United States Patent
Gallagher et al.

(10) Patent No.: US 11,424,817 B2
(45) Date of Patent: Aug. 23, 2022

(54) ENHANCED LDACS SYSTEM HAVING MESH NETWORK TOPOLOGY AND ASSOCIATED METHODS

(71) Applicant: SKYSTREAM LLC, Melbourne, FL (US)

(72) Inventors: Shawn H. Gallagher, Melbourne, FL (US); Eric J. Salyers, Grant, FL (US); Timothy Huggins, Cocoa Beach, FL (US); Ivica Kostanic, West Melbourne, FL (US); Edward Paulsen, Indialantic, FL (US); Daniel Schwinn, Melbourne Beach, FL (US)

(73) Assignee: SKYSTREAM LLC, Melbourne, FL (US)

( * ) Notice: Subject to any disclaimer, the term of this patent is extended or adjusted under 35 U.S.C. 154(b) by 0 days.

(21) Appl. No.: 17/367,324

(22) Filed: Jul. 3, 2021

(65) Prior Publication Data
US 2022/0015005 A1 Jan. 13, 2022

Related U.S. Application Data

(60) Provisional application No. 63/050,131, filed on Jul. 10, 2020.

(51) Int. Cl.
| | | |
|---|---|---|
| *H04B 7/185* | (2006.01) | |
| *H04W 16/18* | (2009.01) | |
| *H04W 40/24* | (2009.01) | |
| *H04W 84/18* | (2009.01) | |

(Continued)

(52) U.S. Cl.
CPC ........ *H04B 7/18508* (2013.01); *G01S 13/878* (2013.01); *G08G 5/0013* (2013.01);
(Continued)

(58) Field of Classification Search
CPC ............ H04B 7/18508; H04B 7/15542; H04B 7/18502; H04B 7/18506; H04B 7/18517;
(Continued)

(56) References Cited

U.S. PATENT DOCUMENTS

| | | |
|---|---|---|
| 6,167,239 A | 12/2000 | Wright et al. |
| 9,692,499 B2 | 6/2017 | Moffatt et al. |

(Continued)

FOREIGN PATENT DOCUMENTS

| | | |
|---|---|---|
| WO | 2018091607 | 5/2018 |

OTHER PUBLICATIONS

Gallagher et al., U.S. Appl. No. 17/367,320, filed Jul. 3, 2021.
(Continued)

*Primary Examiner* — Ashley Shivers
(74) *Attorney, Agent, or Firm* — Allen, Dyer, Doppelt + Gilchrist, P.A.

(57) ABSTRACT

An enhanced L-band Digital Aeronautical Communications System (LDACS) may include LDACS ground stations, and LDACS airborne stations configured to communicate with the LDACS ground stations. Each LDACS airborne station may be configured to collect respective routing metrics, and each LDACS airborne station may be selectively operable as at least one of a host and client. The enhanced LDACS may also include a peer-to-peer server configured to establish a mesh network topology from the LDACS airborne stations based upon the routing metrics, and selectively operate each LDACS airborne station as at least one of the host and client.

28 Claims, 87 Drawing Sheets

(51) Int. Cl.

| | |
|---|---|
| *H04W 12/03* | (2021.01) |
| *H04W 80/02* | (2009.01) |
| *H04W 12/00* | (2021.01) |
| *H04W 12/10* | (2021.01) |
| *H04W 12/06* | (2021.01) |
| *H04B 7/155* | (2006.01) |
| *H04W 8/02* | (2009.01) |
| *G08G 5/00* | (2006.01) |
| *H04W 36/08* | (2009.01) |
| *H04W 72/04* | (2009.01) |
| *H04W 72/10* | (2009.01) |
| *G01S 13/87* | (2006.01) |

(52) U.S. Cl.
CPC ....... *H04B 7/15542* (2013.01); *H04B 7/1855* (2013.01); *H04B 7/18502* (2013.01); *H04B 7/18506* (2013.01); *H04B 7/18517* (2013.01); *H04B 7/18519* (2013.01); *H04B 7/18532* (2013.01); *H04B 7/18541* (2013.01); *H04B 7/18571* (2013.01); *H04B 7/18584* (2013.01); *H04B 7/18591* (2013.01); *H04W 8/02* (2013.01); *H04W 12/009* (2019.01); *H04W 12/03* (2021.01); *H04W 12/06* (2013.01); *H04W 12/10* (2013.01); *H04W 16/18* (2013.01); *H04W 36/08* (2013.01); *H04W 40/24* (2013.01); *H04W 72/0453* (2013.01); *H04W 72/10* (2013.01); *H04W 80/02* (2013.01); *H04W 84/18* (2013.01)

(58) Field of Classification Search
CPC ............ H04B 7/18519; H04B 7/18532; H04B 7/18541; H04B 7/1855; H04B 7/18571; H04B 7/18584; H04B 7/18591; G01S 13/878; G08G 5/0013; H04W 8/02; H04W 12/009; H04W 12/03; H04W 12/06; H04W 12/10; H04W 16/18; H04W 36/08; H04W 40/24; H04W 72/0453; H04W 72/10; H04W 80/02; H04W 84/18

See application file for complete search history.

(56) References Cited

U.S. PATENT DOCUMENTS

| | | | | |
|---|---|---|---|---|
| 9,807,571 | B1 * | 10/2017 | Bauler | ........... H04W 64/00 |
| 10,365,374 | B2 | 7/2019 | Murphy et al. | |
| 10,732,289 | B1 | 8/2020 | Wang et al. | |

OTHER PUBLICATIONS

Gallagher et al., U.S. Appl. No. 17/367,321, filed Jul. 3, 2021.
Gallagher et al., U.S. Appl. No. 17/367,322, filed Jul. 3, 2021.
Gallagher et al., U.S. Appl. No. 17/367,323, filed Jul. 3, 2021.
Gallagher et al., U.S. Appl. No. 17/367,319, filed Jul. 3, 2021.
Gallagher et al., U.S. Appl. No. 17/367,325, filed Jul. 3, 2021.
Gallagher et al., U.S. Appl. No. 17/367,326, filed Jul. 3, 2021.
Gallagher et al., U.S. Appl. No. 17/367,327, filed Jul. 3, 2021.
Gallagher et al., U.S. Appl. No. 17/367,328, filed Jul. 3, 2021.
SESAR2020-PJ14-02-01 LDACS A/G Specifications, Edition 00.02. 02, Aug. 16, 2019, pp. 1-211, https://www.ldacs.com/wp-content/uploads/2013/12/SESAR2020_PJ14_D3_3_030_LDACS_AG_Specification_00_02_02-1_0.pdf.
U. Epple and M. Schnell, "Overview of Legacy Systems in L-Band and its Influence on the Future Aeronautical Communication System LDACS1" IEEE Aerospace and Electronic Systems Magazine, vol. 29, No. 2, Feb. 2014, 13 pages, DOI:10.1109/MAES.2014. 120092.
Icao, "Proposed Amendment to the International Standards and Recommended Practices, Annex 10, Aeronautical Telecommunications," Apr. 2, 2019, 35 pages.
A. Asadi and V. Mancuso, "WiFi Direct and LTE D2D in Action," 2013 IFIP Wireless Days (WD), 2013, 9 pages, DOI: 10.1109/WD. 2013.6686520.
M. Strohmeier, V. Lenders and I. Martinovic, "On the Security of the Automatic Dependent Surveillance-Broadcast Protocol," IEEE Communications Surveys & Tutorials, vol. 17, No. 2, Second Quarter 2015, 23 pages, DOI: 10.1109/COMST.2014.2365951.
K. Khacef and G. Pujolle, "Secure Peer-to-Peer Communication Based on Blockchain," 33rd International Conference on Advanced Information Networking and Applications (AINA-2019), Matsue, Japan, Mar. 2019, 14 pages, DOI:10.1007/978-3-030-15035-8_64.
V.Vitan, G.Berz, and N. Solomina, "Assessment of Current DME Performance and the Potential to Support a Future A-PNT Solution," 2015 IEEE/AIAA 34th Digital Avionics Systems Conference (DASC), 2015, 1 page, Abstract Only, DOI: 10.1109/DASC.2015. 7311357.
V. Vitan, G. Berz, L. Saini, J. Arethens, B. Belabbas and P. Hotmar, "Research on Alternative Positioning Navigation and Timing in Europe," 2018 Integrated Communications, Navigation, Surveillance Conference (ICNS), 2018, 1 page, Abstract Only, DOI: 10.1109/ICNSURV.2018.8384887.
E. Nossek, J. Dambeck, and M. Meurer, "A Direct 2D Position Solution for an APNT-System," Proceedings of the 28th International Technical Meeting of the Satellite Division of The Institute of Navigation (ION GNSS+ 2015), Tampa, Florida, Sep. 2015, 7 pages, https://www.ion.org/publications/abstract.cfm?articleID=13016.
G. Johnson, P. Swaszek, R. Hartnett, R. Shalaev, and M. Wiggins, "An Evaluation of eLoran as a Backup to GPS," 2007 IEEE Conference on Technologies for Homeland Security, 2007, 7 pages, DOI: 10.1109/THS.2007.370027.
D. Shutin, N. Schneckenburger, M. Walter and M. Schnell, "LDACS1 Ranging Performance—An Analysis of Flight Measurement Results," 32nd Digital Avionics System Conference, Oct. 2013, 10 pages, DOI: 10.1109/DASC.2013.6712567.
D. Shutin, N. Schneckenburger, M. Walter, T. Thiasiriphet, N. Franzen, A. Filip, M. Schnell , "LDACS1 Ranging Results from Flight Experiments," Digital Avionics Systems Conference, Oct. 2014, 12 pages, https://www.researchgate.net/publication/312096375_LDACS1_RANGING_RESULTS_FROM_FLIGHT_EXPERIMENTS.
T. Gräupl, M. Ehammer, S. Zwettler, "L-DACS1 Air-to-Air Data-Link Protocol Design and Performance," 2011 Integrated Communications, Navigation, and Surveillance Conference Proceedings, May 2011, 15 pages, DOI: 10.1109/ICNSURV.2011.5935262.
N. Mäurer, A. Bilzhouse, "A Cybersecurity Architecture for the L-band Digital Aeronautical Communications System (LDACS)," 2018 IEEE/AIAA 37th Digital Avionics Systems Conference (DASC), Sep. 2018, 11 pages, DOI: 10.1109/DASC.2018.8569878.
T. Gräupl et al., "L-Band Digital Aeronautical Communications System (LDACS) Flight Trials in the National German Project MICONAV," Conference: 2018 Integrated Communications, Navigation, Surveillance Conference (ICNS), Apr. 2018, 8 pages, https://www.researchgate.net/publication/325771026_L-band_Digital_Aeronautical_Communications_System_LDACS_flight_trials_in_the_national_German_project_MICONAV.
U. Epple, M. Schnell, "Overview of Interference Situation and Mitigation Techniques for LDACS1," 2011 IEEE/AIAA 30th Digital Avionics Systems Conference, 2011, 13 pages, DOI: 10.1109/DASC.2011.6095907.
O. Osechas et al., "Characterization of the Ground-to-Air Ranging Performance of the 960-1215 MHz ARNS Band Using OFDM Measurements in the 902-928 MHz ISM Band," Proceedings of the 2016 International Technical Meeting of The Institute of Navigation, Jan. 2016, 8 pages, DOI.org/10.33012/2016.13413.
S. Ayaz, F. Hoffmann, C. Sommer, R. German, F. Dressier, "Performance Evaluation of Network Mobility Handover over Future Aeronautical Data Link," 2010 IEEE Global Telecommunications Conference GLOBECOM 2010, 2010, pp. 1-11, https://ieeexplore.ieee.org/document/5684106.
R. Kumar, G. Battista, O. Oschas, "Demand-based Placement of LDACS Ground Stations to Achieve RNP 0.3 Accuracy for APNT," Proceedings of the 2017 International Technical Meeting of The Institute of Navigation, Jan. 2017, 15 pages, DOI.org/10.33012/2017.14887.

(56) References Cited

OTHER PUBLICATIONS

N. Mäurer and A. Bilzhause, "Paving The Way for an IT Security Architecture For LDACS: A Datalink Security Threat And Risk Analysis," 2018 Integrated Communications, Navigation, Surveillance Conference (ICNS), 2018, 12 pages, https://ieeexplore.ieee.org/document/8384828.

N. Mäurer, T. Gräupl, C. Schmitt, "Evaluation of the LDACS Cybersecurity Implementation," 2019 IEEE/AIAA 38th Digital Avionics Systems Conference (DASC), 2019, 10 pages, https://ieeexplore.ieee.org/document/9081786.

C. Rihacek et al., "L-band Digital Aeronautical Communications System (LDACS) Activities in SESAR2020," 2018 Integrated Communications, Navigation, Surveillance Conference (ICNS), 2018, 9 pages, DOI: 10.1109/ICNSURV.2018.8384880.

M. Felux, T. Gräupl, N. Mäurer, M. Stanisak, "Transmitting GBAS messages via LDACS," 2018 IEEE/AIAA 37th Digital Avionics Systems Conference (DASC), 2018, 7 pages, DOI: 10.1109/DASC.2018.8569836.

M. Ehammer and T. Gräupl, The LDACS1 Link Layer Design, Collection of open chapters of books in transport research (2011). vol. 2011, pp. 291-316, 117 URL https://www.scipedia.com/public/Ehammer_Graupl_2011a.

Maeurer et al., "L-band Digital Aeronautical Communications System (LDACS)", Internet Draft, Internet Engineering Task Force (IETF), Jul. 2020, pp. 1-23.

Schnell et al., "LDACS: Future Aeronautical Communications for Air-Traffic Management", IEEE Communications Magazine, vol. 52, No. 5, May 2014, pp. 104-110.

Maurer et al., Towards Successful Realization of the LDACS Cybersecurity Architecture: An Updated Datalink Security Threat-And Risk Analysis, IEEE, 2019, pp. 1A2-1-1A2-13.

Graupl et al., "LDACS A/G Specification", SESAR Joint Undertaking (SESAR2020-PJ14-02-01), Aug. 2019, pp. 1-211.

Liu et al. "Space-Air-Ground Integrated Network: A Survey", IEEE Communication Surveys & Tutorials, vol. 20, No. 4, 2018, pp. 2714-2741.

\* cited by examiner

AIRBORNE STATION 1
LDACS TX:   964-1010 MHz
LDACS RX:   1110-1156 MHz
DME TX:     1110-1156 MHz
DME RX:     164-1010 MHz
AIRBORNE STATION 2
LDACS TX:   964-1010 MHz
LDACS RX:   1110-1156 MHz
DME TX:     1110-1156 MHz
DME RX:     164-1010 MHz
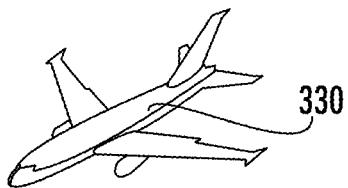
330
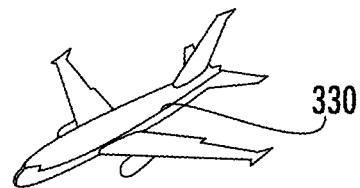
330
GROUND STATION 1
LDACS TX:   1110-1156 MHz
LDACS RX:   964-1010 MHz
DME TX:     964-1010 MHz
DME RX:     1110-1156 MHz
GROUND STATION 2
LDACS TX:   1110-1156 MHz
LDACS RX:   964-1010 MHz
DME TX:     964-1010 MHz
DME RX:     1110-1156 MHz
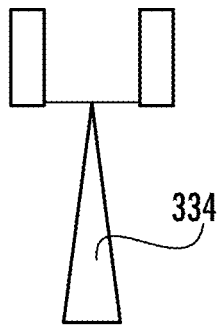
334
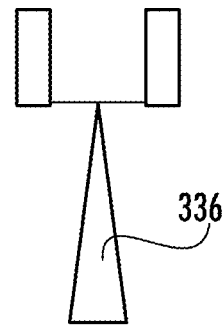
336
FIG. 6

| QCI | RESOURCE TYPE | PRIORITY | PACKET DELAY BUDGET | PACKET ERROR LOSS RATE | EXAMPLE SERVICES |
|---|---|---|---|---|---|
| 1 | GBR | 2 | 100ms | $10^{-2}$ | CONVERSATIONAL VOICE |
| 2 | GBR | 4 | 150ms | $10^{-3}$ | CONVERSATIONAL VIDEO (LIVE STREAMING) |
| 3 | GBR | 3 | 50ms | $10^{-3}$ | REAL TIME GAMING, V2X MESSAGES |
| 4 | GBR | 5 | 300ms | $10^{-6}$ | NON-CONVERSATIONAL VIDEO (BUFFERED STREAMING) |
| 65 | GBR | 0.7 | 75ms | $10^{-2}$ | MISSION CRITICAL USER PLANE PUSH TO TALK VOICE (E.G. MCPTT) |
| 66 | GBR | 2 | 100ms | $10^{-2}$ | NON-MISSION-CRITICAL USER PLANE PUSH TO TALK VOICE |
| 75 | GBR | 2.5 | 50ms | $10^{-2}$ | V2X MESSAGES |
| 5 | NON-GBR | 1 | 100ms | $10^{-6}$ | IMS SIGNALLING |
| 6 | NON-GBR | 6 | 300ms | $10^{-6}$ | VIDEO (BUFFERED STREAMING) TCP-BASED (FOR EXAMPLE, WWW, EMAIL, CHAT, FTP, P2P AND THE LIKE) |
| 7 | NON-GBR | 7 | 100ms | $10^{-3}$ | VOICE, VIDEO (LIVE STREAMING), INTERACTIVE GAMING |
| 8 | NON-GBR | 8 | 300ms | $10^{-6}$ | VIDEO (BUFFERED STREAMING) TCP-BASED (FOR EXAMPLE, WWW, EMAIL, CHAT, FTP, P2P AND THE LIKE) |
| 9 | NON-GBR | 9 | 300ms | $10^{-6}$ | VIDEO (BUFFERED STREAMING) TCP-BASED (FOR EXAMPLE, WWW, EMAIL, CHAT, FTP, P2P AND THE LIKE) TYPICALLY USED AS DEFAULT BEARER |
| 69 | NON-GBR | 0.5 | 60ms | $10^{-6}$ | MISSION CRITICAL DELAY SENSITIVE SIGNALLING (E.G., MC-PTT SIGNALLING) |
| 70 | NON-GBR | 5.5 | 200ms | $10^{-6}$ | MISSION CRITICAL DATA (E.G. EXAMPLE SERVICES ARE THE SAME AS QCI 6/8/9) |
| 79 | NON-GBR | 6.5 | 50ms | $10^{-2}$ | V2X MESSAGES |
| 80 | NON-GBR | 6.8 | 10ms | $10^{-6}$ | LOW LATENCY eMBB APPLICATIONS(TCP/UDP-BASED) AUGMENTED REALITY |
| 82 | GBR | 1.9 | 10ms | $10^{-4}$ | DISCRETE AUTOMATION (SMALL PACKETS) |
| 83 | GBR | 2.2 | 10ms | $10^{-4}$ | DISCRETE AUTOMATION (BIG PACKETS) |
| 84 | GBR | 2.4 | 30ms | $10^{-5}$ | INTELLIGENT TRANSPORT SYSTEMS |
| 85 | GBR | 2.1 | 5ms | $10^{-5}$ | ELECTRICITY DISTRIBUTION-HIGH VOLTAGE |

FIG. 19

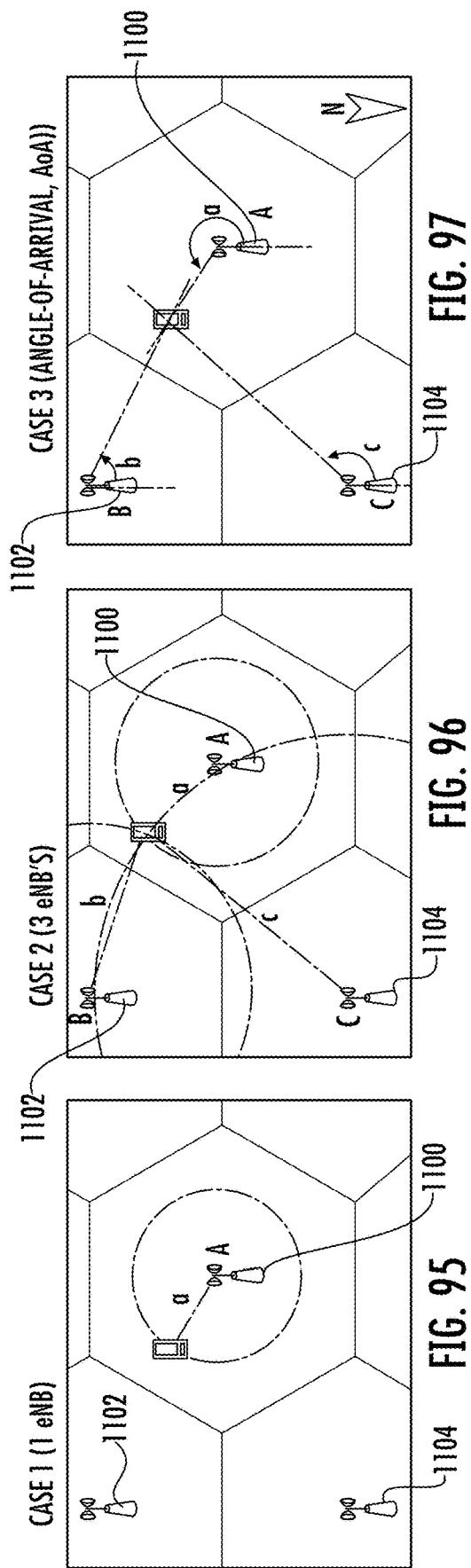

ENHANCED LDACS SYSTEM HAVING MESH NETWORK TOPOLOGY AND ASSOCIATED METHODS

PRIORITY APPLICATION(S)

This application is based upon U.S. provisional patent application Ser. No. 63/050,131 filed Jul. 10, 2020, the disclosure which is hereby incorporated by reference in its entirety.

FIELD OF THE INVENTION

This invention relates to communications, and more particularly, to the L-band Digital Aeronautical Communications System (LDACS).

BACKGROUND OF THE INVENTION

LDACS stands for the L-band Digital Aeronautical Communications System. It is an upcoming air-to-ground communications standard, and therefore, an important data link technology within the future communications infrastructure for aviation. Standardization within the ICAO (International Civil Aviation Organization) started in December 2016 and the LDACS draft SARPs (Standards and Recommended Practices) were developed and endorsed in October 2018. The LDACS system leverages the LDACS waveform as a new Command and Control/Command, Control and Communication (C2/C3) process with aircraft and provides user plane services over an LDACS connection.

The ICAO standardization effort for LDACS has so far yielded a basic Media Access Controller (MAC) and physical-layer (PHY) definition that provides for communications fundamentals such as radio link attachment and connection establishment. However, improvements can be made to provide a higher-layer architecture and procedures to support more advanced communications features, including voice and data, Alternative Position and Timing (A-PNT) services, enhanced security, unmanned aerial systems (UAS), channel aggregation, and other applications.

SUMMARY OF THE INVENTION

In general, an enhanced L-band Digital Aeronautical Communications System (LDACS) may comprise a plurality of LDACS ground stations, and a plurality of LDACS airborne stations configured to communicate with the plurality of LDACS ground stations. Each LDACS airborne station may be configured to collect respective routing metrics, and each LDACS airborne station may be selectively operable as at least one of a host and client. The enhanced LDACS may also comprise a peer-to-peer server configured to establish a mesh network topology from the plurality of LDACS airborne stations based upon the routing metrics, and selectively operate each LDACS airborne station as at least one of the host and client.

The plurality of LDACS airborne stations may be configured to restrict communication based upon data service level. In addition, at least one LDACS ground station may be configured to serve as a gateway for a terrestrial communication network. Each LDACS airborne station may comprise an internal communications network coupled to the mesh network topology.

In some embodiments, the plurality of LDACS airborne stations may be configured to communicate with one another via time division duplex. The plurality of LDACS airborne stations may be configured to communicate with one another in at least one LDACS channel, for example. In addition, the plurality of LDACS airborne stations may be configured to communicate with one another in an available Distance Measuring Equipment (DME) frequency band. The plurality of LDACS airborne stations may be configured to communicate at least one of A-PNT data, ATC data, and voice data, for example.

Each LDACS ground station may comprise a ground antenna, a ground radio frequency (RF) transceiver coupled to the ground antenna, and a ground controller coupled to the ground RF transceiver. Similarly, each LDACS airborne station may comprise an airborne antenna, an airborne radio frequency (RF) transceiver coupled to the airborne antenna, and an airborne controller coupled to the airborne RF transceiver. The plurality of LDACS ground stations and LDACS airborne stations may be configured to operate within at least one 500 kHz channel in a frequency range of between 964-1156 MHz.

The peer-to-peer server may comprise a processor and an associated memory. Another aspect is directed to a method of operating an enhanced LDACS comprising a plurality of LDACS ground stations, and a plurality of LDACS airborne stations configured to communicate with the plurality of LDACS ground stations, with each LDACS airborne station configured to collect respective routing metrics, and each LDACS airborne station selectively operable as at least one of a host and client. The method may comprising operating a peer-to-peer server to establish a mesh network topology from the plurality of LDACS airborne stations based upon the routing metrics, and selectively operate each LDACS airborne station as at least one of the host and client.

DESCRIPTION OF THE DRAWINGS

Other objects, features and advantages of the present invention will become apparent from the detailed description of the invention, which follows when considered in light of the accompanying drawings in which:

FIG. 6 is another schematic view showing an example of interference between LDACS and DME/TACAN in a non-cosite deployment having two ground stations.

FIG. 19 is a chart of a QCI example for the enhanced LDACS system.

FIG. 95 is a plan view of the LDACS cell showing positioning accuracy within the variable of a circle as a single node labeled A.

FIG. 96 is a view similar to that of FIG. 95, but showing positioning with three nodes labeled A, B and C.

FIG. 97 is a view similar to that shown in FIGS. 95 and 16B and showing positioning with angle-of-arrival with the three nodes as A, B and C.

DETAILED DESCRIPTION

Figure 1:
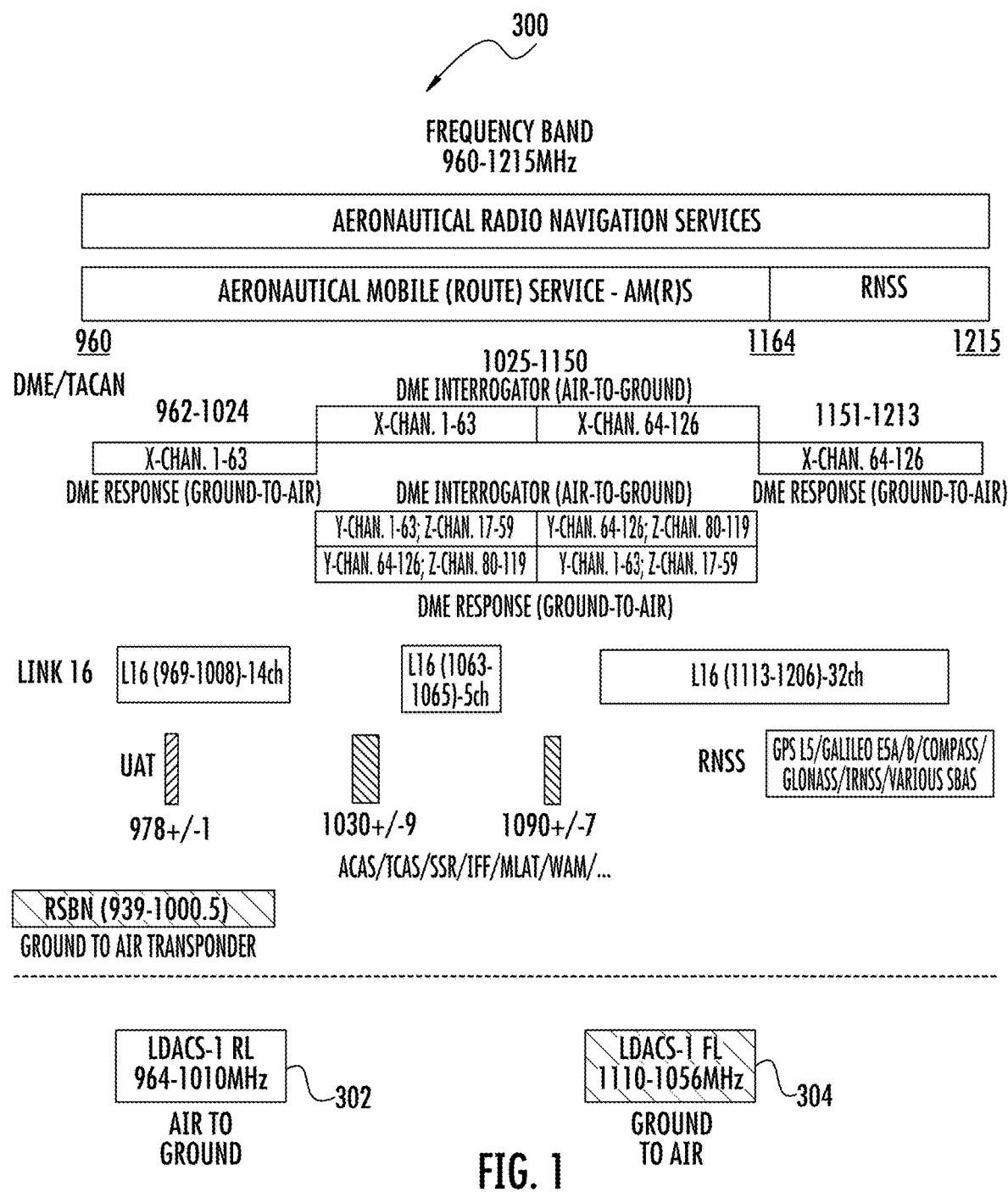
FIG. 1 is a chart showing the Aeronautical Radio Navigation Services in the 960-1215 MHz frequency band and which incorporates the enhanced LDACS system.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

L-Band Characteristics

The L-band Digital Aeronautical Communication System (LDACS) is planned within the Aeronautical Radio Navigation Services spectrum band corresponding to 960-1215 MHz. This spectrum currently includes many important and heavily utilized wireless systems and a significant effort is required to transition the band from its current use to the one that supports deployment of LDACS.

This 960-1215 MHz band is allocated in all ITU (International Telecommunication Union) Regions for the Aeronautical Radio-Navigation Service (ARNS). Worldwide the band is used for: 1) Airborne Collision Avoidance System (ACAS); 2) Automatic Dependent Surveillance-Broadcast (ADS-B); 3) Distance Measuring Equipment (DME); 4) Tactical Air Navigation (TACAN); 5) Secondary Surveillance Radar (SSR); 6) Global Navigation Satellite Systems (GNSS); 7) Military Identification Friend or Foe (IFF)—Mode 1 to 5; 8) Reverse-Identification Friend or Foe (Reverse IFF); 9) Military Joint Tactical Information Distribution; 10) System/Multifunctional Information Distribution System (JTIDS/MIDS); 11) Multilateration (MLAT)/Wide Area Multilateration (WAM); and 12) Radiotechniczny System Bliskiej Nawigacji (RSBN).

The frequency of 978 MHz is also used for the Universal Access Transceiver (UAT) standardized by ICAO (International Civil Aviation Organization). Furthermore, ICAO envisions additional L-band Digital Aeronautical Communication Systems operating within this band. None of the listed services occupies the entire ARNS band, however, in aggregation, they make this band congested. Table 1 summarizes basic parameters associated with the individual ARNS services with respect to spectrum use.

TABLE 1

Use of ARNS Band by Various Services

| | Service | Frequencies | Communication Type | Comments |
|---|---|---|---|---|
| 1 | ACAS | 1030 MHz for interrogation (30 MHz) 1090 MHz for responses (30 MHz) | Digital communication with prescribed message formats | |
| 2 | ADS-B | 1090 MHz for aircraft above 18k feet (30 MHz) 978 MHz for aircraft below 18k feet | Digital communication with prescribed message formats | It is FAA recommendation to switch the frequencies at 18k feet border to alleviate the congestion of 1090 MHz frequency |
| 3 | DME | Ground TX: 962 MHz-1024 MHz 1151 MHz-1213 MHz Airborne TX: 1025 MHz-1087 MHz 1088 MHz-1150 MHz BW = 1 MHz per channel | Analogue pulse pairs separated by either 12 microsec (X), 30 microsec (Y), or 15 microsec (Z) | Even though the channelization is done for the entire range 961-1150 MHz, the DME signal is not utilizing many of its channels to allow for operation of other services in the band. Integer MHz frequencies are used for carrier frequencies. |
| 4 | TACAN | Ground TX: 962 MHz-1024 MHz 1151 MHz-1213 MHz Airborne TX: 1025 MHz-1087 MHz 1088 MHz-1150 MHz BW = 1 MHz per channel | Analogue pulse pairs separated by either 12 microsec(X), 30 microsec(Y) | TACAN utilizes the same channel plan as DME. However, the measurements are more accurate than DME and include orientation of the aircraft. Integer MHz frequencies are used for carrier frequencies. |
| 5 | SSR | Ground TX: 1030 MHz, BW = 21.5 MHz Airborne TX: 1090 MHz, BW = 14 MHz | Analog pulses. | SSR operates within the same band as DME. It takes precedence and its frequencies are not used for DME assignments. In other words, DME channels within SSR bands are not in service. |

TABLE 1-continued

Use of ARNS Band by Various Services

| Service | Frequencies | Communication Type | Comments |
|---|---|---|---|
| 6 GPS (L5) Galileo (E5) COMPASS GLONASS (L3/L5) IRNSS | GPS (L5) 1164 MHz-1191.795 MHz Galileo (E5A, E5B) A: 1164 MHz-1191.795 MHz B: 1191.795 MHz-1215 MHz COMPASS 1195 MHz-1219 MHz GLONASS L3: 1198.55 MHz-1204.88 MHz L5: 1176.45 +/− 12 MHz IRNSS 1176.45 MHz +/− 12 MHz | Spread spectrum signal sent by satellites. | Note: Galileo's authorized bandwidth is 51.15 MHz. Its transmission is as wide as 90 MHz. |
| 7 IFF | 1030 MHz for interrogation (30 MHz) 1090 MHz for responses (30 MHz) | | |
| 8 Reverse IFF | 1090 MHz for interrogation (30 MHz) 1030 MHz for responses (30 MHz) | | |
| 9 JTIDS/MIDS a.k.a. LINK 16 | Three bands are used: 1: 969 MHz-1008 MHz 2: 1053 MHz-1065 MHz 3: 1113 MHz-1206 MHz | Digital FH transmission with 3 MHz channelization and prescribed message format. | Operates in a band as a guest - supposed to cause no harmful interference to other users of the band. |
| 10 MLAT/WAM | 1090 MHz for interrogation (30 MHz) 1030 MHz for responses (30 MHz) | | |
| 11 RSBN | 939.6 MHz-1000.5 MHz | | This is a non-ICAO system designed by USSR and used mostly for military aircraft (MIG and Sukhoi) |
| 12 UAT | 978 MHz BW = 1 MHz | | |

Table 1 shows the existing use of the ARNS spectrum band, including the different services, their range of frequencies, the type of communication, and some details about each service. There are also planned Aeronautical Mobile (Route) Service Systems [AM(R)S], which currently are in the technology evaluation stage. Some prototypes have already been tested. This ARNS band is congested and there are many available services. However, the amount of spectrum is large, and many services are limited geographically to areas located adjacent an airport. As a result, in any given geographical location, there may be significant sections of unused spectrum, especially at lower altitudes. The types of systems operating in this band are considered strategically important and the airline industry is likely to depend on them for many years.

This spectrum may be broadly divided into two sections, i.e., the first section for ground bases or stations AN(R)S (960-1164 MHz), and the second section for satellite systems as GNSS (1164-1215). Any proposed air-to-ground system should stay clear of the GNSS section of the spectrum because GNSS systems operate with weak signals and are vulnerable to interference.

The RSBN systems are used outside of the USA and the western world in general and are not of significant concern in the US airspace. The services listed in rows 1,2 5, 7, 8 and 10 of Table 1 use a small section of the band, for example, a 1030/1090 MHz pair of channels, which have a different bandwidth. Channel 1030 occupies about 18 MHz of spectrum, while channel 1090 occupies about 14 MHz of spectrum. The service listed in row 12, (UAT) occupies a single channel centered at 978 MHz. The bandwidth of this channel is 1 MHz (2 MHz with inclusion of a guard band). The JTIDS/MIDS service, which is also referred to as Link 16, is a tactical system used by NATO, and causes limited interference to other services. The air interface of JTIDS/MIDS Link 16 uses frequency hopping to minimize any impact. When deployed, however, this system uses almost the entire available spectrum, but it is rarely deployed, only in military operations.

Referring now to FIG. 1, the frequency assignments of Table 1 are translated into a chart format at 300 and also shows the proposed new generation digital air-to-ground and ground-to-air communication systems as LDACS-1 for both reverse and forward links shown at 302 and 304. From Table 1 and FIG. 1, the dominant service deployment for the spectrum comes from DME and TACAN, which are essentially civilian and military versions of the same AN(R)R technology. Both DME and TACAN are used for distance measurements where pulse pairs are sent from an aircraft to a ground station. Once received, the ground station echoes the pulses and the aircraft measures the time between the transmission and reception allowing the aircraft to determine its distance from the fixed location of the ground station. DME and TACAN are most commonly paired with VOR (Very High Frequency, Omni-Directional Range) equipment, which allows an aircraft to determine not only the distance to the ground station but also the look angle.

Figure 2:
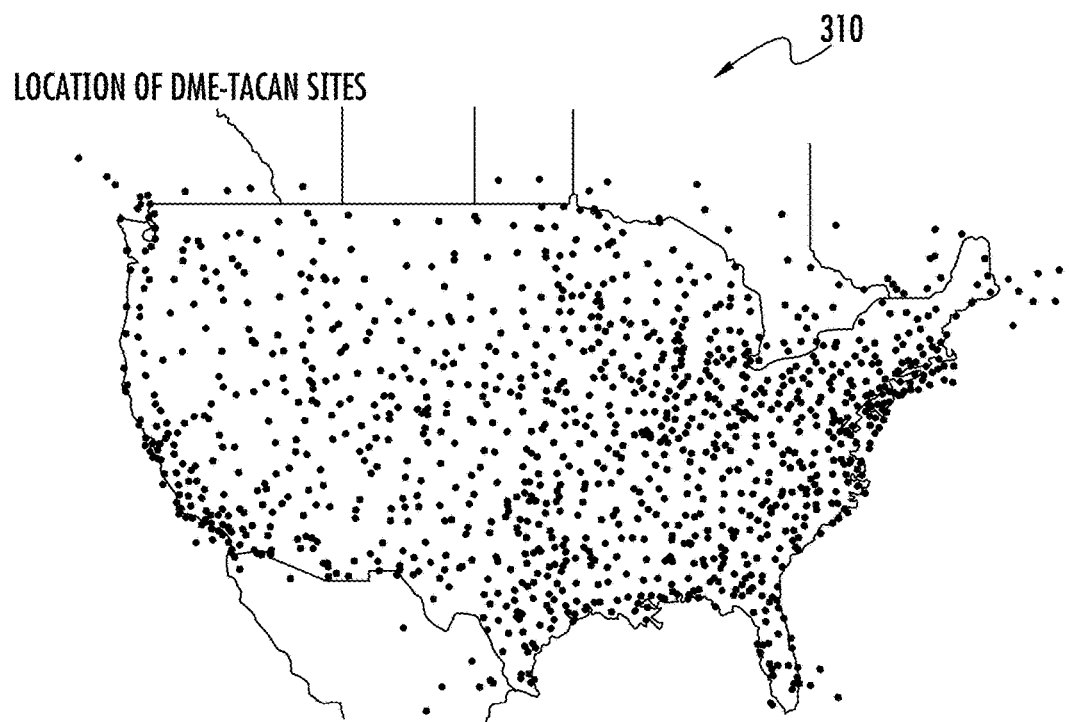
FIG. 2 is a map of the continental US (CONUS) showing deployment of DME and TACAN sites.

Referring to FIG. 2, a map of the United States 310 shows the deployment of DME and TACAN sites throughout the CONUS (Continental United States) and also shows portions of southern Canada and northern Mexico, referred to as CONUS+. The overall count of the illustrated sites is provided in Table 2. There are about 1,200 sites in the CONUS+ area.

TABLE 2

Site Count for Distance Measurement Sites in AN(R)S Band (as of December 2019)

| Site Type | Count |
|---|---|
| DME (only) | 70 |
| TACAN (only) | 84 |
| VOR/DME | 612 |
| VORTEC (VOR/TACAN) | 386 |
| Total | 1196 |

LDACS Overview

Figure 3:
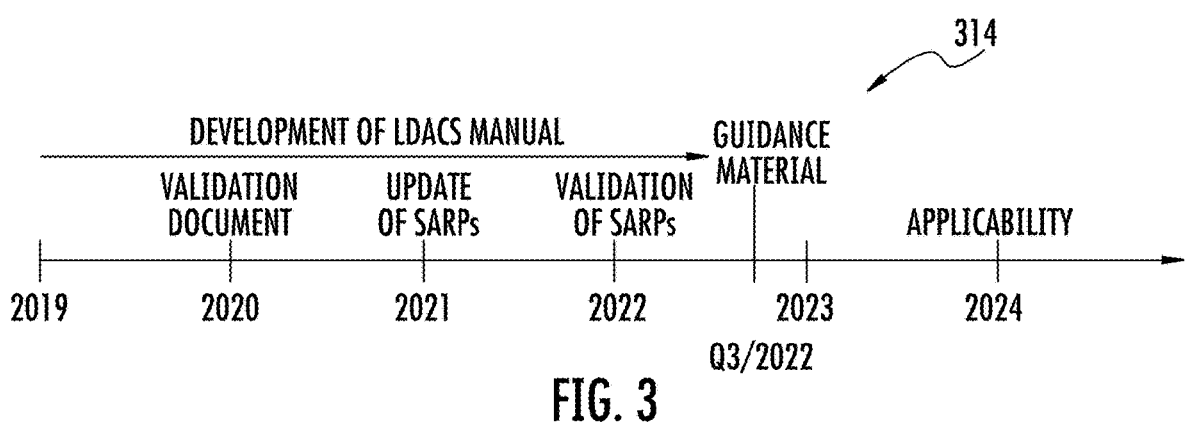
FIG. 3 is a timeline for the LDACS standardization.

In 2002, the International Civil Aviation Organization (ICAO) recognized the need to improve the aeronautical communication system for air traffic management (ATM) and air traffic control (ATC). As a result, researchers on both sides of the Atlantic developed plans for a new aeronautical communication, which came to be known as the Future Communication Infrastructure (FCI). The FCI includes several communication links, including air-to-ground and satellite communication links, and may later include air-to-air communication. The L-band Digital Aeronautical Communication System (LDACS) is in the FCI category and was defined by Eurocontrol. After many years of standardization, the specification document was produced as SESAR2020-PJ14-02-01 LDACS A/G Specifications, Aug. 16, 2019, the disclosure which is hereby incorporated by reference in its entirety. The specification is not finalized, and additional work is planned in accordance with standardization timeline given in FIG. 3 at 314.

Some properties of LDACS as standardized in the A/G Specification are now described. LDACS is standardized by ICAO and designed as a future terrestrial data link for aviation. It is designed to be secure, scalable and spectrum efficient high data rate link that supports both ATS (Air Traffic Services) and AOC (Airline Operational Control) services. LDACS manages and services priorities and guarantees bandwidth, low latency, and high continuity of service for safety critical ATS applications while simultaneously accommodating less safety-critical AOC services. LDACS technology is based on an air interface similar to the interface used in LTE/4G mobile radio, enabling high rate, low latency data link communications beyond the scope of current and proposed VHF communications.

The enhanced LDACS system may include a secure data link that enables secure data communications for ATS and AOC services, including secured private communications for aircraft operators and ANSPs (Air Navigation Service Providers). LDACS operates as a cellular communications system and future terrestrial data link within the Future Communications Infrastructure (FCI). The enhanced LDACS system may work with an upgraded satellite-based communications systems and be deployed within the FCI and constitute the main components of a multilink communication within the FCI. Both technologies, LDACS and satellite systems, have their specific benefits and technical capabilities which complement each other. Satellite systems are especially well-suited for large coverage areas with less dense air traffic, e.g. oceanic regions. LDACS is well-suited for dense air traffic areas, e.g., continental areas or hot spots around airports and terminal airspace.

Figure 4:
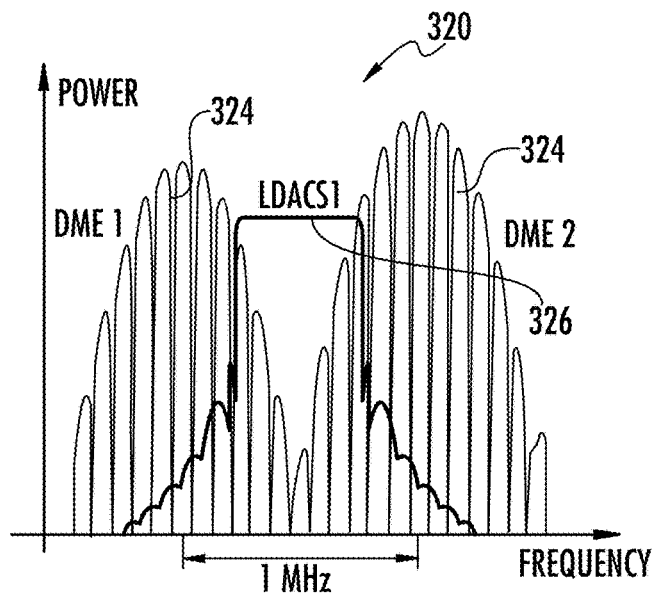
FIG. 4 is a graph showing the signal interlacing between DME and LDACS OFDM (Orthogonal Frequency Division Multiplexing) channels.

LDACS uses 964-1010 MHz with an initial deployment 964-979 MHz for the air-to-ground direction. LDACS uses 1110-1156 MHz with an initial deployment 1110-1125 MHz for the ground-to-air direction. The amount of spectrum that may be available for deployment is 2×46 MHz in FDD (Frequency Division Duplex) operation, which is flexible. Any channel from the air-to-ground portion of the spectrum may be paired with any channel in the ground-to-air portion. An LDACS channel has a bandwidth of 500 kHz. Therefore, within the planned 46 MHz of paired spectrum, there are available 92 LDACS channels. LDACS may be deployed on a 500 kHz raster in-between DME (or TACAN) channels, as best shown in the graph 320 of FIG. 4, showing the interlacing between DME 324 and LDACS OFDM 326 (Orthogonal Frequency Division Multiplexing) channels. Also, the enhanced LDACS system may use the DME/TACAN frequency if that frequency is free within the geographical area of deployment, for example, when traveling over an expanse of ocean having no DME stations, or over a land mass with few or no DME stations, such as the middle of Africa.

In a regular mode of operation, an LDACS cell covers up to 200 nautical miles, and in an extended mode, an LDACS cell may cover a radius of 400 nautical miles. LDACS supports make-before-the-break handover and supports Adaptive Coding and Modulation (ACM) and achievable rates between 550 kbps to 2.6 Mbps per channel, corresponding generally to spectral efficiencies between 1 bps/Hz to 5 bps/Hz. LDACS supports both voice and data. Digital voice may be supported as either VoIP or through a dedicated voice interface. LDACS also supports Quality of Service (QoS) management of service priorities, secure communication, and a native IP based communication.

The enhanced LDACS system also provides support for navigation. LDACS ground stations may transmit signals continuously and LDACS aircraft stations receive the ground station signals and perform pseudo-ranging to the ground stations. By having available four or more pseudo-ranges, an airborne station may determine its position in three-dimensional space, similar to GNSS (Global Navigation Satellite System), e.g., GPS or Galileo. LDACS ground stations act as "satellites-on-the-ground," also termed pseudolites. For navigation, the synchronization among the LDACS ground stations may be more accurate than synchronization used for communications, where the synchronization error between ground stations may be less than 1.6 μs (microseconds) in communications. It needs to be less than 50 ns (nanoseconds) to support LDACS navigation. The required precise synchronization for the LDACS navigation can be achieved in several ways. A first technique is to use affordable GNSS-disciplined, Rubidium atomic clocks at the LDACS ground stations, which have a small drift and can continue function with sufficient accuracy for several hours in the case of a GNSS failure. A second technique uses time distribution via satellite, and a third technique may use eLORAN for a timing reference.

The LDACS navigation capability has been simulated through flight trials with DLR (German Aerospace Center). Theory and simulations predict an achievable accuracy of around 4 meters (RMSE). Flight trials have proven that an accuracy of around 15 meters (RMSE) is achievable in practice, which is better than the achievable accuracy of current DMEs. The LDACS navigation capability may be used for Alternative Positioning, Navigation and Timing (APNT) and as back-up for GNSS. The LDACS navigation capability for APNT is supported by SESAR and a general reference is included in the LDACS standardization within ICAO and by some work from DLR.

From the spectrum chart of FIG. 1, it is evident that an important constraint on the LDACS deployment results from the non-interference requirement with DME/TACAN systems. The Link 16 service is deployed rarely and non-permanently as a tactical system. However, when the Link 16 is deployed, the two technologies should tolerate each other. Except for DME and the Link 16 service, all other communication systems in the L-band are adequately protected with appropriate guard bands.

Figure 5:
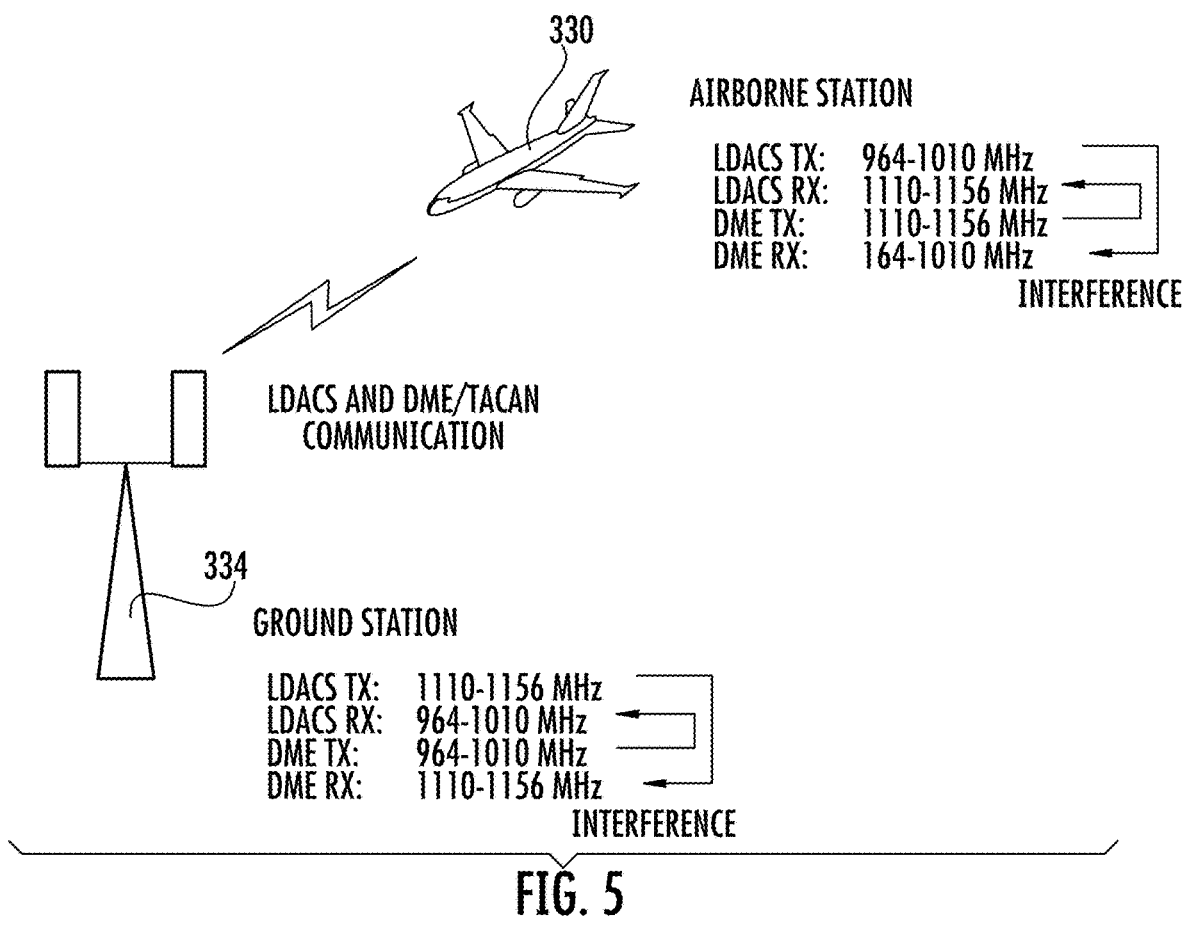
FIG. 5 is a schematic view showing an example of interference between LDACS and DME/TACAN in a deployment at one site for the LDACS and DME/TACAN having a single ground station.

Referring now to FIGS. 5 and 6, the interference conditions in communication with the illustrated aircraft 330 between LDACS and DME/TACAN are illustrated. FIG. 5 shows the interference condition between LDACS and DME/TACAN when equipment is co-located at the same site 334, and FIG. 6 shows possible interference conditions when equipment is not co-located at the same site 334,336. Even though LDACS is an FDD system, the duplexing space is not fixed and therefore, the air-to-ground frequency plan and ground-to-air frequency plan are essentially independent of each other. On the basis of the LDACS specification, it is possible to implement constraints that are satisfied by the LDACS frequency plan so that LDACS may operate as an overlay to the DME/TACAN.

The ground-to-air LDACS uses channels 9-99 for a total of 91 channels. The odd channels are in between DME/TACAN assignments. The even channels are on frequencies that may be used for DME/TACAN. In the LDACS specification, a frequency reuse factor of N=7 is advocated. However, since the sites do not follow a regular hexagonal grid, this constraint is translated into a similar constraint such that all sites within radio horizon of a flying aircraft should operate on different LDACS channels. The overlay between LDACS and DME/TACAN may be "one-to-one," and channel separation between LDACS and DME/TACAN on a given site may be larger than eight (8) LDACS channels. This does not have to be the case and it is possible to co-locate LDACS with DME/TACAN. LDACS should not be on an adjacent channel to a DME assignment on any of the sites within the radio horizon of the ground station.

Enhanced Service Acquisition Including Network Scanning and Detection

When an LDACS aircraft station connects to a ground station signal per the LDACS air-to-ground specification, the process results in the aircraft station having a control and data connection to the ground network via a ground station. This process is depicted in the aircraft station MAC state diagram shown in FIG. 7 generally at 340, which is part of the LDACS specification.

The aircraft station enters an initial FSCANNING state upon power-up 342. In this FSCANNING state 342, the aircraft station scans for RF energy in the designated RF frequency LDACS channels. This process generates a limited data set for the more resource and time intensive synchronization process that follows in the CSCANIING state 344. In that CSCANNING state 344, the aircraft station attempts to synchronize to the LDACS forward channel signal on the channels where energy was detected in the previous FSCANNING state 342. If the aircraft station is unable to synchronize to a particular channel, the next channel in the list is attempted. This repeats until the aircraft station is able to synchronize to a forward link signal.

Once the aircraft station has successfully synchronized to the ground station forward signal, the aircraft station decodes the overhead broadcast messages from the forward link to determine the access parameters for that ground station. When the access parameters have been determined, the aircraft station transitions to the CONNECTING state 346 where it attempts to establish a connection with the ground station using a RACH (random access procedure). When the aircraft station transitions to the OPEN state 348, a dedicated control and data channel (logical) has been established and assigned to the aircraft station. When directed by the ground station, the aircraft station scans its neighbors for potential handover 350. The aircraft station sends or receives link control information via the logical control channel, and "user" payload data is transferred via the logical data channel.

This process as described lacks the features and procedures that are required to allow for disparate or fragmented ground network deployment. Deployment of the enhanced LDACS system as a network may include a fractured network deployed by service providers for access, following a subscription model, or by companies looking for a private air-to-ground network to service their own aircraft or unmanned aerial system. This may follow the pattern set by cellular connectivity rollout, which began as disjointed localized carriers that gradually expanded their coverage areas before network consolidation bought the current limited number of large carriers. That technology employs specific standards that allow each base station, similar to the LDACS ground station, to identify the provider which the cellular device uses during its serving cell selection process to make sure it connects with the proper network. To support this deployment model, two improvements are made to the basic LDACS waveform and connection process and incorporated into the enhanced LDACS system.

The enhanced LDACS system in a first example may add additional broadcast overhead messages that identify the network provider and various network organizational parameters. The aircraft station MAC state definition may be updated to add a separate state in the aircraft station MAC that follows the CSCANNING state 344 where the aircraft station compares the network provider code to a predefined set of providers that can provide service to the aircraft station. In a second example, this functionality may be incorporated as an enhancement to the CSCANNING state 344 rather than introducing a new state. In either case, the aircraft station uses the broadcast network provider identifier to determine if it should mode on the state where it attempts RACH procedure or whether it should return and synchronize with another signal in order to find the appropriate ground station forward link signal.

Using the principles involved with cellular technology, it is expected that over time a set of "roaming" partnerships may be established to allow for increased coverage areas. In addition to the network provider identifier, the transmitted broadcast overhead messages may include additional parameters that indicate various network organizations. These parameters include: (1) the physical site indicator for the ground station node; (2) the antenna type and orientation for the forward link signal; (3) a sector identifier for multi-sector ground station sites; and (4) a local area indicator to facilitate network routing organization.

A centralized set of network brokers is established for user "roaming" costs to be transacted, similar to the roaming agreements with cellular network providers and the clearing houses, such as Synerverse, Vodacomm, and similar entities. When a connection is established on a network, the clearing house may be notified, and the subscription validated prior to providing services. This may result in varied level of services depending on the subscription and specific inter-network roaming agreements, which may be established between the "home" networks. In all cases, the basic network awareness of the aircraft in the area may be maintained, such as for air traffic control notifications. This basic awareness is analogous to the requirement for 911 services to all cellular devices, regardless of carrier subscription agreements or even lack of a carrier at all.

An enhanced handover process may be implemented. According to the LDACS specification, there are two CSCANNING states: (1) controlled and (2) ground station. In the aircraft station controlled state, the aircraft station selects a candidate from the output of the Fast Scanning state and attempts to synchronize. The ground station controlled scanning state is initiated when the ground station wants a specified aircraft station to conduct a handover. In order to select the appropriate ground station to hand the aircraft station over to the current ground station, it must assess the signal power levels of all candidate and neighboring ground stations as received by the aircraft station. These measurements are periodically triggered by the current ground station using the STB message. After a successful ground station controlled scanning procedure, the aircraft station physical layer may report the measured signal quality and optionally provide the content of the received PHY-SDUs (physical layer, service data units), if it could be decoded via MAC to the LME. The collected power reports shall provide the basis for handover decisions at the current ground station.

The aircraft station controlled state may be enhanced to account for situations where the aircraft station may need to, without the aid of the ground station, fall back to a directed search instead of going back to a Fast Scanning state. This state is facilitated through the reception of neighboring cells, which are broadcast by the serving ground station. These are various conditions in which the aircraft station may begin evaluation of neighbor cells. These include as an example the received power in dBm (RXP) when it falls below an established threshold.

Figure 7:
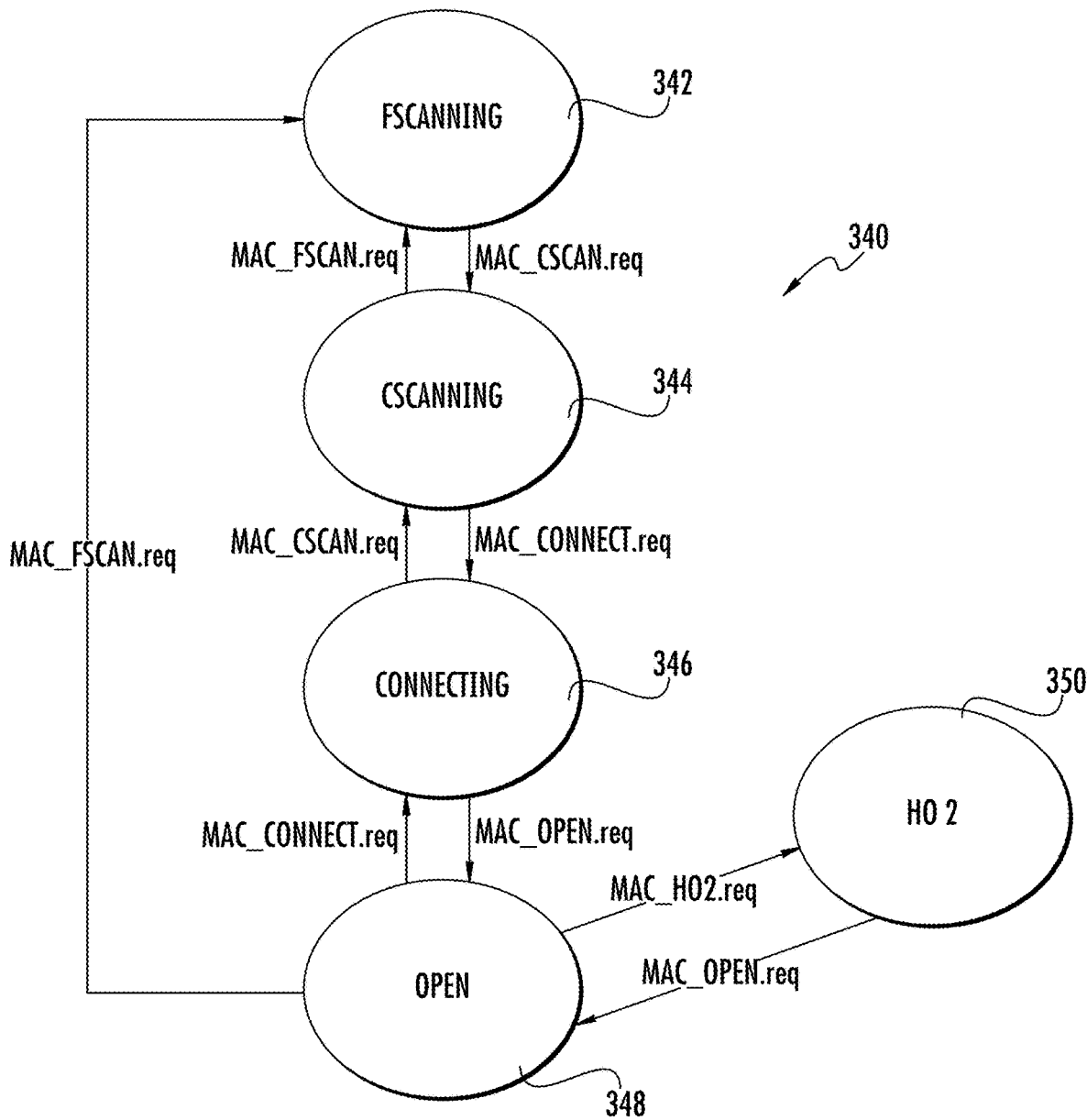
FIG. 7 is a state diagram showing the aircraft station MAC state for an LDACS system.
Figure 8:
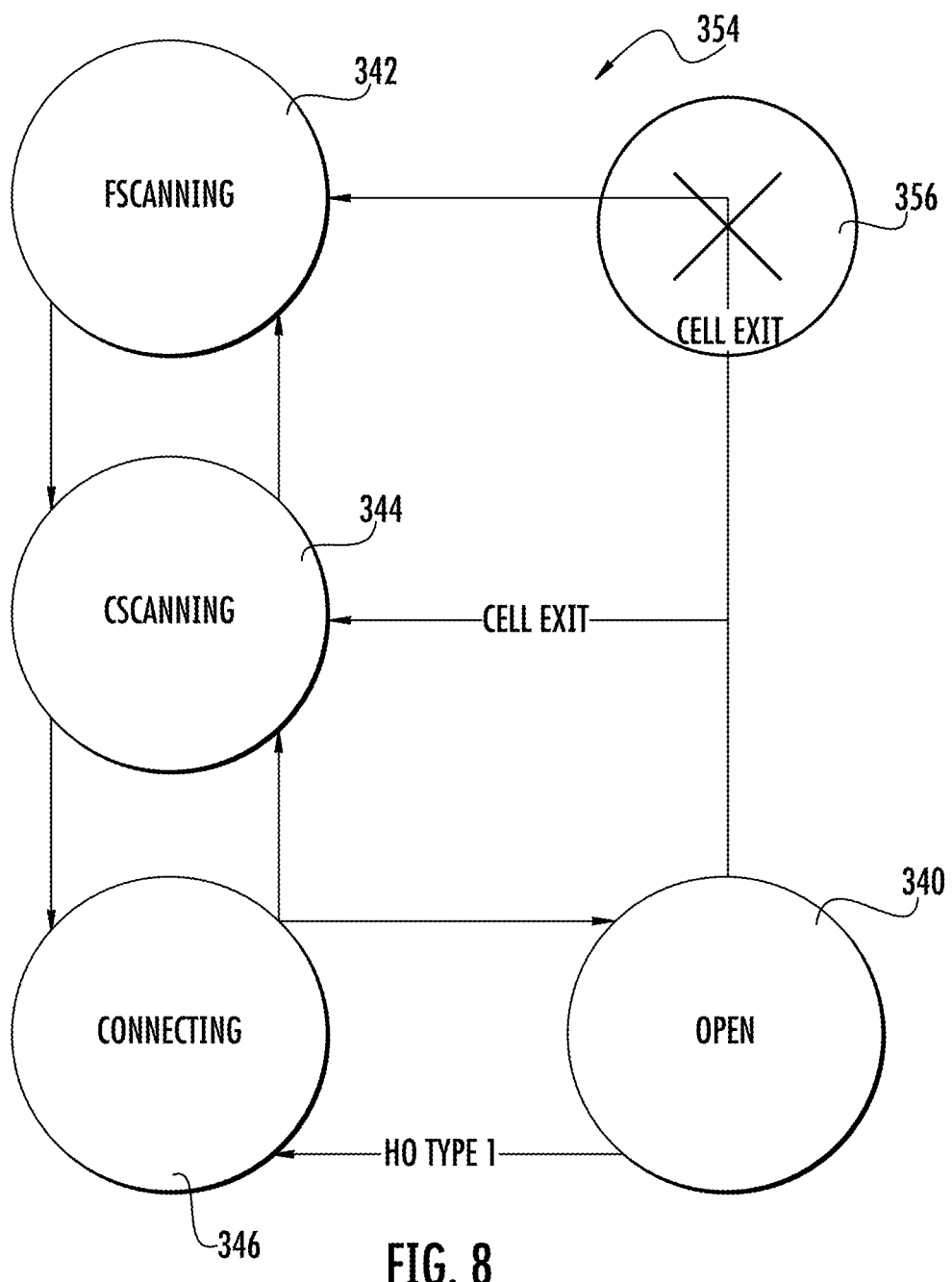
FIG. 8 is a state diagram showing reacquisition with the OPEN or enhanced state.

A reacquisition state diagram 354 is similar to that of FIG. 7 and in the OPEN (enhanced) state 348 (FIG. 8) and when the aircraft station PHY layer device has determined that the forward link signal quality has become unacceptably poor such as when the aircraft station is about to leave the coverage of the LDACS system network, the aircraft station LME may initiate sending the CELL-EXIT message to the current ground station and transit or cross to the CSSCAN-NING state 344 instead of the FSSCANNING state 342. To facilitate this change, the aircraft station may maintain a list of the ground stations that have been broadcast in the ACB for some period. The reacquisition state diagram 354 (FIG. 8) shows the cell exit 356 and the handover type I (HO Type I) with the OPEN state 340.

The Enhanced LDACS System Mobility and Handover

The enhanced LDACS system may include enhanced mobility for handover procedures between ground stations that may be triggered by the ground station on the basis of power report messages received from the aircraft station that are triggered by the ground station to a Scanning Table Broadcast (STB) message. A type 1 hard handover may involve ground stations that are not interconnected and do not coordinate to handle the procedure. A type 2 seamless handover may involve ground stations that are interconnected and coordinate the handover procedure.

A Type 1 hard handover may be triggered through a handover command control message (HO_COM) where the HOT bit is cleared. The handover command control message (HO_COM) may contain the ground station identifier (GS SAC) as a sub-net access code that the aircraft station shall handover. Based on the GS SAC, an aircraft station may determine the forward link and reverse link frequencies, which may be permanently broadcast via the BCCH as the broadcast channel. This process may be conducted through a cell entry procedure. If not acknowledged, a cell exit control message (CELL_EXIT) may be sent.

For the commanding ground station, a transmission error of the handover command control message (HO_COM) may be recognized through a keep-alive control message (KEEP-ALIVE), which may be sent by the aircraft station if it has no other control messages to send. A transmission error of the cell exit control message (CELL-EXIT) may be recognized through a keep-alive time-out at the Media Access Controller (MAC).

Figure 9:
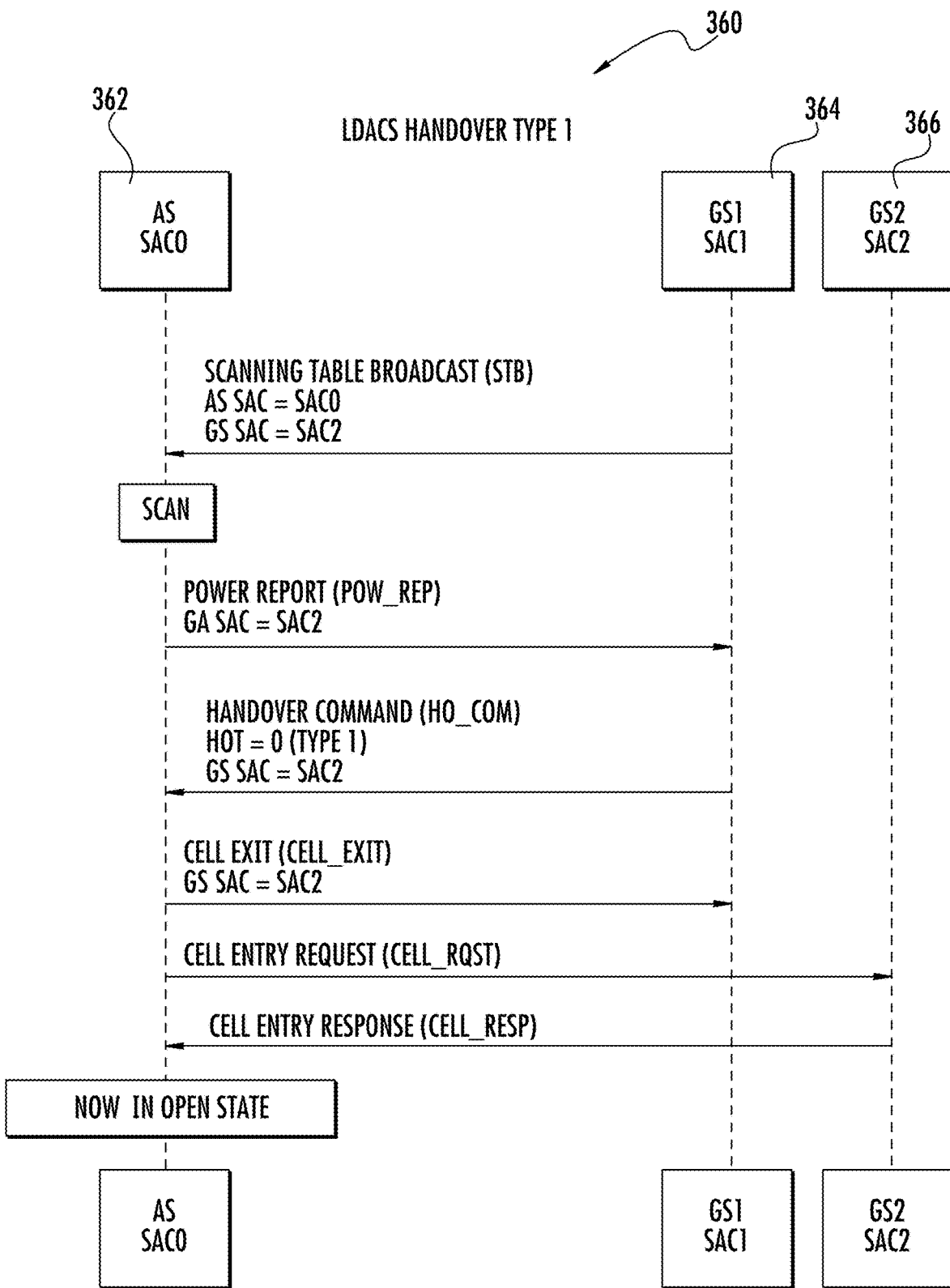
FIG. 9 is a messaging flow diagram for LDACS handover Type I used in the enhanced LDACS system.
Figure 10:
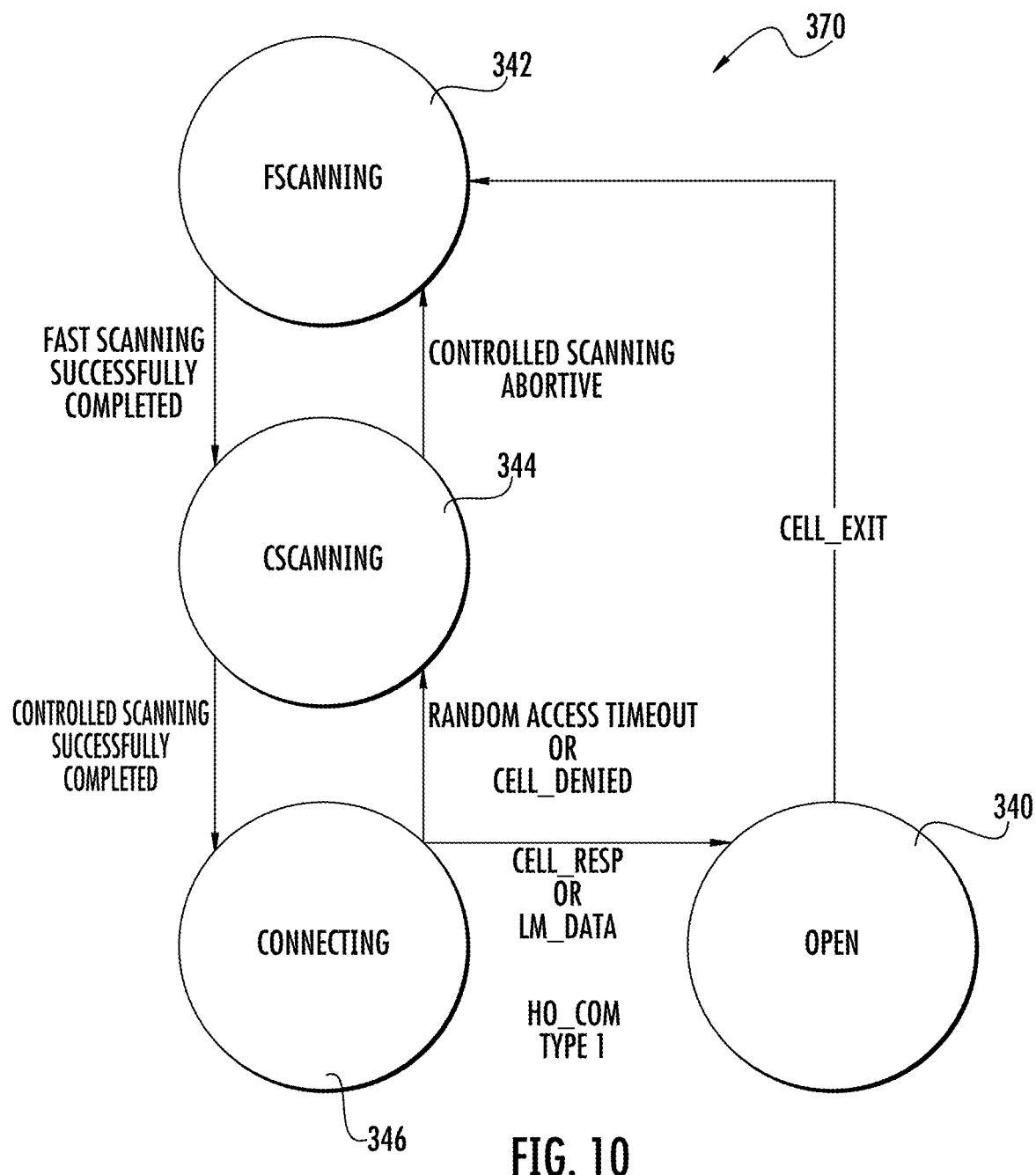
FIG. 10 is a state diagram for the LDACS handover Type I shown in FIG. 9.

Referring to FIGS. 9 and 10, the LDACS mobility messaging with the LDACS handover type I is illustrated at the timing flow diagram at 360, and showing the aircraft station 362 operative with the Scanning Table Broadcast (STB) and the ground station 1 364 and ground station 2 366. The flow diagram shows the ground station 1 implementing the Scanning Table Broadcast (STB) and a power report by the aircraft station 362 back to the ground station 1, and followed with the handover command (HO-COM) from the first ground station to the aircraft station and the corresponding cell entry requests and responses to the second ground station 2 366. As illustrated in FIG. 10, the state diagram for the LDACS handover type I is shown at 370 with the fast scanning successfully completed, including controlled scanning and a random access timeout, including the hand off communications of type I and the open state and cell exit back to the FSSCANNING 342.

The link management entities of adjacent ground stations may be coordinated by a common ground station controller and adjacent ground stations may be synchronized on the same time source with all ground stations in an area on the same time source. They may be triggered through a handover command control message (HO_COM) where the HOT bit is set. The handover command control message may contain the ground station identifier (GS SAC) and the new control offset from the next cell. Based on the ground station SAC (Subscriber Access Code), an aircraft station may be able to determine the forward link and reverse link frequencies, which may be broadcast via the BCCH (broadcast Control Channel) via an ACB (Adjacent Cell Broadcast) message. The updated sub-net access code and the unique control offset for the next cell may be retrieved from the LDACS management entity (LME) of the next ground station. A type 2 handover may be conducted through the transmission of a synchronization tile in the DC (dedicated control) slot, which may be indicated by the next LME through the transmission of a synchronization polling control message (SYNC POLL) for the new control offset. The arbitrary hand-off boundaries may be based on flight routes.

Figure 11:
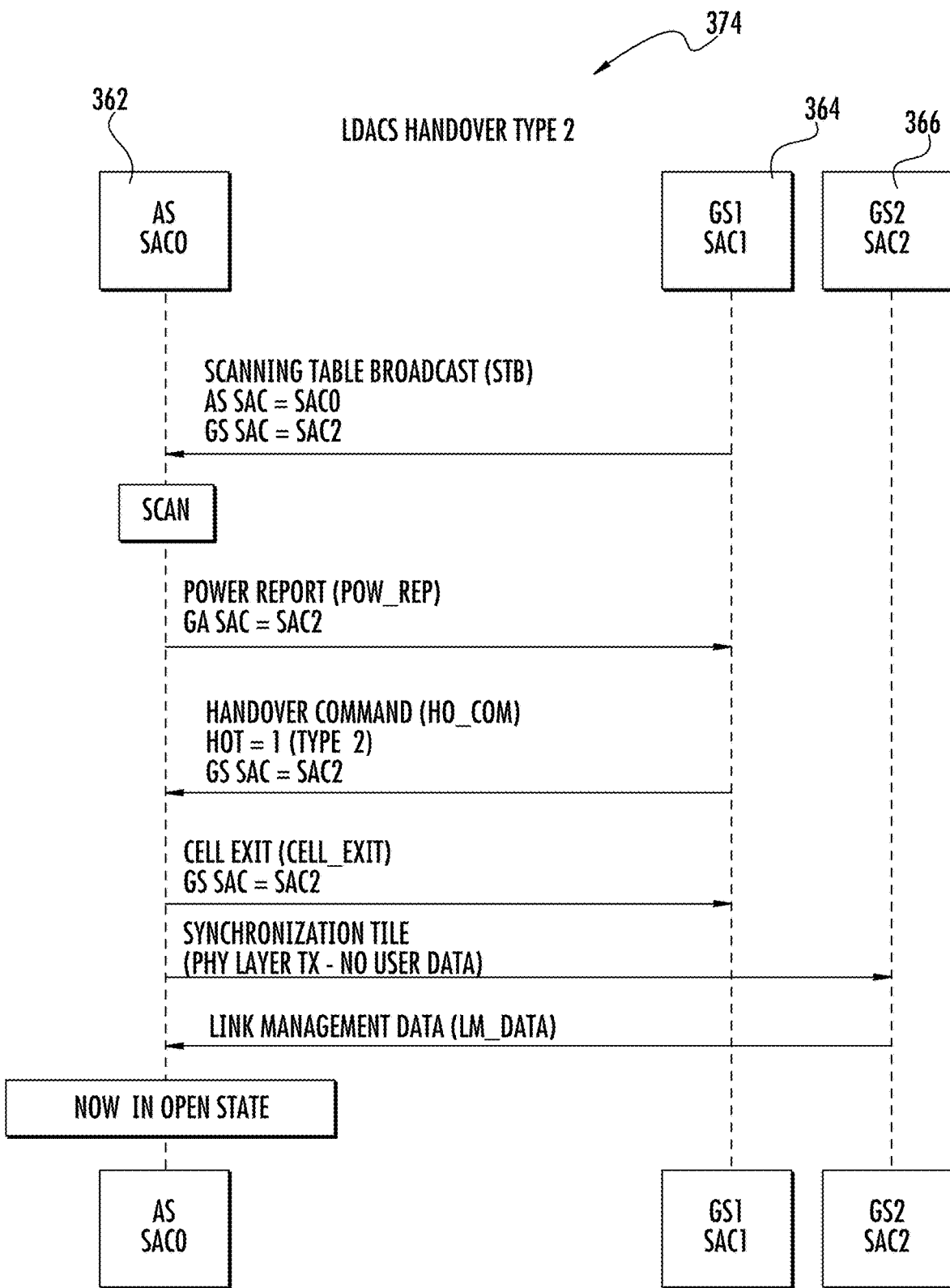
FIG. 11 is a messaging flow diagram for the LDACS handover Type II used in the enhanced LDACS system.
Figure 12:
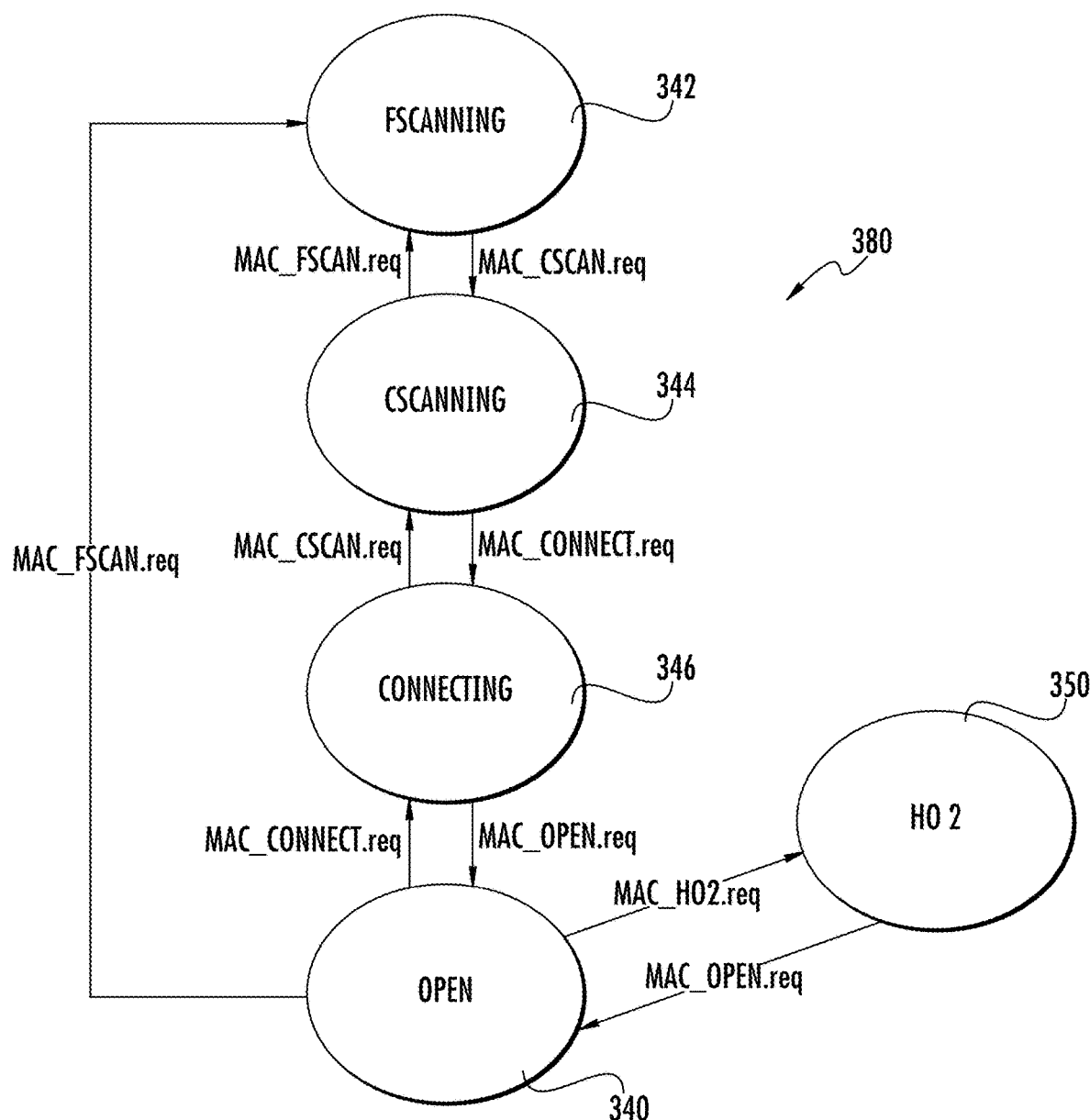
FIG. 12 is a state diagram for the LDACS handover Type II of FIG. 11.

Referring now to FIGS. 11 and 12, there are shown the flow diagram in FIG. 11 at 374 and state diagram for the LDACS handover type 2 process in FIG. 12 at 380. The scanning cable broadcast (STB), power report, handover command, and cell exit flow are similar to that with the LDACS handover type I (FIG. 9) with some variations. Changes may occur with the synchronization tile and link management data flow for the LDACS handover type 2. Also, in the state diagram, the LDACS handover type 2 includes a MAC frequency scan from the OPEN position 340 to the FS scanning 342 and a handover type 2 state with the OPEN condition as shown in the state diagram.

With the OPEN state 340, the aircraft station may be able to transmit and receive user plane data. When there is no handover (HO) command to the next ground station, and when the aircraft station PHY has indicated the forward link (FL) signal quality is unacceptably poor, e.g., when the aircraft station is about to leave the coverage of the LDACS network, the aircraft station LME may initiate sending of the CELL_EXIT message to the current ground station and transit to the FSSCANNING state 342. This may require unnecessary time to reacquire conductivity with the ground station. Adding neighbor lists through the ground station broadcast may allow the aircraft station to move into the CSSCANNING state 344 first before falling back into the FSSCANNING state 342 if the CSSCANNING state fails.

A Neighbor List and the mobility management service may be supported by the broadcast control messages that are adjacent cell broadcasts (ACB) and Scanning Table Broadcast (STB). The adjacent cell broadcast indicates neighboring cells and the scanning table broadcast indicates the aircraft station, which is allowed to scan adjacent cells during the next broadcast control slot. The adjacent cell broadcast (ACB) is transmitted periodically, for example, once per SF (super frame). The ACB control message may be transmitted via the broadcast control channel (BCCH) using the broadcast (BC) slot nos. 1 and 3. The ACB control message contains information about the ground station identifier (GS SAC), the forward link channel (FLF), and the reverse link channel (RLF) of one adjacent cell. If more than one adjacent ground station is to be announced, multiple ACB messages may be sent.

Figure 13:
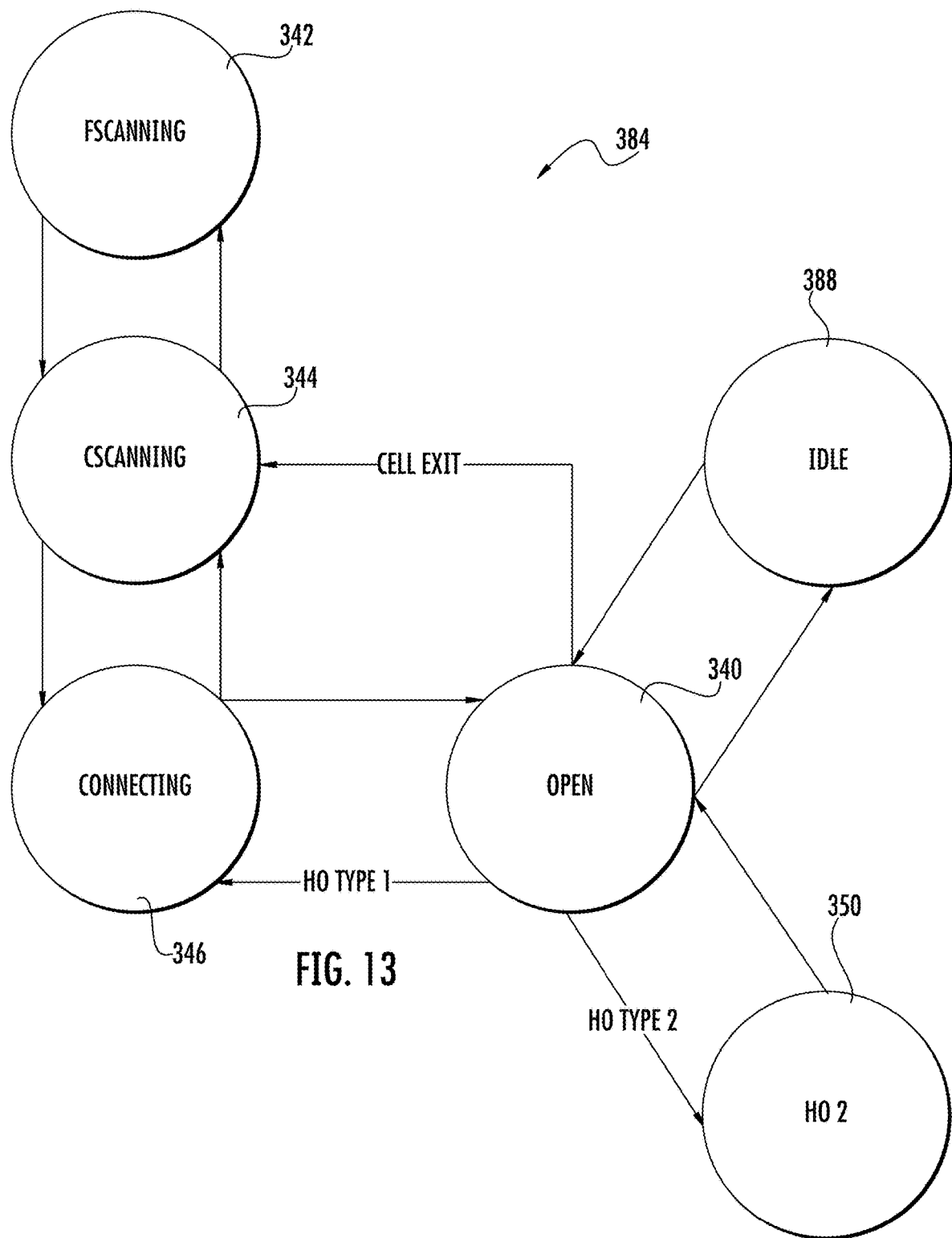
FIG. 13 is a state diagram for the Idle state for mobility messaging used in the enhanced LDACS system.

The Idle State does not exist in the normal LDACS specification and KEEP ALIVE messages are sent back and forth when there is no data to send in order to maintain the communications link alive. In the state diagram 384 of FIG. 13, creating an Idle State 388 may potentially allow for better use of resources. A dynamic allocation may increase the aircraft station's density support and channel aggregation may increase bandwidth needs. Paging may also be introduced. The enhanced LDACS system network may contact an aircraft station in the Idle State 388. An example of the state diagram for the Idle State 388 is shown in FIG. 13 showing the handover type 1 with the OPEN state 340 included in the handover type 2 350, and the Idle State 388 with the cell exit from the OPEN state to the CSSCANNING state 344.

Timers may be implemented in a Reverse Link Keep Alive Timer, LME_T_RLK, which may have a default timer for 10 seconds and may indicate whether an aircraft station is still within a cell or not within that cell. On expiration, the aircraft station may be considered as absent and may be deregistered from the ground station. It is possible this may be reset in an Idle State 388 and possibly can be repurposed. The aircraft station Forward Link Keep Alive Timer, LME_T_FLK, which may have a default of about 10 seconds, may operate as an indicator for the aircraft station whether it may be connected to the ground station or not. On expiration, the aircraft station LME may change its status to FSSCANNING state 342 and trigger its Media Access Controller (MAC) to start the fast scanning procedure. The ground station Forward Link Keep Alive Timer, LME_T1_FLK, may have a default of about three seconds. On expiration, if no message is scheduled, the ground station LME may transmit a keep alive message to the specific aircraft station. Reception of the keep alive message may reset to keep the alive timer in the aircraft station LME.

Paging may occur. For example, there may be an overload of the STAY_ALIVE message. On the ground station to the aircraft station communications link, there may be an indication to send data and a determination may be made to keep the timer active for the aircraft station to ground station link. It may be repurposed because the ground station may not be required to know that the aircraft station is attached to the ground station, but there should be some indication of how long the context should be kept. Once the aircraft station registers with the new ground station, the ground station controller may inform the prior ground station for deregistration purposes if required.

It is possible to implement a new paging message that contains one or more aircraft station subscriber access codes (AS SAC). There may be more than one to account for situations where multiple aircraft stations may be reached. There may be a determination of what area may be paged. For example, in a large cell area, the last "seen" ground station and adjacent ground stations may be taken into account. An aircraft station may have migrated to the next ground station and the original ground station may never receive the CELL_EXIT message. On a new registration, the ground station controller may be aware of the new serving ground station.

Referring now again to FIG. 13, a portion of the state diagram 384 for the OPEN 340 to Idle State 388 is shown. Once the ground station detects inactivity from the aircraft station, after a time out period, the ground state may reallocate resources and start sending KEEP ALIVE messages. This may assume the dynamic resource allocation such that resources will be minimized before transitioning to IDLE. In the Idle State 388, the aircraft station may maintain synchronization with the ground station, decode broadcast messages for at least the adjacent cell broadcast, and listen to the KEEP ALIVE message in case there is data to receive.

The ground station may initiate an IDLE 388 to OPEN 340. For example, when the ground station has data to send to the aircraft station, it may transmit a KEEP ALIVE message indicating data to send. The aircraft station may respond and receive a resource allocation message and the channel may again be ready for data transfer. The aircraft station may initiate an IDLE 388 to OPEN 340. For example, when the aircraft station has data to send, the ground station may transmit a cell entry request. This may assume the context is still active, but the opposite may be faster.

A reselection process may occur. While in the IDLE state 388, the aircraft station may continue to monitor the received power of the ground station to which it was last connected and the adjacent ground stations that are being broadcast by the "serving" ground station. When the aircraft station PHY layer device has determined that the forward link signal quality is unacceptably poor, such as when the aircraft station is about to leave the coverage of the LDACS system network, the aircraft station LME may initiate sending the CELL_EXIT message to the current ground station and transit to the CSSCANNING state 344. The first ground station to attempt should be the strongest monitored adjacent ground station and then proceed down the list in order until a connection has been established. After the connection has been established, the ground station may move the aircraft station into the IDLE state 388 if there is no data to send.

Multiple Network Coexistence

The enhanced LDACS system as described above is an improvement over the LDACS standard and its defined MAC and PHY device layers and incorporates modern cellular industry elements to provide a network architecture that can support multiple network providers. In order to connect to the LDACS network, the aircraft station transitions through four states as described above in a procedure referred to as the cell search: FSCANNING 342, CSCANNING 344, CONNECTING 346, and OPEN 348 as shown in FIG. 7. In the FSCANNING state 342 the aircraft station MAC may trigger fast scanning requests of the LDACS channels and repeat scanning requests for each channel in round-robin, while it remains in the FSCANNING state. Once power has been detected on an LDACS channel, the aircraft station MAC moves into the CSCANNING state 344 and begins its attempts to decode the LDACS channel. The aircraft station MAC may transition between FSCANNING 342 and CSCANNING states until a LDACS channel successfully decodes and the aircraft station MAC transitions into the CONNECTING state 346. In that state, the aircraft station MAC waits for the successful synchronization of the physical layer and the MAC framing. After synchronization has been achieved, the aircraft station MAC may perform the random access procedure (RACH) to request cell entry and synchronize the reverse link. Once the ground station allocates an aircraft station Sub-net Access Code (AS SAC), the aircraft station MAC moves into the OPEN state 348, allowing user communication.

In order to support multiple network providers, the enhanced LDACS system adapts the cell search procedure to include a Public Land Mobile Network (PLMN) code search. Ground stations transmit their PLMN as part of their broadcast information. In the CONNECTING state 346, the aircraft station evaluates the decoded PLMN code to determine priority of LDACS channels prior to attempting random access procedures (RACH). If a valid PLMN is not decoded, the aircraft station attempts random access procedures (RACH) with the strongest tower as part of a ground station in order to gain connectivity for critical communications, such as air traffic control, while non-critical communications, for example, on-board user data, may not be available.

In order to evaluate the decoded PLMN, the aircraft station retrieves a stored PLMN list and identifies itself to the ground station and network that the aircraft station is attempting to attach. The Aircraft Station Identification Module (ASIM) as described above is analogous to a 4G LTE USIM. The ASIM or similar module having the same functionality provides network information capable of identifying the aircraft station to the network and identifying the ground station to the aircraft station. The aircraft station evaluates and identifies itself to multiple network systems for deployment to have multiple co-existing networks as part of the enhanced LDACS system.

Network Deployment

The cost of deploying a wide area or national data may result in the creation of multiple individual sub-networks. Poor planning in the initial stages of a national network rollout may result in a disjoined collection of networks and associated user access sites if there is improper planning during the early stages of the capability rollout. A utility or commercial communication network architecture may be used as a model. For example, each area may be divided and allocated to a specific network operator, which establishes connections and provides services to all paying subscribers that access their network.

By leveraging a commercial communications network approach, overlapping services are available in high usage areas. It is possible that roaming relationships are not universal and specific carriers may establish unique relationships among each other and may not provide access to those outside of their network agreements. Regardless of the model used for network deployment, an organized approach for data management may be established, similar to the use of access point names (APN) within the cellular community. Data is segmented for management and distribution to specific data centers that may help secure user data more efficiently. For example, each of the many multi-modal carriers may establish their own APN (access point name) to ensure that each carrier has access to all of their transit and package data, while receiving none of the data from a competitive carrier or provider. When user organizations are smaller or regionalized, the network may assign the local user to an available access point name (APN) with capacity to support their traffic. Although not specifically aligned to only their data, this combined APN approach provides sufficient security, while optimizing available resources and minimizing network expenses.

LDACS Overlay for Command, Control and Communication

The enhanced LDACS system includes deployment in the described multi-tier network configuration. Although the LDACS system may be used in any geographic region, the description proceeds where the enhanced LDACS system deployment is over the CONUS. The same deployment principles may be used globally.

Figure 14:
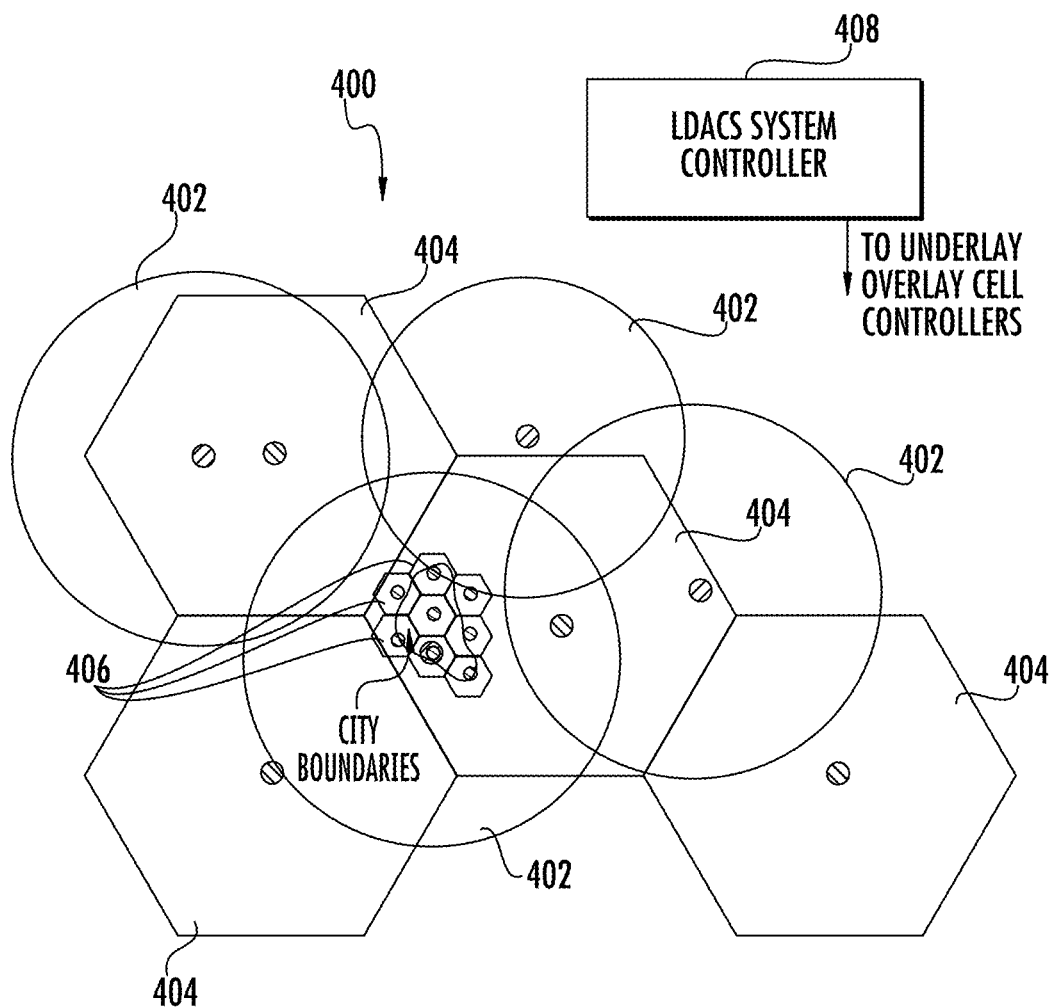
FIG. 14 is a diagram showing the enhanced LDACS system cell layout and showing the LDACS underlay and overlay.

Referring now to FIG. 14, there is illustrated a multi-tier network configuration at 400 for the enhanced LDACS system underlay/overlay. Three separate communication systems are deployed within a relatively small geographical area and all systems use the Aeronautical Radio-Navigation Service (ARNS) frequency band. The DME/TACAN existing sites are shown by the large circles 402 and the area covered by a single DME/TACAN site is usually quite large. Typically, the radius of a DME/TACAN cell 402 is on the order of about 100 km. There are four DME/TACAN cells 402 shown in FIG. 14 by the four overlapping circles. The LDACS underlay (LDACS-u) cells are illustrated by the four hexagons 404 and these cells are also large. The LDACS-u system provides coast-to-coast coverage with sufficient initial capacity. A sample design for a nominal cell radii is about 150 km. Each LDACS-u cell 404 may operate a single LDACS channel, and because the LDACS channel is relatively narrow, e.g., about 500 kHz, the capacity of the initial deployment is not very large. The initial traffic load on the system is low and matches the initial capacity. As the traffic load increases, additional channels may be added to the site, or cell spitting may be performed. Both of these techniques are standard for capacity increase in cellular systems. It should be understood that a higher frequency reuse in the underlay means more capacity. If certain cells are at higher loading, it is possible to borrow channels from nearby lower capacity ground stations.

The smaller hexagonal cells 406 illustrated in FIG. 14 are the LDACS overlay (LDACS-o) cells, which are deployed locally and over an area that bounds the intended deployment. The transmission powers and link budget for the LDACS-o 406 are adjusted so that these LDACS cell areas and more precisely, their volumes, are relatively small. The radii of the LDACS-o cells 406 are on the order of few kilometers, e.g., about 3-10 km. Also, the portion of the airspace served by LDACS-o cells 406 is close to the ground, e.g., about 0 to 500 meters.

All three systems, i.e., 1) the DME/TACAN system and cells 402, 2) the LDACS-u system and cells 404, and 3) the LDACS-o system and cells 406, share the same radio spectrum. The inter-system and intra-system interference are managed through careful allocation of the available DME/TACAN and LDACS channels, such as by an enhanced LDACS system controller 408 shown in FIG. 14. It should be understood that it is possible to use multi-RAT receivers (Radio Access Technology).

Prioritization and Preemption

When there are a limited number of aircraft in a particular area, and with the current requirements for visual line of sight (VLOS) control of unmanned aircraft, route planning is less critical. As aircraft operators move toward beyond line of sight (BLOS) flight of unmanned aircraft, coordination with other aircraft, both manned and unmanned, will be a critical action to ensure that collisions do not occur. This coordination may include the use of air traffic control transponder information, collision avoidance sensors, coordinated location peer-peer communication, and route scheduling.

Using this information, route prioritization and flight optimization may be accomplished by employing a hierarchy of importance to develop flight route planning tools. An example entry level prioritization of aircraft may include: (1) Defense Department; (2) Law Enforcement (Local, State, then Federal); (3) Medical Evacuation; (4) Humanitarian Services; (5) Human Transport; (6) Commercial Perishable Goods; (7) Commercial Non-Perishable Goods; and (8) Private Use—Recreational. As examples of possible flight missions, the enhanced LDACS system may be configurable to modify mission types and priority and add new mission types. When assigning a priority class to an aircraft, the user and aircraft may be validated as properly classified by an FAA regulatory inspector prior to authorization. This authentication service may be included in the sale of radio devices that operate the enhanced LDACS system.

In operation and in preparation to fly, the aircraft owner/pilot defines the launch location, launch time, destination location, mission type, aircraft type, and maximum flight times. Based upon this information, the pilot submits a request for flight path and channel assignment. The UAS (unmanned aircraft system) Operations Control Center verifies the request parameters, checks to ensure that the flight route will be available, and approves the flight. This flight route planning process may be manually accomplished or automated.

With the flight approved and scheduled, the command and control channel assignment may be reserved for the mission. Depending on the flight path, duration of flight, and surrounding missions, the command and control communications link may require mid-flight channel reassignments, which may be coordinated to allow hand-off without a risk of lost communications during flight. It is possible that aircraft stations may be allowed to auto negotiate channels and the enhanced LDACS system may ensure that the aircraft may reserve space on the network to avoid loss of communications mid-flight.

During a flight, a higher priority mission may be scheduled for the same airspace location and timeframe, and the command and control link may be used to communicate updates to the flight path for each aircraft station. In addition, each aircraft station may use on-board sensor data to scan for potential collision threats. Should an obstacle be identified, the en route aircraft may report the threat type and location so that additional aircraft stations in the area may be notified and potentially rerouted. These in-flight threats may include wildlife or uncontrolled aircraft stations and other threats. By using prioritization and preemption, it is possible to have higher levels of service with a higher price and include, for example, prioritized data.

As noted before, prioritization and preemption is provided in the enhanced LDACS system to provide support for different user classes that access the enhanced LDACS system and its network resources. Prioritization and preemption provides a mechanism for handling congestion and supports service level differentiation, for example, basic services versus premium services. The enhanced LDACS system provides prioritization of certain types of users, for example, military, commercial, and civil users. Prioritization enables a user's application or a user's network use to take precedence over another user's application network usage. Preemption concerns the enhanced LDACS system's network capability that permits authorized high priority traffic. For example, military aircraft or premium subscribers may have priority and use the resources assigned to lower priority traffic. The quality of service (QoS) concerns the overall performance of a telephony or a data network, particularly as seen by the users of the network and is measured by such factors as error rates, bandwidth, throughput, transmission delay, availability and jitter.

Figure 15:
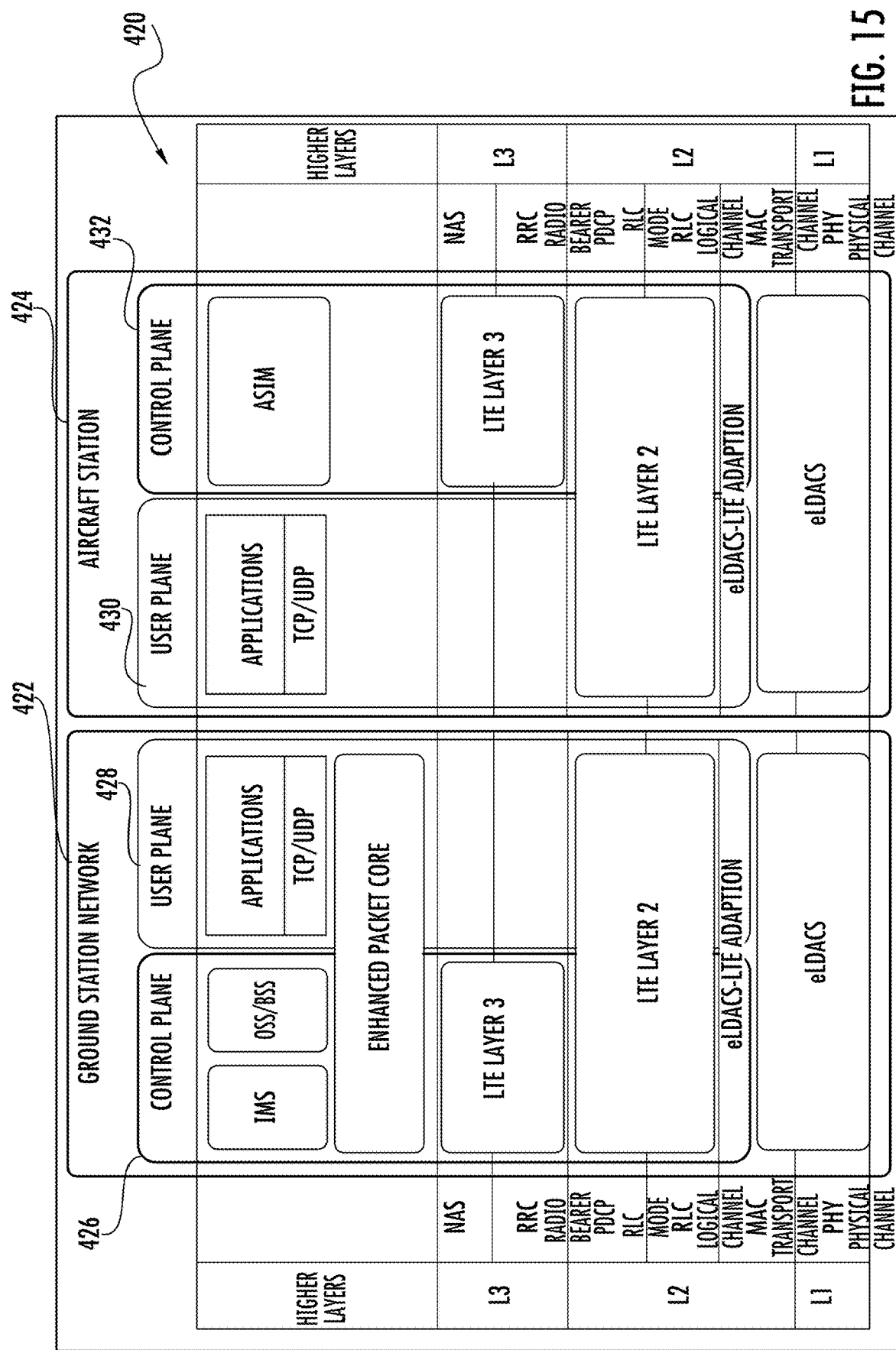
FIG. 15 is a diagram of a protocol stack for the enhanced LDACS system.

Reference is now made to be enhanced LDACS system protocol stack of FIG. 15 at 420, showing the ground station network 422, the aircraft station 424, and the associated control planes 426,428 and user planes 430,432 for both the ground station network 422 and aircraft station 424. The ground station network 422 includes the enhanced packet core (EPC) and the IMS and OSS/BSS as part of the higher layers, and the aircraft station 424 includes the ASIM, also in the higher layers. The L1, L2 and L3 layers of both the ground station network and aircraft station include similar functional components as illustrated.

Figure 16:
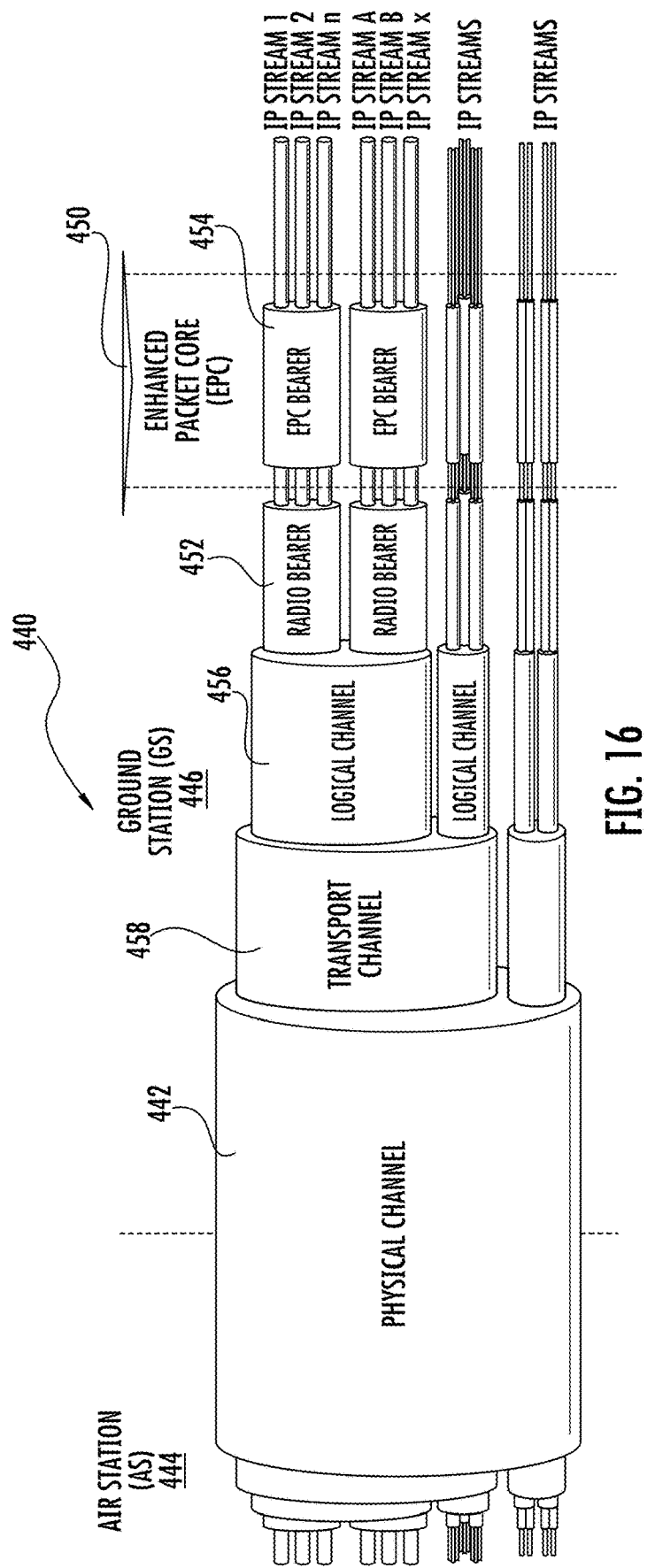
FIG. 16 is a diagram showing the IP flow through the enhanced LDACS system.

Referring now to FIG. 16, the IP flow through the enhanced LDACS system is illustrated generally at 440, showing a representation of the physical channel 442 and the aircraft station 444 and the ground station 446, including the enhanced packet core (EPC) 450. The different channels are illustrated, and the IP streams are mapped into bearers for delivery, including both radio 452 and the enhanced packet core bearers 454. There is a one-to-one relationship between the radio and the EPC bearers 452,454. The bearers are mapped to logical channels 456, which are then organized into transport channels 458 that are routed to the physical channel 442 for transmission.

The enhanced LDACS system uses a QCI (Quality of Service) (QOS) class indicator) assigned to each bearer to ensure the proper handling of the bearer's traffic through the enhanced LDACS system. A QCI is a scalar that is used within the access network as a reference to specific parameters that control packet forwarding and impact scheduling weight, admission thresholds, and link-layer protocol configurations. QOS parameters for the IP streams are used to map the bearer and are a key factor in the link-layer access scheduling in the ground station for the QCI's.

The QCI include a quality of service factor and allows a service provider to assign and manage radio and network resources based on the subscription levels and data service types. It may classify IP traffic into different data flows with different classes and apply maximum bandwidth policies and map to different bearers. It may apply quality of service rules such as priority and bandwidth control during each data flow to deliver data.

Figure 17:
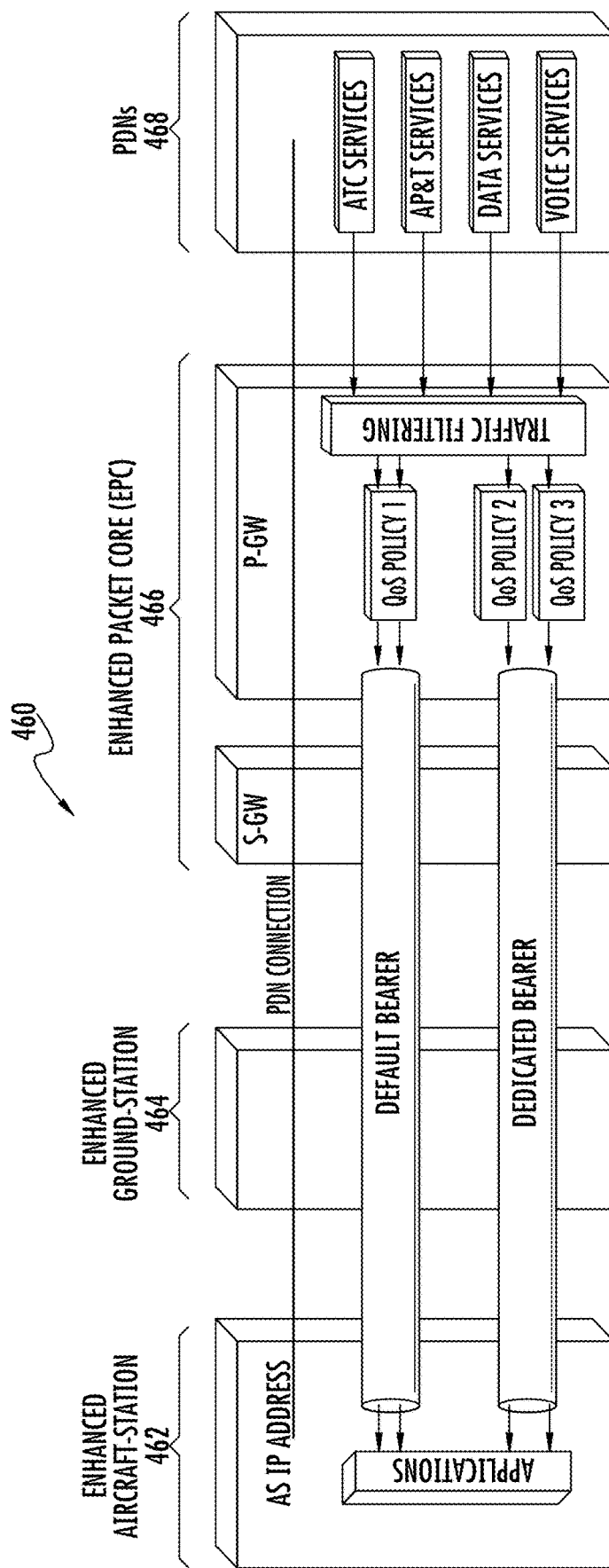
FIG. 17 is a diagram showing the quality of service impact for the enhanced LDACS system.

Referring now to FIG. 17, there are illustrated components that impact the quality of service shown generally at 460 and including the enhanced aircraft station 462, enhanced ground station 464, enhanced packet core 466, and PDN's 468 that include the different services, and the data flow for the default bearer and the dedicated bearer. The different QoS policies are shown in the P-GW component.

Figure 18:
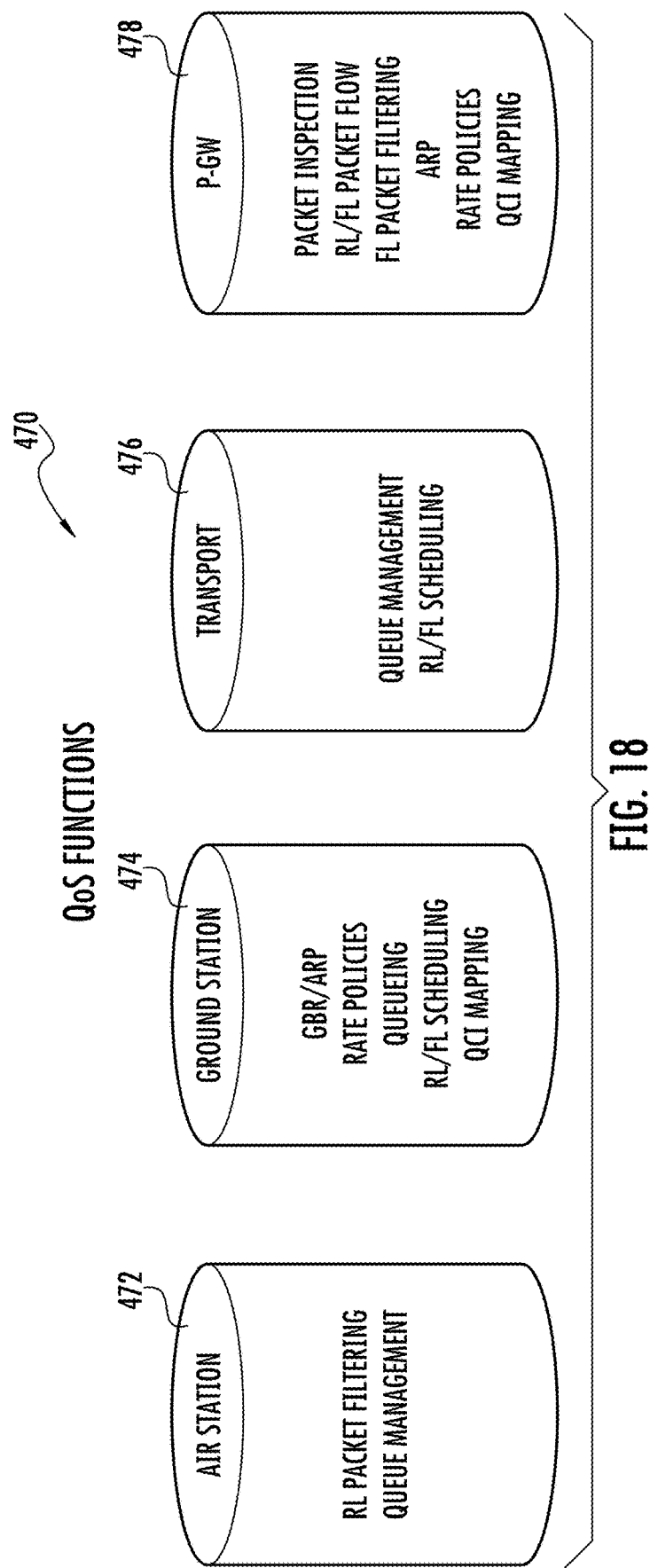
FIG. 18 is a diagram showing quality of service functions.

Referring now to FIG. 18, there are illustrated generally at 470 the quality of service functions as the air station 472, ground station 474, transport 476, and the P-GW 478, and each having the listed functions. The bearer may be established when an aircraft station is taxed to the enhanced LDACS system network and an IP address assigned and a default bearer established. The network may establish a default bearer with false settings and a potential future upgrade may make these defaults vary among subscribers. When a user attempts to use a service that requires a different quality of service than the current default bearer, it may support a dedicated bearer and establish it on demand. The default bearer may last even while no service is being used, and last until the aircraft station detaches from the network.

The bearers include transmission paths between the aircraft station 472 and the P-GW 478 to deliver user traffic. Different types may include a default, and a dedicated resource type may include a guaranteed bit rate (GBR) and bandwidth and a dedicated bearer may include a non-guaranteed bit rate (non-GBR) with a best effort bandwidth and a default or non-dedicated bearer.

The bearer quality of service (QoS) parameters may be a standardized performance indicator (QCI), and may include the resource type, priority, packet delay, error loss rate, and similar functions. The allocation and retention priority (ARP) factors may be used to determine if an old bearer can be removed and a new bearer created. Another parameter for the bearer QOS may be the bit rate and the bandwidth limit that applies to a single GBR bearer. The PDN aggregate bandwidth limit may apply to the total bandwidth of all non-GBR bearers per the PDN. The aircraft station aggregate bandwidth limit may apply to the total bandwidth of all non-GBR bearers per the aircraft station with multiple PDNs.

Referring now to FIG. 19, there is shown a chart at 480 of a QCI example, showing the resource type with a resource type column giving a GBR as a guaranteed bit rate and a non-GBR non-guaranteed bit rate. The priority column gives a scheduling weight and the packet delay budget column shows an example of allowable jitters, such as 30 microseconds. The packet error loss rate column gives a number, such as $10^{-5}$, as an acceptable packet error loss rate. Example services are illustrated, such as the intelligent transport systems as an example of cellular type services.

Referring now to Table 3, there are shown the potential QCI for the enhanced LDACS system, showing the different QCI numbering, resource, priority, delay, error loss, and the example services, to give a potential mapping between traffic types and the QCI.

TABLE 3

Potential QCI for Enhanced LDACS System

| QCI | Resource | Priority | Delay | Error Loss | Ex. Services |
|---|---|---|---|---|---|
| 1 | GBR | 3 | 100 ms | $10^{-2}$ | Cockpit Voice |
| 2 | | 2 | 150 ms | $10^{-6}$ | Controller Pilot Data Link Communications (CPDLC) |
| 3 | | 4 | 300 ms | $10^{-2}$ | A-PNT |
| 4 | | 8 | 500 ms | $10^{-2}$ | ADS-B |
| 5 | Non-GBR | 7 | 100 ms | $10^{-3}$ | Passenger Data |

Packet filtering may include data from packet data networks and PDNs that arrive at the P-GW in the enhanced packet core. Data may be filtered through IP packet filters to place the data on bearers, and may include the source IP address, source port number, destination IP address, destination port number, and protocol ID.

Referring now to Table 4, there is illustrated IP packet filters, showing the filter rule and the different sources and destinations with the protocol ID and bearer ID.

TABLE 4

IP Packet Filters

| Source IP | Source Port | Filter Rule Destination IP | Destination Port | Protocol ID | Bearer ID |
|---|---|---|---|---|---|
| 8.8.8.8 | * | 192.168.8.123 | 443 | TCP | 8 |
| * | * | 192.168.8.123 | * | * | 5 |
| 192.168.8.123 | 443 | * | * | UDP | 3 |

The prioritization and preemption are used to provide a preferred access to the enhanced LDACS resources to a user as an aircraft station over other users. The concept of the "access class" may be of a value defined for each aircraft station that defines a level of access priority for network resources. The access class can be used to support a "premium" service as a subscriber model, where users pay higher rates for additional bandwidth access, throughput and "emergency services" to ensure first responders, military aircraft or the like that have access to data services beyond basic flight communications. There are also allocation and retention priority (ARP) characteristics that define the relative importance of a resource request and allows deciding whether a bearer can be established or modified, or needs to be rejected in case of resource limitations. The ground network has the EPC plus the ground stations use the access class to effect the aircraft station's resource access scheduling and may be used as a biasing parameter in the ground network to determine how linked resources should be shared among different types of users.

The prioritization in the enhanced LDACS system is similar to that prioritization used in cellular systems, and may enable preferred link access scheduling of higher access classes over lower classes. For the enhanced LDACS system, prioritization may be applied to non-critical QCI bearers, e.g., lower priority, and non-critical QCI bearers of a higher access class. Some aircraft stations may be preferred for link scheduling over lower access class aircraft stations.

Preemption may be applied in the enhanced LDACS in a different manner than in cellular systems. For example, in cellular systems, prioritization may be used to limit access to only higher access classes. This includes the ability to "drop" lower access class users to service designated higher access class devices. For an enhanced LDACS system, because critical data such as the air traffic control communications may be carried over the LDACS communications link, the cellular concept of preemption may not be applicable. In the enhanced LDACS system, preemption may enable the ground station to tear down established bearers for lower access class aircraft stations, and allow higher access class aircraft stations to access the link resources whenever the link access scheduler is unable to meet the QCI performance required for those bearers.

Figure 20:
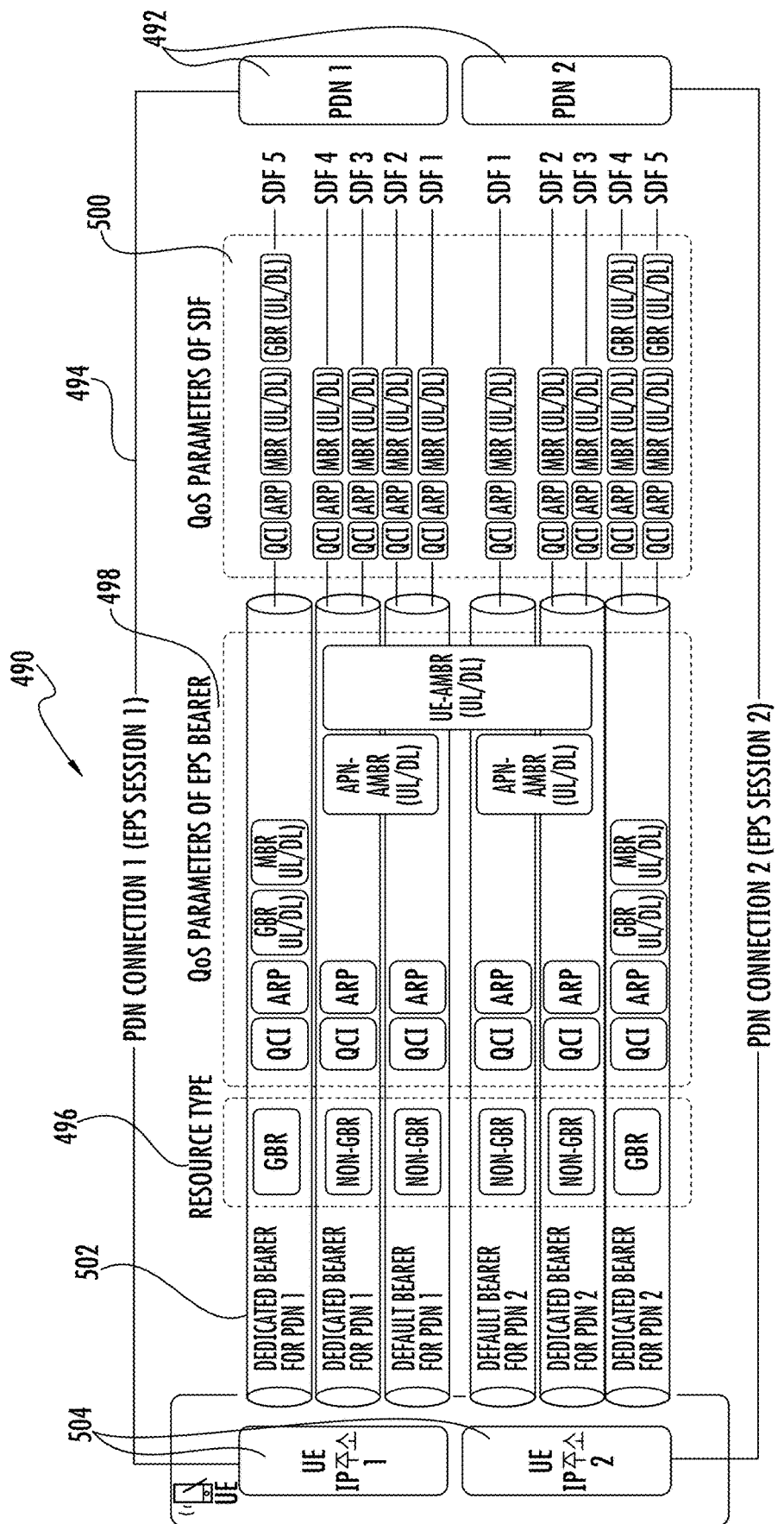
FIG. 20 is an example of an LTE QOS.

Referring now to FIG. 20, an LTE QOS example is illustrated generally at 490 showing the PDN connections 492 as part of the EPS session 1 494 and the different resource types 496, QOS parameters of the EPS bearer 498, QOS parameters of the SDF 500, dedicated bearer 502, and the UE,IP 504.

Channel Aggregation

Figure 21:
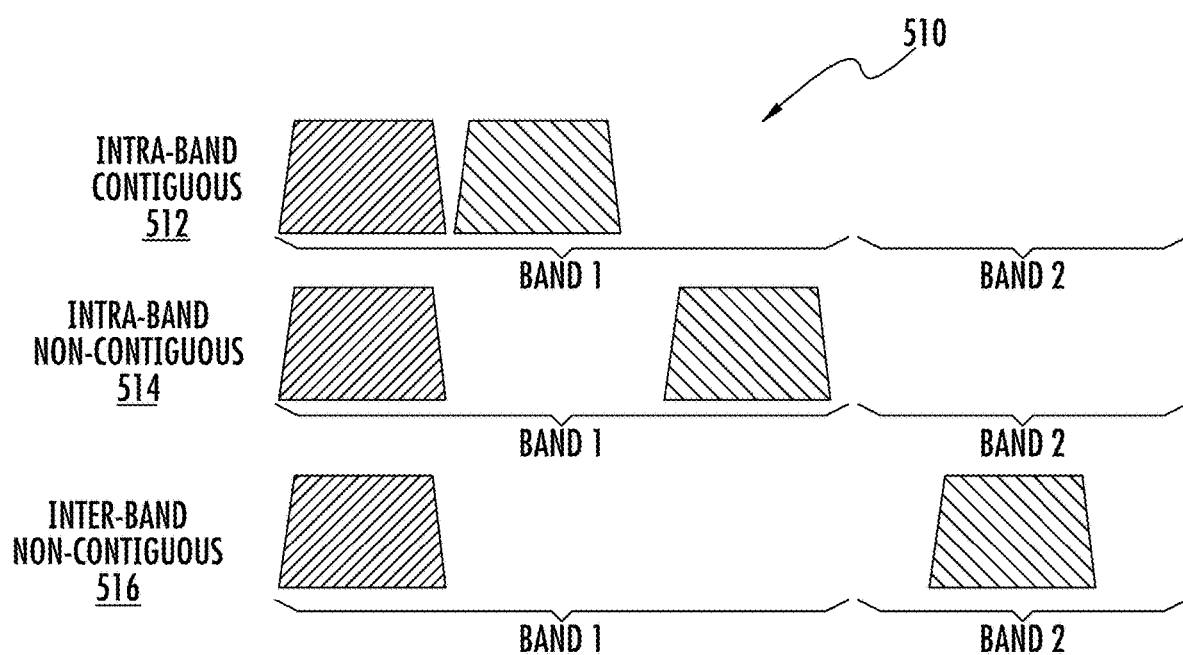
FIG. 21 is a schematic representation of possible LDACS channel locations in the enhanced LDACS system for examples of contiguous and non-contiguous bands used in channel aggregation.

The enhanced LDACS system may include channel aggregation added with the FDD and the TDD peer-to-peer communications and protocol to achieve higher data rates. Channel aggregation combines multiple LDACS carriers together, potentially on separate bands to increase the available bandwidth and capacity for a user. Referring now to FIG. 21, there are shown three potential channel locations for the channel aggregation in the enhanced LDACS system and more than two channels may be aggregated together as generally shown at 510. As a non-limiting example, it is possible for the system to enable channel aggregation and combine adjacent channels in the same band for intra-band contiguous channel aggregation 512. The aircraft station or ground station may consider the aggregated channel as a single large channel from an RF perspective. The system may use one physical transceiver with multiple RF logical paths. Due to situations where channels are not adjacent, however, more physical transceivers may be required. As illustrated, the enhanced LDACS system may also incorporate intra-band, non-contiguous aggregation 514, or inter-band non-contiguous aggregation 516.

Figure 22:
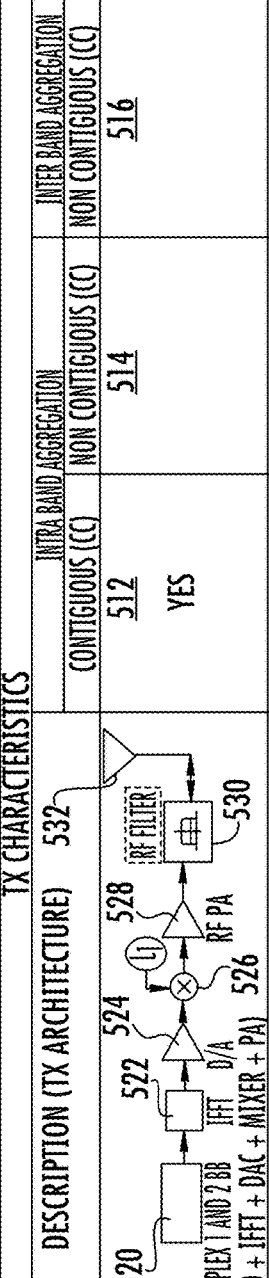
FIG. 22 is a chart showing four different schematic block diagrams of possible transmitter architectures for the three aggregation scenarios shown in FIG. 21.

Referring to FIG. 22, four possible transmitter designs are illustrated as options A, B, C, and D, and may be used in the three aggregation examples of FIG. 21. Option A shows a single transmitter change circuit that includes a multiplexer baseband circuit 520 coupled to an inverse fast Fourier transform (IFFT) circuit 522 and digital-to-analog converter (DAC) 524 and mixer 526 and power amplifier 528. Once the RF signal is power amplified in the power amplifier 528, it is filtered within RF filter 530 and output via a single antenna 532. Option B shows two transmitter circuit chains each one having the multiplexer baseband circuits 520, IFFT 522, DAC 524, and only one of the chains having the mixer 526. A combiner 534 combines the signals from the two chains, and the signal is mixed within the mixer 536, amplified within RFPA 528, filtered within the RF filter 530, and output via single antenna 532. Option C is similar to the circuit of Option B, but includes in both transmitter chains the mixer 526 with a combiner 534 and followed by similar components as in Option B. Option D is similar to Option C except it also includes an option of a single antenna 532 or a dual antenna 532a, 532b with two RF filters 530. For each option, the corresponding contiguous, non-contiguous for intra-band aggregation and noncontiguous for inter-band aggregation is indicated as to whether the circuit may be used for that type of aggregation.

The inter-band, non-contiguous aggregations 516 shown in the third column may require consideration to reduce intermodulation and cross modulation from the transceivers. The receiver may use a single wideband-capable RF front end and a single FFT, or alternatively, multiple RF front ends and FFT engines. The choice between single or multiple transceivers may come down to the comparison of power consumption, cost, size, and flexibility to support other aggregation types. An initial rollout of the enhanced LDACS system may use a single band, which removes the need to incorporate inter-band channel aggregation, thus reducing complexity at the aircraft station and ground station. Aggregating channels may cause an increase in the RF bandwidth as processed by the aircraft station and ground station and it may be necessary to ensure that operation over maximum aggregation bandwidth that is consistent without a reduction in performance.

When carrier aggregation is employed, there are a plurality of serving cells, one for each channel or carrier. A primary or fundamental serving cell (PSC) is served by the primary or fundamental carrier. The other channels or carriers may be referred to as supplemental carriers cells.

LDACS FDD channel aggregation may be directed by an LDACS Management Entity Controller (LMEC) as part of the enhanced LDACS system. The EGSC may have a full picture of the frequencies and resources in use at each ground station. The supplemental carriers are added and removed as required, while the fundamental carrier is only changed at handover. LDACS TDD channel aggregation may also operate without the operation of the EGSC, thus requiring a slightly different LDACS channel aggregation protocol. The host aircraft station as defined in the peer-to-peer LDACS protocol for the enhanced LDACS system may allocate the available frequencies and channel resources based upon loading and link metrics. It may also be possible to incorporate frequency aggregation.

The channel aggregation techniques to increase channel capacity as described above may be applied to: (1) Air Traffic Control (ATC); (2) Airline Operations Control (AOC); (3) Alternative Positioning and Navigation Timing (APNT); and General Ip Connectivity (GIpC).

The channel aggregation as described takes advantage of the channelization and spectral efficiency of the enhanced LDACS system's air interface to increase data rate. Channel aggregation in an example requires bundling of several LDACS channels into a single data pipe, which can be shared between all the aircraft that are within the coverage area of the LDACS cell.

Channel Aggregation and Expanded Bandwidth Channels

In an example of channel aggregation, it is possible to employ channel expansion. The enhanced LDACS system chooses an LDACS channel and adds additional subcarriers to the left and right to consume free bandwidth. The growth of each side may be in multiples of LDACS channels, and to ensure backwards compatibility, it may be grown in odd numbers, with one LDACS channel, and then grow that one LDACS channel to consume three LDACS channels worth of bandwidth.

Figure 23:
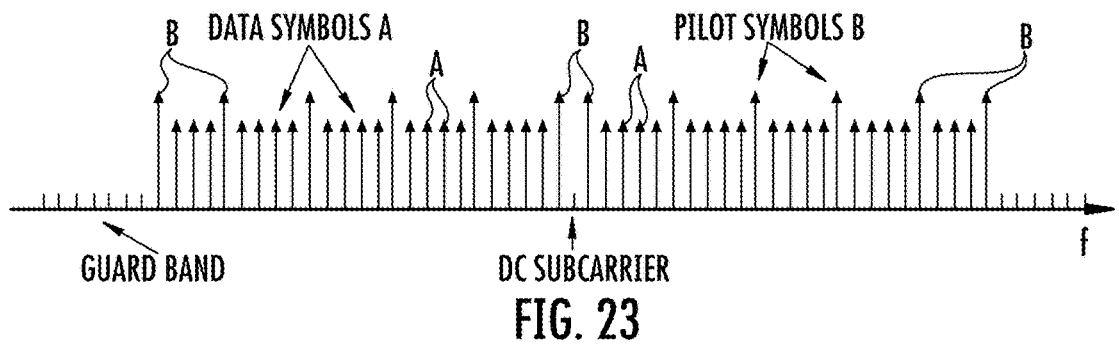
FIG. 23 is a graph showing the guard band, data symbols, DC subcarrier, and pilot symbols in the LDACS forward link signal.
Figure 24:
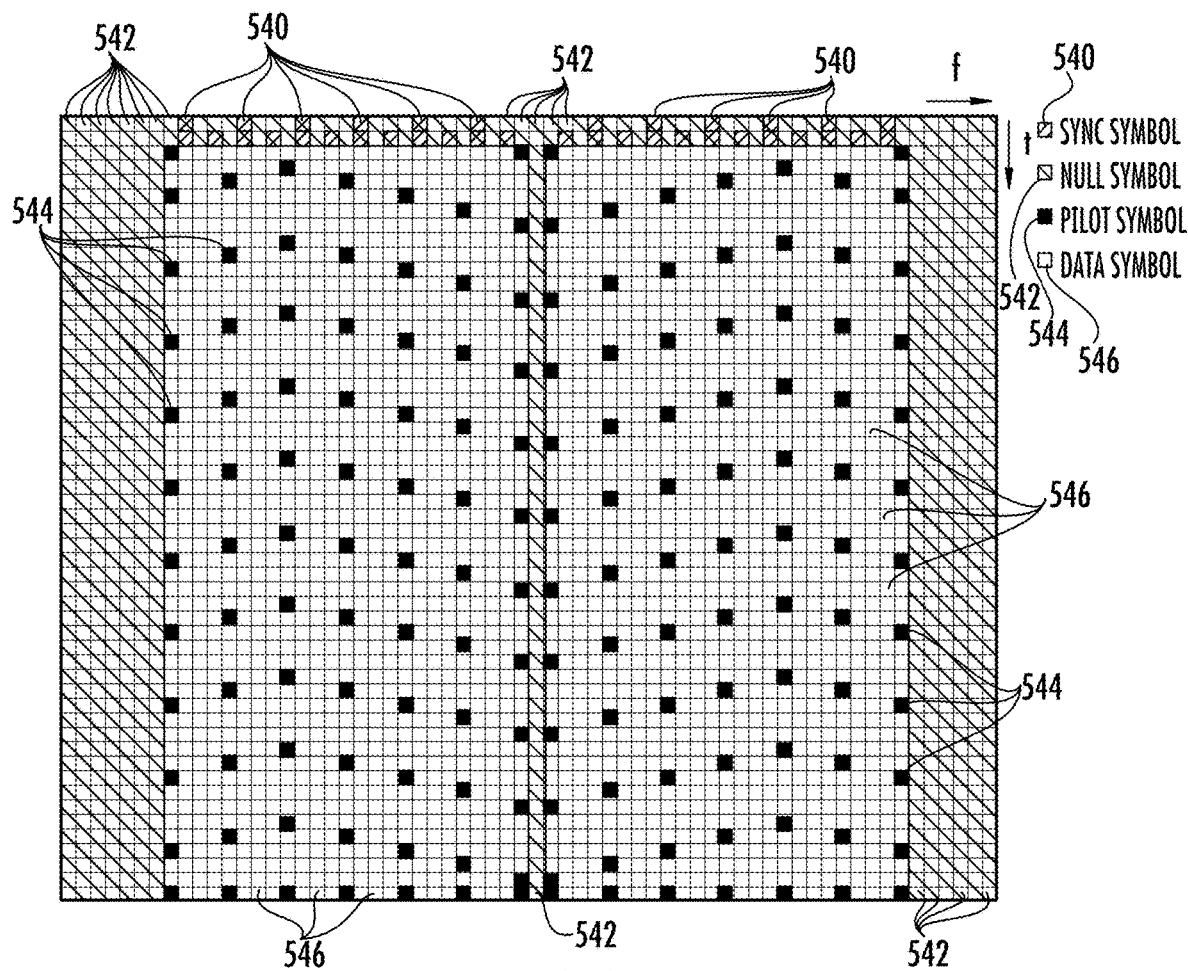
FIG. 24 is a diagram showing the structure of the LDACS forward link signal frame.

Referring now to FIGS. 23 and 24, there is illustrated the OFDM physical layer that has a 64 FFT size and subcarrier spacing in this example of 9.765 kHz, and in this example, 50 subcarriers (+1, DC). These graphs (FIG. 23) and mapping (FIG. 24) show the sync symbols 540, null symbols 542, pilot symbols 544, and the data symbols 546. There may be 7 left and 6 right guard or null subcarriers 542 and the occupied bandwidth is about 498.05 KHz. There are 54 OFDM symbols per frame in this example and a frame duration of 6.48 milliseconds (ms) and two OFDM symbols used for synchronization and a data capacity of about 2,442 symbols per frame. These data characteristics correspond to the LDACS forward link signal characteristics.

Figure 25:
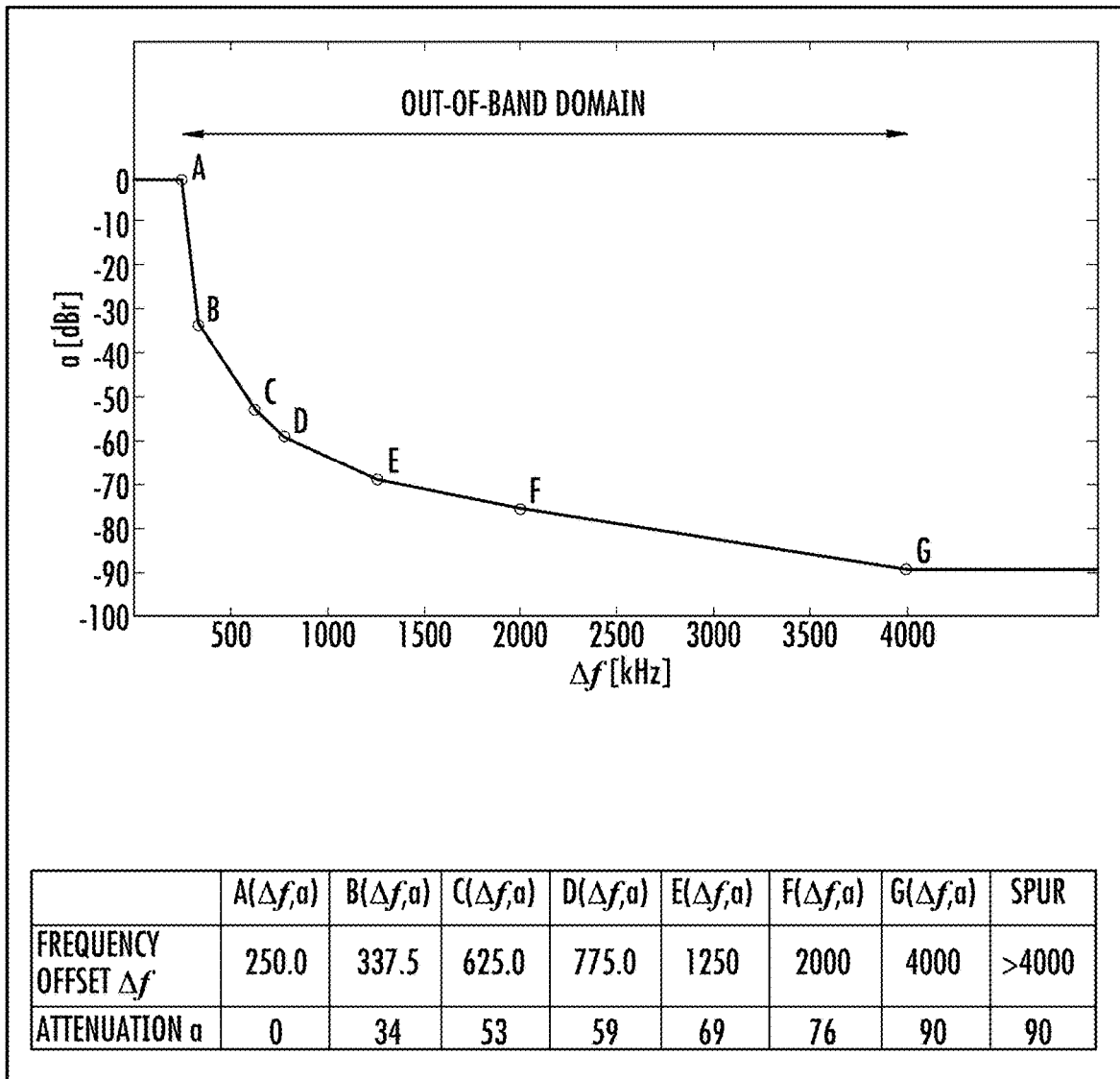
FIG. 25 is a graph and table taken from the LDACS specification for the LDACS ground transmitter spectral mass.
Figure 26:
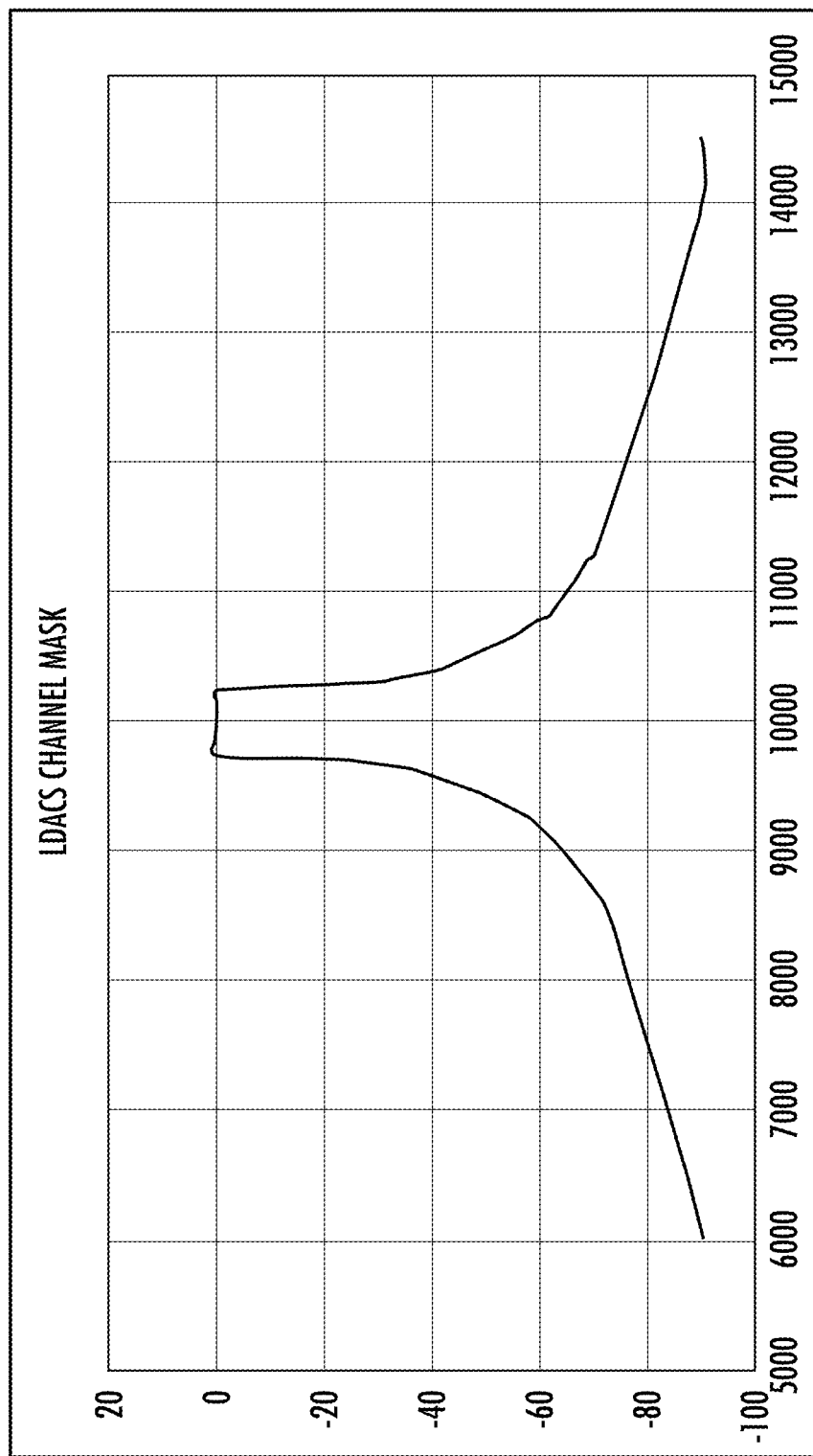
FIG. 26 is a graph showing the LDACS channel mask.

The forward link transmit channel mask is shown in the graphs of FIGS. 25 and 26, with FIG. 25 showing the out-of-band domain and FIG. 26 showing the LDACS channel mask. With the channel aggregation and the expanded bandwidth channel, the channel aggregation may use the standard LDACS physical channel. This is an opportunity since there is no requirement for contiguous channels and adjacent channels may be less desirable. The LDACS ground station may be enhanced to allow for coordinated resource assignments across multiple channels as carriers. With the expanded bandwidth channel, key elements of the enhanced LDACS system are maintained, including a frame/multi-frame/super frame structure and a subcarrier spacing of about 9.765625 kHz. The modulation, coding and timing may correspond to a "out-of-band domain" channel mask. The standard LDACS system may be expanded and multiple 500 kHz LDACS channels may be bound into one expanded channel, and this increases FFT sizing to increase the frame data bandwidth.

Figure 27:
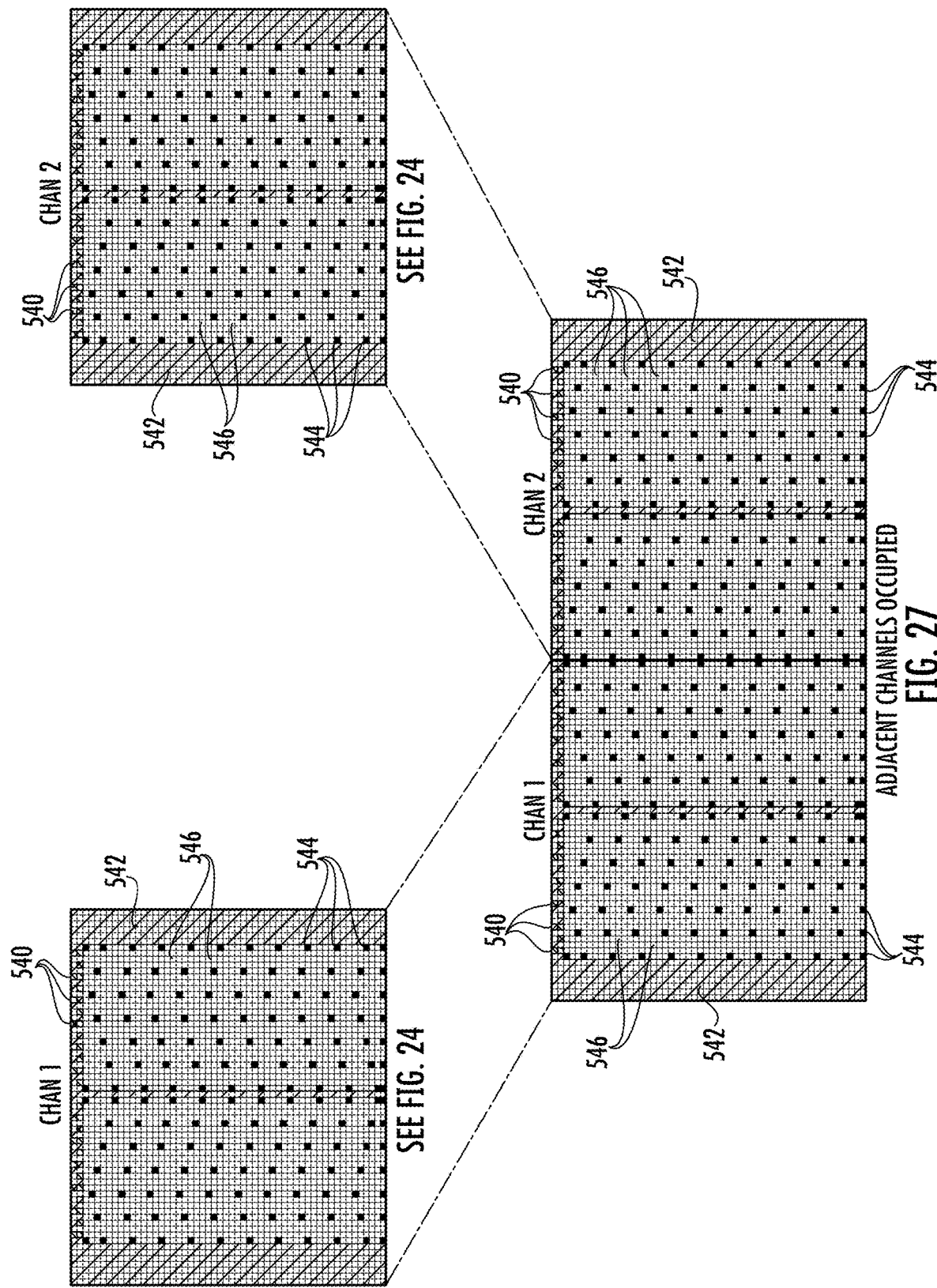
FIG. 27 is a diagram showing occupied adjacent first and second channels.
Figure 28:
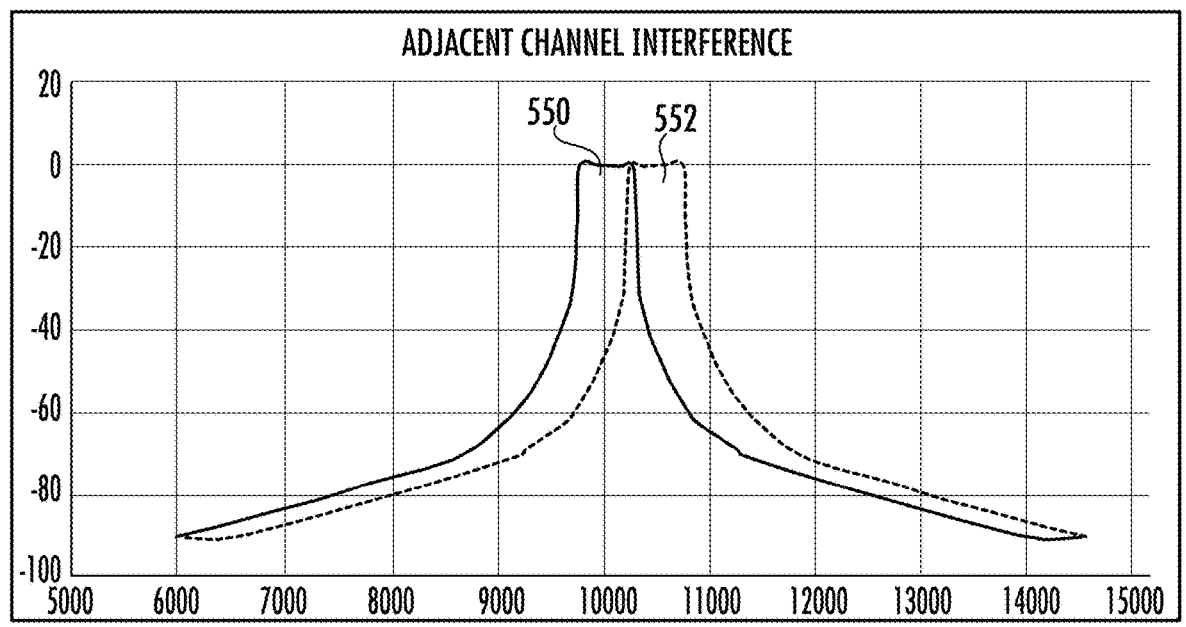
FIG. 28 is a graph showing adjacent channel interference.
Figure 29:
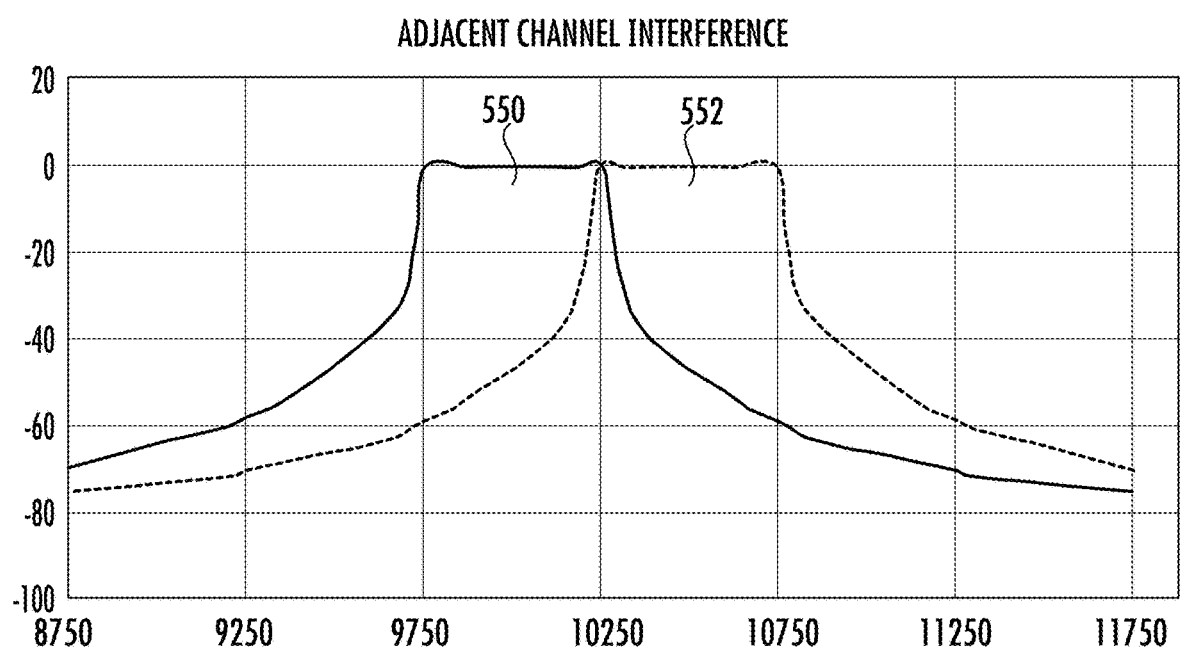
FIG. 29 is a graph showing another example of adjacent channel interference.
Figure 30:
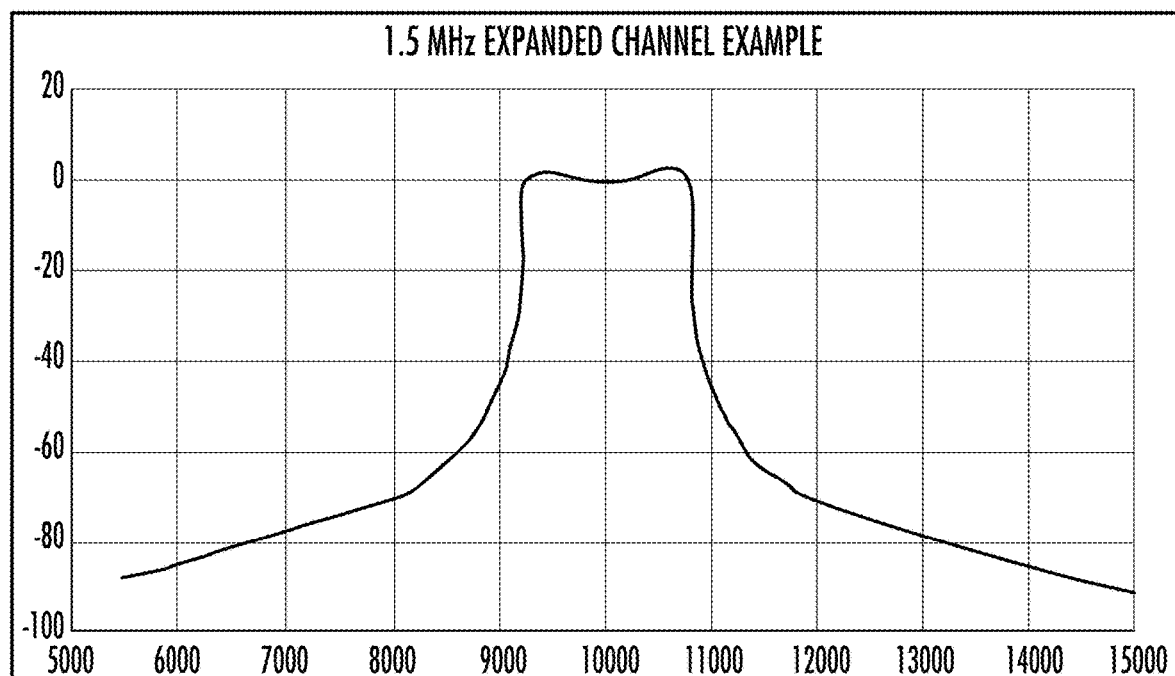
FIG. 30 is a graph showing an example of a 1.5 MHz expanded channel.

There may be significant spectral overlap between adjacent LDACS channels and inter-cell interference. FIG. 27 shows the adjacent occupied channels (channels 1 and 2) with the sync symbols 540, null symbols 542, pilot symbols 544, and data symbols 546. Adjacent channel interference is shown in the graphs of FIGS. 28 and 29 with first and second signals 550,552 compared. The graph in FIG. 30 shows a 1.5 MHz expanded channel example where the FFT size changes to 256 as part of the OFDM physical layer for the subcarrier spacing of 9.765625 kHz and 152 (+1, DC), and 50 left and 50 right guard or null subcarriers, and an occupied bandwidth of about 1.494 MHz.

To minimize the amount of the channel control information and to minimize the intra system interference, two types of LDACS channels may be defined. The first LDACS channel type may be fundamental channels, which are always active and carry the LDACS cells' broadcast information. There is at least one fundamental channel per cell. The second type of enhanced LDACS channel may be supplemental channels, which support the cell's capacity needs and usually carry only user data. When there is no data to transmit, supplemental channels may be inactive and the overall intra system interference is reduced.

Two basic strategies may be used in assignment of the supplemental channels: (1) static assignment, and (2) dynamic assignment of the channels as explained below.

Channel Aggregation with Static Assignment

In the static assignment of supplemental channels, each enhanced LDACS system cell is allocated one fundamental and zero or more supplemental channels. The frequency plan for a static assignment is devised up-front and radio resource management is performed by each enhanced LDACS system cell individually. The cell may require aircraft within its coverage area to measure interference on the set of channels that are assigned to the cell using a spectral analyzer or similar spectrum analyzer or RF energy sensor device. Typically, the same receiver that is used for communication is used to perform these measurements. Due to the time organization of the air interface, there are time intervals where the aircraft radio is neither transmitting nor receiving. The feedback information from the aircraft may be used in the resource management to prioritize the order on how channels are aggregated. The channels that have less interference as measured by the aircraft should be aggregated first.

Figure 31:
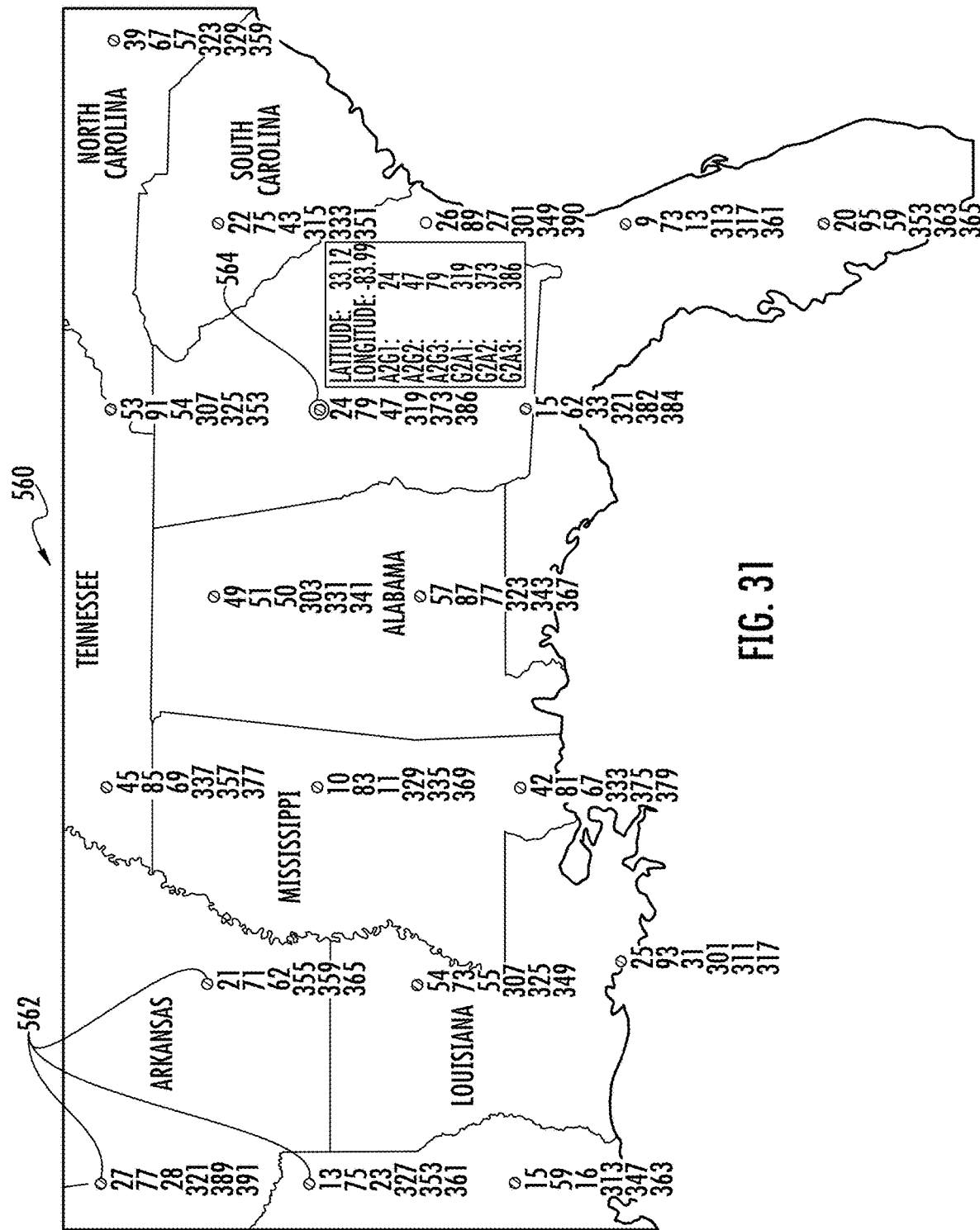
FIG. 31 is a map of the southeastern United States showing a nominal frequency plan design with three air-to-ground and three ground-to-air LDACS channels per cell.

Reference is now made to the enhanced LDACS system of FIG. 31, where a map of the southeastern section of the CONUS is illustrated generally at 560. The enhanced LDACS system is frequency planned so that each cell 562 has three LDACS channels in both ground-to-air and air-to-ground direction, indicated by the six listed channels at each ground station location. For example, the highlighted cell 564 around Atlanta, Ga. uses channels 24, 47 and 79 in the air-to-ground direction, and uses channels 319, 373 and 386 for ground-to-air communication.

This channel aggregation illustrated in FIG. 31 is frequency planned so that it avoids all interference to DME/TACAN. The frequency planning is not excessively constrained and a significant capacity may be obtained, even in the initial deployment. Over time, through its APNT alternative positioning, navigation and timing functionality, the enhanced LDACS system may render DME/TACAN and VOR (VHF Omni-directional Range systems) obsolete. Eventually, these legacy systems may be decommissioned and as a result, much more spectrum will become available for the enhanced LDACS system deployment, and over time, the capacity of the enhanced LDACS system will become quite large. It should be understood that the demand for air-to-ground and ground-to-air communications is not geographically uniform, and therefore, it may not be necessary to deploy the same number of channels at each ground station. The ground stations along flight corridors may use more LDACS channels, while ground stations away from major flight routes may use fewer channels. For example, a site in North Dakota may serve all of its demand using only two LDACS channels. At the same time, a site in the northeast area of the country may deploy five or even more channels. This is not unusual. The non-uniform geographical distribution of traffic demand is a common occurrence in day-to-day cellular engineering practice.

Additionally, because the demand for air-to-ground and ground-to-air communications is not equal, traffic in the ground-to-air direction may exceed the air-to-ground traffic by a significant factor. For that reason, the number of channels does not have to be the same in the air-to-ground and ground-to-air direction. In the existing spectrum allocation, the current LDACS specification makes allowance for 86 channels in air-to-ground direction and 91 channels in ground-to-air direction. As more spectrum is reclaimed from the legacy systems in the future, this spectrum may be used for additional ground-to-air supplemental channels. One possible issue is that the static channel assignment may have drawbacks from a well-known problem of trunking inefficiency. The capacity planning is performed so that the LDACS ground stations have enough resources during their busiest hours. A channel that is assigned to a ground station cell in a low demand area may not be used. When there is a fixed assignment, that channel cannot be assigned elsewhere.

Channel Aggregation with a Dynamic Channel Assignment

In dynamic channel assignment, frequencies are pre-assigned only to the fundamental channels, and therefore, there is one fixed frequency per cell. The assignment of the frequencies to supplemental channels, however, may be performed dynamically and on the basis of the feedback that a ground station receives from an aircraft within its coverage area. By accomplishing the assignment in a dynamic fashion, the channel aggregation system avoids trunking inefficiency problems associated with fixed channel assignment.

In a dynamic assignment, a higher capacity is automatically provisioned in those areas where the demand is higher.

Figure 32:
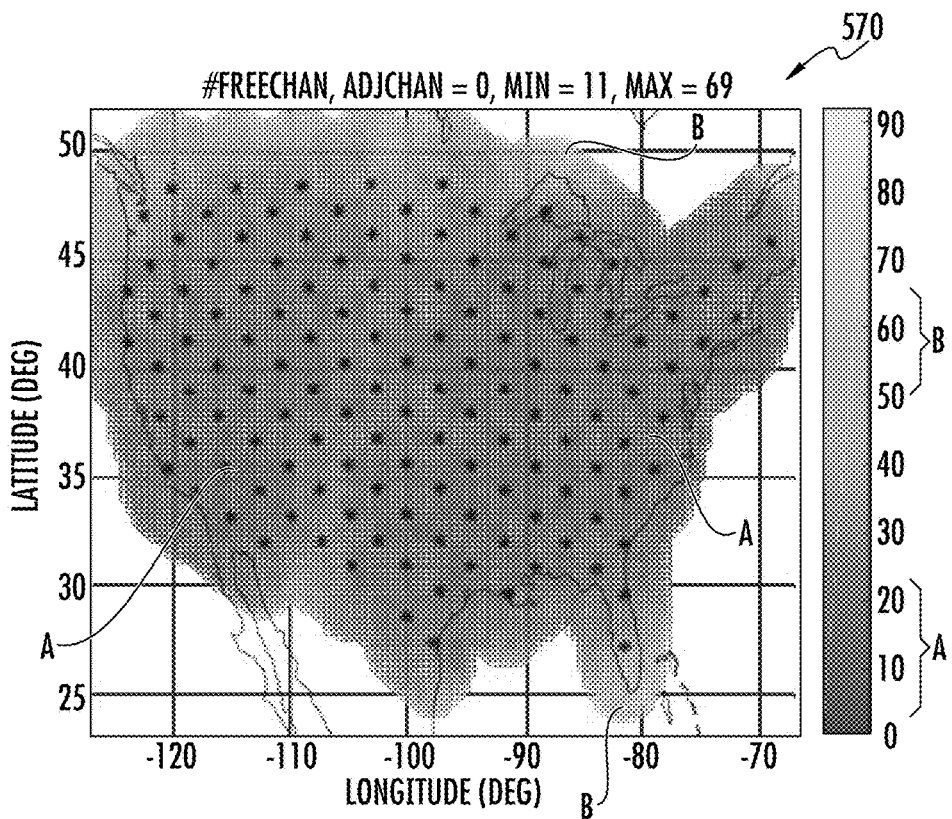
FIG. 32 is a map of the CONUS showing the number of free LDACS channels for dynamic assignment when adjacent channel assignment between the LDACS and DME/TACAN not allowed.
Figure 33:
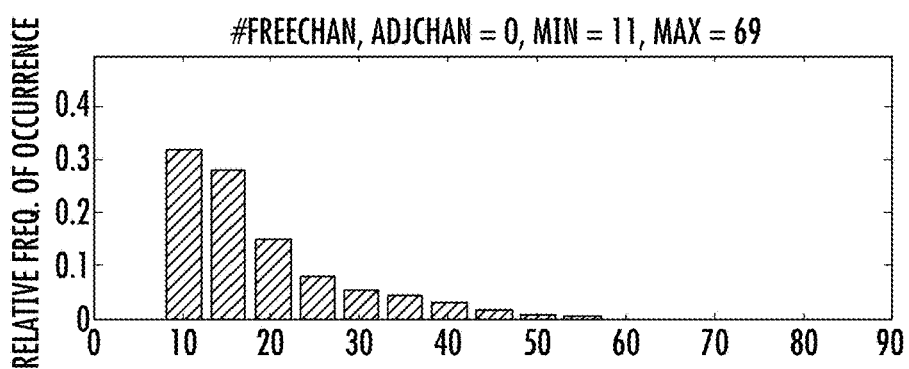
FIG. 33 is a histogram showing the free LDACS channels for dynamic assignment.
Figure 34:
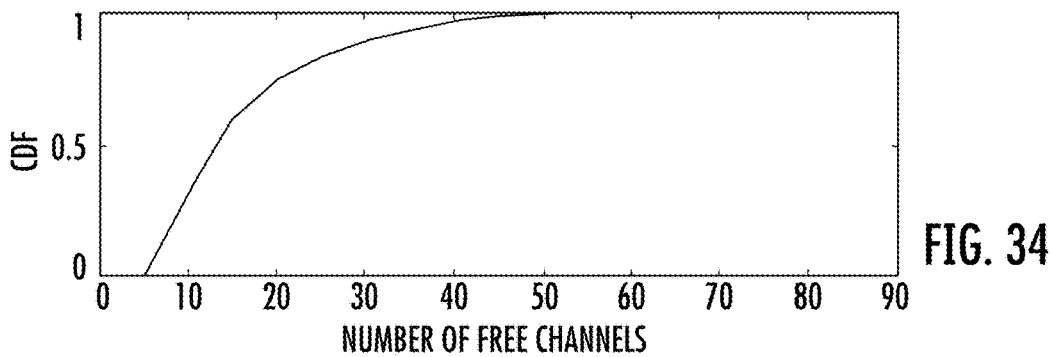
FIG. 34 is a graph showing the number of free channels corresponding to the histogram of FIG. 33.

A prediction of the number of available channels that may be assigned in a dynamic fashion at any given location is shown in FIGS. 32, 33, and 34, showing in FIG. 32 a map of CONUS at 570 and the number of free LDACS channels for dynamic assignment. Adjacent channel assignment between LDACS and DME/TACAN is not allowed and a histogram (FIG. 33) and graph (FIG. 34) of the free LDACS channels is shown. The prediction considers the interference between a nominal LDACS system and an existing DME/TACAN installation. Only those channels that are currently available for LDACS are considered. The link budget parameters are provided in the table entitled System Parameters Used for Prediction of Ground-to-Air Data Rate. The simulations assume the aircraft altitude of 35,000 feet. This table is reproduced below:

TABLE 4A

System Parameters Used for Prediction of Ground-to-Air Data Rate

| Parameter | Value | Comment |
|---|---|---|
| EiRP (dBm) | 49 | Maximum allowed by standard is 52 dBm. |
| Aircraft antenna gain (dB) | 3 | |
| Receiver cable losses (dB) | 2 | |
| Noise figure of the RX (dB) | 6 | |
| Fade margin (dB) | 6 | |
| Implementation margin (dB) | 3 | Implementation margin specifies how far from the Shannon limit systems ACM operate. The 3 dB value use here is quite conservative. |
| Propagation model | FSPL | Free Space Path Loss |

The histogram and graph of FIGS. 33 and 34 illustrate dynamic assignment but assume restrictive conditions on no adjacent channels assignment between DME/TACAN and LDACS. Even in this scenario, there are at least 11 LDACS channels available. In some parts of the country, this number may be as high as 69 channels.

The conditions for no adjacent channel assignment may be conservative. The enhanced LDACS system may operate on channels that are adjacent to DME/TACAN. The adjacent channel assignment may result in a very small level of cross-system interference, which may be tolerated by both LDACS and DME/TACAN as noted in the article by Epple et al. entitled, "Overview of Legacy Systems in L-Band and its Influence on the Future Aeronautical Communication System LDACS1" (2011), which is hereby incorporated by reference in its entirety.

Figure 35:
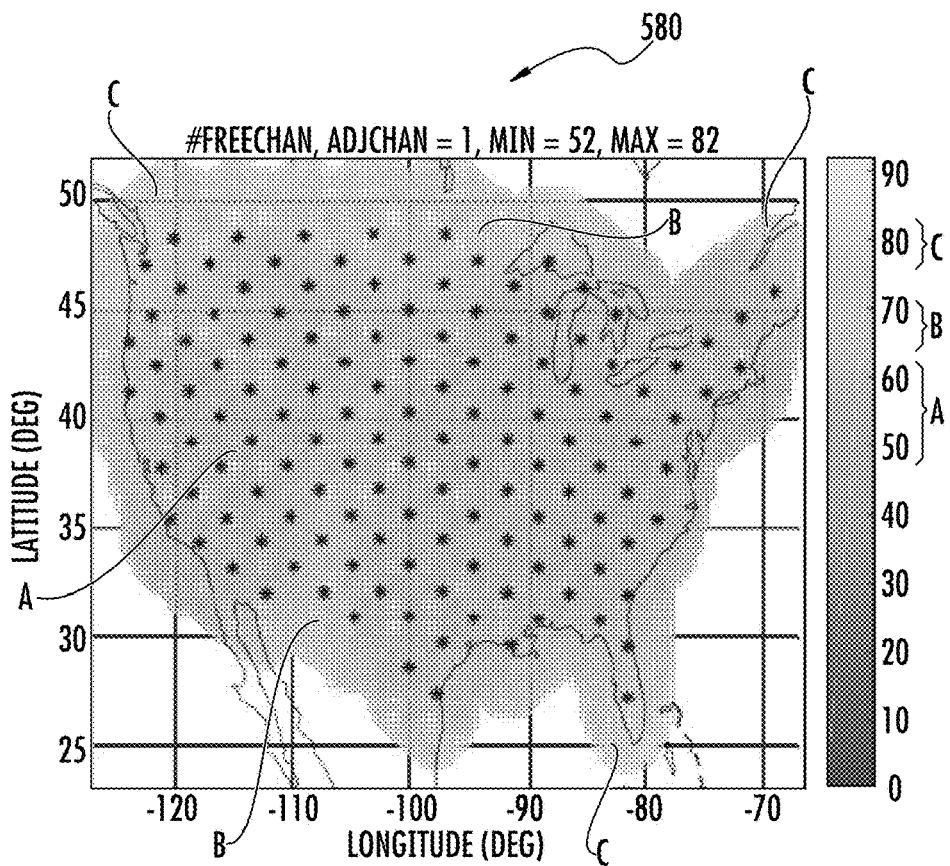
FIG. 35 is another map of the CONUS showing the number of free LDACS channels for dynamic assignment where adjacent channel assignment is allowed between the LDACS and DME/TACAN.
Figure 36:
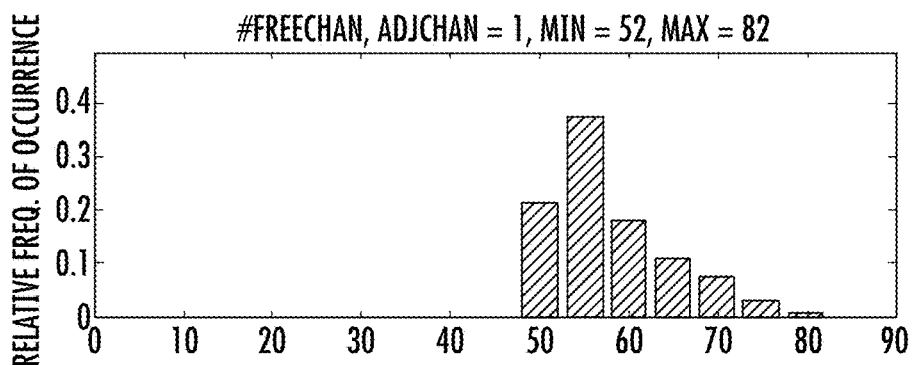
FIG. 36 is a histogram of the free LDACS channels for dynamic assignment corresponding to that shown in the map of FIG. 35.
Figure 37:
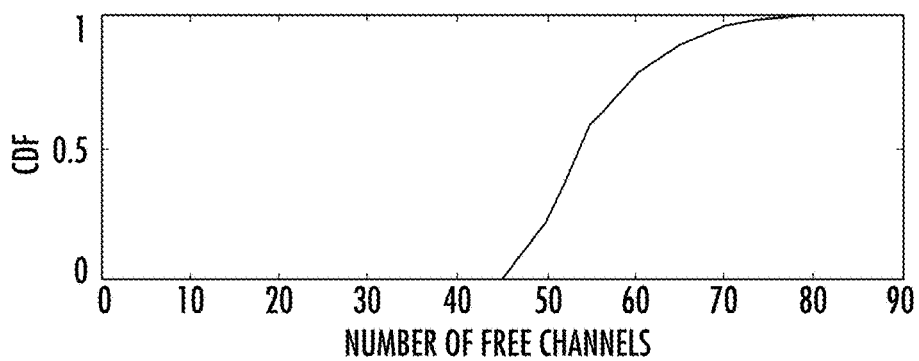
FIG. 37 is a graph showing the number of free channels corresponding to that of FIG. 36.

The CONUS map shown in FIG. 35 at 580 and histograms and graphs of FIGS. 36 and 37 are generated under assumption that the adjacent channels assignment is allowed. It is evident that if a small amount of interference could be tolerated, there may be a substantial increase in the system capacity, e.g., in some locations more than three times. However, it is not likely that such a high capacity would be needed for an initial deployment, which may be driven primarily by the ATC, AOC and APNT services, which have low data rate requirements.

Figure 38:
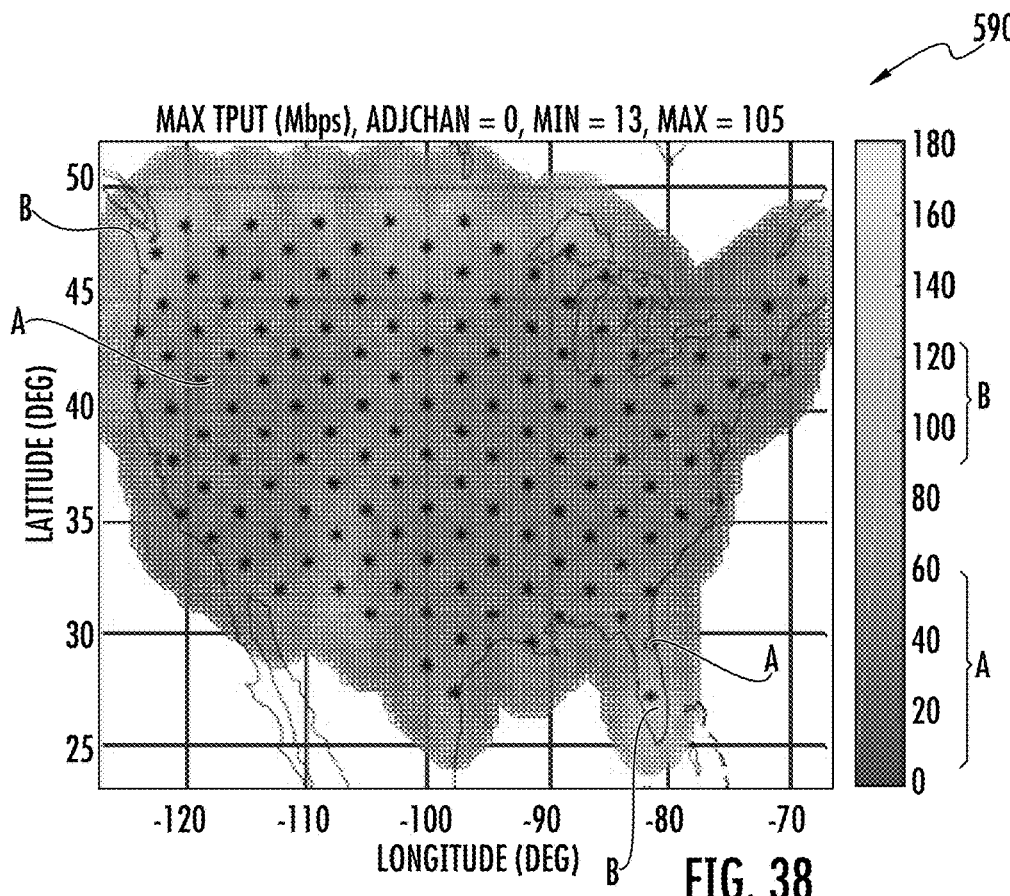
FIG. 38 is a map of the CONUS showing the maximum achievable data rate when all free channels are aggregated and adjacent channel assignment between LDACS and DME/TACAN is not allowed.
Figure 39:
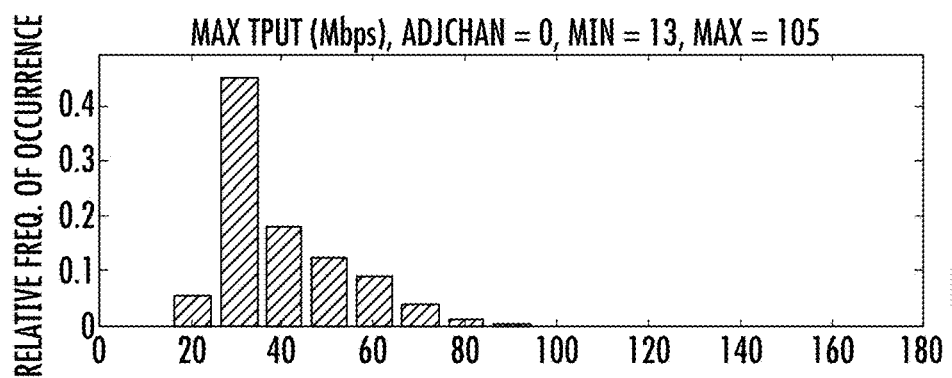
FIG. 39 is a histogram of the maximum achievable data rate when all free channels are aggregated corresponding to the CONUS of FIG. 38.
Figure 40:
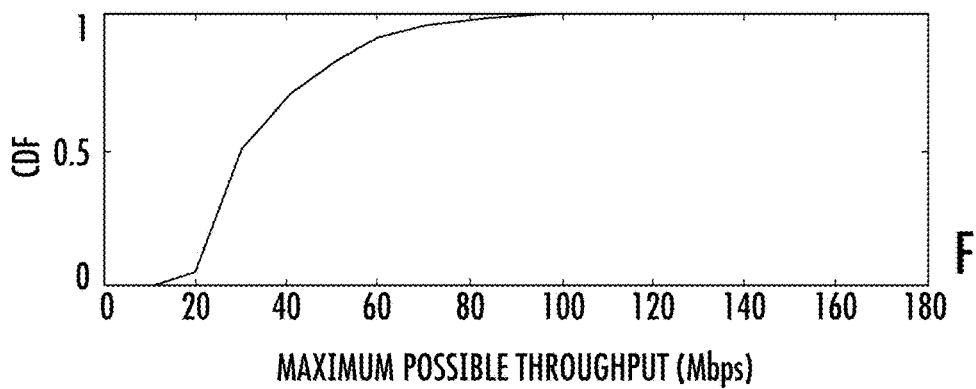
FIG. 40 is a graph of the achievable data rate corresponding to FIG. 39.
Figure 41:
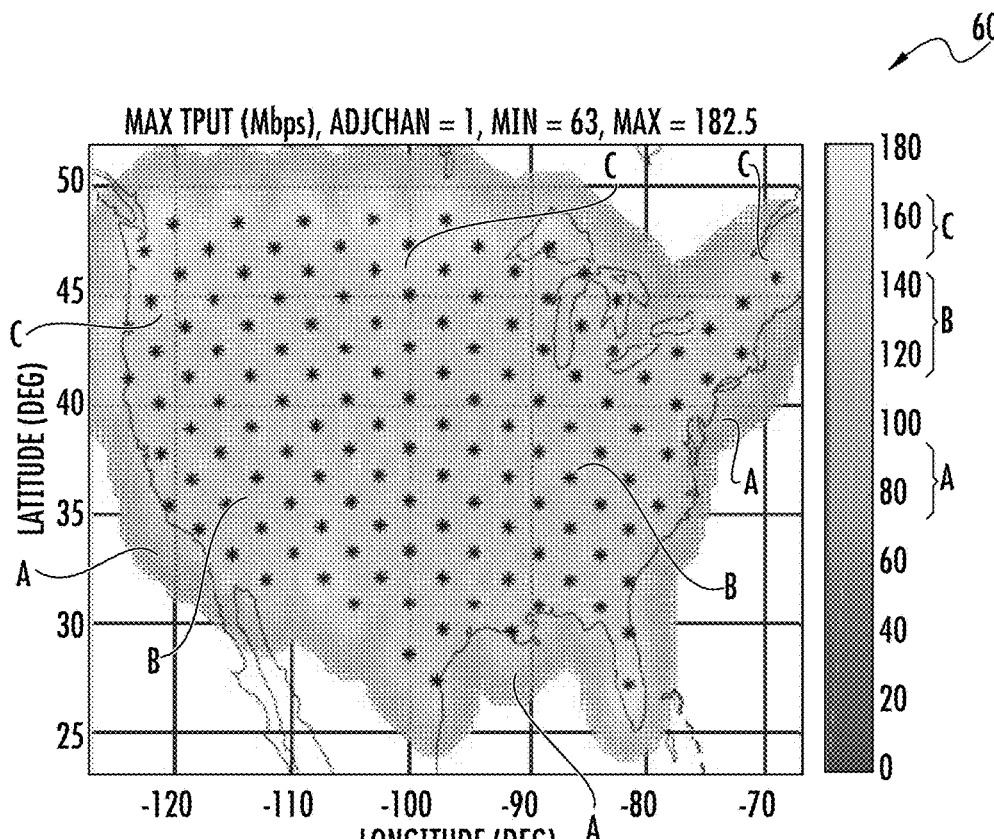
FIG. 41 is a map of the CONUS showing the maximum achievable data rate when all free channels are aggregated and adjacent channel assignment between LDACS and DME/TACAN is allowed.
Figure 42:
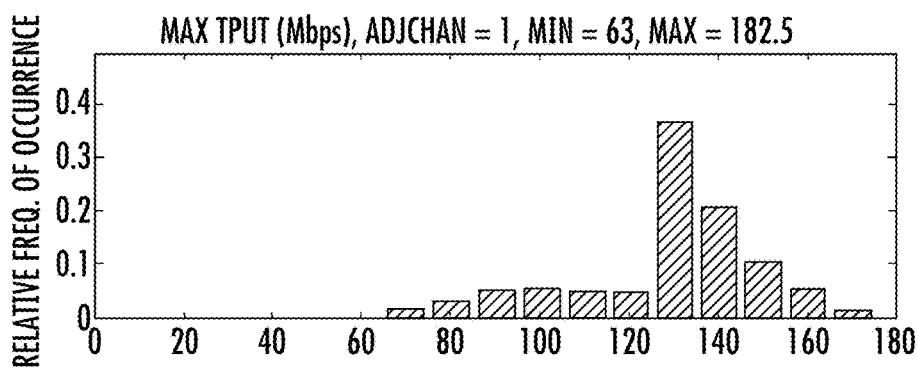
FIG. 42 is a histogram of the maximum achievable data rate when all free channels are aggregated corresponding to the CONUS shown in the map of FIG. 41.
Figure 43:
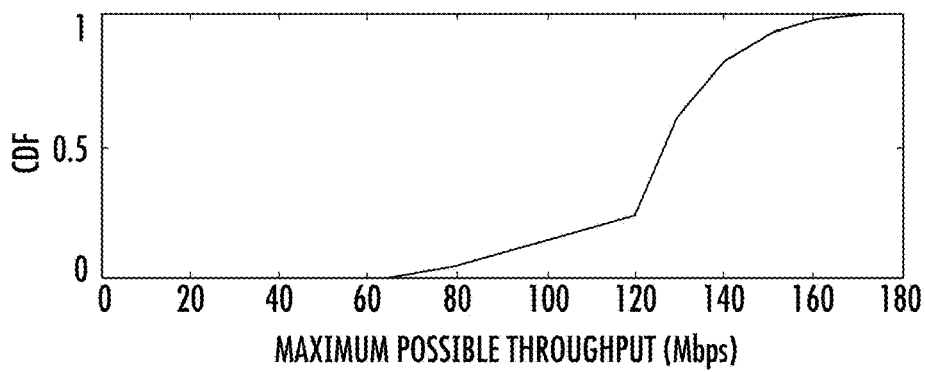
FIG. 43 is a graph of the achievable data rate corresponding to FIG. 42.

Referring now to the CONUS map of FIG. 38 at 590 and histogram and graphs of FIGS. 39 and 40, the maximum possible data rate of the enhanced LDACS system is illustrated. The simulations assume aggregation of all free channels. Adjacent channel assignment between LDACS and DME/TACAN is not permitted in this example. This can be compared to the example presented with the CONUS map of FIG. 41 at 600 and the graphs and bar chart of FIGS. 42 and 43 when the adjacent channel assignment is allowed. If the adjacent channel assignment is restricted, the achievable throughput is over 13 Mbps over the entire country with more than 50% of the country having data rates above 30 Mbps. This is far above what is available to the ATC and AOC at the current time. Allowing the assignment of the adjacent channels will achieve data rates above 63 Mbps, which is a rate that provides sufficient capacity to accommodate general IP connectivity and data transmission of flying aircraft. These results even assume no decommissioning of the DME/TACAN sites. If DME/TACAN sites are decommissioned, the available data rates will grow above the numbers presented in the bar charts and graphs of FIGS. 38-40 and 41-43.

Figure 44:
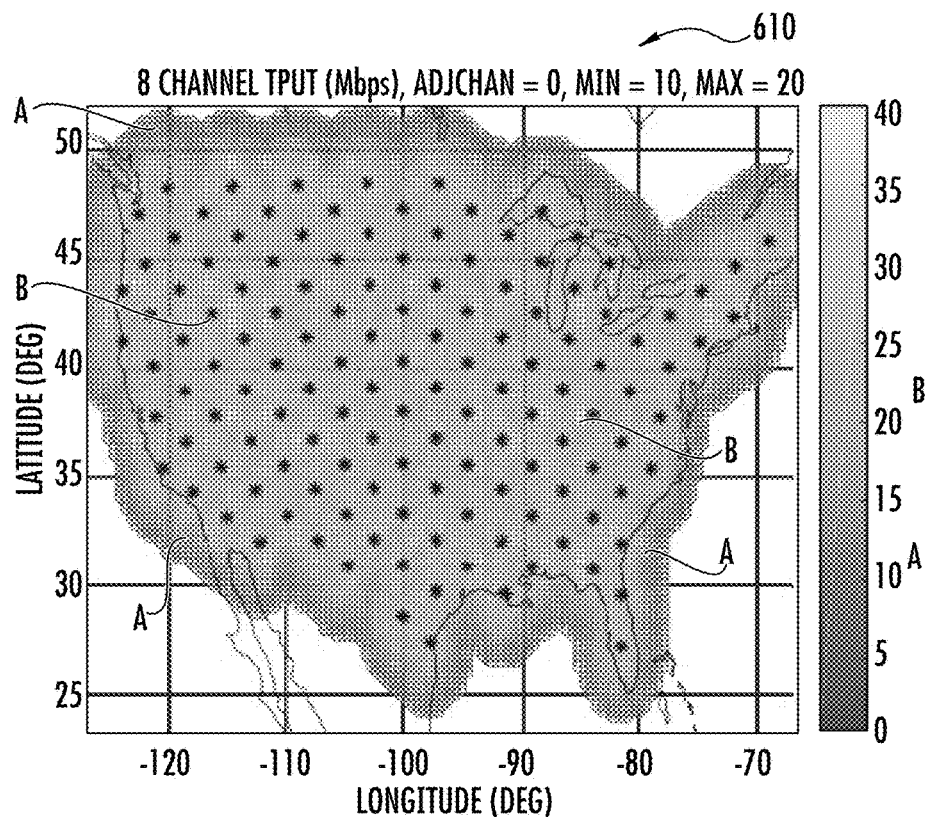
FIG. 44 is a map of the CONUS showing the LDACS data rate expected from an eight-channel aggregation.
Figure 45:
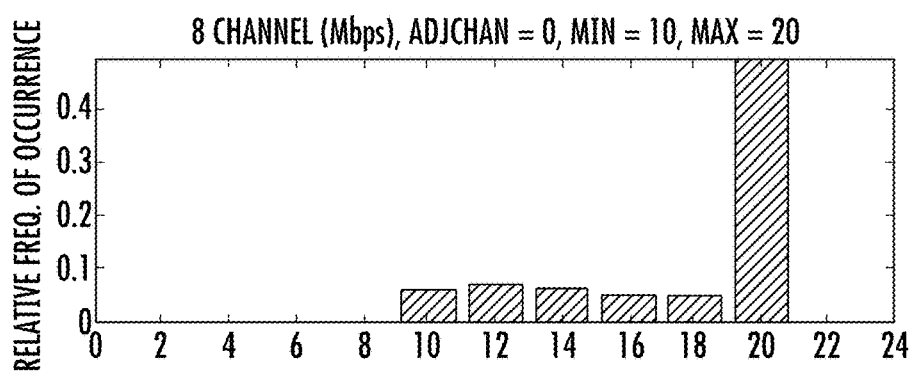
FIG. 45 is a histogram showing the LDACS data rate expected from an eight-channel aggregation.
Figure 46:
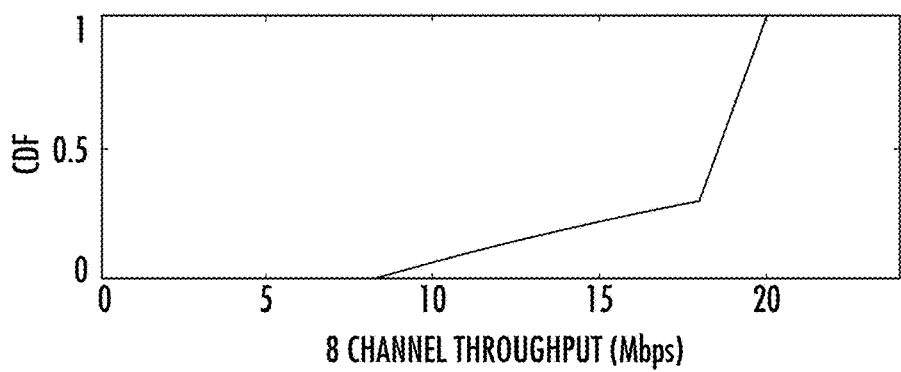
FIG. 46 is a graph showing the LDACS data rate corresponding to FIG. 45.

It may not be realistic to aggregate all possible channels because the amount of required signal processing may be prohibitively high. Referring to the CONUS map of FIG. 44 at 610 and histogram and graph of FIGS. 45 and 46, there are shown the data rates that could be achieved under the assumption of an eight channel aggregation. When the channels are aggregated, the same results are obtained regardless whether LDACS and DME/TACAN are allowed to use adjacent channels, which is evident from FIGS. 45 and 46. At any given location within the CONUS, there may be at least 11 channels that are available for an interference free assignment. Therefore, eight channels may be available. From the bar chart and graph of FIGS. 45 and 46, it is evident that the enhanced LDACS system may provide a coast-to-coast data rate of 20 Mbps. More detailed analysis of the receiver processing requirements may be necessary to obtain a more justifiable number. It should be understood that adjacent assignment results in a very small level of cross-system interference that may be tolerated easily by both LDACS and DME/TACAN.

An example migration/implementation strategy for the channel aggregation used by the enhanced LDACS system is outlined in the table below:

TABLE 5

Example Migration Strategy

| Step # | Step | Comment |
|---|---|---|
| 1 | Dual mode LDACS-DME/TACAN with single fixed channel assignment | Initial deployment is a coverage deployment. Ground stations could be deployed starting from high congestion area until national coverage is reached. The network is frequency planned with fixed assignment. There is a single channel per cell. Frequency plan avoids adjacent channel assignment between LDACS and DME/TACAN. An aircraft radio needs to be developed that supports both DME/TACAN and LDACS. The radio could be using LDACS positioning capability to provide DME/TACAN messages. This way in areas where LDACS is deployed, the aircraft is completely independent of DME/TACAN network. This reduces the utilization of the DME/TACAN and hence, the overall interference in the band is reduced as well. In this stage, the use of LDACS is for ATC, AOC and APNT services. |
| 2 | Dual mode (LDACS-DME/TACAN) with channel aggregation | Channel aggregation feature is implemented in dual mode radios. Channel aggregation allows higher data rates and hence enables general IP connectivity services. Adjacent channel assignment should still be avoided. |

TABLE 5-continued

Example Migration Strategy

| Step # | Step | Comment |
|---|---|---|
| 3 | Dual mode LDACS-DME/TACAN with channel aggregation and adjacent channel assignment | The radio becomes more robust so that it may tolerate adjacent channel assignment. There is a national wideband coverage on LDACS, and only legacy aircraft are still using DME/TACAN. |
| 4 | Single mode LDACS with channel aggregation | DME/TACAN is decommissioned and all aircraft are on LDACS. |

LDACS Channel Aggregation with Cloud-Based Radio Resource Management

Due to LDACS system's relatively small channel bandwidth, carrier aggregation achieves high system capacity, where multiple LDACS channels are bonded together in the enhanced LDACS system in a single data pipe between flying aircraft and LDACS ground station. Because each channel requires a separate frequency, frequency planning is used. Two approaches to frequency planning include: 1) the static frequency planning where all LDACS channels are preconfigured with frequencies, which is an approach similar to FDMA (or FDMA/TDMA) type cellular systems, e.g., IS-136, TDMA, iDEN and similar systems, and 2) the assignment of dynamic channel frequencies.

In the dynamic approach, only one channel per cell has a fixed assignment, which is the fundamental channel. The remaining channels are referred to as the supplemental channels, which are assigned frequencies based on energy or spectrum measurements provided by the receiver of the flying aircraft. This second dynamic approach allows higher LDACS system capacity because it avoids trunking inefficiency, which is a fundamental problem of all cellular systems using fixed frequency assignments. This system, however, is inherently reactive because it depends on feedback from flying aircraft to manage frequencies. Also, in its management of radio resource assignment, such system is local in nature because each radio resource management entity is located at the cell level and has visibility only of those cells in its immediate neighborhood.

Because the air traffic is highly predictable, much information is readily available: (1) number of flying aircraft; (2) flying routes of each aircraft; (3) type and passenger capacity for each aircraft; (4) historical data on communication needs for each aircraft, including volume and type of communication; and (5) weather patterns and changes of flying routes that are due to the changes in weather.

Based upon this information, the enhanced LDACS system is able to predict the capacity requirements for each LDACS cell and its ground stations. This prediction may not only consider historical trends, but also, consider the air traffic situation as it presents itself at any given time. Since the number of aircraft is essentially constant, the situation awareness becomes an important factor as suggested by the following example.

In this example, bad weather in the southeast of CONUS may cause temporary traffic congestion around Atlanta's airport creating a higher demand for capacity in that region. The same aircraft that are flying around Atlanta are not flying around Los Angeles. Therefore, while there is an elevated demand around Atlanta, there is a reduced demand around Los Angeles.

Figure 47:
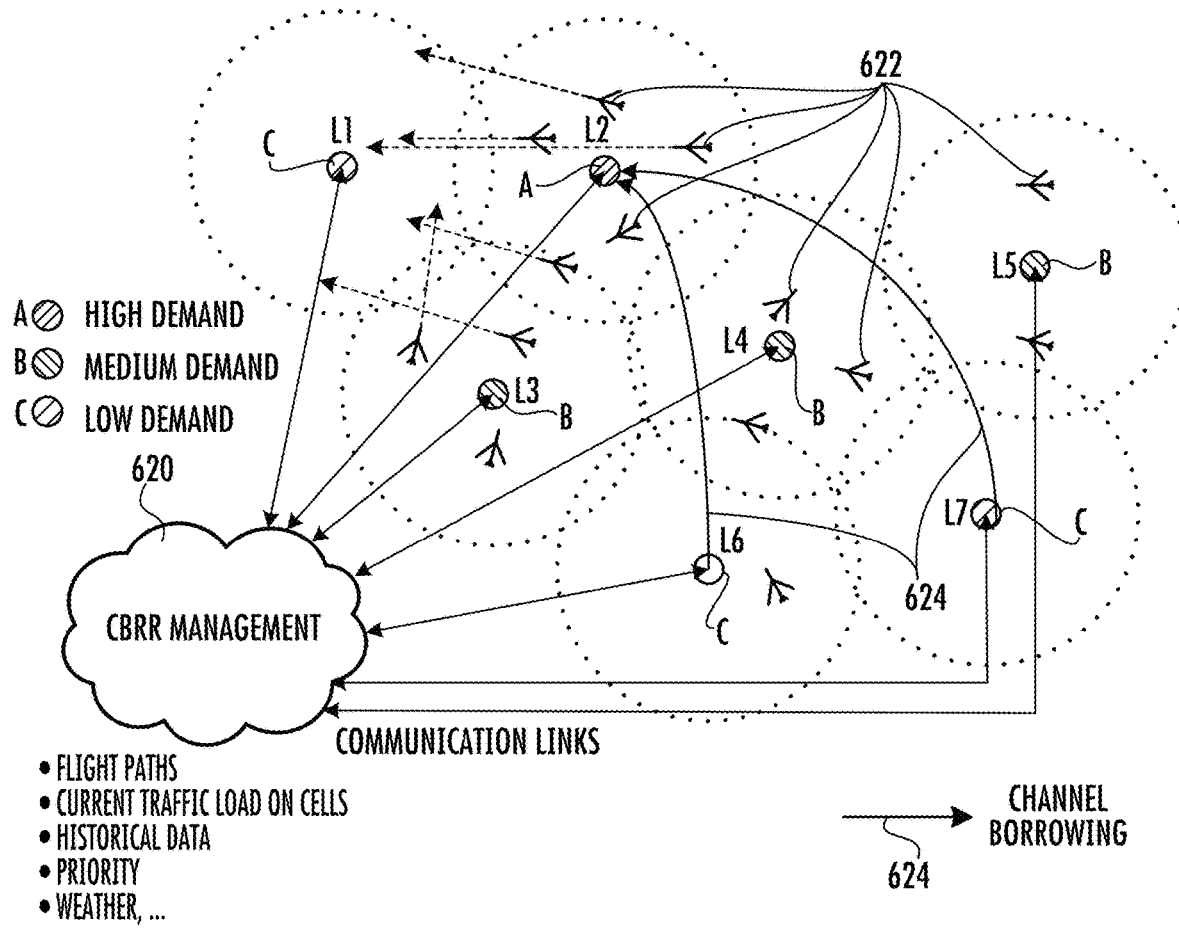
FIG. 47 is a diagram showing a cloud-based radio resource management used in the enhanced LDACS system.

An intelligent enhanced LDACS system that manages radio resources and has a knowledge of CONUS based demand may seamlessly "migrate" the excess capacity from the Los Angeles area to the Atlanta areas. The enhanced LDACS system provides this capability with the Cloud Based Resource Management (CBRR) entity. Referring now to FIG. 47, there is illustrated an example of the CBRR 620 and showing seven different LDAC cells labeled L1 to L7, which are not equally loaded. Different aircraft 622 are shown flying in different cells. Cell L2 has the highest traffic, while cells L1 and L7 have no aircraft within their service area. Based on the dynamic approach outlined above, Cell L7 may try to borrow some frequencies from surrounding cells. Surrounding cells L3 and L4, however, are already substantially loaded and as a result, an attempt may be made to borrow channels from cell L1. This borrowing could temporarily alleviate congestion in cell L2, but it is likely to cause additional trouble some time later as most of the planes that are causing congestion to cell L2 are moving towards cell L1.

With CBRR management in the enhanced LDACS system, communication links exist between all LDACS cells and the network cloud that may include the CBRR cloud-based management 620. Through these links, the CBRR management entity is informed about current traffic served by each cell. Because the CBRR management entity 620 is aware of each cell's configuration, it may determine how much traffic loading occurs on each cell. The management entity 620 is also aware of the trajectory for each plane and may predict what will be the demand placed on each cell in the near future. In this example in FIG. 47, the CBRR management entity 620 may decide not to take channel capacity from cell L1 because it is on the average having high demand. However, cells L7 and L6 are lightly loaded, and there will be no demand in those cells for some time. Therefore, the frequencies from cells L6 and L7 may be migrated to cell L2 as shown with the illustrated channel borrowing lines 624, and later on to cell L1 to support the elevated traffic demand that will occur as aircraft moves from cell L2 and cell L3 and passes into cell L1.

This example shows there are advantages to the use of the CBRR management entity 620 because the capacity of the LDACS system becomes a flexible resource that may be optimized to follow the traffic demand across CONUS. Any idle resources are minimized and the available throughput is the largest in those cells where it is needed the most.

To accommodate this CBRR approach in the enhanced LDACS system, each cell may include a bank of radios that is sufficient to accommodate the cell's peak demand. At any given moment, only a fraction of these radios may be active, i.e., have a frequency assignment. For example, after channel borrowing, cell L7 in FIG. 47 may be left with only one radio operating on its fundamental channel and the remaining radios may be without assignment. This is acceptable because there is no traffic demand in Cell L7.

The CBRR management entity 620 may be configured as a boundary between the enhanced LDACS system and its network and the Internet. Therefore, it becomes a single point that needs to be secured. In cases of cyber based danger, the entire network could be separated from the Internet and reduced to its primary functionality, e.g., ATC, AOC and APNT. The CBRR management entity has ability to easily accommodate the following features: (1) prioritization of traffic type, e.g., ATC vs. user-based Internet traffic; (2) prioritization of aircraft such as customer tiers; (3) flexible time and geographic billing, which allows different rates based on time of the day and geographical location; (4)

Service Level Agreement (SLA) based on capacity/resource pre-allocation; and (5) user experience management.

The CBRR management entity 620 may include an LDACS Management Entity Controller (LMEC) that sits above the LME to configure and control resources across all enhanced LDACS ground station connections and with other ground stations in the enhanced LDACS system. It may operate for dynamic resource allocation and internally allocate and deallocate based on the aircraft station requirements. It may include an external interface that operates to allow cloud-based resource sharing or similar functions. It may determine which channels should be assigned to which aircraft station. The LMEC may interface with a ground station controller to determine which channels are in use and which channels are available for assignment. As a potential addition to the enhanced LDACS system, it may allow channel estimation symbols. The aircraft station may transmit symbols back to the ground station when requested for the ground station to determine the channel characteristics. In an OPEN state, the LMEC may allow the ground station to reuse sub-channel resources for additional aircraft stations.

The ground station controller overseas Type II handovers and will have data about needing to know which channels are in use in an area requiring the LMEC to interface with it in order to appropriately allocate channels for dynamic resource management. The LMEC will request resources as channels from the ground station controller, which in turn, will rescind resources from the LMEC if needed for the overall application. The LMEC is originally allowed to expand a channel, but new aircraft stations are entering a neighboring ground station cell and resources will need to be reallocated.

The channel estimation symbols as noted before are a potential addition to the enhanced LDACS system and when requested, the aircraft station performs channel estimation calculations based upon channel estimation symbols from the ground station to determine channel quality. It is possible that pilot symbols may be used. The LMEC receives data from each ground station per aircraft station communications link, including a channel quality indicator, precise timing advance, modulation scheme and coding scheme. The aircraft station will be able to demodulate and decode the transmitted downlink data with the maximum error rate.

Reference is again made to the description regarding the state diagram 384 of FIG. 13 and the open state 340 where instead of constantly transmitting the keep alive message, the aircraft station will incorporate in a random-access channel (RACH) as a shared channel when the aircraft station needs to transmit data and will listen to the ground station to determine if the ground station needs to transmit data to it. The aircraft station may use the random-access channel and check with the ground station after the expiration of a new timer. As an example will be the T321T timer in the LTE system. Paging may be used and the STAY_ALIVE message may overload or create new paging messages. On the ground station to aircraft station communications link, it is possible to indicate the data to send as containing one or more aircraft station SAC messages. It is possible to read purpose and remove the KEEP ALIVE timer on the aircraft to ground station communications link. Different areas can be paged, such as the last seen ground station and adjacent ground stations when the cell size is quite large. An aircraft station could have migrated to the next ground station and the original ground station may never receive the CELL_EXIT message. On a new registration, the ground station controller should be aware of the new serving ground station.

Combined LDACS-LTE Architecture

Figure 48:
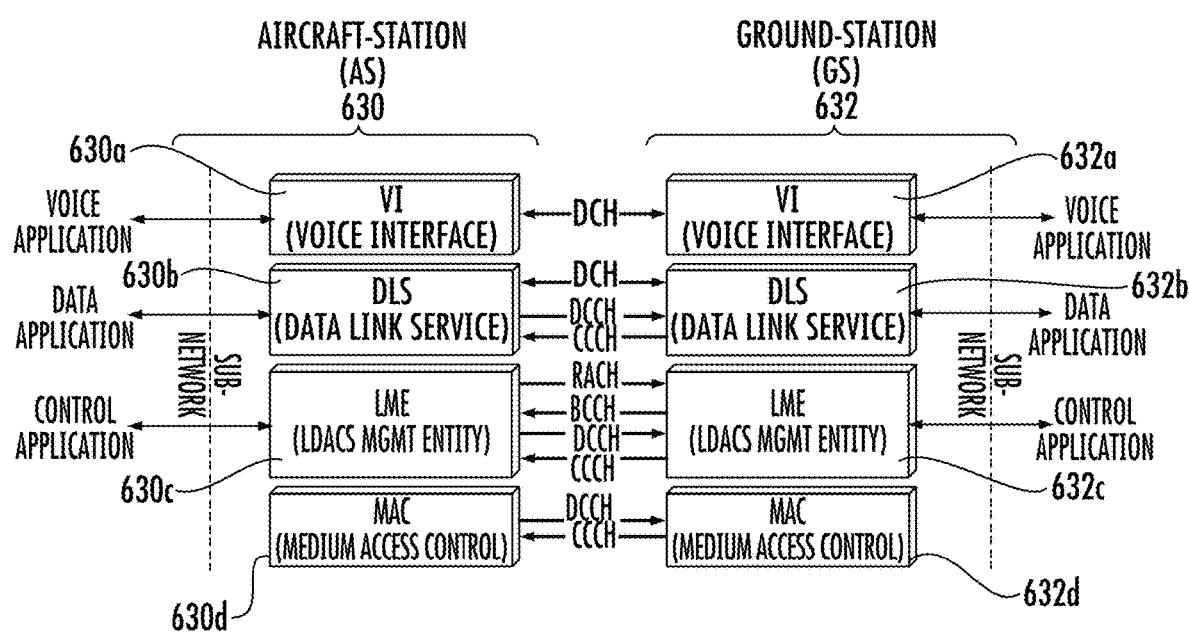
FIG. 48 is a block diagram showing the aircraft station and ground station architecture for LDACS standards that may be used in the enhanced LDACS system.

Referring now to FIG. 48, a representation of the LDACS architecture that may be used with the enhanced LDACS system and is derived from the LDACS standards is illustrated and shows the Aircraft Station side 630 and Ground Station side 632. The LDACS standards do not currently expand upon the applications, such as the voice, data and control applications, also referred to as "services" as shown in FIG. 48. Instead, the current LDACS standards to date have focused on defining the MAC and PHY elements necessary to provide the connection and logical communication channels between the architectural elements for both the Aircraft Station side 630 and Ground Station side 632 as the respective Voice Interface (VI) 630*a*,632*b*, Data Link Service (DLS) 630*b*,632*b*, LDACS Management Entity (LME) 630*c*,632*c*, and Medium Access Control (MAC) 630*d*,632*d*. The "Medium Access Controller" is a functional layer of the LDACS waveform that interfaces the PHY and provides the connection mapping into the logical transport channels that are transmitted and received by the PHY. The Medium Access Control 630*d*,632*d* is an architectural element that is responsible for managing the connection between the ground station 632 and aircraft station 630.

The architecture captured in the LDACS specifications is similar in many ways to the IEEE 802.11 standards, which provide a universal access data centric technology. The 802.11 standards are generally used for connections that are generally localized and used in static deployment scenarios and lacks key mobility features such as protocols for very wide area network location tracking and seamless site-to site handovers that are needed for a wide-scale network deployment of and LDACS-based system for command, control and communications.

The system air-to-ground (ATG) network technology includes features that are common in modern cellular protocols and the enhanced LDACS system architecture marries the LDACS waveform and modern cellular technologies to provide the following benefits: (1) maintain compatibility with the current and foreseen LDACS standards and interfaces; (2) add support for A-PNT (alternative positioning and timing) and other navigational features; (3) provide for secure authenticated network access; (4) provide security and privacy encryption; (5) enhance handover support; and (6) enable network segregation and mobility.

Figure 49:
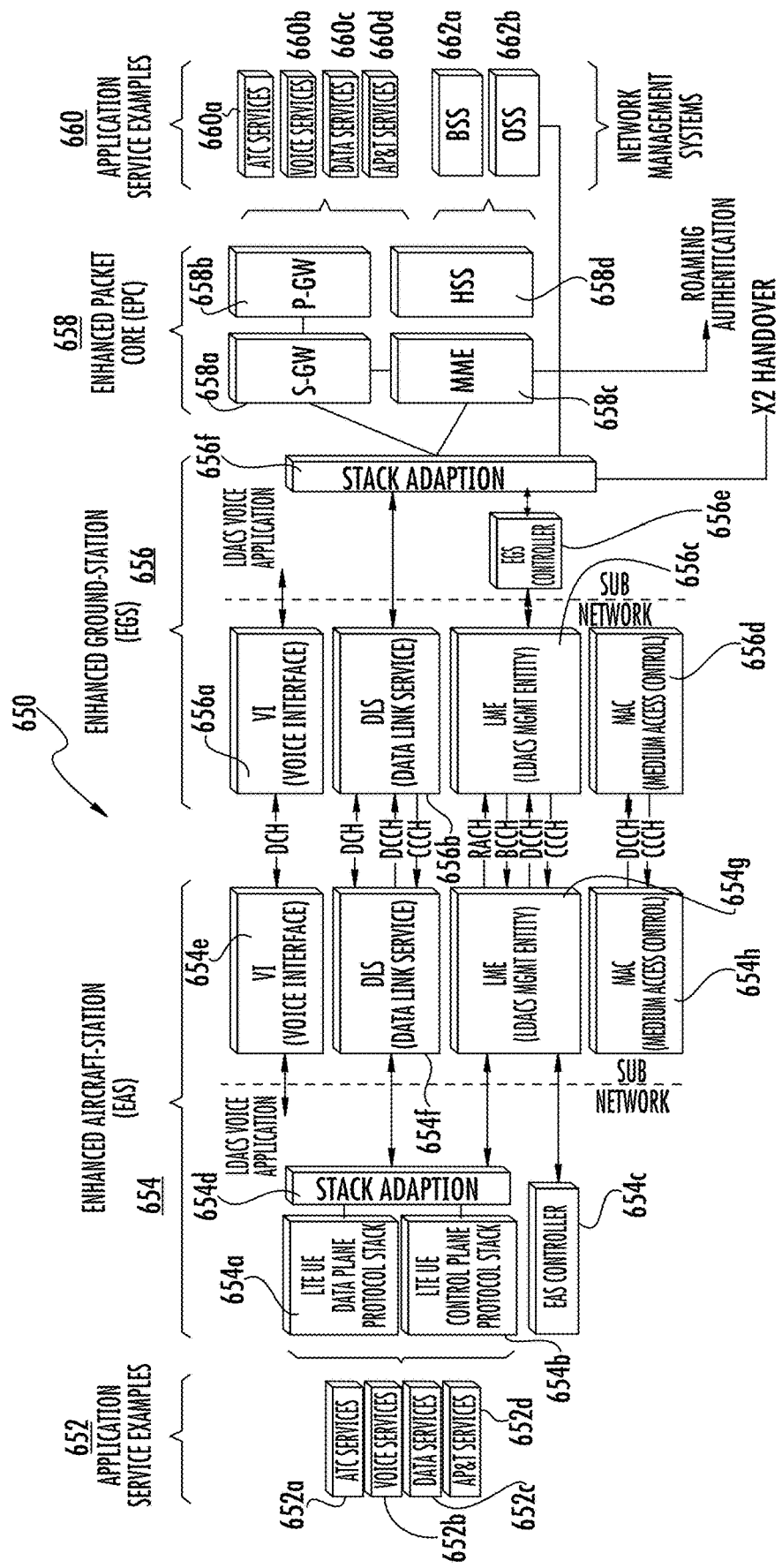
FIG. 49 is a block diagram showing the enhanced LDACS system architecture with application service examples.

Referring now to FIG. 49, an example of the enhanced LDACS system architecture is shown generally at 650 that yields these benefits is illustrated. At the highest level, the ground station and aircraft station support the upper layers of the LTE protocol stacks and custom elements and support network mobility and A-PNT features.

The enhancements to the base LDACS waveform on the ground station side includes support for additional broadcast messaging. The standard LDACS Forward Link broadcast signaling is enhanced to include advertising of a network provider code and neighbor cell information that allows the aircraft station to verify that the network provider is provisioned to reduce the burden on the aircraft station for finding neighboring ground station signals for handover and reselection. In addition, the broadcast messages are enhanced to advertise the precise geographic coordinates of the ground station. This information can be used by an aircraft station to determine its location with high accuracy. The broadcast message additions require expansion of the LDACS Management Entity (LME) portion or the ground station architecture.

As illustrated in FIG. 49, the enhanced LDACS system architecture 650 includes the application service example 652, enhanced aircraft station (EAS) 654, the enhanced ground station (EGS) 656, the enhanced packet core (EPC) 658, and the application service example 660. The application service examples include the ATC services 652a, voice services 652b, data services 652c, and AP&T as alternate pointing and tracking services 652d. The enhanced aircraft station 654 includes an LTE UE data plain protocol stack 654a, LTE UE control plain protocol stack 654b, the enhanced aircraft station (EAS) controller 654c, and the stacked adaptation module 654d. These interact with the voice interface (VI) 654e, data link service (DLS) 654f, LDACS management entity (LME) 654g, and medium access control (MAC) 654h. The enhanced ground station 656 includes the voice interface (VI) 656a, data link service (DLS) 656b, LDACS management entity (LME) 656c, and medium access control (MAC) 656d. The EGS controller 656e is illustrated and communicates with stacked adaptation 656f. The enhanced packet core 658 includes the S-GW 658a, P-GW 658b, MME 658c, and HSS 658d. The application service example 660 includes similar services as the application service example 652 and includes the ATC services 660a, voice services 660b, data services 660c, and AP&T services 660d. A network management system 662 is illustrated in BSS 662a and OSS 662b.

Beyond this broadcast message expansion, the ground station is enhanced with dynamic resource allocation based on demand and aircraft station subscriber priority. These features exist in the LTE currently, but the contemporary LDACS standards have no allowance for this functionality. The conventional LDACS approach in the standards is to allocate a percentage of the ground station's bandwidth to each aircraft station that attaches, whether there is or is not data to transfer at that time. The enhanced ground station 656 as part of the enhanced LDACS system, on the other hand, implements dynamic resource allocation using similar schemes to those used in cellular technologies. Based on the demand, the data channel resources of the ground station are allocated to the aircraft station or any requesting aircraft station. This support for dynamic resource allocation necessitates additional enhancement of the LME.

The enhanced ground station 656 as part of the enhanced LDACS system includes a protocol stack adaption layer 656f that provides the interface and protocol conversion between the LDACS MAC 656d and the LTE core Network (enhanced Packet Core or EPC) 658. This protocol stack adaption layer 656f is a primary architectural feature that allows the LTE features and functions to map into the LDACS waveform. In order to maintain compatibility with the standard LDACS waveform, the enhanced LDACS system uses the LDACS Data Link Services (DLS) 654f, 656b as a transport for the LTE core network traffic. This maps the mobility management (MME) 658c traffic and the user application plane traffic over the standard LDACS DLS data connection with the aircraft station. The protocol stack adaption layer 656f manipulates the data traffic from the LTE enhanced packet core through the Data Link Services 656b. In effect, the LDACS Data Link Services is unaware of the LTE traffic flows.

At the enhanced aircraft station 654 operating in the enhanced LDACS system, a mirrored approach expands the standard LDACS of the aircraft station. The aircraft station enhances the base the LME reads and interprets the additional broadcast messages. On top of enhancements to the aircraft station LME, the enhanced aircraft station incorporates the LTE User Equipment (UE) protocol stack. The network provider identifiers, neighbor ground station information and ground station location information are passed to the enhanced aircraft station controller and the LTE UE protocol stack. As in the enhanced ground station 656 where the LTE core network as the enhanced packet core (EPC) protocol stack is used, the enhanced aircraft station leverages the aircraft station DLS to allow the LTE UE protocol stack to communicate using the LDACS data resources.

Figure 50:
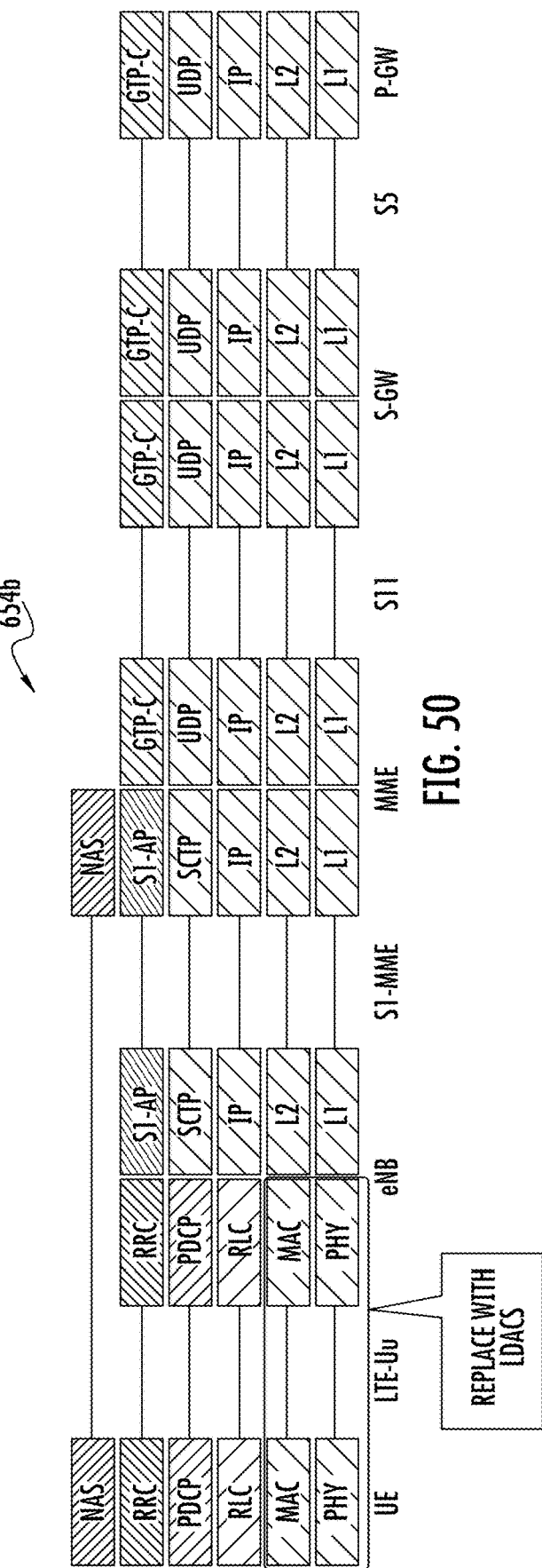
FIG. 50 shows the enhanced LDACS system control plane protocol stack with those areas that may be replaced with LDACS interfaces and components.
Figure 51:
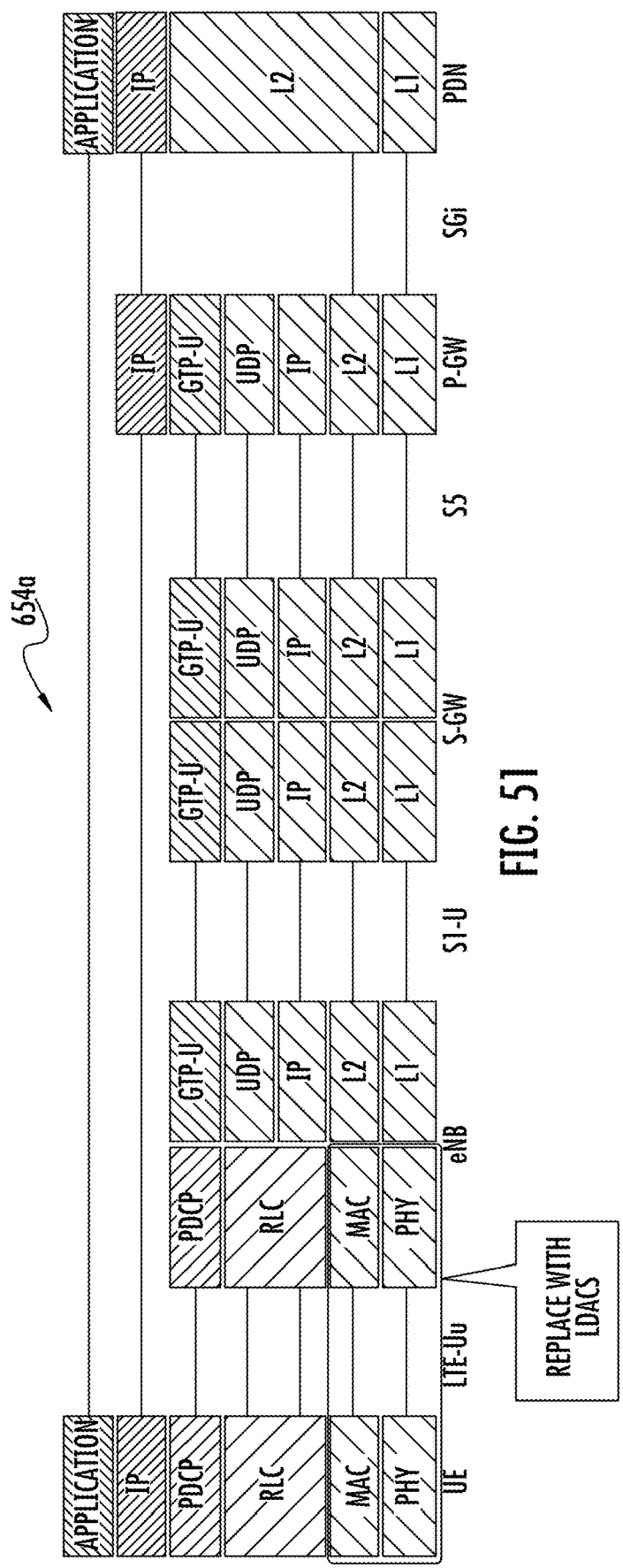
FIG. 51 shows the enhanced LDACS system data plane protocol stack with those areas that may be replaced with LDACS interfaces and components.
Figure 52:
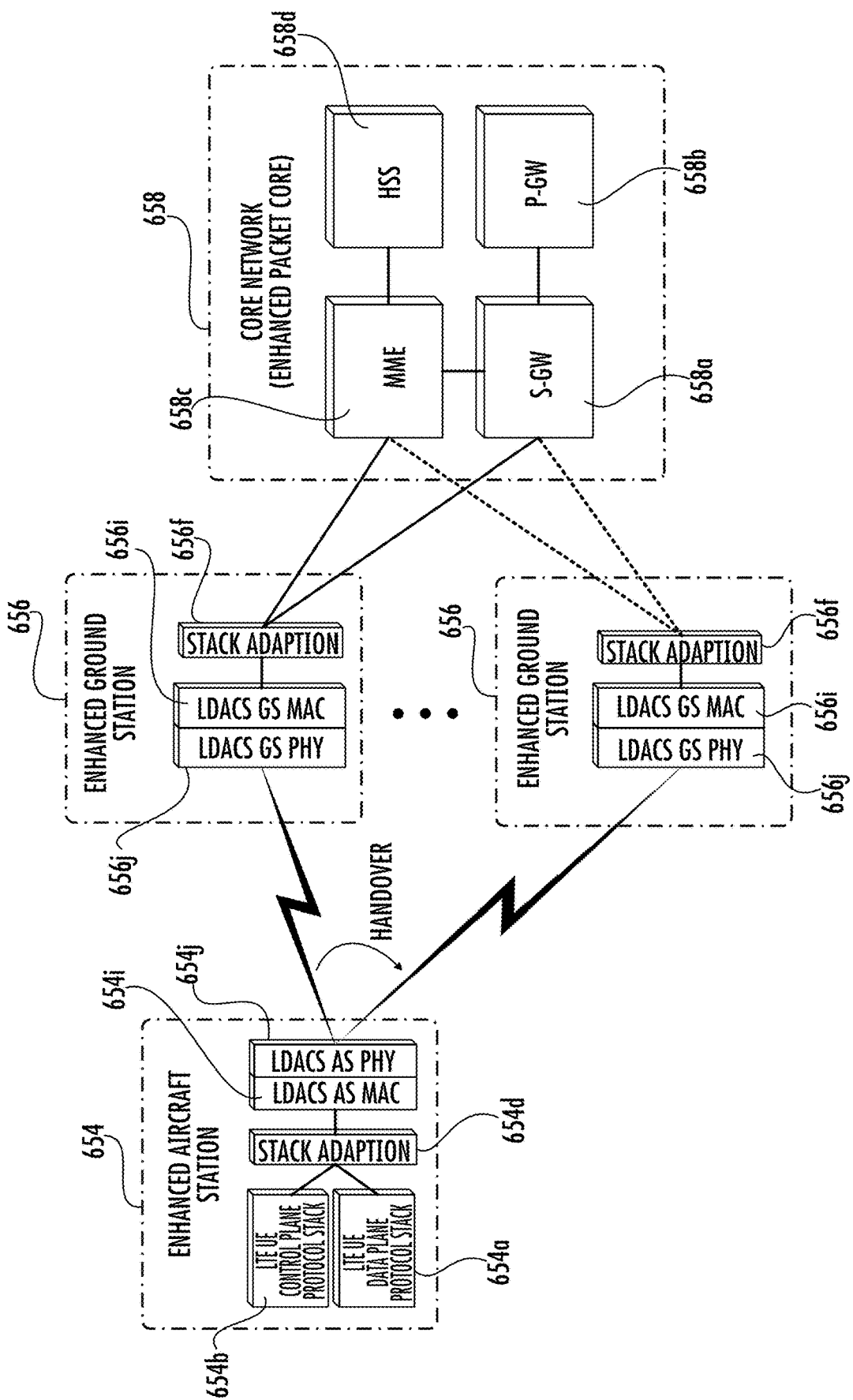
FIG. 52 is a block diagram showing the enhanced packet core and enhanced aircraft stations and ground stations used in the enhanced LDACS system.

The protocol stack communication as can be modified for the enhanced LDACS system architecture as described is shown at FIGS. 50, 51 and 52. As illustrated in FIG. 50, the enhanced LDACS control plane protocol stack is illustrated at 654b where the MAC and PHY layers are replaced with the LDACS. Similarly, the system enhanced LDACS data plane protocol stack 654a is shown at FIG. 51 and shows the MAC and PHY replaced with the LDACS. FIG. 52 shows the enhanced aircraft station 654 in communication with two enhanced ground stations 656 that communicate with the core network as the enhanced packet core 658 for allowing the handover. The enhanced aircraft station 654 includes the LDACS MAC 654i and PHY 654j layers that communicate with the stack adaptation 654d and the LTE UE control plane protocol stack 654b and LTE UE data plane protocol stack 654a. Similarly, the enhanced ground stations 656 include MAC 656i and PHY 656j and communicate via the stack adaption 656f with the enhanced packet core 658 as part of the core network that includes the MME (Mobility Management Entity) 658c, HSS (Home Subscriber Server) 658d, the S-GW (Serving Gateway) 658b, and P-GW (Packet Data Network Gateway) 658a. These modules may operate as part of system architecture evolution (SAE) for the 3G PP's LTE wireless communication standard.

Combined LDACS-LTE and UAS-Pass Off to LTE Network

The LTE protocols may be implemented on the LDACS PHY/MAC as noted before and provide security in order to prevent undesired commandeering or eavesdropping on UAS traffic. As explained in greater detail below, certain areas are more likely to have an increased UAS presence, such as larger metropolitan areas. Adding additional LDACS ground stations in these areas, along with LTE handovers, can be better suited to meet demand and capacity. There may be options for multi-provider. A delivery service, for example, may use UAS systems and may set up individual LDACS networks to handle their fleets of UAS. These UAS's, e.g., drones, may need to recognize what provider they should be attached to and what services they have on roaming providers.

The conventional commercial cellular technologies deliver excellent bandwidth to a large number of subscribers, but still have shortcomings for long range air-to ground connectivity. The modern cellular technologies have a frequency reuse factor of 1 because the same RF channel is used by several base stations simultaneously. The cellular standards employ advanced signal processing techniques to enable signal differentiation and separation of the multiple base station signals and are optimized for cellular devices that are distributed throughout the ground within the area of coverage. There is differentiation of a limited number of base station signals, which works because a cellular device on the ground can only "hear" a limited number of base stations because of RF propagation limitations due to terrain and obstacles, e.g., buildings, and the spacing of the deployed network base stations.

When a cellular device is airborne at a reasonable height above the ground, the RF propagation is not as limited by the terrain or buildings. As a cellular receiver rises in altitude, the number of base station signals it may receive increases. In many cases, the signal processing techniques currently employed cannot provide the differentiation needed to reliably connect with a base station. If the cellular device is able to connect with a base station, when the cellular device transmits to the base station, its signal propagates to many base stations and not just the local base station. Due to the reuse factor of 1, the cellular device's transmitted signal becomes interference to the surrounding base stations. If there are a significant number of cellular devices present as the control and command link for a fleet of unmanned aerial systems (UASs), the interference created by the UASs transmitting to these base stations may impact the performance of the cellular network. These drawbacks increase as the altitude of the cellular device increases. At ground level and lower altitudes, there is little to no impact to either side of the communications link.

Air-to-ground specific waveforms, however, such as LDACS, do not suffer the same limitations as the cellular technologies because they were designed to be used with much greater separation between ground stations and the aircraft station at altitudes consistent with flight. In addition, air-to-ground waveforms, like LDACS, employ a different channelization strategy and lower frequency reuse factors to mitigate interference from the airborne transmit signal. With expected UAS usage for applications such as home delivery, however, near-ground connectivity is necessary for safety of operation and UAS command and control, thus requiring near-ground level coverage for low altitude UAS.

The financial and practical challenges of deploying a network based on the LDACS waveform may be prohibitive, and for that reason, the solution lies in a hybrid approach that leverages both the commercial cellular network connectivity and a dedicated air-to-ground LDACS network. The air-to-ground network may provide connectivity when the UAS is above an altitude, for example, 300 feet above ground level. Below that altitude, the UAS may connect to a commercial cellular carrier for the final approach to a delivery address and the subsequent departure.

The UAS connects to both networks, which may be achieved via a reconfigurable radio device or using two distinct radios. In either case, due to the criticality of the command and control link for the UAS, a make-before-break handover between the upper layer air-to-ground network and the commercial cellular network is employed. This type of handover is known for allowing the channel in the source cell to be retained and used in parallel with the channel in the target cell, i.e., in this case, the commercial cellular network as the target cell. Connection to the cellular network is established before the LDACS connection is broken.

Figure 53:
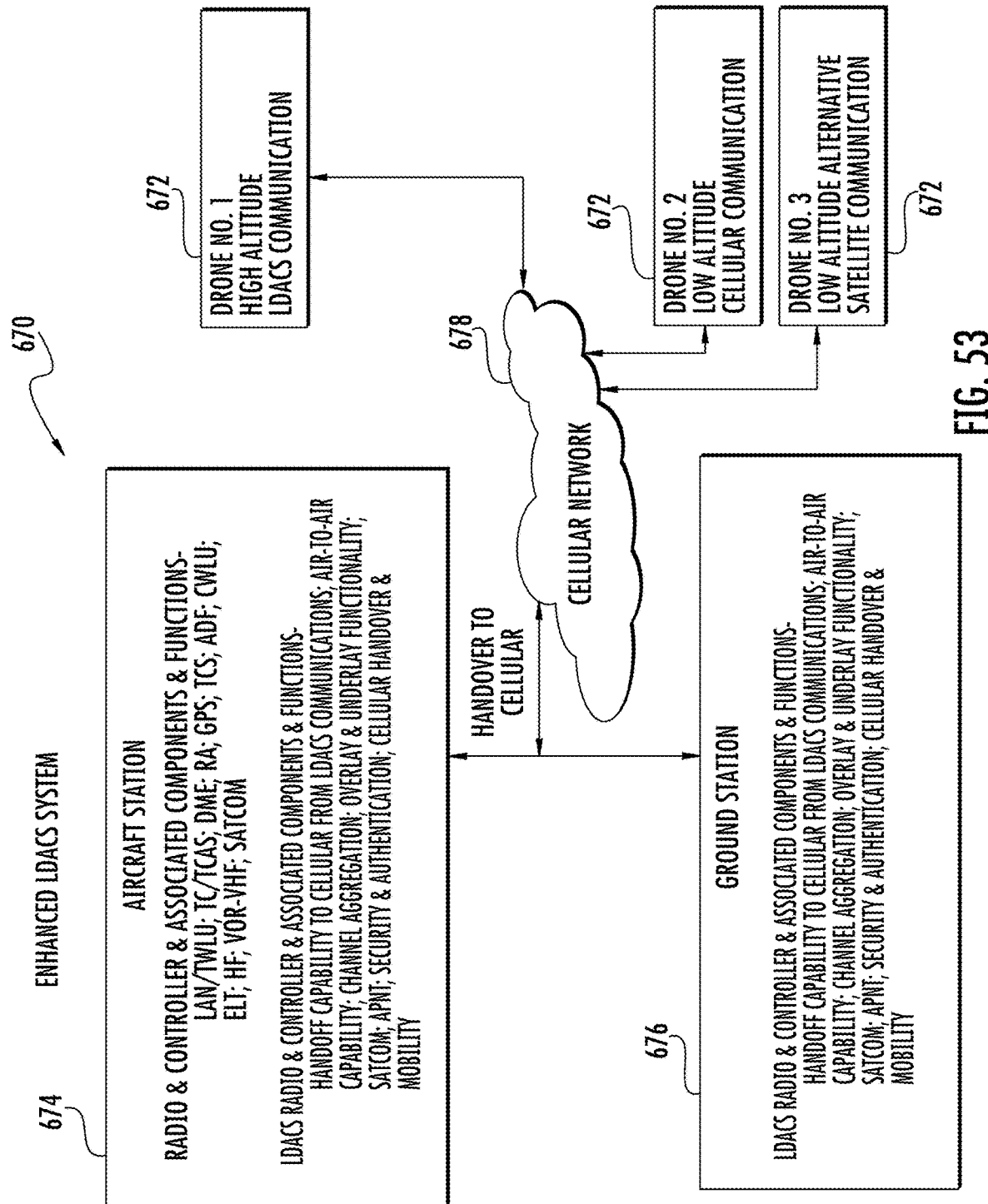
FIG. 53 is a block diagram of the enhanced LDACS system showing an unmanned aerial system (UAS) and operative with a satellite link and LDACS and commercial cellular network.

Referring now to FIG. 53, there is illustrated the enhanced LDACS system generally at 670 and a number of UAV's as drones 672, some flying at high altitudes and commanded and controlled via the enhanced LDACS system network, and a number of other drones making deliveries and operating at a lower altitude below 300 feet in this example, and operating for command and control via the cellular LTE network. It is possible for a drone 672 to establish a make-before-break handover between the enhanced LDACS system 670 and commercial cellular network 678. The aircraft station 674 communicates with the ground station 676 and may communicate with drones 672.

Some remote areas of the country have sparse cellular coverage and may have no LTE coverage at all. Even if there is coverage, it may not be ubiquitous, and for that reason, the enhanced LDACS system may include a tri-band option for an assured command and control link with LDACS/LTE/SatComm (Satellite Communications). There may still be continuous monitoring and redundant connection solution that ensures that the command and control link to the new connection before releasing the last connection. The enhanced LDACS system 670 of FIG. 53 may include a tri-band option with a satellite link and a drone with a number of different antenna and radios for this function.

Link Budget and Coverage Planning

A version of a link budget for deployment with reference to FIG. 14, for example, of the larger LDACS-u macro-cells has been described. It has been demonstrated that within limitations given within the conventional LDACS standard, nominal cell radii may easily extend up to 200 nautical miles. In the example of the macro LDACS-o cells, this coverage may be achieved. To prevent excessive intra-system interference, the power on both the aircraft station, such as a drone, and the base station should be significantly reduced. A version of link budget where both aircraft station and base station operate with 1 watt, e.g., about 30 dBm, of conductive power is presented in Table 6, showing the results of the ground-to-air (G2A) link and air-to-ground (A2G) link. With 30 dBm of conductive power, the enhanced LDACS system may achieve coverage of about 10 km with a significant fade margin.

There are several aspects of the link budget. L-band propagation losses are relatively low when compared with 2.4 GHz ISM or even PCS (Personal Communications Service) band deployments. As a result, the coverage objectives may be achieved, taking into account the higher transmit powers that may result in elevated intra-system interference. Addressing this issue solely through cell placement may be difficult due to path loss variability within an urban environment. Therefore, the enhanced LDACS system may implement a fast transmit power control mechanism with a significant dynamic range. Additionally, any selected antennas may have low selectivity, which allows for a full tri-dimensional coverage of the various LDACS cells. This may create additional complexities when it comes to intra-system interference management, and it is possible to implement some form of beam forming or MIMO.

TABLE 6

Link Budget for LDACS Overlay Cells

| Parameter | G2A Link | Parameter | A2G Link |
|---|---|---|---|
| PA Power (dBm) | 30 | PA Power (dBm) | 30 |
| Cable loss (dB) | −2 | Cable loss (dB) | −2 |
| BS Antenna gain (dB) | 3 | AS Antenna gain (dB) | 3 |
| EiRP (dBm) | 31 | EiRP (dBm) | 31 |
| Fade margin (dB) | −14 | Fade margin (dB) | −14 |
| AS antenna gain (dB) | 3 | BS antenna gain (dB) | 3 |
| Cable loss (dB) | −2 | Cable loss (dB) | −2 |
| RX Sensitivity (dBm) | −95 | RX Sensitivity (dBm) | −95 |
| Max path loss (dB) | 113 | Max path loss (dB) | 113 |
| Nominal cell radius (km) | 10.67 | Nominal cell radius (km) | 10.67 |

Inter-System Interference Condition

Referring to again and as shown in FIG. 14, there are three concurrent systems illustrated by the DME/TACAN 402, LDACS underlay 404, and LDACS overlay 406 operating within the same geographical region and sharing the same time/frequency space. Therefore, there are six interference scenarios that are managed using frequency planning. At this time, it is assumed that DME/TACAN 402 and LDACS-u 404 are planned in a manner as described above. LDACS-o 406 as microcells are planned after DME/TACAN 402 and LDACS-u 404 are already deployed. An example planning sequence is as follows:

1) DME/TACAN systems 402 are frequency planned in a manner unrestricted by deployment of LDACS.
2) LDACS-u 404 is frequency planned with a "no-interference" constraint towards DME/TACAN 402. LDACS-u 404 is deployed with a single channel per site. The LDACS-u 404 provides coverage of the CONUS and possibly an alternate positioning system.
3) LDACS-o 406 is frequency planned to cause no interference to either DME/TACAN 402 or LDACS-u 404.

The interference constraints between LDACS-u 404 and DME/TACAN 402 are explained above. The interference constraints between LDACS-o 406 and DME/TACAN 402, and between LDACS-o and LDACS-u 404 are now explained in greater detail.

Interference Constraints Between LDACS-o and DME/TACAN

Figure 54:
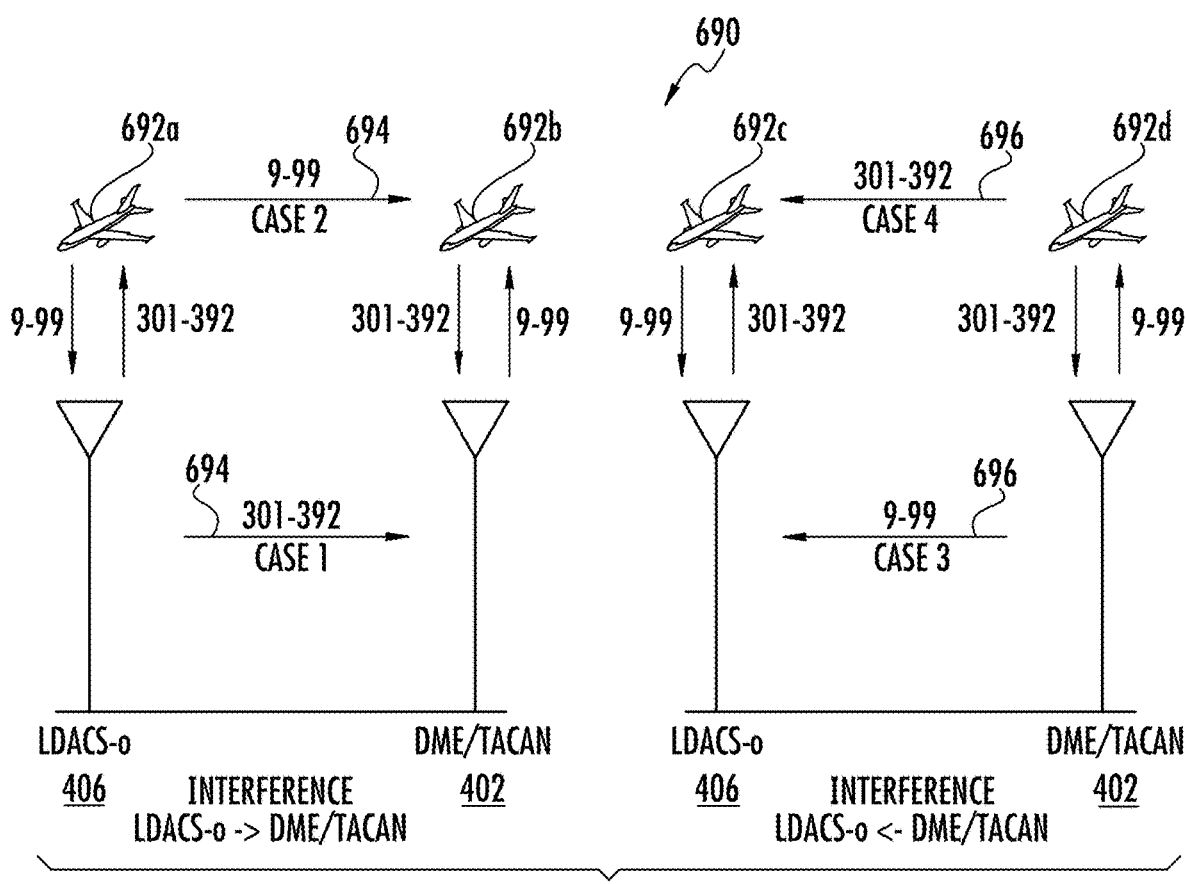
FIG. 54 is a diagram showing interference between the LDACS overlay of FIG. 14 and the DME/TACAN.

Referring now to FIG. 54, a potential interference between LDACS-o 406 and DME/TACAN 402 is illustrated generally at 690 and showing aircraft 692a-d. The two systems are deployed in a cross-duplex configuration. As a result, base station transmissions in one system may cause interference with base station reception in the other system. Likewise, the aircraft transmission in one system interferes with aircraft reception in the other system. The forward link 694 and reverse link 696 channels are illustrated. As shown in FIG. 54, there are four interference examples illustrated as cases in this example. They are described below.

Example 1

The transmissions from an LDACS-o 406 base station may cause interference to the base station reception on the DME/TACAN system 402. To prevent this interference, the LDACS-o 406 base station transmission may be separated in frequency domain from the DME/TACAN 402 reception channel. This separation is a function of the distance between the LDACS-o 406 and DME/TACAN 402 base stations. For a nominal analysis, this document adopts separation requirements as presented in Table 7. The values in Table 7 are nominal and based on preliminary specifications of LDACS's emission spectral mask as noted in the text of the Proposed Amendment to the International Standards and Recommended Practices, Annex 10, Aeronautical Telecommunications 2019 (hereinafter "Proposed Amendment"), the disclosure which is hereby incorporated by reference in its entirety. The values in Table 7 may be verified more accurately with further experimentation. Also, the separation requirements depend on radiated signal center lines of both LDACS-o 406 and DME/TACAN 402 sites, and thus, separation may be subject to site-by-site planning.

TABLE 7

Channel Separation Requirements Between LDACS-o Base Station Transmission and DME/TACAN Reception

| Distance between LDACS-o and DME/TACAN BS (km) | Frequency separation requirements (LDACS channels) |
|---|---|
| <10 | 3 |
| Between 10 and 20 | 2 |
| Between 20 and 40 | 1 |
| >40 | 0 |

Example 2

In this example also shown as Case 2 in FIG. 54, a transmission from LDACS-o 692a aircraft station may interfere with reception of the DME/TACAN aircraft 692b using that system. To prevent this interference, LDACS-o cell 406 should not be co-channeled in the air-to-ground direction with any DME/TACAN 402 ground-to-air signals within a two RHz40k distance. The RHz40k distance in an example indicates radio horizon for an aircraft at the highest cruising altitude of 40,000 feet. This distance may be estimated as:

$$RHz = RE \times \left( \frac{[(RE + hA)^2 - RE^2]^{1/2}}{RE + hA} \right)$$

Where
RHz—radio horizon of a flying aircraft at altitude hA
RE—radius of the earth (6378.14 km)
hA—altitude of the aircraft
Substituting hA=40,000 feet (i.e., 12.2 km), one obtains:
RHz40k=394 km

Example 3

In this example also referred to as Case 3 in FIG. 54, transmissions from a DME/TACAN base station 402 may interfere with reception of LDACS-o 406 base station. This interference case is very similar to Example 1. To prevent this interference, the LDACS-o 406 base station reception may be separated in frequency domain from the DME/TACAN 402 transmission channel. The separation requirements provided in Table 7 may be reused. This may not be completely justified as the transmission power of the DME/TACAN 402 is much higher than the transmission power of the LADACS-o 406 base station. Further investigation and confirmation of the numbers in Table 7 may be warranted when practical performance characteristics of the equipment become available.

Example 4

In this example also referred to as Case 4 in FIG. 54, interference may exist between DME/TACAN aircraft 692d and the reception between LDACS-o aircraft 692c. To prevent this interference, the LDACS-o cell 406 should not be co-channeled in the ground-to-air direction with any DME/TACAN air-to-ground within two RHz40k distance. This distance is calculated in the Proposed Amendment as 394 km in this example.

Interference Constraints Between LDACS-o and LDACS-u

The interference between LDACS-o 406 and LDACS-u 404 use the same channels and in the same duplex configuration. The interference between these sites is similar to intra-system frequency reuse interference, which is described above.

Figure 55:
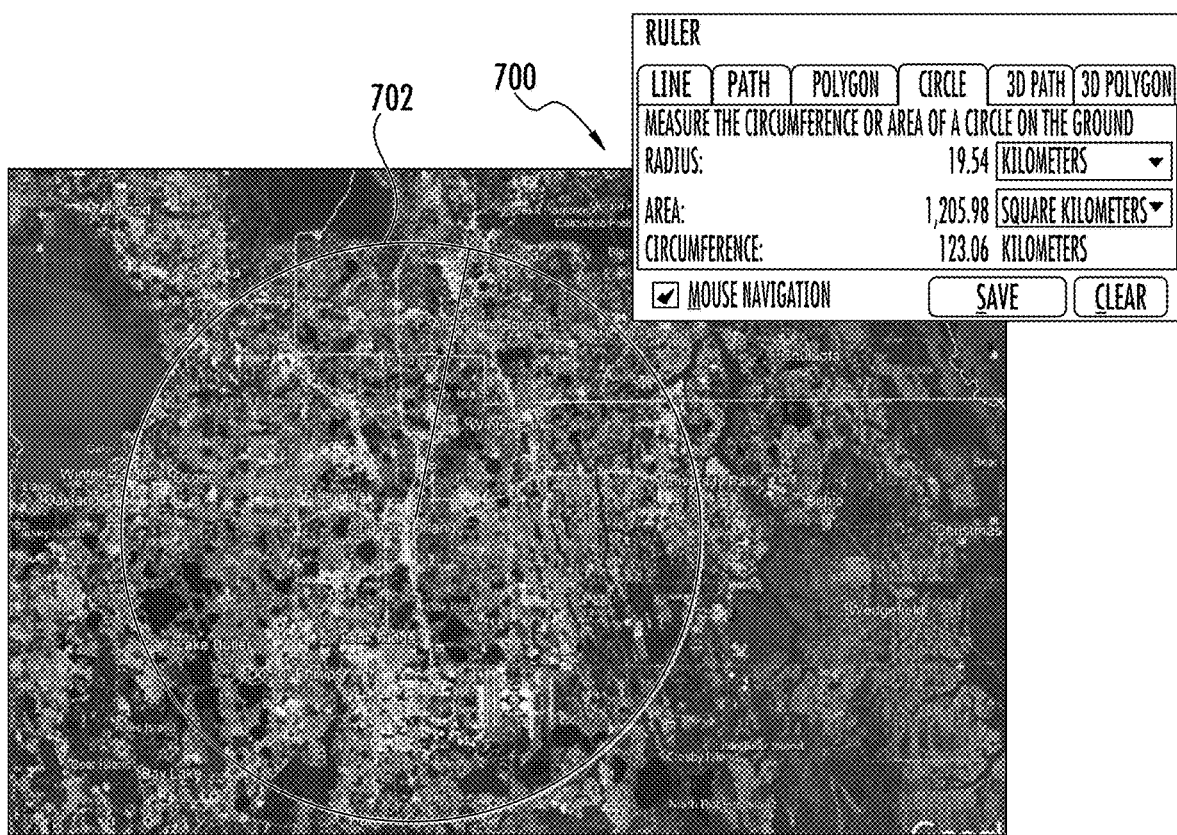
FIG. 55 is a satellite image of the greater Orlando, Fla. area selected as a case study for the enhanced LDACS system having the overlay and underlay of FIG. 14.

An example deployment of the enhanced LDACS system is shown in the aerial satellite map of FIG. 55 within the greater metropolitan area of Orlando, Fla. shown generally at 700. The intended coverage area is bounded by the circle 702 shown on the satellite map. This circle has a radius of about 20 km and it covers area of about 1250 square kilometers.

In this satellite image 700 of FIG. 55, the Center Latitude is 28.534783 deg. The Center Longitude is −81.380188 deg. The radius is about 20 km and the bound area is about 1250 km$^2$. The coverage cities include Orlando, Altamonte Springs, Winter Park, Pine Hills, Oak Ridge, Doctor Phillips, University Park, and Ocoee, all located in central Florida.

The explanation now follows with a first section that addresses coverage and a second section that addresses frequency planning.

Figure 56:
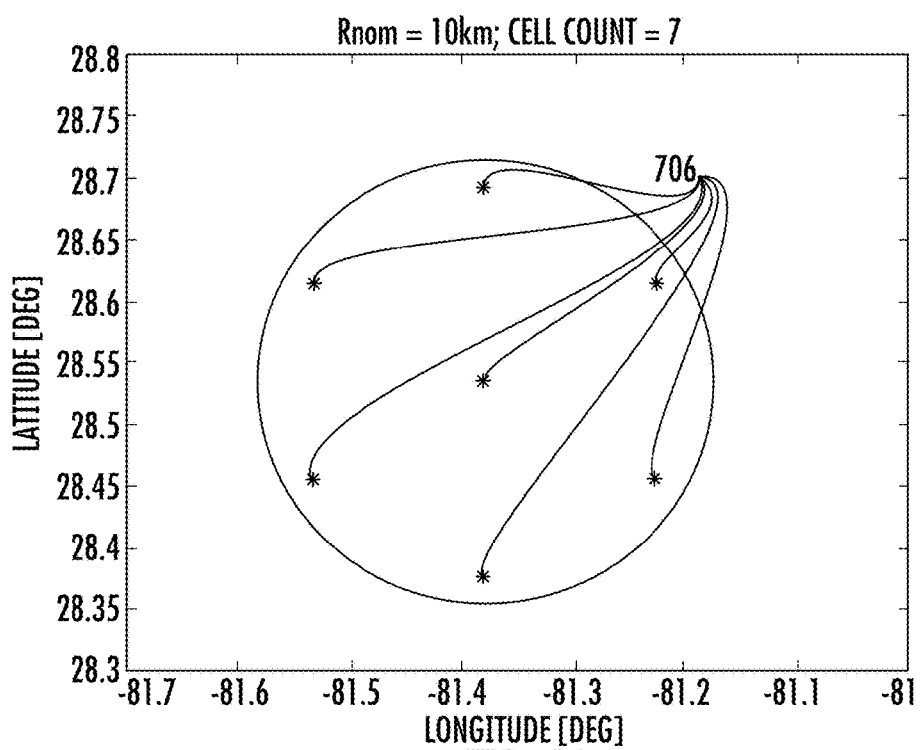
FIG. 56 is a diagram showing cell placement for the image area shown in FIG. 55.
Figure 57:
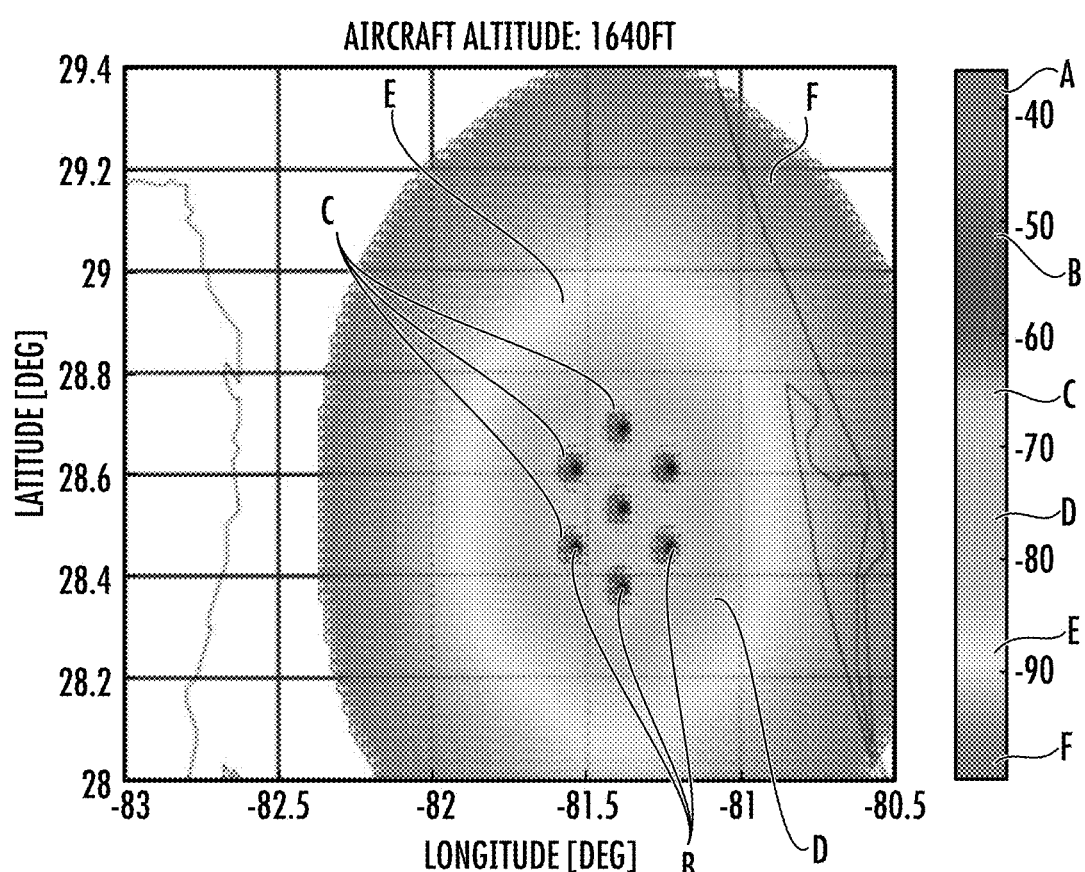
FIG. 57 is a graph of coverage prediction for the area shown in the image of FIG. 55.

The coverage design is based on the link budget shown in Table 8. The cell radii of the LDACS-o 406 cells are set to about 10 km. This gives a cell separation of about 17 km. A cell placement based on the nominal radius of 10 km is presented in the graph of FIG. 56 and there are about 7 cells in the design indicated by the 7 asterisks 706. The coverage prediction plot associated with the design shown in FIG. 56 is shown in FIG. 57 and the altitude of the aircraft is about 500 meters (1,640 feet), which is appropriate for unmanned flying systems. The coverage area is large and may extend past the major coverage area shown in FIG. 50 because of the favorable propagation conditions of the L-band. The different coverage predictions are identified on the route with alphabetic labels A-F.

TABLE 8

Link Budget Overlay for LDACS-o System
in the Orlando, Florida Area (FIG. 55)

| Parameter | G2A Link | Parameter | A2G Link |
|---|---|---|---|
| PA Power (dBm) | 30 | PA Power (dBm) | 30 |
| Cable loss (dB) | −2 | Cable loss (dB) | −2 |
| BS Antenna gain (dB) | 3 | AS Antenna gain (dB) | 3 |
| EiRP (dBm) | 31 | EiRP (dBm) | 31 |
| Fade margin (dB) | −14 | Fade margin (dB) | −14 |
| AS antenna gain (dB) | 3 | BS antenna gain (dB) | 3 |
| Cable loss (dB) | −2 | Cable loss (dB) | −2 |
| RX Sensitivity (dBm) | −95 | RX Sensitivity (dBm) | −95 |
| Max path loss (dB) | 113 | Max path loss (dB) | 113 |
| Nominal cell radius (km) | 10.67 | Nominal cell radius (km) | 10.67 |

Frequency Plan

Figure 58:
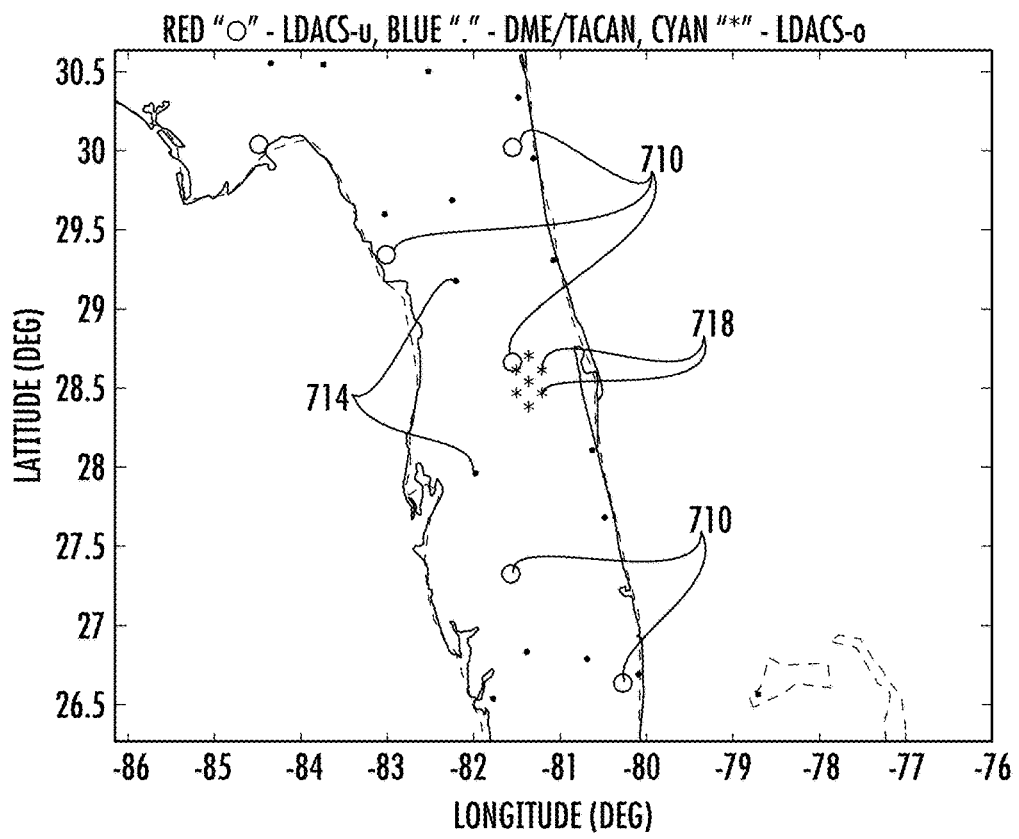
FIG. 58 is a map showing deployment of the LDACS underlay and overlay cell layout and the DME/TACAN systems throughout the state of Florida.

Deployment of the three systems is illustrated in FIG. 58. The small circles 710 represent the LDACS-u, the small dots 714 represent the DME/TACAN, and the asterisks represent the LDACS-o sites 718. There is a greater difference in density between LDACS-u 710, DME/TACAN 714 and LDACS-o 718. The density of LDACS-o 718 is much higher. Per design, LDACS-o 718 covers localized, small areas and at altitudes that are well below cruising altitudes of commercial aircraft.

Figure 59:
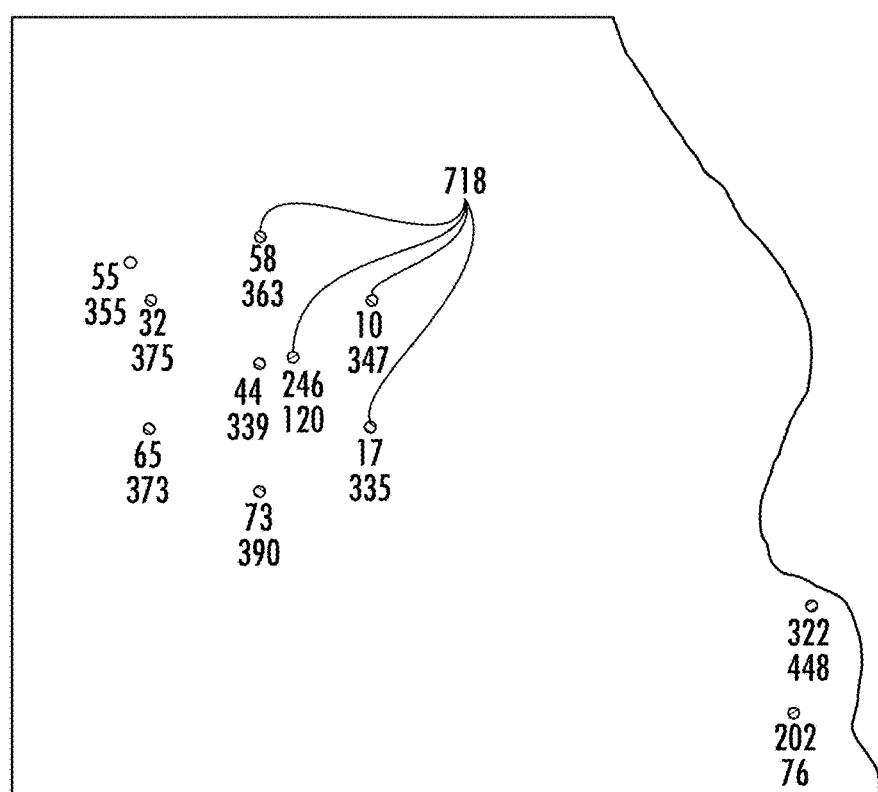
FIG. 59 is a map representing an example of frequency assignment in the LDACS underlay cell layout used in the enhanced LDACS system.

An Automatic Frequency Planning (AFP) algorithm was developed to perform the frequency assignment to LDACS-o cells 718. The result of the assignment for the Orlando overlay is shown in FIG. 59 with the different overlay cells 718 shown as dots. In this plan, the algorithm successfully found a set of non-interfering channels for the overlay system. A single channel per site is assigned. It may be demonstrated that in this case, the frequency problem is not constrained and several channels may be found for the overlay cells 718 and form an overlay system having substantial capacity. This system may be used for command, control and communication with unmanned airborne systems, i.e., drones.

The enhanced LDACS system as described may operate as a two-tier LDACS system, which includes the LDACS-u 710 and LDACS-o sites 718. The LDACS-u 710 are the underlay sites, which provide coast-to-coast coverage at aircraft cruising altitudes, i.e., above 18,000 feet, and the LDACS-o 718 are the overlay sites that operate at the lower altitudes, e.g., less than 1,500 feet in an example, and over smaller geographical areas. A typical deployment of a number of LDACS-o sites may serve a metropolitan area, such as the illustrated Orlando, Fla. area shown in the satellite image of FIG. 55, and is used for command, control and communication with unmanned aerial systems. The LDACS-u sites 710 cover the entire CONUS and the LDACS-o sites 718 provide coverage for the illustrated greater Orlando area in the example as described. Both systems meet the necessary coverage and capacity requirements.

Security in the LDACS Network

Unmanned aircraft systems, which include drones, are expanding in use and their popularity and the management of their airspace is becoming important. The enhanced LDACS system may coordinate and pre-plan routes and coordinate command and control (C2) and radio channel assignments, and prioritize flights for conflict resolution, and schedule flights in the airspace. By properly managing these parameters, both unmanned and manned aircraft may be efficiently operated in a safe manner during flight. When evaluating these parameters, it is important to identify the factors that impact them individually.

At the current time, route planning may not be critical due to the limited number of manned aircraft and unmanned aircraft in a particular area and the current requirements for visual line of sight (VLOS) control for unmanned aircraft. As aircraft operators move toward beyond line of sight (BLOS) flight, coordination with other aircraft, including manned and unmanned, will be more important to ensure that collisions do not occur. This coordination may include the use of air traffic control transponder information, collision avoidance sensors, coordinated location planning, peer-to-peer communication, and route scheduling.

The enhanced LDACS system is applicable to unmanned aircraft systems (UAS) and permits management of the airspace. It includes proper pre-planning of routes, coordination of command and control (C2), radio channel assignments, prioritization of flights for conflict resolution, and airspace scheduling. The enhanced LDACS system manages these parameters, and as a result, both the unmanned and manned aircraft are efficiently operated in a safer manner during flight.

At the current time, route planning is a lower priority matter due to the limited number of aircraft in a particular area and the current requirements for visual line of sight (VLOS) control for unmanned aircraft systems. However, as aircraft operators move toward beyond line of sight (BLOS) flight, coordination with other aircraft becomes more important to ensure that collisions do not occur. This coordination may include the use of air traffic control transponder information, collision avoidance sensors, coordinated location peer-peer communication, and route scheduling. Recently, there is a trend to use commercial cellular network connectivity for BLOS UAS command and control applications because contemporary cellular network coverage is widespread, robust and secure. More recent advancements have improved bandwidth availability, connection reliability and network latency, which are positive attributes for the UAS C2 use case.

As unmanned aircraft use continues to expand in popularity, management of the airspace will become increasingly more important. This coordination will need to include proper pre-planning of routes, coordination of command and control (C2), radio channel assignments, prioritization of flights for conflict resolution, and airspace scheduling. By properly managing these parameters, the unmanned and manned aircraft will both be more efficiently operated and safer during flight. When evaluating these parameters, it is important to identify the factors that will impact them individually.

The enhanced LDACS system may use commercial cellular network connectivity for BLOS unmanned aerial system command and control, and makes use of the advancements in bandwidth availability, connection reliability and network latency, which are positive attributes for the UAS (unmanned aerial system) command and control. The current LDACS specifications are missing security features found in modern cellular systems, such as mutual authentication and encryption. Because cyberattacks are becoming common, it is important to protect the LDACS data stream to both manned and unmanned aircraft. The security features found in the Long-Term Evolution (LTE) cellular protocol are employed in an enhanced LDACS system to prevent the exploitation of security weaknesses in the existing LDACS specifications. The three main security components to be implemented are:

1) Authentication—The process in which the aircraft station is determined to be an authorized subscriber of the ground station's network and in which a ground station is determined to be a valid server for the aircraft station. This procedure is commonly known as mutual authentication.

2) Integrity Protection—This process guards against man-in-the-middle attacks using an integrity checksum.

3) Encryption—This process encodes transmitted data to prevent unauthorized listeners from accessing the transmitted data.

Figure 60:
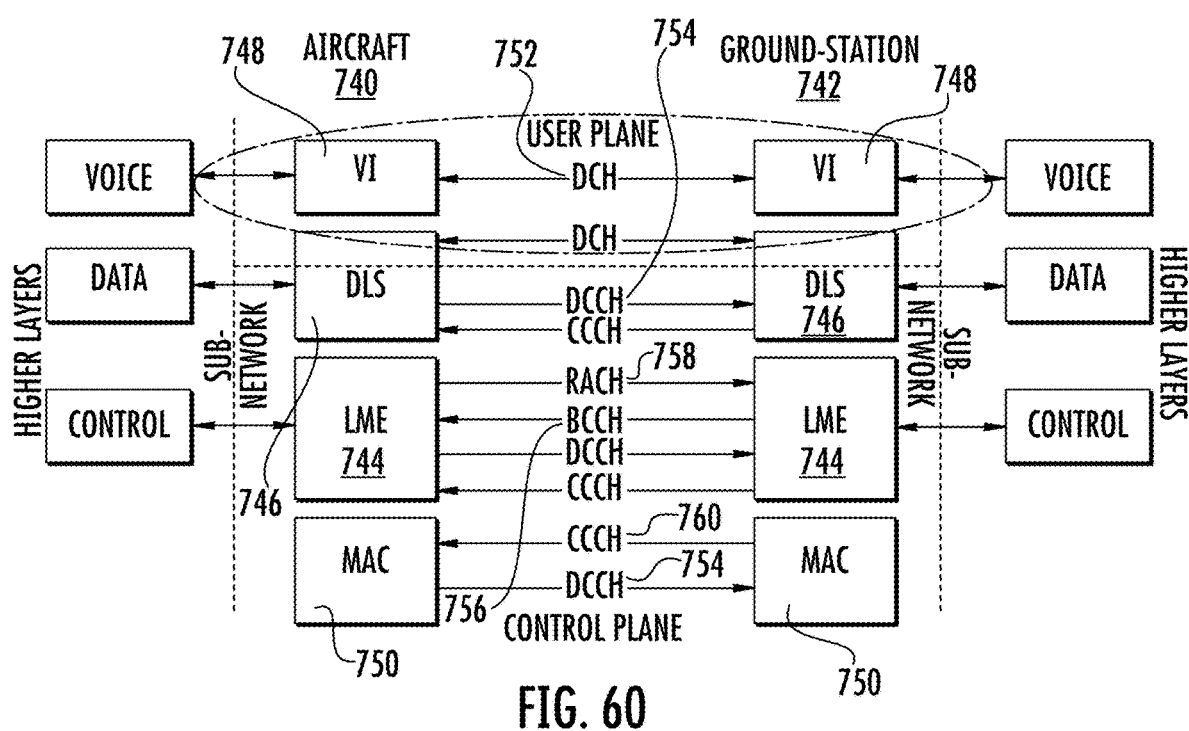
FIG. 60 is a block diagram showing the LDACS data link layer and logical channel structure in the aircraft station and ground station used in the enhanced LDACS system.

To facilitate the deployment of LTE security features, the access stratum of LDACS remains untouched. Authentication, integrity protection, and encryption may be performed at the non-access stratum layer through the LDACS Data Link Service. Referring to FIG. 60, the LDACS Data Link Layer (DLL) is shown for the logical channel structure in the aircraft station 740 and ground station 742. The higher layers for voice, data and control are shown as operative with the LDACS Management Entity (LME) 744, the Data Link Service (DLS) 746, the Voice Interface (VI) 748, and the Medium Access Control (MAC) 750. The logical data channel (DCH) 752 as part of the user plane is illustrated with the logical dedicated control channel (DCCH) 754 and broadcast control channel (BCCH) 756 and random access channel (RACH) 758. LTE services, in this case specifically the security procedures, are configured across the DCH (logical data channel) 752 through DLS-PDUS (Data Link Services-Protocol Data Units). The common control channel 760 is illustrated.

Figure 61:
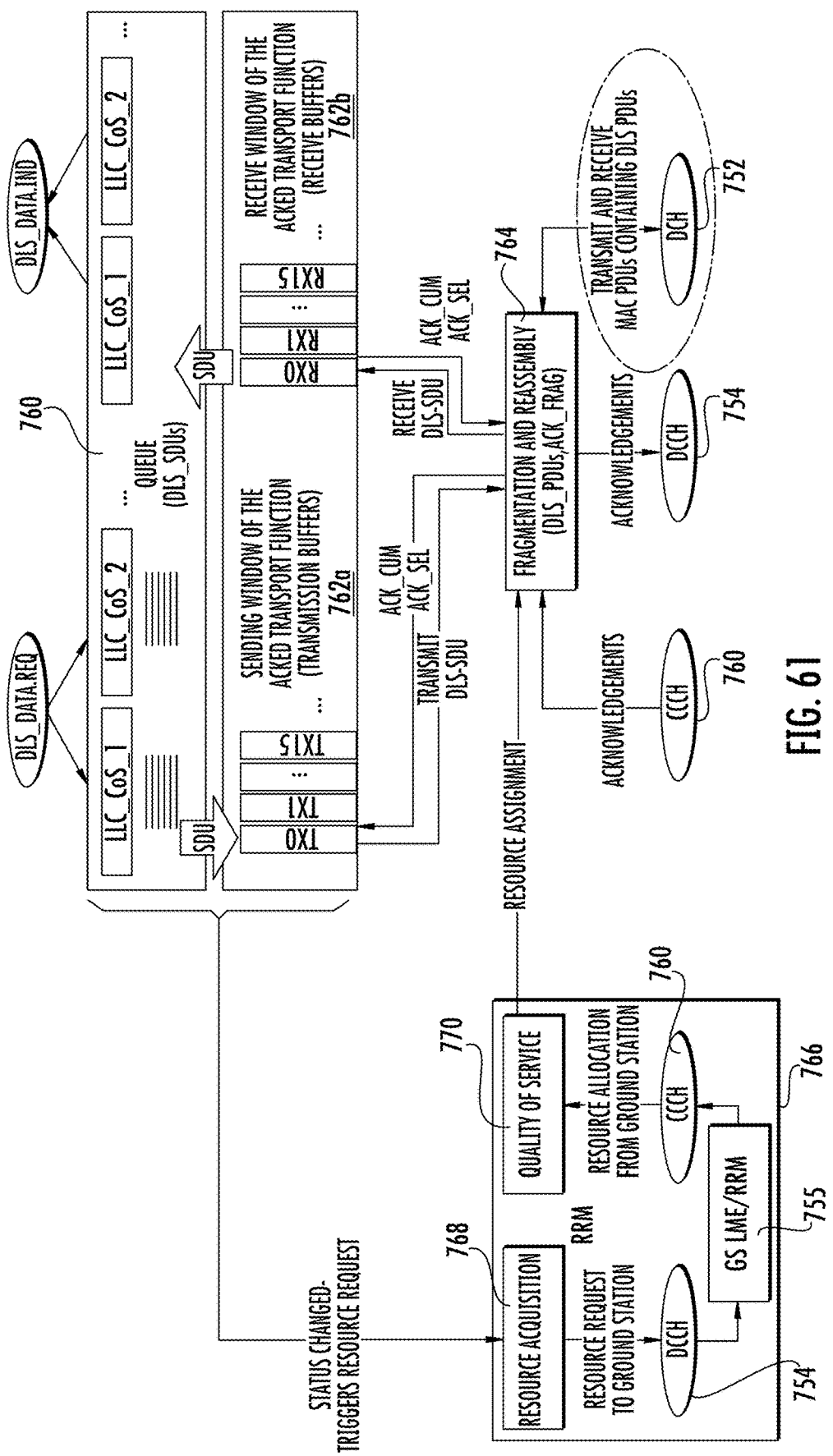
FIG. 61 is a block diagram showing an acknowledged operation of the aircraft station data link service used in the enhanced LDACS system.
Figure 62:
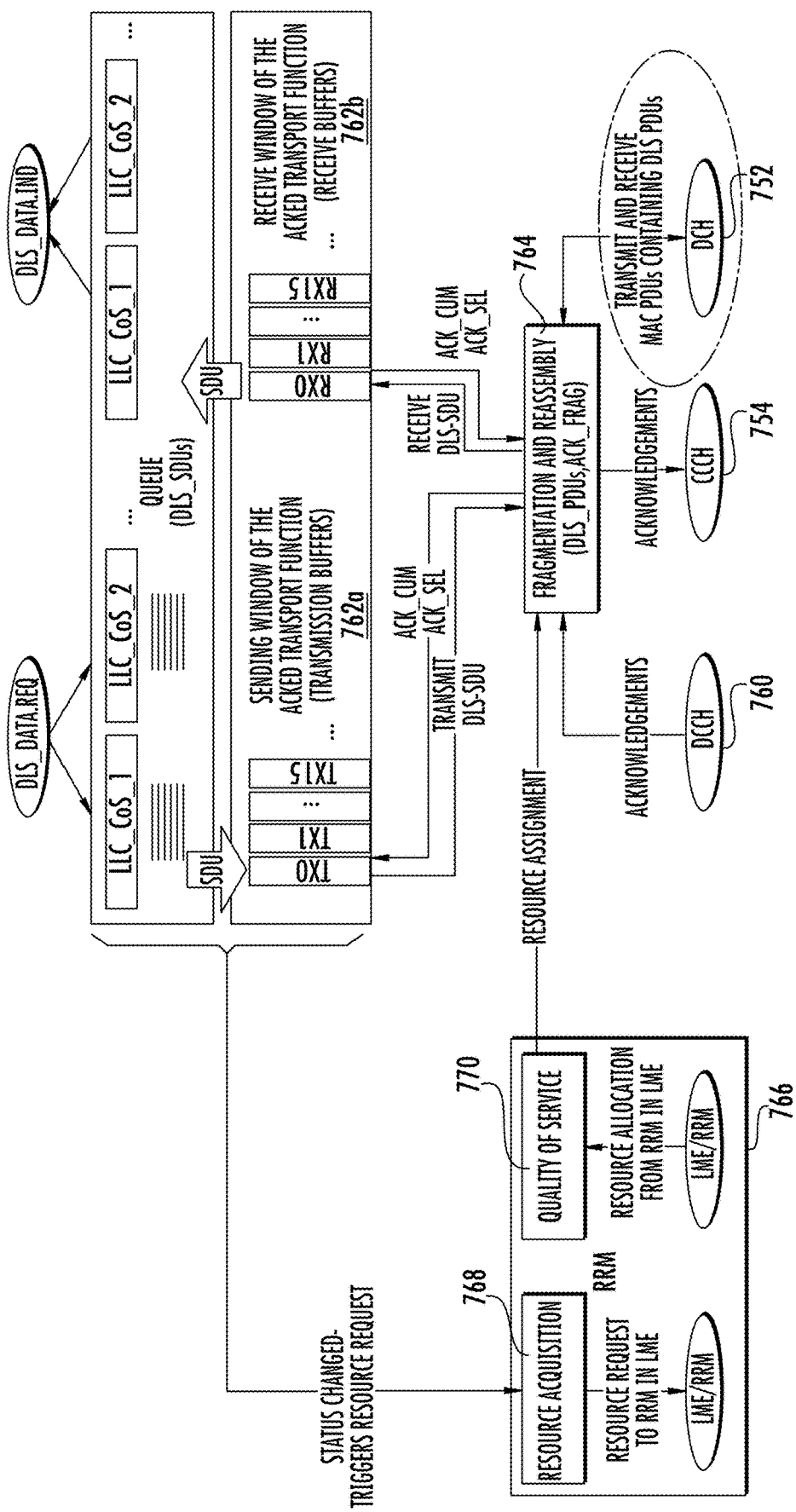
FIG. 62 is a block diagram showing an acknowledged operation of the ground station data link service used in the enhanced LDACS system.
Figure 63:
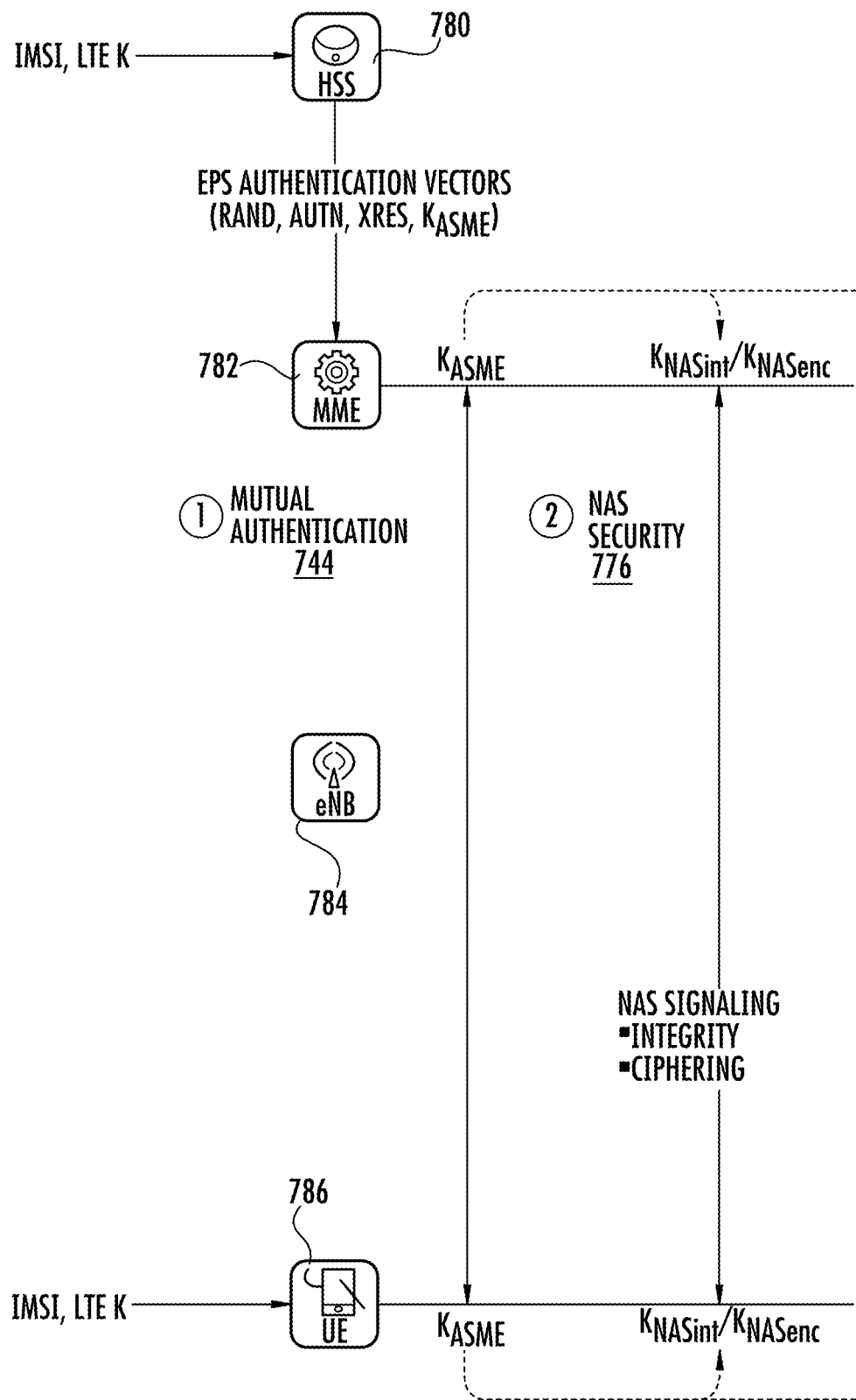
FIG. 63 is a combination block and flow diagram showing mutual authentication and NAS security that may be modified for use in the enhanced LDACS system.

The acknowledged data operation is broken down further in the diagrams of FIGS. 61, 62, and 63. The addition of LTE security in the user plane does not impact the LDACS protocol. The acknowledged operation of the aircraft station data link service is shown in FIG. 61 and illustrates the basic flow and the addition of the transmit and receive media access control (MAC) critical data units containing the data link service protocol data units that operate in conjunction with the logical data channel, and if fragmented, are reassembled. As illustrated, a queue 760 is operative with a serving window of the acked transport function 762a corresponding to the transmission buffers and the received window of the acked transport function 762b corresponding to receive buffers. Data is received and transmitted between a fragmentation and reassembly module 764 that transports data to and from on the CCCH 760, DCCH 754, and DCH 752. A radio resource manager 766 receives data regarding the status change and triggers for resource requests and includes a resource acquisition module 768 and quality of service module 770 and transmits along the DCCH 754 into the GSLME/RRM module 755 that also transmits data to the quality of service module 770 for resource allocations from the ground station along the CCCH 760.

Similarly and having the same basic components, in the acknowledged operation of the ground station data link service (FIG. 62), the media access control protocol data units contain the data link service protocol data units and are transmitted and received and operate with the logical data channel and are fragmented and reassembled. At both the aircraft station and ground station, there is resource acquisition and quality of service as part of the radio resource management (RRM) 766. The quality of service interoperates and transmits resource assignments to a fragmentation and reassembly unit and the resource acquisition of the RRM 766 receives status changed and triggers resource requests from a queue for the DLS service data units (DLS-SDU). As shown in FIG. 63, mutual authentication 774 occurs with network attached security (NAS) 776 with this example illustrating a cellular example that can be updated to the enhanced LDACS system. As illustrated in this cellular example, the HSS 780 communicates via EPS authentication vectors with the MME 782 for mutual authentication and with the eNB 784 and the UE 786. The NAS signaling includes integrity and ciphering.

Air Station Identification Module

As noted above, the ICAO standardization effort for LDACS has yielded a basic Media Access Controller (MAC) and physical-layer (PHY) definition that provides for communications fundamentals such as radio link attachment and connection establishment, but no higher-layer architecture or procedures to support more advanced communications features such as voice and data and Advanced Position and Timing (A-PNT) services. The enhanced LDACS system adds an Air Station Identification Module (ASIM) that provides advanced services, such as multiple network operator concepts, authentication, encryption and related functions.

As noted before, the enhanced LDACS system includes the LDACS ground station and aircraft station that are enhanced to support the upper layers of the LTE protocol stacks and custom elements that support the network mobility and A-PNT features. The enhanced aircraft station incorporates the LTE User Equipment (UE) protocol stack and leverages the aircraft station LDACS Data Link Services (DLS) to allow the LTE UE protocol stack to communicate using the LDACS data resources.

Figure 64:
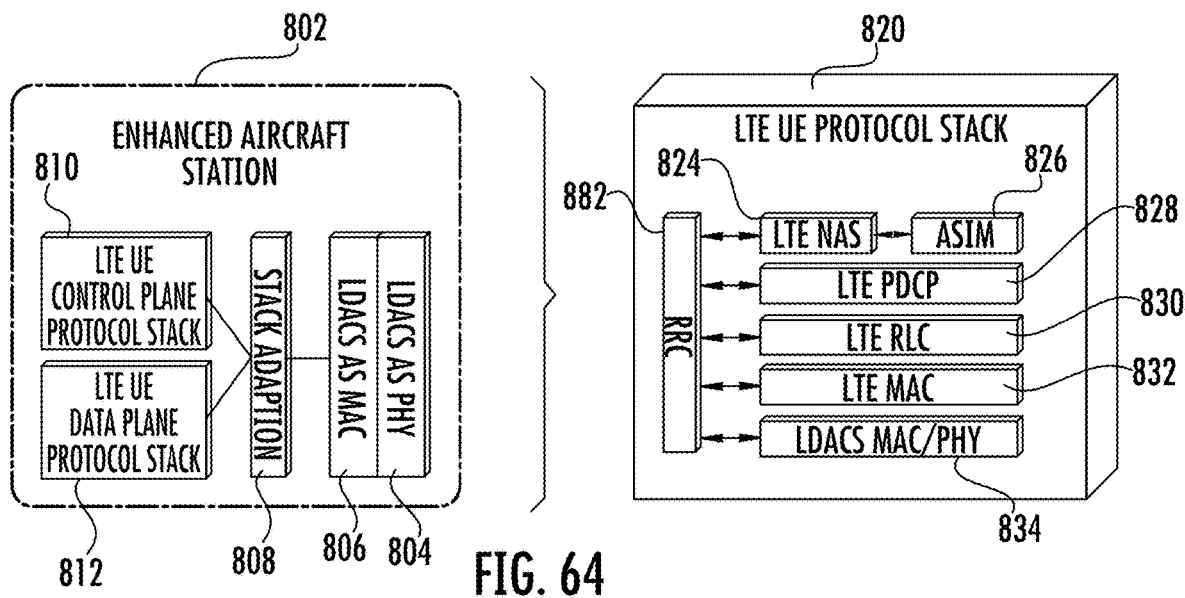
FIG. 64 is a block diagram showing the LTE user equipment (UE) protocol stack interface operative with the air station identification module (ASIM) used in the enhanced LDACS system.

To provide proper access and services in the enhanced LDACS system, the aircraft station requires a module for identification purposes, referred to as an ASIM (Air Station Identity Module), that is conceptually analogous to a 4G LTE USIM (Universal Mobile Telecommunications System Subscriber SIM) card. The ASIM does not need to meet the USIM physical package constraints, which is directed to the universal integrated circuit card (UICC). Referring now to FIG. 64, the LTE protocol stack is illustrated and the ASIM is interfaced with the LTE UE protocol stack. The USIM interface is replaced with the ASIM interface.

As illustrated, the enhanced aircraft station 802 includes the LDACS aircraft station PHY 804 and MAC 806 layers and stack adaption 808 that interfaces with the LTE UE control plane protocol stack 810 and LTE UE data plane protocol stack 812. The LTE UE protocol stack is shown generally at 820 includes the RRC (Radio Resource Control) 882 that is part of the LTE air interface control plane and allows broadcast of system information related to the non-access stratum (NAS) 824, which interfaces with the ASIM 826. The RRC 822 also interfaces with the LTE PDCP (Packet Data Convergence Protocol) 828 and allows transfer of user plane data and control plane data with header compression, ciphering and integrity protection. The RRC also interfaces with the LTE RLC 830 and the LTE MAC 832 and the LDACS MAC/PHY 834.

The ASIM 826 securely stores subscriber-related information, including network identification numbers, a Public Land Mobile Network (PLMN) list, cell location information and subscription services, implements the security functions pertaining to authentication and ciphering, for example, the private authentication keys and encryption algorithms, and is capable of receiving over-the-air updates. The ASIM 826 may use a secure messaging channel to pass requested data to the aircraft station.

This enhanced LDACS architecture is a viable command, control and communication link (C2/C3) by expanding the base LDACS waveform. To increase the security and privacy of the current LDACS protocol, the Air Station Identity Module (ASIM) stores security details, network information and other future applications as they are developed. As a result, a conventional LDACS systems may be expanded commercially to support multiple networks with varying levels of services with secure channels and equipment using the ASIM and transform a conventional LDACS system a more enhanced LDACS system.

The LTE non-access stratum (NAS) 824 layer communicates to the ASIM 826 during normal enhanced aircraft station operation. Due to the similarities between a USIM and the ASIM 826, and to reduce complexity when incorporating LTE and potentially updating to 5G and beyond protocol stacks, the Application Protocol Data Unit (APDU) messaging format may correspond to the data structures in Table 9 and Table 10. This data structure is defined and maintained in ETS ITS 102 221 Smart Cards, the UICC-Terminal Interface, and Physical and logical characteristics.

TABLE 9

Contents of Command APDU

| Code | Length | Description | Grouping |
|------|--------|-------------|----------|
| CLA | 1 | Class of Instruction | Header |
| INS | 1 | Instruction Code | |

TABLE 9-continued

Contents of Command APDU

| Code | Length | Description | Grouping |
|------|--------|-------------|----------|
| P1 | 1 | Instruction Parameter 1 | |
| P2 | 1 | Instruction Parameter 2 | |
| Lc | 0 or 1 | Number of bytes in the command data field | Body |
| Data | Lc | Command data string | |
| Le | 0 or 1 | Maximum number of data bytes expected in response of the command | |

TABLE 10

Contents of Response APDU

| Code | Length | Description |
|------|--------|-------------|
| Data | Lr | Response data string |
| SW1 | 1 | Status byte 1 |
| SW2 | 1 | Status byte 2 |

Figure 65:
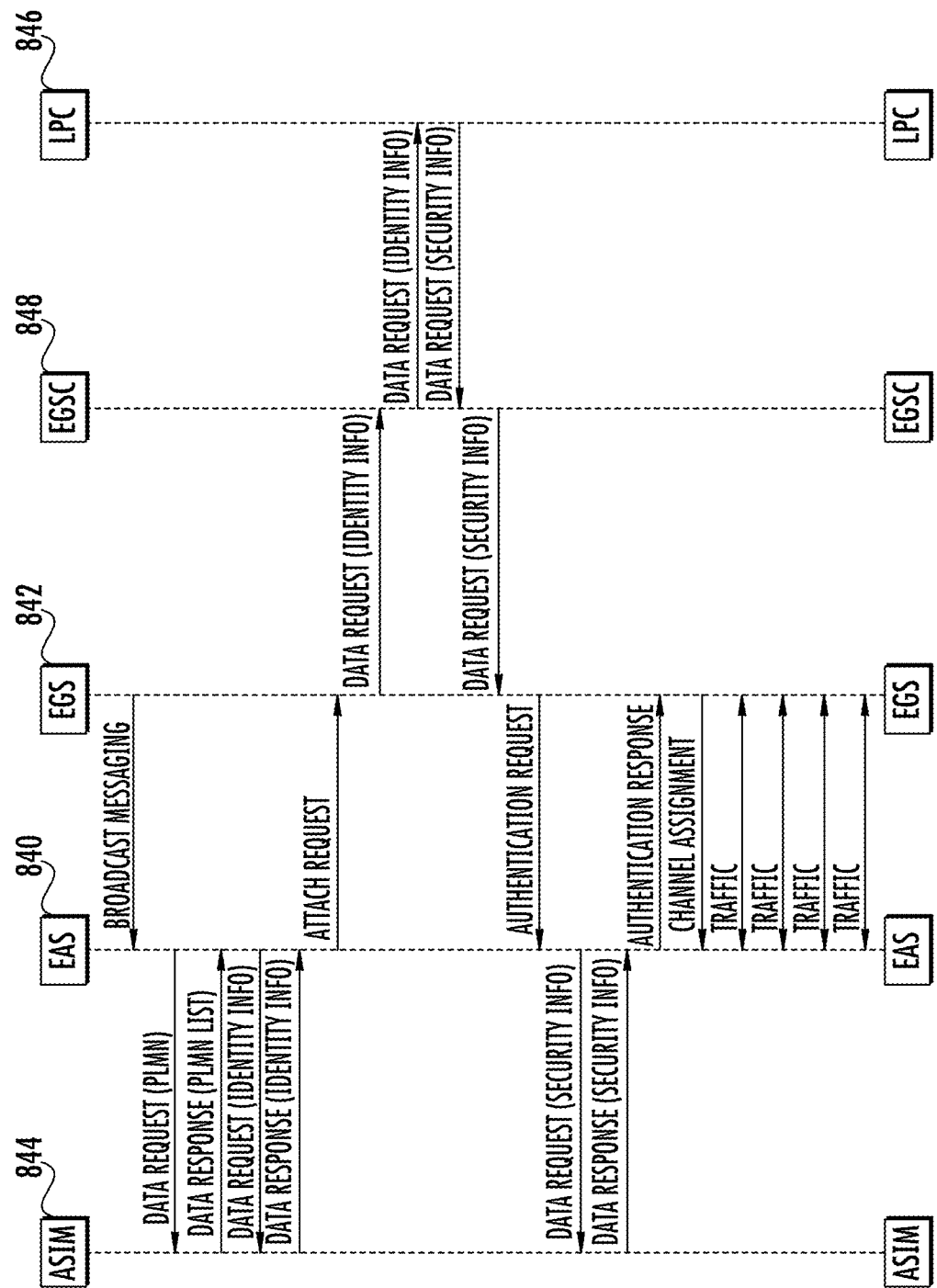
FIG. 65 is a messaging flow diagram using the ASIM.

An example of this messaging flow and sequence is shown in FIG. 65, indicating a connection request by the enhanced aircraft station (EAS) 840 to the enhanced ground station (EGS) 842. During the cell synchronization process the enhanced aircraft station 840 will query the ASIM 844 to determine which PLMN should be given priority for attachment. Once a suitable enhanced aircraft station has been found the enhanced aircraft station 840 will request to attach triggering an authentication procedure. The procedure requires data from both the ASIM 844 and the LPC 846 to verify both devices. If this handshake is verified, the enhanced aircraft station 840 will assign the enhanced aircraft station resources for data traffic.

Peer-to-Peer Communications

In accordance with a non-limiting example of the enhanced LDACS system, peer-to-peer communications capability is added between aircraft stations, in effect forming a mesh communications network in the sky. Because interactions between aircraft are becoming more complicated as technology improvements enhance speed and flight density within the same air space, the ability to seamlessly and directly communicate between aircraft is more important. The peer-to-peer communications may: (1) relay information; (2) provide A-PNT services to ground infrastructure for out-of-range aircraft; (3) have communications between "off network" aircraft operating in a common area; (4) provide warning and instruction from emergency air-traffic moving in the area; or (5) extend communications for other reasons.

It is possible for different communication networks to restrict the data stream between different classes of authorized aircraft stations. For manned aircraft, a direct connection without the applicable service level may result in limited information that is available for distribution to the requesting aircraft e.g., critical parameters, including positioning data and emergency services. At a higher service level, shared data and data volume may be negotiated by the cooperating aircraft.

The ground station may operate as a gateway for connected aircraft stations to access services via a terrestrial network. In an example, a ground station for the enhanced LDACS system includes a protocol stack adaption that provides the interface and protocol conversion between the enhanced LDACS system MAC and the LTE core network as an Enhanced Packet Core or EPC.

The aircraft station provides access to the services available through data connection with the ground station, and the aircraft station is expanded with an LTE User Equipment (UE) protocol stack to create an enhanced aircraft station. Additionally, the aircraft station protocol stack includes a peer-to-peer protocol stack from Wi-Fi Direct and LTE Direct implementations as it becomes defined, and the 5G Direct implementation as will be explained in greater detail below.

The current LDACS specification utilizes 964-1010 MHz for the air-to-ground link and 1110-1156 MHz for the ground-to-air link. Peer-to-peer deployment may be located anywhere in the L band, however, the enhanced LDACS system may initially use the bandwidth between the forward link (FL) and the reverse link (RL) for peer-to-peer communications or 46 MHz between 1037-1083 MHz. The enhanced LDACS system peer-to-peer protocol may retain the same channel characteristics of a regular LDACS system, i.e., a bandwidth of 500 kHz, allowing for 92 peer-to-peer channels. A time division duplex (TDD) system may be used on a separate enhanced LDACS system radio device to support these frequencies.

Figure 66:
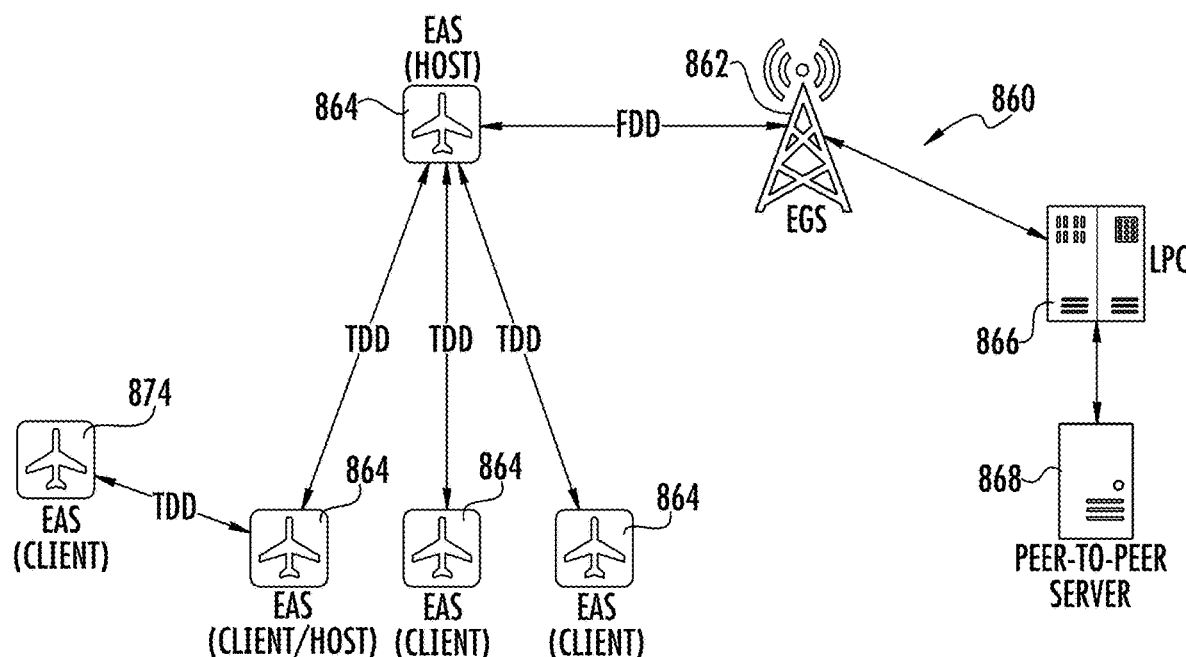
FIG. 66 is a schematic representation of the enhanced LDACS system having peer-to-peer communications and a mesh capability.

Referring now to FIG. 66, there is illustrated a system diagram generally at 860 of peer-to-peer communications in the enhanced LDACS system in which routing is made possible by an application receiving link metrics from the enhanced LDACS system peer-to-peer entities as enhanced aircraft stations (EAS). The enhanced ground station (EGS) 862 is in communication with the enhanced air station (EAS) 864 as a host. The EGS 862 also communicates with the LPC 866, which in turn, communicates with the peer-to-peer server 868 that also operates and stores software for the LDACS peer-to-peer protocol. The EAS host 864 communicates with other enhanced aircraft stations 870 that operate as clients for the host 864. The EAS host 864 also communicates with a second EAS 872 and also operates as a client and host to communicate with another EAS 874 as a client. A mesh network may be formed in an example.

While in operation, higher layer applications may operate on the aircraft via direct LDACS peer-to-peer services to monitor for needed services and at the same time broadcast their own available services. Services could include, but are not limited to, ground station connection, A-PNT, ATC, voice services and similar services. The enhanced LDACS system peer-to-peer aircraft stations wake up during specific periods, either to broadcast or to listen to services. As the aircraft station 864 enters into proximity to another aircraft station 872, each peer-to-peer service may evaluate the services available from the other aircraft station and if a service is in need, then the aircraft station may attempt to negotiate a direct link. After securing a direct link through a handshake procedure, required service information may be transmitted to and from the requesting aircraft station 872. Security and authentication procedures may be based on certificates, pre-shared keys, private keys, or through a different mechanism and may be used to verify an aircraft station to another aircraft station. An aircraft station 864 may operate as a host in communication with a ground station 862, which in turn, communicates with the LPC 866 and peer-to-peer server 868. The host aircraft station 864 may communicate with an aircraft station as a client host 872 or client 870.

Figure 67:
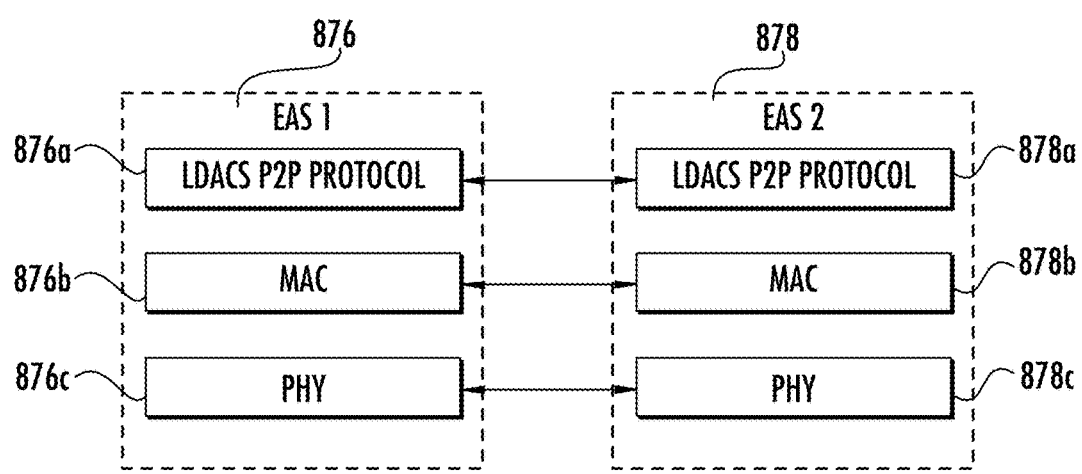
FIG. 67 is a block diagram of the discovery plane for the aircraft station to aircraft station interfacing in the peer-to-peer communications shown in FIG. 66.

The mesh network and peer-to-peer communications of the enhanced LDACS system allow each aircraft station as a node to operate as both a client and server. Connections can be made without requiring a ground station connection. The mesh network can be used to secure ADS-B data and pass data across oceanic LDACS ground station groups. The mesh network of multiple aircraft stations 864, 870, 872, 874 may extend the coverage of an enhanced ground station as shown in FIG. 66. For example, a first aircraft station 864 may connect to a ground station 862 and broadcast that service connection to a second aircraft station 872. When the second aircraft station 872 comes into proximity with the first aircraft station 864, it may negotiate a connection, and once it has been secured, the second aircraft station may broadcast that it has a ground station connection. A third aircraft station 874 in need of a ground station link, after coming into proximity with the second aircraft station 872 may negotiate a connection with the ground station and service the third aircraft station through the second aircraft station's connection with the first aircraft station 864. The resulting mesh network may provide services in areas where it is not feasible to have ground station coverage, such as across a large body of water. The potential discovery plan for the aircraft station to aircraft station interface is shown in FIG. 67, and showing EAS1 and EAS2 indicated generally at 876 and 878, each having an LDACS peer-to-peer protocol layer 876a, 878a and a MAC 876b, 878b, and PHY layer 876c, 878c.

The routing network application required to achieve this communications mesh will sit above the LDACS and peer-to-peer protocol and use a routing protocol to direct traffic. Potential open source protocols include, but are not limited to: (1) RFC 6126: The Babel Routing Protocol; (2) RFC 3626: Optimized Link State Routing Protocol (OLSR); (3) OSLRD2 implementing (RFC 7181: The Optimized Link State Routing Protocol Version 2; and (4) RFC 6130: Mobile Ad Hoc Network (MANET) Neighborhood Discovery Protocol (NHDP), and batman-adv. Closed source licensed routing protocols may take advantage of the enhanced LDACS system peer-to-peer capability. The enhanced LDACS system peer-to-peer protocol may collect metrics at the LDACS MAC/PHY layer for the routing application to aid in making routing decisions.

Figure 68:
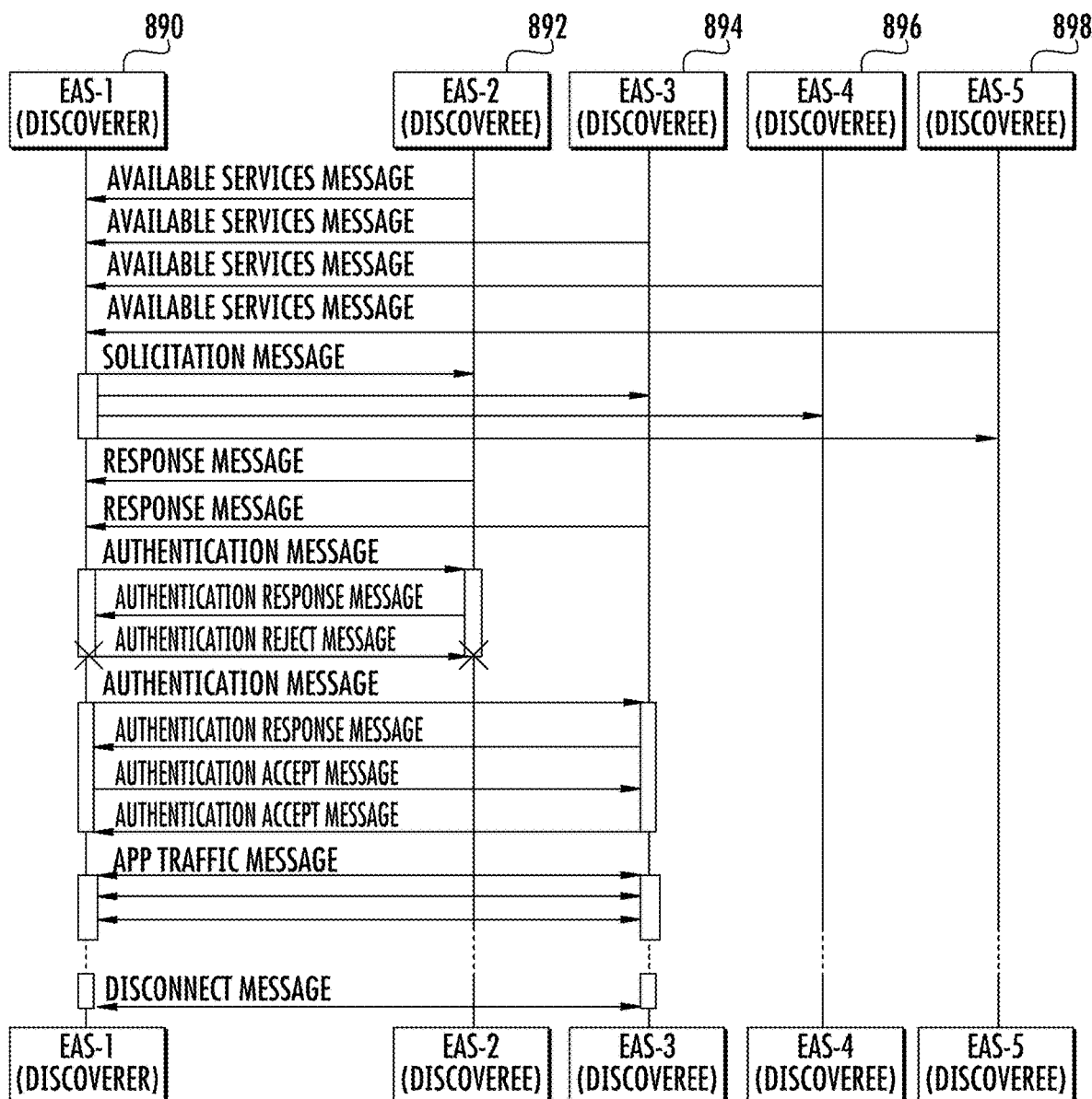
FIG. 68 is an example peer-to-peer messaging flow for the enhanced LDACS system.

An example discovery mode messaging flow for the enhanced LDACS system and its peer-to-peer communication is shown in FIG. 68, and showing a first enhanced aircraft station (EAS-1) 890 as a discover station and the messaging flow among the EAS-1 890 and four other EAS discovery stations numbered 892, 894, 896, 898. In operation, the aircraft station peer-to-peer radio may broadcast the services that it is capable of and the services that it currently may provide during appropriate resource blocks. The services may vary based on equipment capability and network conditions, such as the ability to contact a single ground station or multiple ground stations. In an example, the aircraft stations that come within range may attempt to negotiate with each other to create a peer-to-peer session. During this negotiation, each aircraft station may authenticate the other aircraft station and if successful, allow for a traffic session. The host aircraft station 864 such as shown in FIG. 66 may either directly or indirectly communicate with a ground station through a direct frequency division duplex (FDD) standard LDACS link or through a previously established communications mesh to create a daisy chain out to another aircraft station without a link to the ground station. At the end of the session, the aircraft station may disconnect from the peer, typically when in range of a ground station or when the connected aircraft stations move outside of range from each other.

The system architecture as described for peer-to-peer communications allows the enhanced LDACS system to be a viable command, control and communication air-to-ground link with support for peer-to-peer services by expanding the base LDACS waveform. This peer-to-peer protocol may build upon the strengths of the LDACS Standards, the 3GPP LTE protocols, and the WiFi Direct protocols to bring an enhanced protocol.

The enhanced LDACS system having peer-to-peer communications may be applicable over those areas having few or no DME stations, e.g., over the ocean. It is possible to increase the bandwidth in the peer-to-peer communications using the bands associated with DME. For example, the duty cycle of DME signals is about 1-2%, and it is possible to use part of the DME band to enhance the peer-to-peer communications and take advantage of the low duty cycle.

As noted above, the peer-to-peer protocol stack may draw from WiFi direct and LTE direct implementations and as it becomes defined, the 5G direct implementation. The WiFi peer-to-peer technical specification may be similar to the discovery process of normal WiFi performed via a probe request and response, and include group owner negotiation and a three-step handshake to determine which device will be working on an access point, such as an aircraft station. The group owner may switch to a chip set having an access point mode and the peer-to-peer device, such as the aircraft station, and may perform and attach with a peer-to-peer group owner device, which may include IP allocation.

The LTE direct implementation may include the 3G PPTS 23.303 proximity-based services, stage 2, and 3G PPTS 24.334, proximity-services user equipment. The pro se function may send different parameters to the user equipment, including security parameters, group IDs, group IP multicast addresses, and radio resource parameters for usage in out-of-coverage scenarios. There may be direct discovery and pro se direct discovery.

There are benefits of LTE direct over the WiFi direct because LTE may operate over 500 meters and WiFi is more limited. The 5G direct may be a fully integrated device-to-device. It may also be possible to implement WiFi direct features and deploy the device-to-device modeling on top of the LTE cellular infrastructure without requiring any fundamental changes in LTE protocols by modifying the LDACS system and use the WiFi direct in LTE device-to-device modeling as shown in FIG. 69 and described in the article from Asadi et al. entitled, "WiFi Direct and LTE D2D in Action" (2013), the disclosure which is hereby incorporated by reference in its entirety.

Figure 69:
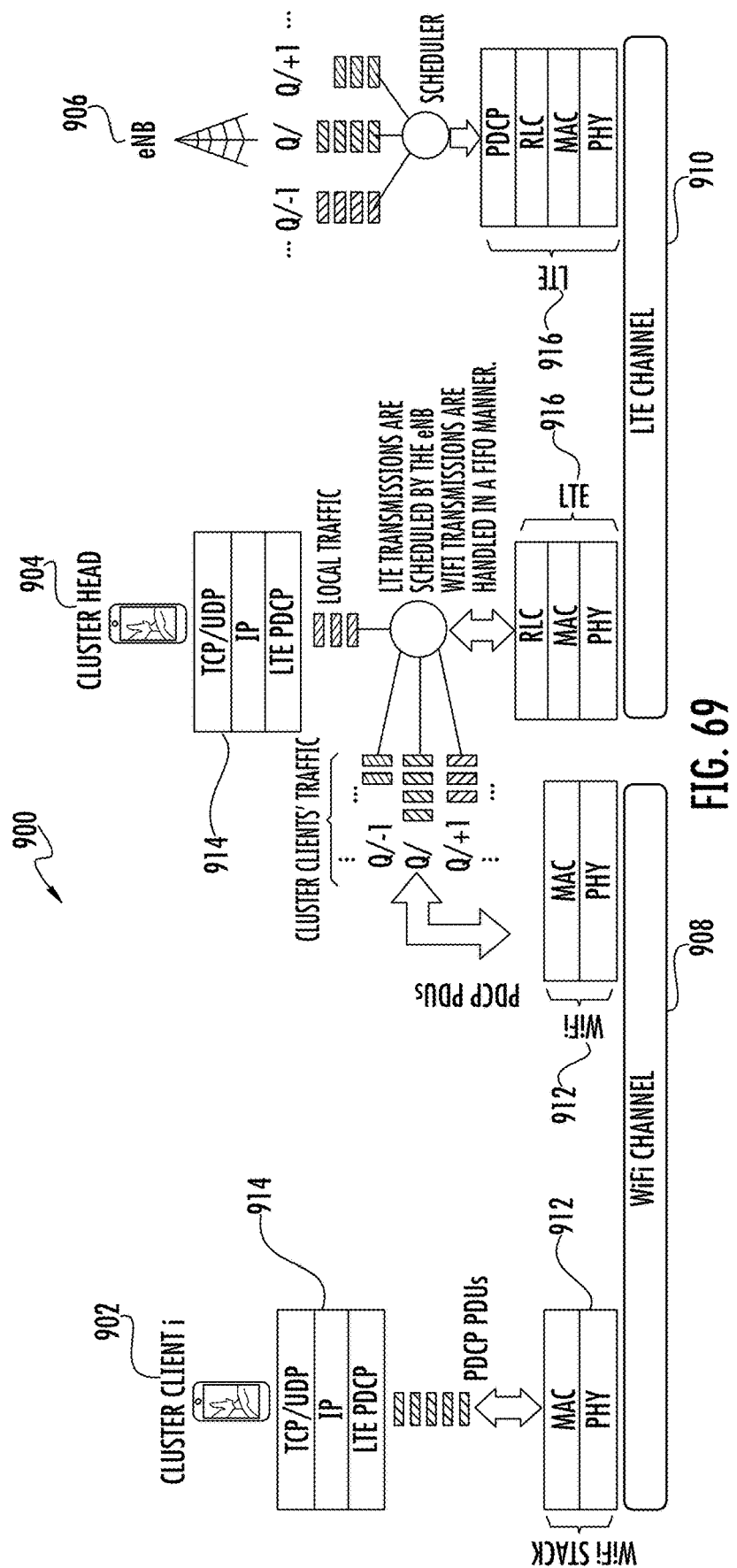
FIG. 69 is a block diagram showing device-to-device communications for WiFi channel and LTE channel interface that may be incorporated into the enhanced LDACS system.

As illustrated with the protocol diagram 900 of FIG. 69, a cluster client 902 communicates with a cluster head 904, which in turn, communicates with the eNB 906 of the base station. The cluster client 902 shares a WiFi channel 908 with the cluster head 904, which in turn, shares the LTE channel 910 with the base station 906. The cluster client 902 includes a lower level WiFi stack that includes the MAC and PHY layers. The cluster head 904 also includes the WiFi stack 912. The cluster client 902 and cluster head 904 also include an upper layer stack 914 that includes the TCP/UDP, IP and LTE PDCP layers. The cluster head 904 and base station 906 include the lower LTE layer 916 that includes the RLC, MAC and PHY, while the base station also includes in the lower layer the PDCP. The base station 906 has a scheduler and the cluster head includes local traffic and PDCP protocol data units that are part of the cluster client traffic. LTE transmissions are scheduled by the base station 906 and WiFi transmissions are handled in a FIFO manner.

ADS-B Over the Enhanced LDACS System

Figure 70:
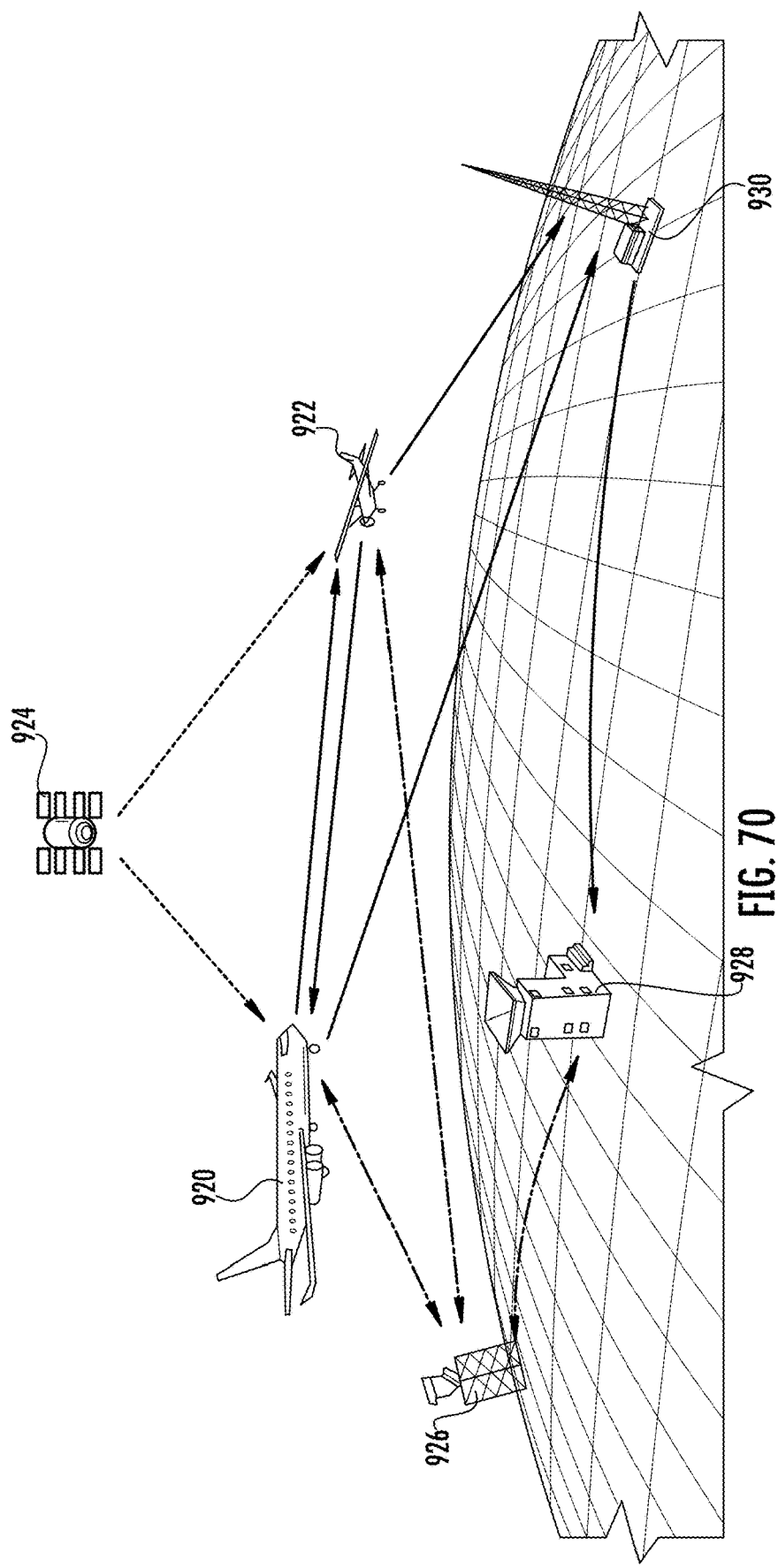
FIG. 70 is a schematic diagram of the enhanced LDACS system and showing an aircraft station that may be used with a satellite communication system associated with the enhanced LDACS system.

As noted before, the Automatic Dependent Surveillance-Broadcast (ADS-B) is a surveillance technology in which an aircraft determines its position and periodically broadcasts it, enabling the aircraft to be tracked. No interrogation signal is required from the ground because it is "automatic" and does not require pilot input. Mandatory "Out" signals include information that is transmitted about altitude, airspeed and location, and the optional In signals include traffic and weather information that is received from ADS-B ground stations and nearby aircraft. The ADS-B information may be received by air traffic control (ATC) ground stations as a replacement for secondary surveillance radar because no interrogation signal is required. The signals can also be received by other aircraft to provide situational awareness and allow self-separation such as shown in FIG. 70, showing an aircraft 920 communicating with aircraft 922 and with satellite 924 and base stations 926, 928, 930.

Other automatic dependent surveillance groups include ADS-R (rebroadcast), ADS-S(secure), ADS-C(contract), and ADS-A (addressed). The acronym ADS-B refers to the "A" as automatic and without pilot intervention; the "D" as dependent information that is derived by aircraft from GPS; the "S" as surveillance to provide 3D aircraft position velocity and related data; and "B" as broadcast information sent in a broadcast mode.

The ADS-B content varies and may include an ICAO address where the sender has a unique ICAO address assigned to each mode-S transponder of an aircraft that becomes a unique identifier, and a query tool as part of a world aircraft database from mode-S.org to determine more about the aircraft within a given ICAO address. The tables below show the various ADS-B content.

TABLE 11

ADS-B Bit Content Table

| nBits | Abbr. | Name |
| --- | --- | --- |
| 5 | DF | Downlink Format |
| 3 | CA | Capability |
| 24 | ICAO | Aircraft Addr |
| 56 | Data | Data |
| Data [0-4] | [TC] | Type Code |
| 24 | PI | Parity/Interrogator ID |

TABLE 12

ADS-B Type Code Table

| Type Code | Content |
| --- | --- |
| 1-4 | Aircraft ID |
| 5-8 | Surface Pos |
| 9-18 | Airborne Pos (w/Baro Altitude) |
| 19 | Airborne Velocities |
| 20-22 | Airborne Pos (w/GNSS Height) |
| 23-27 | Reserved |
| 28 | Aircraft Status |
| 29 | Target State and Status Info |
| 31 | Aircraft Operation Status |

As noted before, ADS-B is a radio on an aircraft that automatically broadcasts precise location of the aircraft via a digital signal. It is one of the more prominent technologies supported by NextGen (Next Generation National Airspace System). The ADS-B is used by Air Traffic control (ATC) and other aircraft in the area to gain awareness on the position of the broadcasting aircraft and the position of the aircraft is delivered to the ATC through a network of ADS-B ground stations. The aircraft knows its position by decoding the GPS signal. The GPS is augmented with Wide Area Augmentation System (WAAS), which improves location accuracy, integrity, and availability.

ADS-B signals are broadcast about once per second. In the US, the operating frequency is 1090 MHz (1090ES) or 978 MHz (over UAT). Aircraft flying above 18,000 feet require 1090ES, but aircraft that fly below 18,000 feet may use either UAT or 1090ES. The modulation is Pulse Position Modulation (PPM) and the data rate is 1 Mbps with a bit duration of 1 us. The message length is 112 bits/112 us, and includes 54 information bits (other bits are overhead), and a 24-bit CRC checksum, which is capable of correcting up to five errors in the message.

As partially indicated in the tables above, ADS-B messages may include flight identification (flight number call sign or call sign), the ICAO 24-bit aircraft address (global unique airframe code), the position (latitude/longitude) and position integrity/accuracy (GPS horizontal protection limit). Other data in the ADS-B messages may include the barometric and geometric altitudes, the vertical rate (rate of climb/descent), an emergency indication (when emergency code selected), and special position identification (when IDENT selected). The maximum rage of a ground station is 250 nautical miles.

Figure 71:
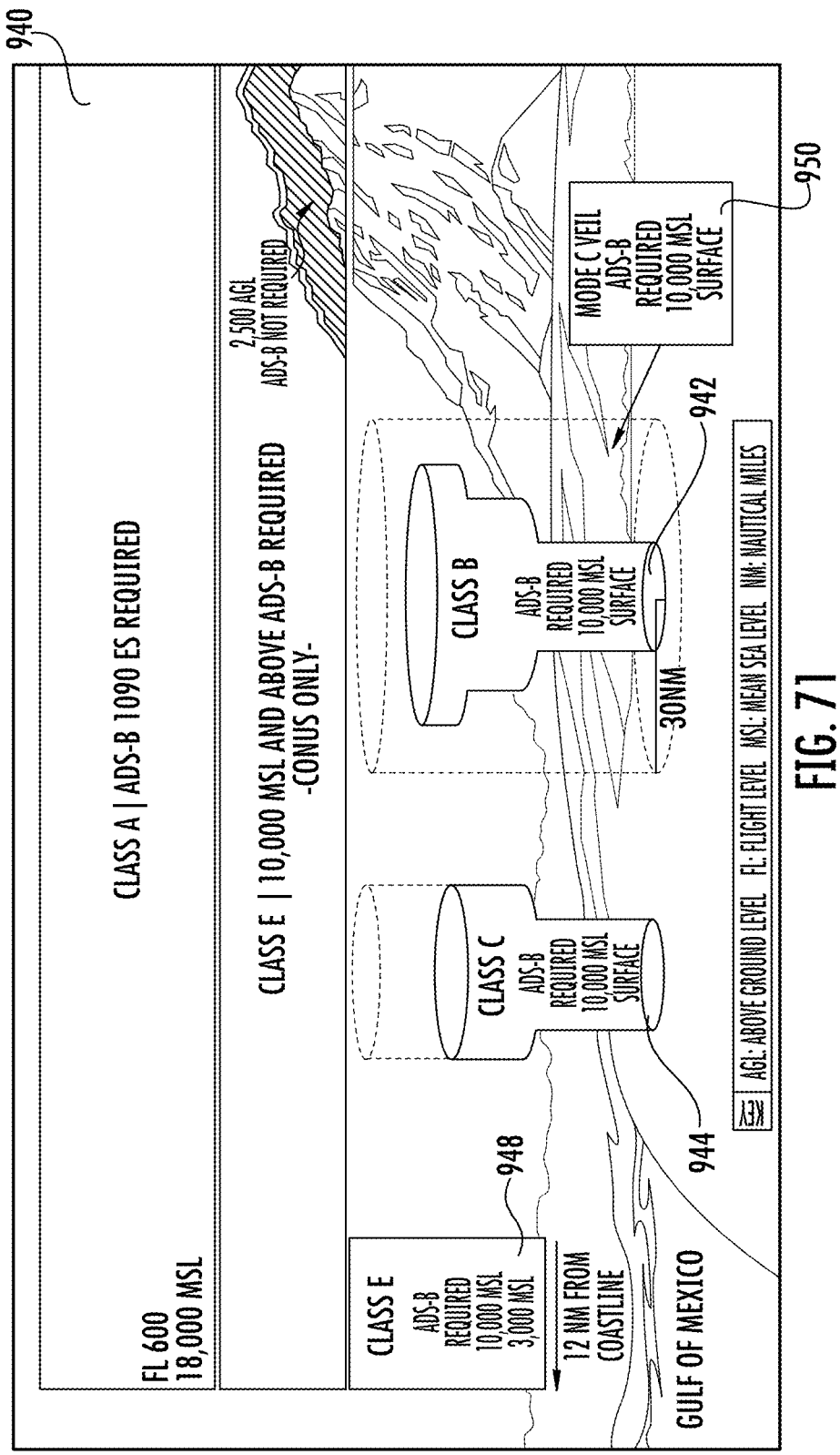
FIG. 71 is a fragmentary block diagram showing the various airspace components for the ADS-B system operative with the enhanced LDACS system.

As of Jan. 2, 2020, ADS-B is required for flying in most of the US controlled airspace. The table below provides more specific information. Additionally, FIG. 71 provides a chart having definitions of various parts of the airspace.

As illustrated, the class A 940 corresponds to ADS-B 1090 and is ES required and has a flight level of 600 to 18,000 mean sea level. Class B 942 is ADS-B required and 10,000 mean sea level surface with 30 nautical miles (NM). Class C 944 is ADS-B required with 10,000 mean sea level to the surface. Mode C veil 946 is ADS-B required and 10,000 mean sea level to the surface. Class E 948 for the conus only is 10,000 mean sea level and above, which is ADS-B required and at 2,500 above ground level mountains, the ADS-B not required as illustrated. The Class E 950 is ADS-B required and 10,000 mean sea level to 3,000 mean sea level and 12 nautical miles from the coastline. Table 13 sets forth these requirements in table format.

TABLE 13

Requirements for ADS-B in the United States

| Airspace | Altitude |
| --- | --- |
| Class A | All |
| Class B | Generally, from surface to 10,000 feet mean sea level (MSL) including the airspace from portions of Class Bravo that extend beyond the Mode C Vell up to 10,000 feet MSL (e.g., LAX, LAS, PHX) |
| Class C | Generally, from surface up to 4,000 feet MSL including the airspace above the horizontal boundary up to 10,000 feet MSL |
| Class E | Above 10,000 feet MSL over the 48 states and DC, excluding airspace at and below 2,500 feet AGL<br>Over the Gulf of Mexico at and above 3,000 feet MSL within 12 nautical miles of the coastline of the United States |
| Mode C Vell | Airspace within a 30 nautical mile radius of any airport listed in Appendix D, Section 1 of Part 91 (e.g., SEA, CLE, PHX) from the surface up to 10,000 feet MSL |

As noted before, there are also ADS-B Out and ADS-B In messages. ADS-B Out sends ADS-B information and ADS-B In receives ADS-B information. ADS-B Out has the aircraft sending its ADS-B messages to ATC via ground stations. ADS-B In has the aircraft receiving ADS-B messages from other aircraft or from the ground stations when using ADS-B In at the UAT frequency (978 MHz). The aircraft may receive Flight Information Service-Broadcast (FIS-B) and Traffic Information Service-Broadcast (TIS-B), free of charge. ADS-B Out is mandatory while ADS-B In is optional. ADS-B Out is required in the following regions or countries: Australia, Canada, China, Europe, Fiji, Hong Kong, Singapore, United States, and Vietnam. US ADS-B Coverage map may be found at the Federal Aviation Administration website for NextGen airspace.

Figure 72:
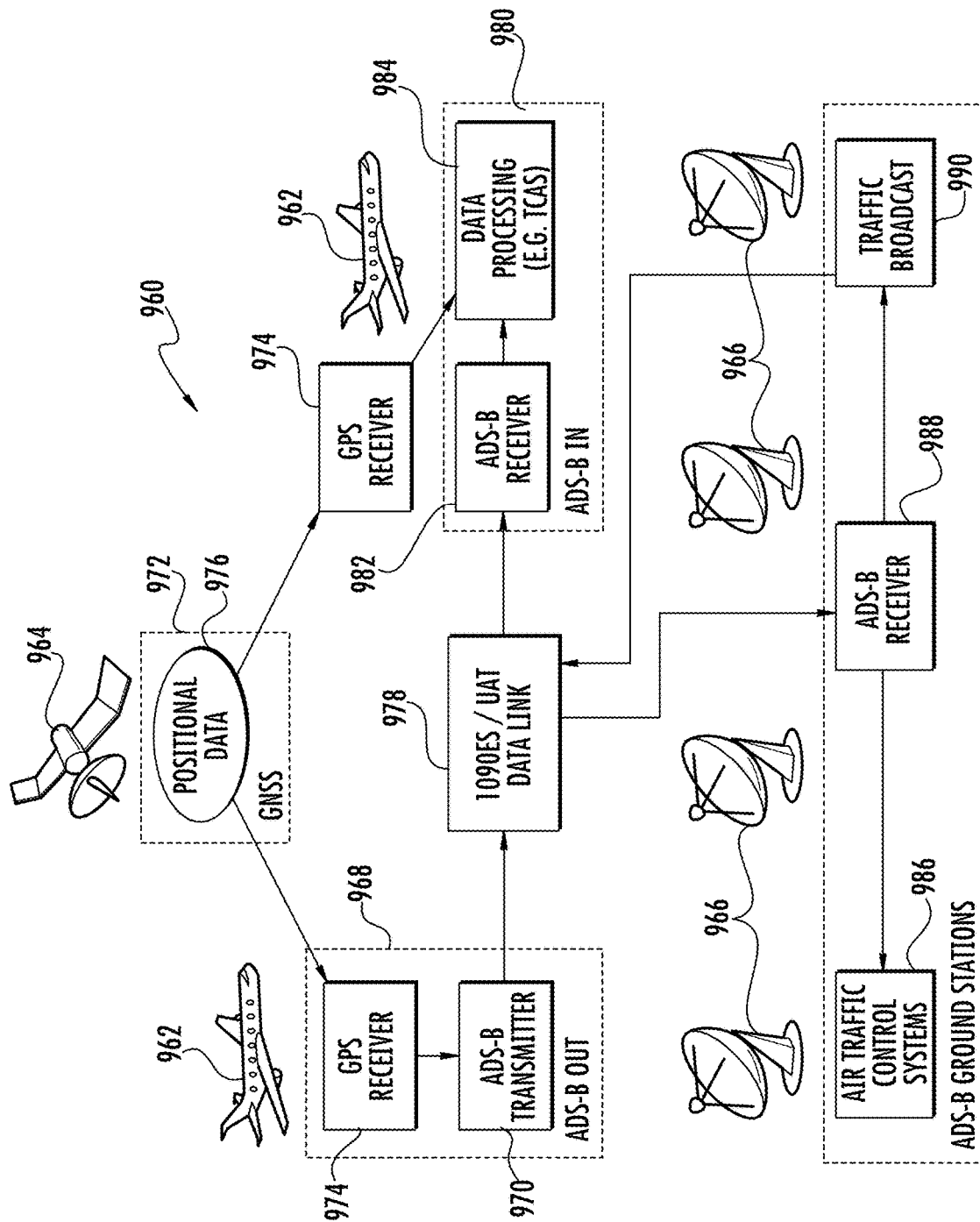
FIG. 72 is a block diagram showing an overview of the ADS-B system architecture that may be used with the enhanced LDACS system.

An overview of ADS-B architecture is presented in FIG. 72 and shown generally at 960, and shows an aircraft 962, a satellite 964, and ground stations 966 that cooperate with each other. As illustrated, ADS-B Out 968 includes the ADS-B transmitter 970 that is integrated with a GPS system 972 via a GPS receiver 974, but the system may use other satellite navigation systems to receive positional data 976 besides the illustrated GNSS system. The ADS-B Out transmission may use the 1090 ES and the UAT transmission data link 978. ADS-B receivers on the ground stations receive ADS-B Out messages, which are relayed to the ATC through terrestrial links. The ADS-B system includes GNSS positional data 976 received via satellites 964 and operative with the ADS-B In 980 having an ADS-B receiver 982 and data processing module such as TCAS (Traffic Collision Advance System) 984. ADS-B Out 968 communicates with ADS-B In 982 via the 1090 ES/UAT data link 978, which communicates with ADS-B ground stations 966 that includes the ATC (Air Traffic Control Systems) 986, ADS-B receiver 988 and traffic broadcast 990.

The ATC (Automatic Traffic Control) 986 compiles TIS-B (Traffic Information Server Broadcast) messages 990, which are broadcast to all aircraft within the ground station coverage area. These messages are broadcast on both 1090 ES and UAT data link 978. All aircraft that have ADS-B In 980 are capable of receiving ADS-B messages. They may also process ADS-B Out 968 messages from other aircraft 962, e.g., for the purpose of collision avoidance, or they may receive TIS-B messages to gain general awareness of the traffic patterns in their vicinity. Furthermore, on UAT, the ADS-B In 980 operates with the aircraft and may receive weather information. There is a commercially offered satellite version of the ADS-B. This service is provided by the Virginia based satellite company, Aireon, which is a subsidiary of Iridium Communications that operates a network of 66 LEO satellites for worldwide voice and data communication. In the satellite version of ADS-B, the terrestrial network in FIG. 72 is replaced by Iridium's satellite network. Through satellite connectivity, Aireon provides global aircraft surveillance for Earth's airspace.

ADS-B is not developed with security in mind. It is an open broadcast and as a result it is susceptible to a number of different Radio Frequency (RF) attacks. There are different vulnerabilities. A first vulnerability is Eavesdropping (Aircraft reconnaissance). Since the system is open, i.e., it is transmitting on a known frequency, using the signal of known properties and using no security measures, anyone with a relatively simple receiver may obtain mobility information on all aircraft that are within its radio horizon. There are even systems that deploy a network of ground-based ADS-B receivers, which collect ADS-B messages and make them available on the Internet. This information may be easily misused by a malicious actor. Another vulnerability is jamming on both air-to-ground and ground-to-air air links, such as ground station flood denial and aircraft flood denial. The location of the ADS-B ground based infrastructure is generally known. Since the system uses a single frequency (1090 MHz), a strong jammer in a vicinity of a ground station may overpower the aircraft messages and hence, make the ground station inoperable. Similarly, by sending a signal on 1090 MHz, a sufficiently strong jammer may create a disruption of the aircraft reception on the ADS-B In side.

Despite its importance, through jamming, the ADS-B service may be relatively easily disrupted. Another vulnerability is message injection, including ground station target ghost injection/flooding and aircraft target ghost injection/flooding. Since ADS-B implements no transmitter authentication, it is relatively simple to spoof the system and "impersonate" an aircraft. A spoofing transmitter may transmit messages in a proper format, with a known aircraft ID, but with fake mobility information. The ATC may obtain erroneous information on flying aircraft and it may be forced to control the airspace on the basis of erroneous data.

Yet another vulnerability is message deletion as aircraft disappearance. A more sophisticated jammer may target a specific aircraft and jam its messages. As a result, the aircraft may disappear from the ATC. Another issue is message modification, such as virtual aircraft hijacking or virtual trajectory modification. A malicious actor my inject messages for an already flying aircraft that show erroneous mobility information. As a result, the ATC would have incorrect information on the aircraft's trajectory. There are known prior cases where each of the listed vulnerabilities has been exploited.

An additional vulnerability of the ADS-B based ATC is the system's dependency on satellite-based navigation and positioning. In the absence of Global Navigation Satellite Systems (GNSS), the system stops functioning. Since interruption of GNSS service is considered as a real possibility, it may not be possible to decommission ATC based on HF/UHF radios and navigation based on DME/TACAN+ VOR. Thus, the introduction of ADS-B does not render these legacy systems obsolete and as they are still needed in the event that GNSS service becomes unavailable.

There are security issues with ADS-B based upon in three fundamental properties of the system. First there is no encryption of the messages. The ADS-B messages are "open." Any individual with an ADS-B receiver may read everyone else's message. The openness of the system is by design, and in that respect, the ADS-B is very different than most modern communication systems. For example, cellular standards (2G-5G), WiFi, WiMAX and even Bluetooth deploy encryption of the user data, which prevents eavesdropping by unauthorized parties. Second, there is no authentication of the transmitters. Anyone is allowed to transmit within the ADS-B system. There is no transmitter registration and authentication. This allows malicious actors to act as imposters by generating fake ADS-B messages. The lack of authentication creates vulnerabilities associated with message injection, message deletion and message modification. Third, there is a single operating frequency. ADS-B operates on single frequency, i.e., 1090 MHz. Therefore, jamming of the system is relatively easy. Even a single tone jammer at 1090 MHz can cause substantial denial of service on both ADS-B Out and ADSB-In.

There have been some attempts to address these security issues, such as described in the article by Strohmeier et al. entitled, "On the Security of the Automatic Dependent Surveillance-Broadcast Protocol" (2015), the disclosure which is hereby incorporated by reference in its entirety.

Figure 73:
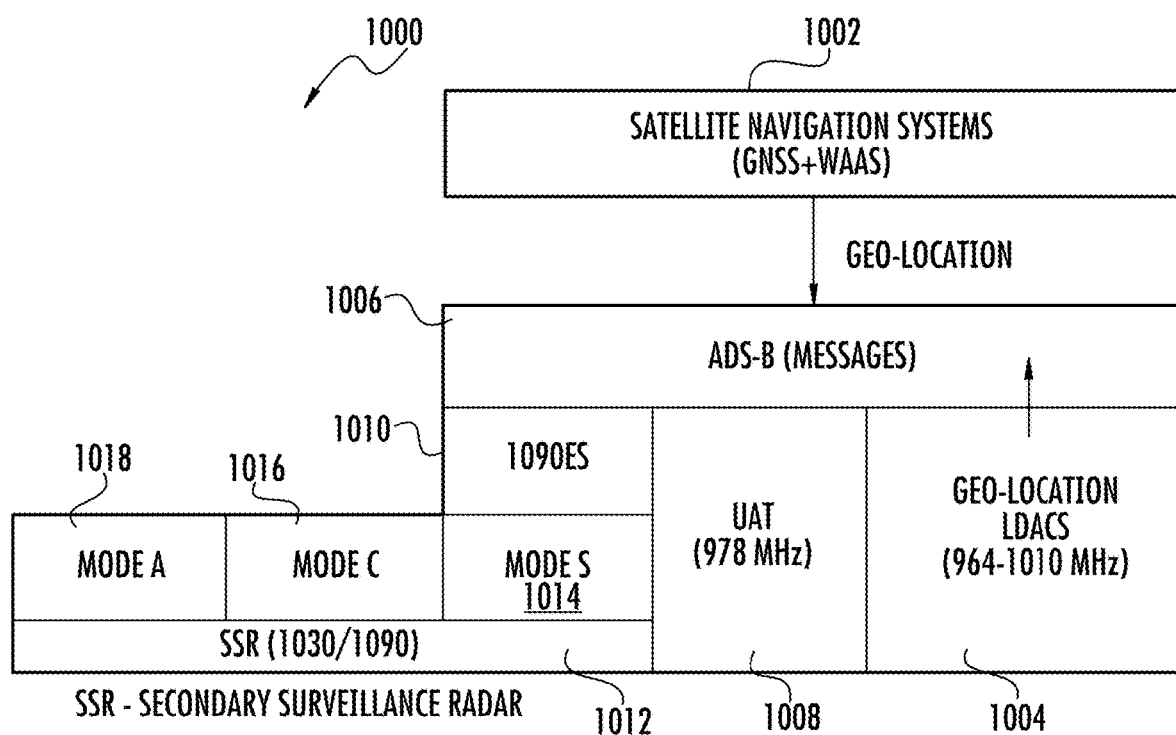
FIG. 73 is a block diagram showing use of the ADS-B system and the enhanced LDACS system.

The enhanced LDACS system addresses these security issues and can best be understood with reference to the block diagram of FIG. 73 illustrated generally at 1000. As shown in this FIG. 73, the ADS-B is implemented over existing communication systems. As illustrated, the satellite navigations system 1002 operates such as with GNSS and WAAS and transmits geolocation data to be used with the geolocation LDACS system such as operating at 964-1010 MHz for ADS-B messages 1006. The system may work with UAT 1008 at about 978 MHz and the secondary surveillance rate (SSR) 1012 at 1030/1090. The system may also work with Mode S 1014, Mode C 1016, and Mode A 1018.

In the United States, ADS-B may use either UAT (978 MHz) 1008 or Secondary Surveillance Radar (Mode S) 1012. Both of these two communication systems were developed for alternative uses and subsequently adopted by ADS-B, which operates to deliver a specific message type, i.e., the ADS-B message 1006, via either UAT or SSR Mode S. The enhanced LDACS system of FIG. 73 includes another communication path for ADS-B messages, which passes through the LDACS radio and through the LDACS terrestrial network, thus addressing many of the ADS-B vulnerabilities as now explained.

First, LDACS provides message encryption. In LDACS, the unauthorized eavesdropping is not possible. This enables privacy protection of the flying aircraft. For example, there may be multi-tier broadcasting on ADS-B In, where every receiver receives the positions of flying aircraft, but without their specific identification. This allows functioning of collision avoidance systems, but still protects the privacy of the aircraft. At the same time, an authorized receiver may receive additional information that will allow identification of individual aircraft, groups of aircraft or, as a maximum, all aircraft. Second, the LDACS requires that the parties join the network after proper authorization. Therefore, the messages from unauthorized transmitters are not permitted. Spoofing of the system through transmission of fake aircraft position, message deletion or message modification is not easily accomplished. Third, in the L-band, the LDACS network may use hundreds of channels. The allocation of channels may be dynamic and algorithms may be developed where the allocation takes interference into account. Under such circumstances, the enhanced LDACS system becomes more robust towards jamming.

The enhanced LDACS system creates a secure replacement for ADS-B data transport and includes the capability to encapsulate the ADS-B data and secure it by authorization and encryption schemes that are provided on the enhanced LDACS system communications link. It is possible in the future that the ADS-B system will be replaced with data derived from the LDACS ranging mechanism (A-PNT) and the enhanced LDACS system may provide the aircraft station with accurate knowledge of its position. As noted before, it is possible to split broadcast data fields into coarse and fine data fields to allow better control of what is available. For example, the fine data may be encrypted to prevent improper usage, and the coarse data may be either unsecured or encrypted with a different certificate that is more publicly accessible. There may be multiple layers of encryption using certificates from different authorities to limit the availability of data to casual observers. It may also be possible to use temporary identifiers so that the network knows who is where, but that casual observers cannot easily associate the aircraft station with a specific entity.

The enhanced LDACS system shown in FIG. 73 offers additional benefits. First, LDACS offers positioning capabilities. Therefore, the ATC system may continue to function even in the absence of GNSS. Early trials of LDACS positioning capabilities indicate accuracy that is superior to DME/TACAN+VOR. Therefore, the enhanced LDACS system allows for a complete decommissioning of legacy navigation systems. Second, LDACS offers a full-duplex communication. Therefore, the enhanced LDACS system may use both ADS-B Out and ADS-B In. ADS-B Out may be implemented with the LDACS air-to-ground link, while ADS-B In may be implemented on the LDACS ground-to-air link.

Third, LDACS has a much higher capacity than the existing 1090ES channel 1010. The capacity of 1090ES 1010 is not very large. In the current use model, the aircraft access the channel via a contentious protocol. In such circumstances, many of the ADS-B messages 1006 are lost. As the traffic increases and as UAS aircraft enter the ATC management, the capacity of the 1090ES link 1010 becomes an issue. Within the current implementation, there are no avenues for significant capacity improvements of the system as only one channel is used.

On the other hand, the enhanced LDACS system may address capacity needs. First, the ADS-B messages 1006 may be scheduled, i.e., the access protocol is contention free. Therefore, a message loss is a rare event. Second, LDACS operates on many channels and the capacity of the systems is much larger than what is offered on 1090ES 1010. Third, LDACS is a cellular system, and at least in theory, an infinite capacity may be achieved through the processes of cell splitting and frequency reuse. Fourth, localized capacity demands for lower altitudes and UAS may be achieved through the enhanced LDACS system using the overlay/underlay.

Finally, the enhanced LDACS system offers peer-to-peer communication. This mode of the enhanced LDACS system may be used for ADS-B In absence of terrestrial network. The enhanced LDACS system may also be used for FIS-B (Flight Information System Broadcast) messages. Currently FIS-B messages are sent only over UAT. Therefore, aircraft operating ADS-B In on 1090ES do not have the capability of receiving FIS-B messages. If these messages are sent over the enhanced LDACS system, all aircraft with LDACS receiver may receive them.

As noted before, the conventional ADS-B system may also have drawbacks because it includes TMI and no authentication/encryption mechanism. Jammers or other adversaries or intruders may take advantage of this drawback and with only one aircraft ADS-B commercial radio, they may receive ADS-B messages that provide position and aircraft identity information and track all aircraft in the vicinity. This information may provide continuous tracking information, for example, and one may use small guided missiles, which navigate accurately using GPS without visual sighting. Corporate espionage may be another issue because an intruder may track the location of known private aircraft to discern their business intent.

Securing ADS-B and Peer-to-Peer Communications

As noted before, the enhanced LDACS system operating in a peer-to-peer communications system may broadcast information between aircraft stations automatically, and to satisfy privacy considerations for the ADS-B data, the ADS-B data may be split into public fields and private fields, corresponding to public data and private data. The public data may be open or secured with a "long" term public encryption certificate and have a low resolution position with certain aircraft classes. The private data may be secured with a short-term encryption certificate only known to appropriate entities. The certificate becomes part of the pre-flight planning and the enhanced LDACS system may be updated for each flight or updated more frequently if desired. This includes a high accuracy position and unique aircraft identifier.

Figure 74:
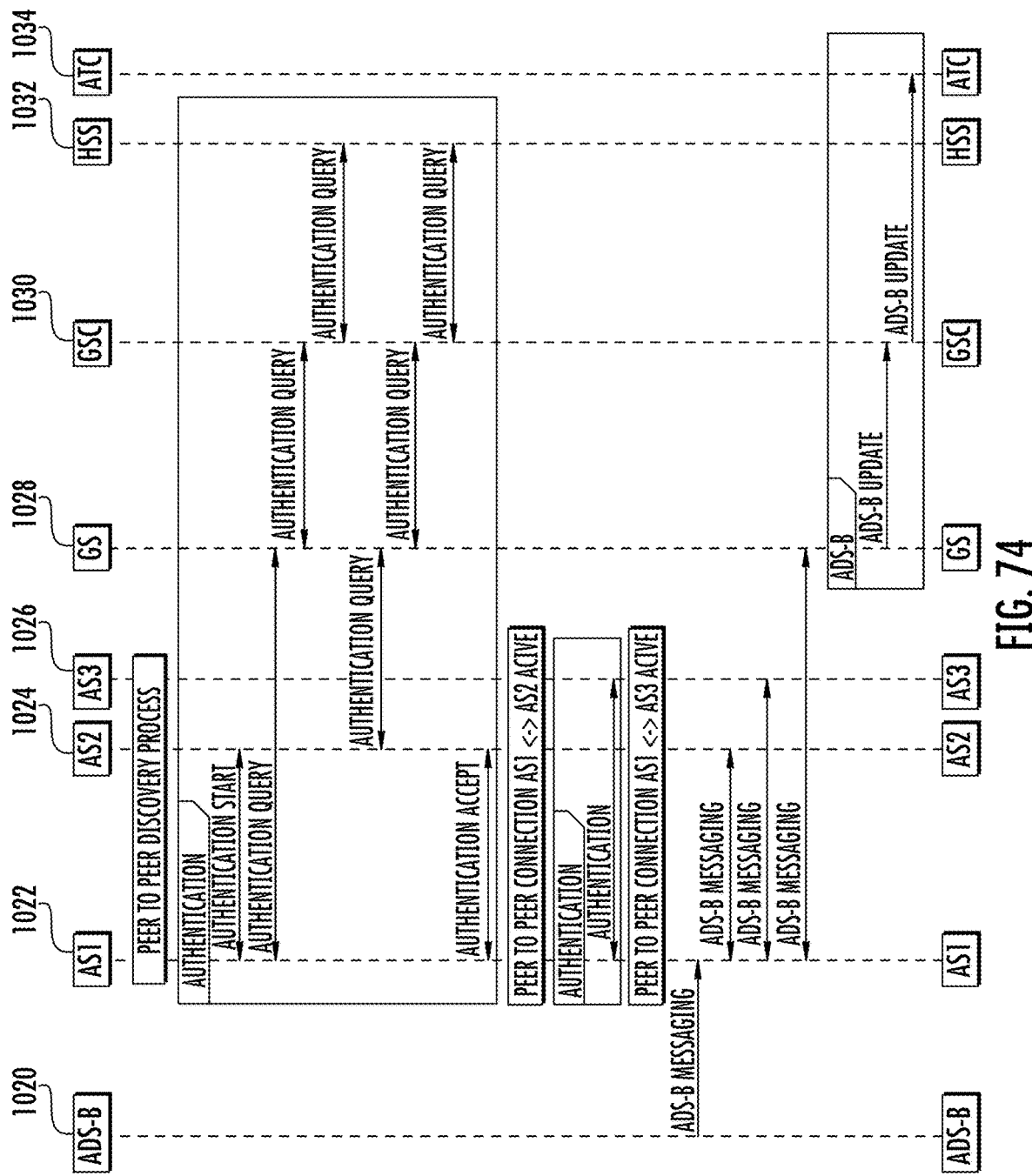
FIG. 74 is a messaging sequence diagram for the peer-to-peer communications used in the enhanced LDACS system.

There may be peer-to-peer communications where the "public" ADS-B fields may be transmitted to peer-to-peer aircraft stations and the precise ADS-B fields may be sent to the ground station to relay to air traffic controllers. FIG. 74 is a flow sequence showing an example of the initial rollout messaging sequence. This flow sequence shows the ADS-B 1020 and the AS1, AS2 and AS3 indicated at 1022, 1024, 1026 respectively, and ground station (GS) 1028, ground station controller (GSC) 1030, HSC 1032, and ATC 1034. The peer-to-peer discovery process is shown with the authentication sequence and peer-to-peer connection among the components. It includes ADS-B messaging and update.

Figure 75:
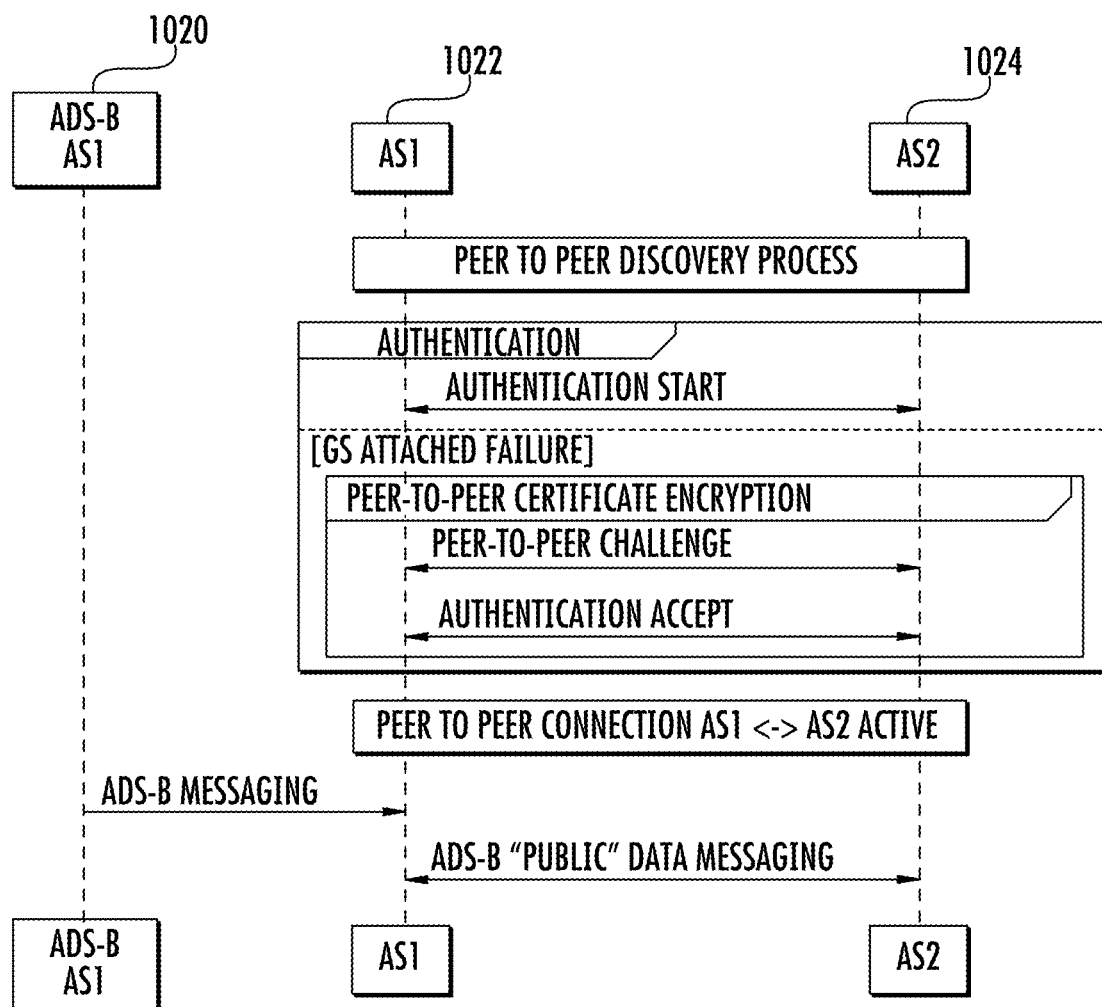
FIG. 75 is another messaging sequence diagram similar to that shown in FIG. 74 and showing encryption.

Referring now to FIG. 75, there is shown another flow sequence of the initial rollout for the messaging sequence, and showing further details of the peer-to-peer certificate encryption and the peer-to-peer discovery process and connection among the three components shown in FIG. 74 of the ADS-B 1020, AS1 1022, and AS2 1024.

The LDACS peer-to-peer security may include authentication and encryption and may not have to rely on the availability of an HSS (Home Subscriber Service) 1032 (FIG. 74) as a master user database stored in a single node or alternative central trust server during the authentication process. It may be certificate based and have varying levels and tiers such as commercial, hobbyist, etc. with precise certificate data allowing certain entities to operate. Blockchain encryption may be used for enhanced security.

Peer-to-Peer Authentication in the Enhanced LDACS System

The enhanced LDACS system includes peer-to-peer communications that require a different approach to authentication because any authentication may not rely on the availability of an HSS or alternative central trust server during the authentication process. There are several methods for decentralized authentication:

The first is web of trust. It is used in PGP (Pretty Good Privacy), GnuPG (GNU Privacy Guard), and other Open-PGP-compatible systems to establish the authenticity of the binding between a public key and its owner. In the web of trust, keys may be accumulated from others that a party may designate as trusted introducers. Others will each choose their own trusted introducers, and everyone will gradually accumulate and distribute with their key a collection of certifying signatures from others, with the expectation that anyone receiving it will trust at least one or two of the signatures. This will allow a decentralized fault-tolerant web of confidence for all public keys.

The second is Cryptographically Generated Addresses (CGA). The purpose of CGAs is to prevent stealing and spoofing of existing IPv6 addresses. The public key of the address owner is bound cryptographically to the address. The address owner may use the corresponding private key to assert its ownership and to sign SEND messages sent from the address. An attacker may create a new address from an arbitrary subnet prefix and its own or someone else's public key because CGAs are not certified. However, someone else's address may not be impersonated. Also of interest is Secure Neighbor Discovery (SEND) which uses CGA.

The third is blockchain, which may have a low number of attached peers at any point in time, however, making implementation challenging.

Authentication may occur in the enhanced LDACS system using the peer-to-peer protocol and include autonomous operation and short-lived public keys with crypto based network identifiers. There may be mutually authenticating peers such as aircraft stations that associate network endpoints to public keys and an asynchronous network with no partitioning and eventual delivery after retransmissions and this joint message transmission paths. It is possible to publicize the lack of consensus where an authenticating peer as an aircraft station sends proofs of possession to other peers and each peer tries to authenticate with a majority decision at every peer. There may be trust groups and executed authentication and smaller trust groups, which may be governed by communication patterns.

Secure peer-to-peer communication with the enhanced LDACS system may be based on the blockchain, which may validate a user's identity and ensure trust between users as aircraft stations for exchanging messages. The aircraft station's identity may be validated by a smart contract and consider every other interaction as malicious. The smart contract may be code that is stored and executed on the blockchain. An aircraft station may generate: 1) a peer key using the ECDSA algorithm, 2) a public key, or 3) a private key, and derive an identity as the hash of the public key. The private key may be safely kept by a party, e.g., Alice, and request to register its identity with the corresponding public key into the blockchain. Further details may be found in the article by Khacef et al., "Secure Peer-to-Peer Communication Based on Blockchain" (2019), the disclosure which is hereby incorporated by reference in its entirety.

Enhanced LDACS System and Positioning and DME/TACAN

There are also some constraints on air-to-ground LDACS frequency plan. The air-to-ground LDACS uses channels 301-391, for a total of 91 channels. The odd channels are in between DME/TACAN assignments. Even channels are on frequencies that may be used for DME/TACAN. All sites within the radio horizon of a flying aircraft should operate on different LDACS air-to-ground channels. At each ground station, the LDACS channels should be at least eight (8) channels away from the assigned DME/TACAN transmit channel. LDACS should not be on or at an adjacent channel to DME assignment on any of the sites within the radio horizon of the ground station.

There now follows a description of an enhanced LDACS system that may operate alongside the existing DME/TACAN deployment. The enhanced LDACS system may provide global coverage over the CONUS and the frequency assignments for LDACS cells may obey non-interference constraints as noted above. Because the enhanced LDACS system may be used as an alternative positioning system, at a flying altitude above 20,000 feet, an aircraft should "see" or receive signals from at least three and preferably four LDACS cells. With four cells within the view, the triangulation may yield estimates of latitude, longitude and altitude of the aircraft. The altitude estimate, however, is not required because the aircraft typically measures altitude directly. Therefore, most cases having three cells in view may be sufficient. It is possible and in some cases accuracy may be enhanced if more than four cells are viewable.

To establish a nominal cell radius of LDACS cells, a link budget shown in Table 14 may be employed. The parameters of the link budget are within the ranges as specified in the LDACS Standard and proposed Amendment.

TABLE 14

LDACS Link Budget

| Parameter | G2A Link | Parameter | A2G Link |
|---|---|---|---|
| PA Power (dBm) | 42 | PA Power (dBm) | 42 |
| Cable loss (dB) | −2 | Cable loss (dB) | −2 |
| Antenna gain (dB) | 9 | Antenna gain (dB) | 3 |
| EiRP (dBm) | 49 | EiRP (dBm) | 43 |
| Fade margin (dB) | −6 | Fade margin (dB) | −6 |
| AS antenna gain (dB) | 3 | AS antenna gain (dB) | 9 |
| Cable loss (dB) | −2 | Cable loss (dB) | −2 |
| RX Sensitivity (dBm) | −95 | RX Sensitivity (dBm) | −95 |
| Max path loss (dB) | 139 | Max path loss (dB) | 139 |
| Nominal cell radius (km) | 212.81 | Nominal cell radius (km) | 212.81 |

The Ground Station (GS) may use an antenna gain of about 12 dB, which would extend the range of the cell beyond a 200 km value as calculated in Table 14, corresponding to a link budget used in simulations. The link budget in Table 14 may provide substantial (about 6 dB) margin. The LDACS link budget may support much larger cell radii with slightly larger reliability. The LDACS receiver sensitivity value for the lowest modulation and coding rate is on the order of about −104 dBm. The value of about −95 dB used in the link budget table is significantly higher. For that reason, everywhere within the 200 km cell, an aircraft may achieve a significant data rate. The radius of 200 km, however, may be too large to provide enough cells for alternative positioning, especially at lower altitudes. It may be necessary to deploy cells of substantially smaller radii to meet the requirement of seeing three to four LDACS cells, thus increasing the cell site count over the CONUS. To meet the link budget and to provide good probability for an aircraft having at least 3 LDACS sites within the radio horizon, a nominal radius of about 150 km is selected.

Figure 76:
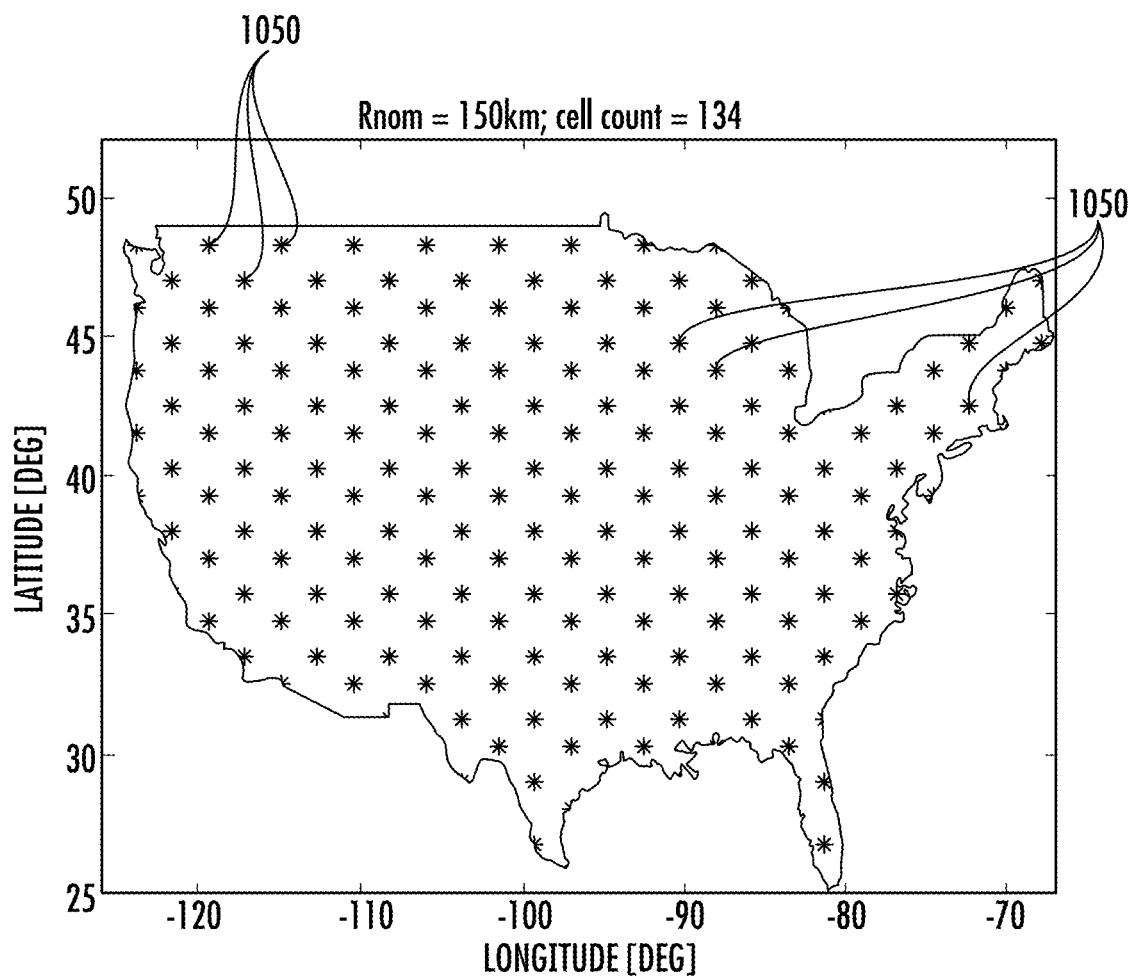
FIG. 76 is a map of the CONUS showing a cell layout and cell count for an LDACS system having a cell nominal radius of 150 km.

Based on the nominal cell radius of about 150 km, a theoretical cell layout for the enhanced LDACS system is shown in FIG. 76. To cover the entire CONUS with this LDACS service, the enhanced LDACS system may require about 150 cells shown generally by the stars at 1050. A cell count of 134 may be obtained in a regular cell layout that neglects terrain features. In practice, due to real location cell placement and the effects of terrain, the site count may be expected to be 10-15% higher.

Figure 77:
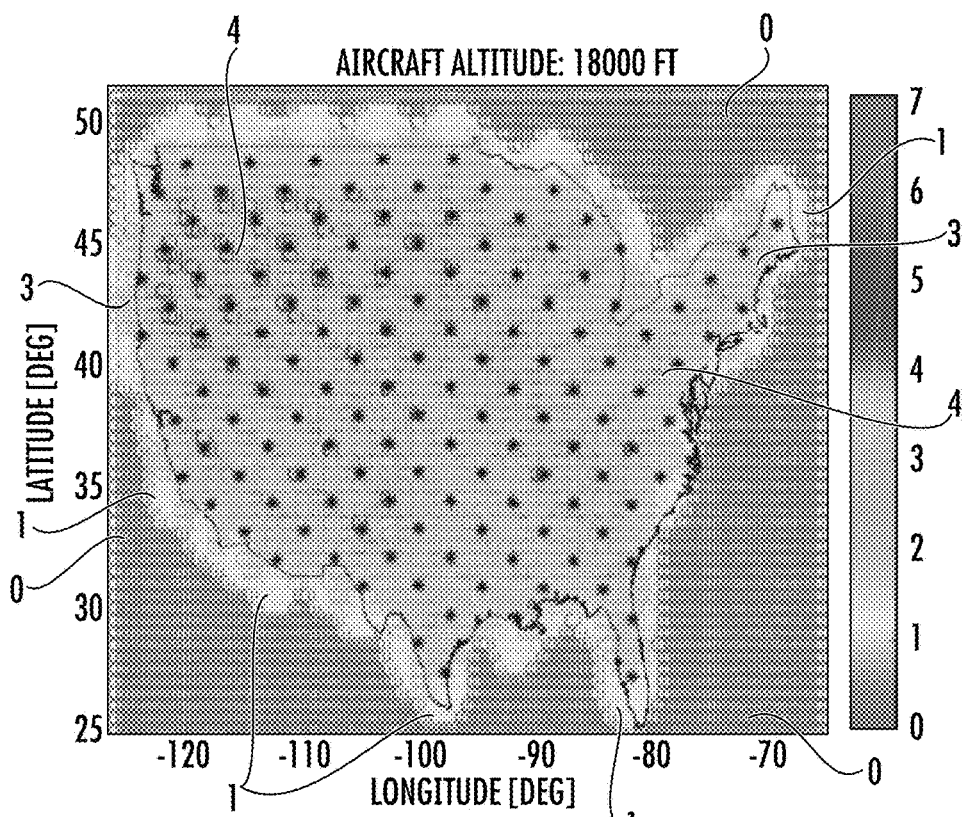
FIG. 77 is a map of the CONUS showing the number of LDACS cells within the radio horizon of an aircraft station at an altitude of 18,000 feet.
Figure 78:
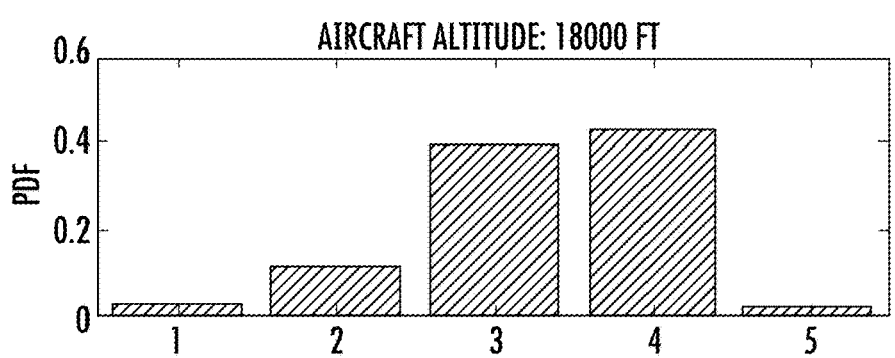
FIG. 78 is a histogram showing the PDF for the aircraft station operating at an altitude of 18,000 feet shown in FIG. 77.
Figure 79:
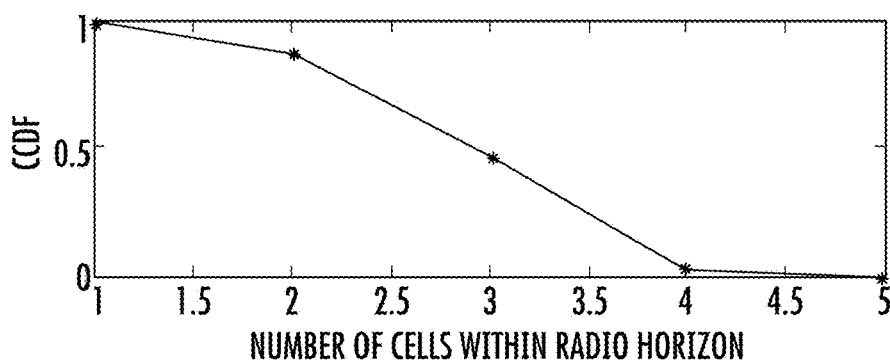
FIG. 79 is a graph showing the CCDF for the aircraft station operating at an altitude of 18,000 feet shown in the map of FIG. 77.
Figure 80:
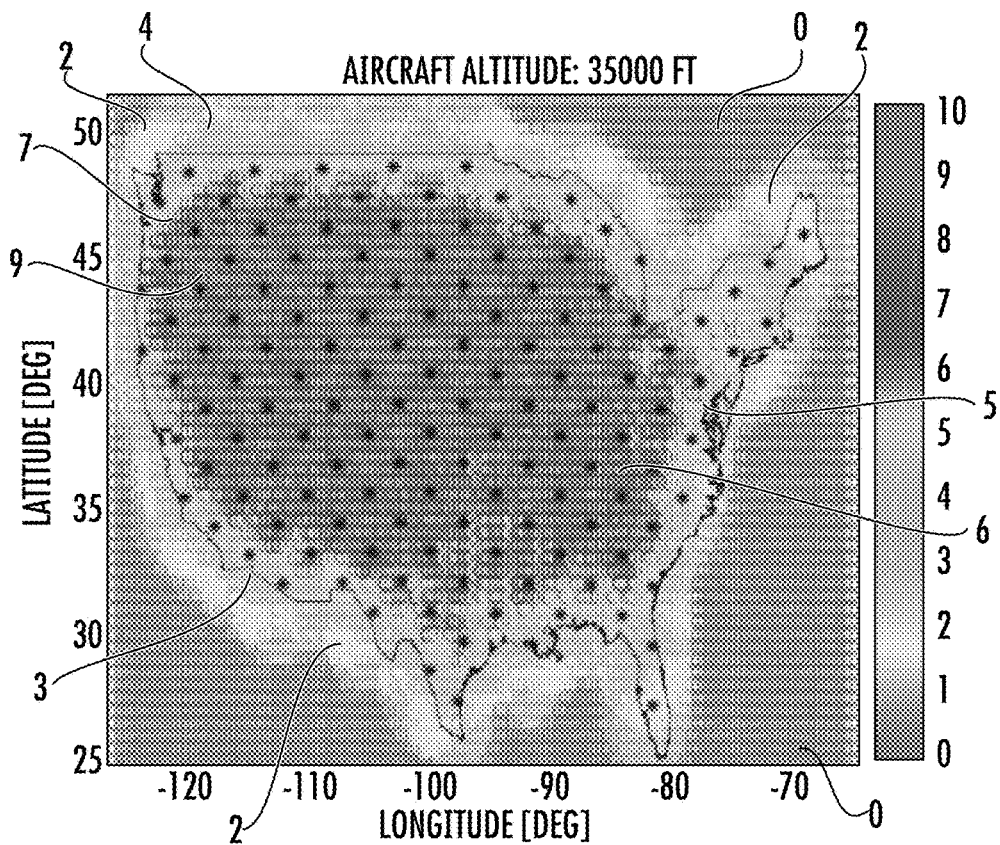
FIG. 80 is another map of the CONUS showing the number of LDACS cells within the radio horizon of an aircraft at 35,000 feet.
Figure 81:
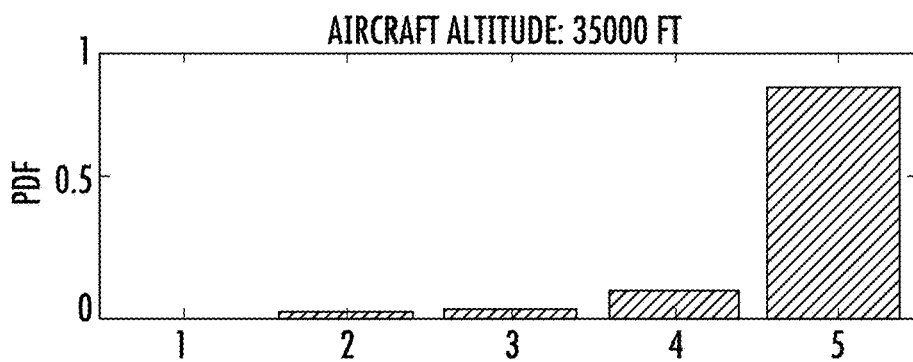
FIG. 81 is a histogram showing the PDF for the aircraft station operating at the altitude shown in the map of FIG. 80.
Figure 82:
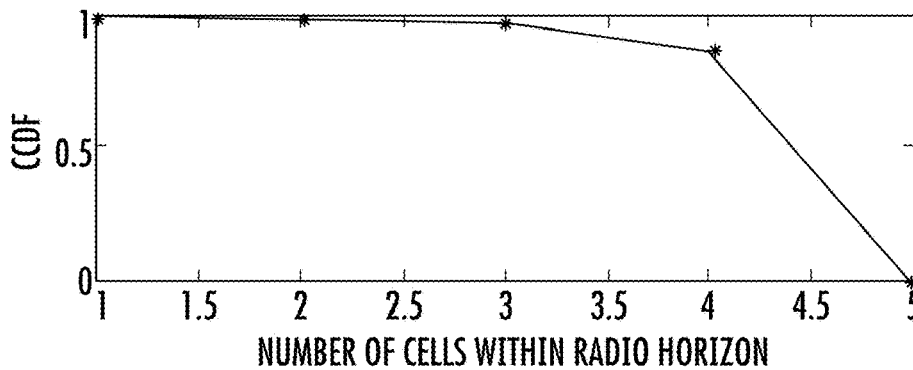
FIG. 82 is a graph showing the CCDF for the aircraft operating at the altitude shown in the map of FIG. 80.

FIG. 77 is a map of CONUS with the number of cells visible by aircraft given the numerical indicia 1-7 in the map, and FIGS. 78 and 79 showing a bar chart (FIG. 78) and graph (FIG. 79) for the number of cells that are visible by an aircraft from a given location at an altitude of 18,000 feet. This may be compared to the similar map of CONUS FIG. 80 and FIGS. 81 and 82 showing the same analysis, but with an aircraft altitude of 35,000 feet. FIGS. 78 and 79 in contrast show a bar chart and graph of the PDF and CCDF for a number of LDACS cells within the radio horizon of aircraft at 18,000 feet within CONUS.

At low altitudes (18,000 feet), an aircraft "sees" four or more LDACS cells at 40% locations within CONUS. There are three or more cells over 80% of CONUS area. These percentages do not provide global coverage over the CONUS and to meet this requirement, additional ground stations need to be deployed. At higher altitudes (35,000 feet), there is significant improvement and almost all areas see more than three and about 95% of the area see more than four cells. FIGS. 81 and 82 show a bar chart and graph of PDF and CCDF for a number of LDACS cells within the radio horizon of the aircraft at a high altitude of 35,000 feet within CONUS. There are few parts of the CONUS, however, where that requirement is not met for this altitude. For example, those areas where the requirement is not met could include southern Florida, the southern tip of Texas, and the far northwest corners of the country.

Figure 83:
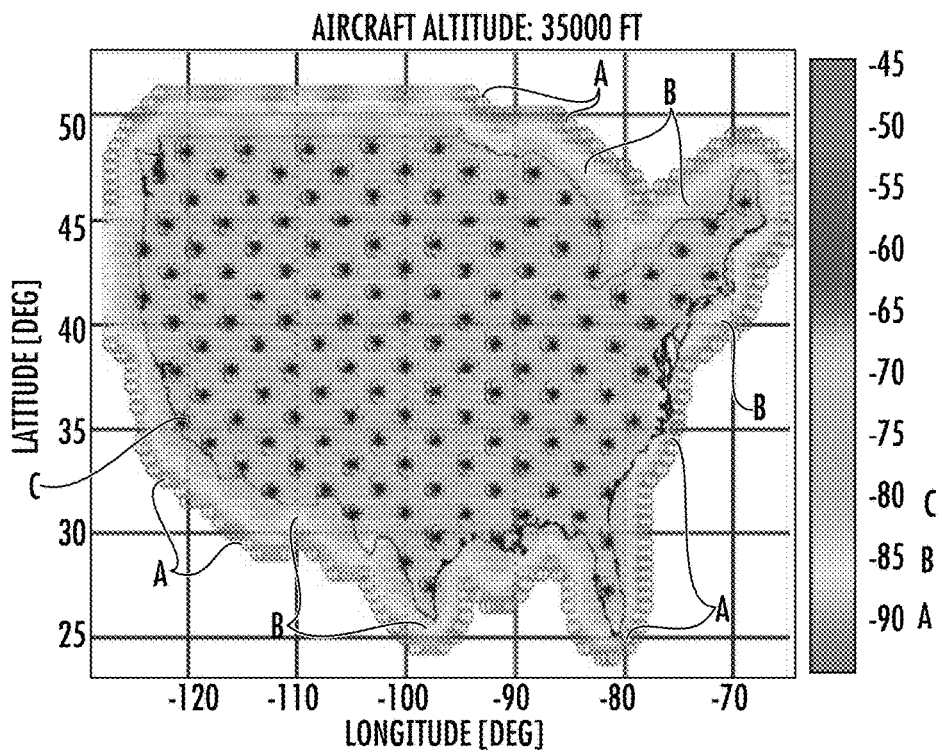
FIG. 83 is a map of the CONUS showing the coverage prediction in the ground-to-air direction for the aircraft at 35,000 feet.

The coverage prediction for the nominal system shown in FIG. 76 is presented in the map of FIG. 83, where the ground-to-air link is presented and the link budget from Table 14 is balanced. The antenna pattern is assumed to have about 20 dB null at the azimuth of about 90 degrees. The profile of the antenna pattern is specified as:

$$G(\theta) = G_{max} \frac{1}{1 + 99 \sin \theta}$$

where $\theta$ is the elevation angle above the horizon.

The coverage may be "coast to coast" and the RSL (received signal level) may be above −80 dBm almost everywhere, and for that reason, the enhanced LDACS system is not coverage limited. Within the CONUS, the signal level should be sufficient.

A frequency plan may be developed and three types of constraints considered, including (1) inter-system interference between LDACS and DME/TACAN on the ground; (2) inter-system interference between LDACS and DME/TACAN in the air; and (3) intra-system interference between LDACS ground stations due to frequency re-use.

If the spectrum plan as shown in FIG. 1 is considered, it is evident that a given DME-TACAN site cannot cause interference to LDACS on both ground-to-air and air-to-ground links. If a DME-TACAN site has a potential for interfering to the LDACS reception on the ground, the aircraft that are served by this ground station will not interfere with an aircraft's LDACS reception in the air and vice versa.

Frequency planning in some cases may be a difficult combinatorial optimization problem, and may be related to the generalized graph-coloring problem and is NP-hard (non-deterministic polynomial-time hardness). It is possible to use a computer based Automatic Frequency Planning (AFP) tool. In general, the frequency plan follows fixed duplexing space, but with LDACS, this is not the case and has two implications. First, the problem is less constrained and therefore, it is easier to find a viable frequency plan. Second, the frequency planning for ground-to-air and air-to-ground links may be conducted separately.

Figure 84:
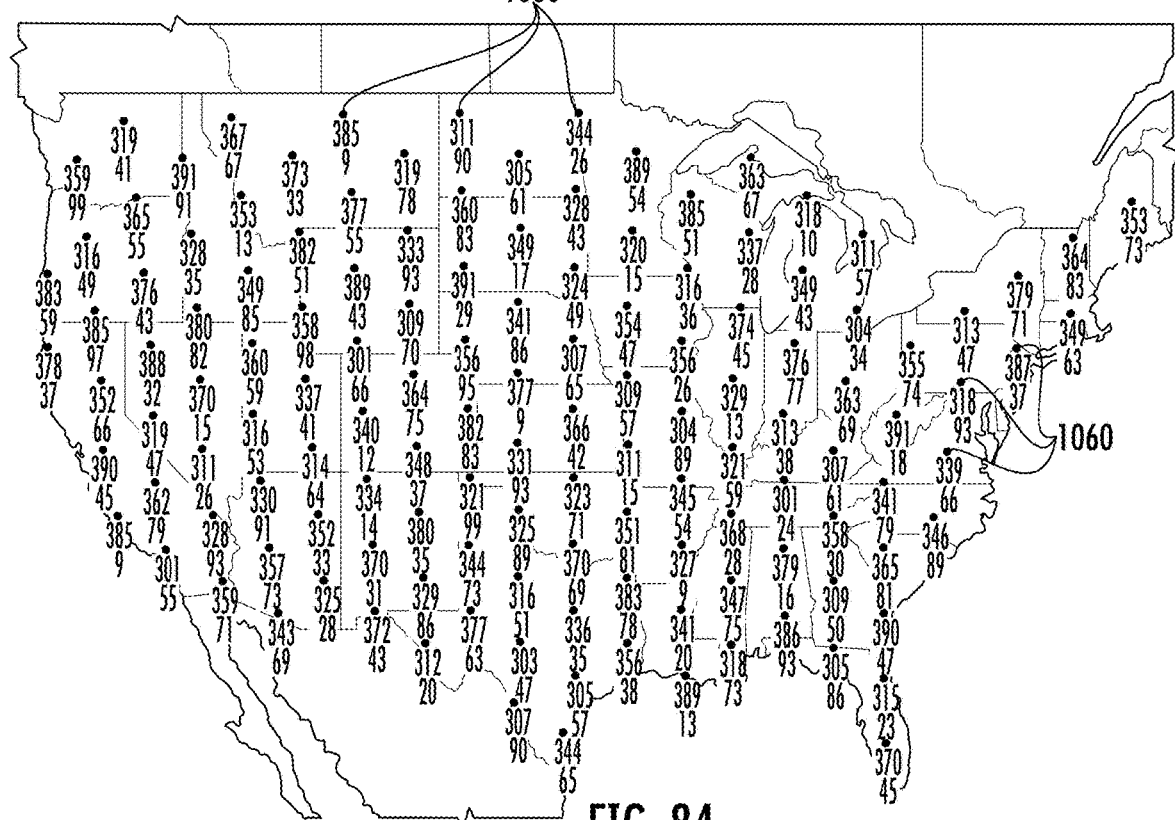
FIG. 84 is a map of an LDACS frequency plan for the CONUS such as shown in FIG. 83.
Figure 85:
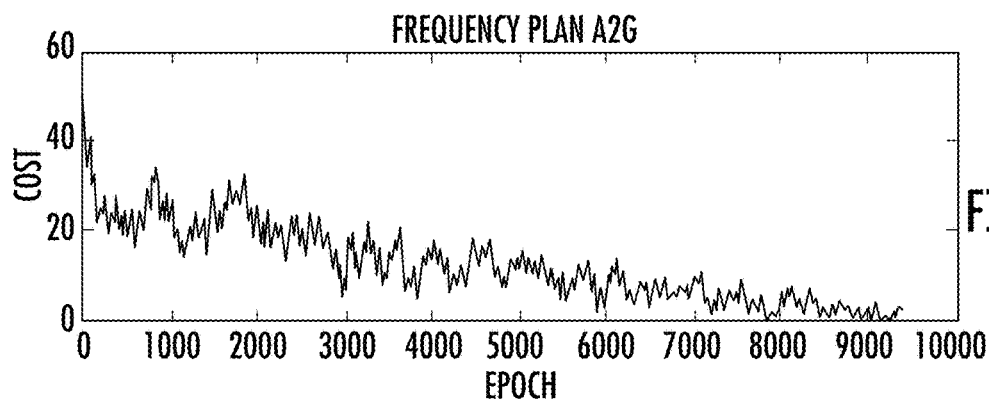
FIG. 85 is a graph for the frequency plan output of a flight plan proposal (AFP) for the aircraft communicating air-to-ground direction.
Figure 86:
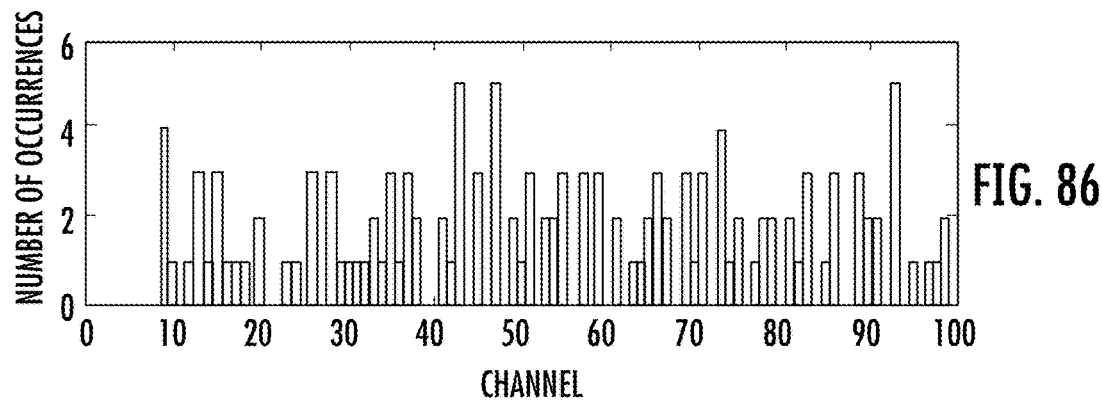
FIG. 86 is a histogram showing the number of occurrences versus the channel for the frequency plan shown in FIG. 85.
Figure 87:
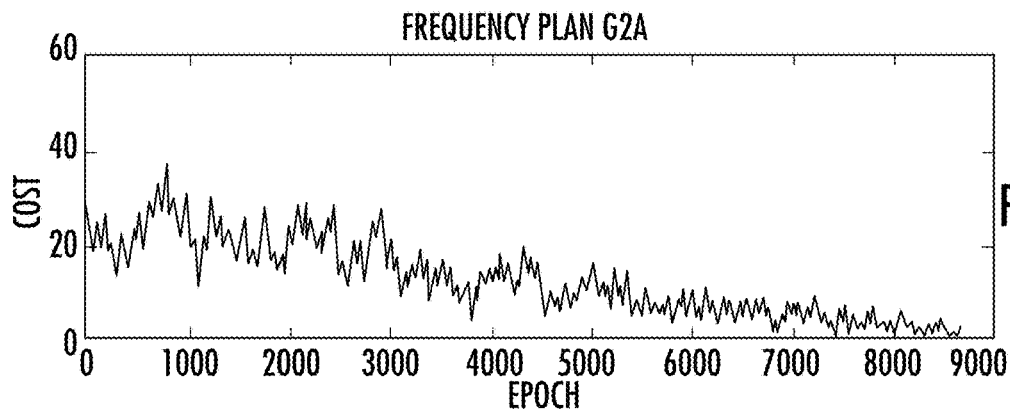
FIG. 87 is a graph for the frequency plan of the aircraft station at the ground-to-air direction similar to the graph shown in FIG. 85.
Figure 88:
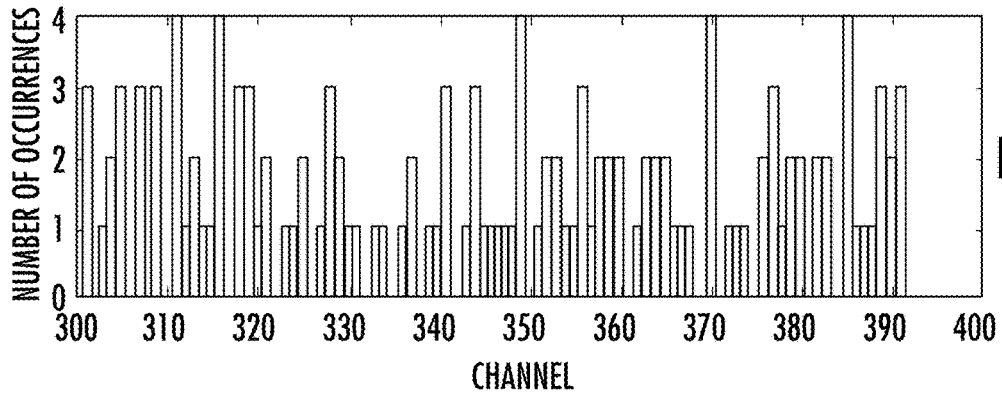
FIG. 88 is a histogram for the frequency plan for ground-to-air direction similar to that of FIG. 86.

The AFP tool solves the frequency plan using simulated annealing based optimization algorithm. An example of the results of the frequency planning for the enhanced LDACS system shown in FIG. 76 is presented in the CONUS shown in FIG. 84, where each identified circle at 1060 indicates the location of an LDACS ground station. There are two numbers associated with each location where the ground station 1060 is located. The top number indicates the ground-to-air channel and the lower number indicates the air-to-ground channel. Both air-to-ground and ground-to-air channel plans have zero cost and solve frequency planning problem without violating the interference constraints. This AFP optimization trajectory of the cost function and the histogram of channel use associated with the frequency plan in FIG. 84 are presented in FIGS. 85, 86, 87, and 88, showing a graph in FIGS. 85 and 87 for the cost versus epoch for respective air-to-ground and ground-to-air, and a bar chart in FIGS. 86 and 88 showing the number of occurrences versus channel. The frequency is uniform across both air-to-ground and ground-to-air sets.

Figure 89:
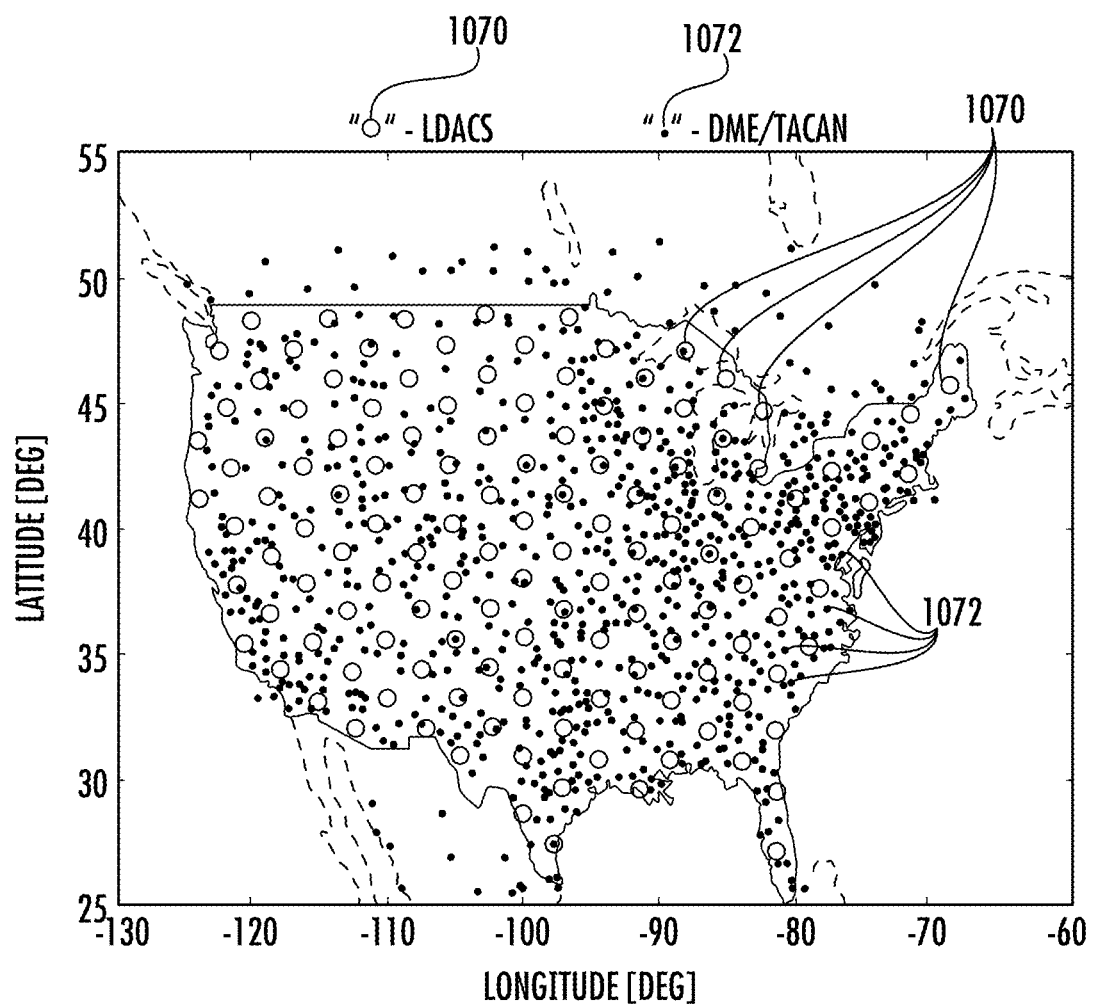
FIG. 89 is a map of the CONUS showing a nominal plan for the LDACS overlay in the 1 GHz aeronautical band.

The enhanced LDACS system is well suited for deployment within the 1 GHz ARNS band. From the link budget standpoint, the initial deployment requires about 150 base stations to cover CONUS. The overlay of the enhanced LDACS system onto DME/TACAN is shown in the map of CONUS in FIG. 89 shown by the larger circles 1070, the LDACS sites, and the DME/TACAN sites indicated by the periods at 1072. It is possible for 150 sites to geo-position as an alternative to GPS and provide about 80% of CONUS at an altitude of 18,000 feet and at about 95% of the CONUS at an altitude of 35,000 feet. The improvement of geo-location requires ground stations with smaller coverage radii. Within constraints of LDACS frequency allocation and current frequency assignment of DME and TACAN sites, it is possible to have zero cost frequency plans for both air-to-ground and ground-to-air links. This frequency plan considers deployment where a single LDACS channel is assigned to each site. This approach provides coverage and sufficient capacity for command and control. If there is a desire to increase the enhanced LDACS system capacity for user data, it is possible to either deploy smaller LDACS cells or allocate more than one channel per LDACS cell, or, both.

Enhanced LDACS System Deployment Using Contiguous Spectrum

As noted above, the enhanced LDACS system may include a nominal deployment of the LDACS within the Aeronautical Radio-Navigation Service (ARNS) frequency band (964-1215 MHz). This deployment assumes that there are no changes to the rules of the band. LDACS is deployed as a secondary service under conditions of strict non-interference with the existing systems. To ensure non-interference, the LDACS waveform is designed to occupy approximately 500 kHz of spectrum. Its spectral emission mask allows deployment of LDACS in-between two DME channels.

This type of approach is suboptimal from at least two standpoints. First, due to inverse duplexing scheme of the enhanced LDACS system and essentially the co-spectrum deployment between the LDACS system and DME, frequency planning requires that much of the spectrum is set aside as guard bands. Second, use of the 500 kHz waveform limits the data rate that may be achieved on a single LDACS channel. Within that standard, the data rate limit is around 2.5 Mbps, which is quite low from the standpoint of all contemporary wireless data systems, WiFi, 4G or 5G.

In an approach for the enhanced LDACS system, existing DME sites are frequency re-planned so that a portion of the spectrum is cleared for LDACS use. It has been demonstrated that this approach is technically viable. Furthermore, this approach is not at odds with the existing LDACS standard because this approach may be pursued without any requirements that the standard be modified. However, this approach would have to be supported by regulatory bodies, such as the FCC and FAA.

Figure 90:
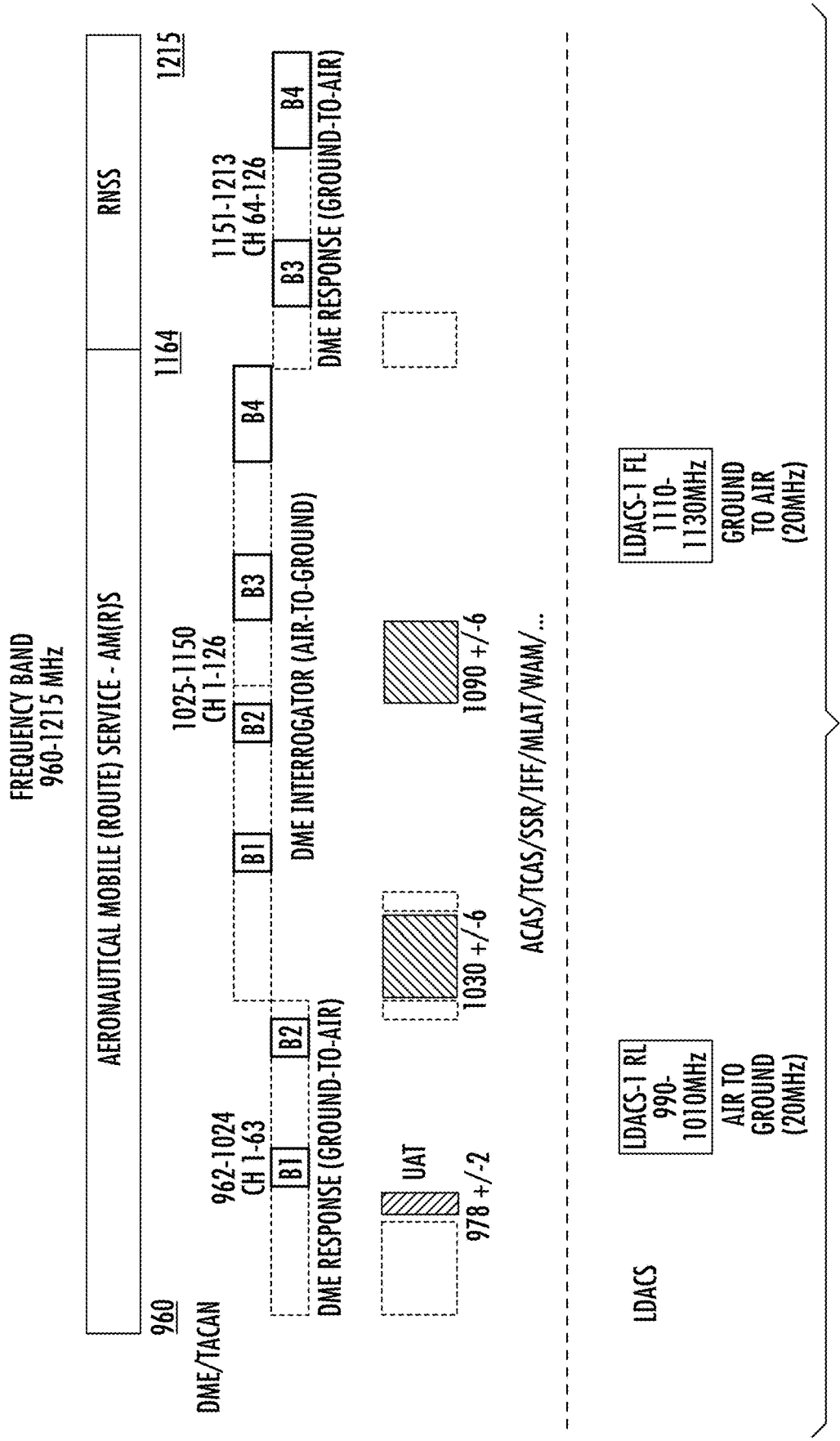
FIG. 90 shows the frequency band for the AFP.

A proposed spectrum allocation for the ARNS band, where some spectrum is cleared for the enhanced LDACS system deployment is presented in FIG. 90 where the DME/TACAN is replanned to free 20 MHz for the LDACS deployment.

This spectrum plan vacates 20 MHz for deployment of the enhanced LDACS system. This amount of spectrum is somewhat arbitrary. It is possible to deploy the enhanced LDACS system with less than 20 MHz of spectrum. However, a 20 MHz channel is aligned with common terrestrial systems, such as WiFi and 4G. Also, it should be adequate to provide a broadband experience comparable to what is experienced on the ground. The DME channelization may operate in accordance with DME-X channels. The DME-Y channels are rare in the current deployment, and DME-Z channels are not used. The enhanced LDACS system spectrum is selected to fit within the bands identified in the SESAR2020, PJ14-02-01 LDACS A/G Specifications, Aug. 16, 2019. For that reason, there are no changes to the standard. However, this enhanced LDACS system deployment will take 40 DME channels out of service as can be compared in Table 15.

TABLE 15

Account of ARNS Spectrum Utilization from the Viewpoint of DME-X Channelization

| DME Channels (Spectrum) | Use | Comment |
| --- | --- | --- |
| 1-18 (962-979 MHz DME G2A and 1025-1042 DME A2G) | Out of use. These channels are not in service due to UAT and SSR at 1030 MHz. | Not because of LDACS |
| 19-28 (980-989 MHz DME G2A and 1043-1052 MHz DME A2G) | Free DME-X channels | This is B1 in FIG. 14A |
| 29-49 (990 MHz-1010 MHz DME G2A and 1053-1073 MHz DME A2G) | Out of use. These channels are given to LDACS for A2G communication | |
| 50-59 (1011-1020 MHz DME G2A and 1074-1083 MHz DME A2G) | Free DME-X channels | This is B2 in FIG. 14A |
| 60-64 (1021-1024 MHz DME G2A and 1084-1087 MHz DME A2G) | Out of use. These channels are out of use due to SSR at 1090 MHz | Not because of LDACS |
| 65-69 (1025-1093 MHz DME A2G and 1151-156 MHz DME G2A) | Out of use. These channels are out of use due to SSR at 1090 MHz | Not because of LDACS |
| 70-85 (1094-1109 MHz DME A2G and 1157-1172 MHz DME G2A) | Free DME-X channels | This is B3 in FIG. 14A |
| 86-106 (1110-1130 MHz DME A2G and 1173-1193 MHz DME G2A) | Out of use. These channels are given to LDACS for G2A communication | |
| 107-126 (1131-1150 DME A2G and 1194-1213 MHZ DME G2A) | Free DME X channels | This is B4 in FIG. 14A |

Based on Table 15, channels available for DME/TACAN deployment are summarized in Table 16. As it may be seen, after allocation of 2 times 20 MHz for the enhanced LDACS system, there are 56 channels that are still available for DME/TACAN use. In order for the proposed approach to work, the enhanced LDACS system includes a frequency plan for the existing DME/TACAN sites using only 56 channels as shown in Table 16.

TABLE 16

Channels Available for DME Deployment

| Band | Channels | Number of Channels |
| --- | --- | --- |
| B1 | 19-28 | 10 |
| B2 | 50-59 | 10 |
| B3 | 70-85 | 16 |
| B4 | 107-126 | 20 |
| | Total | 56 |

Figure 91:
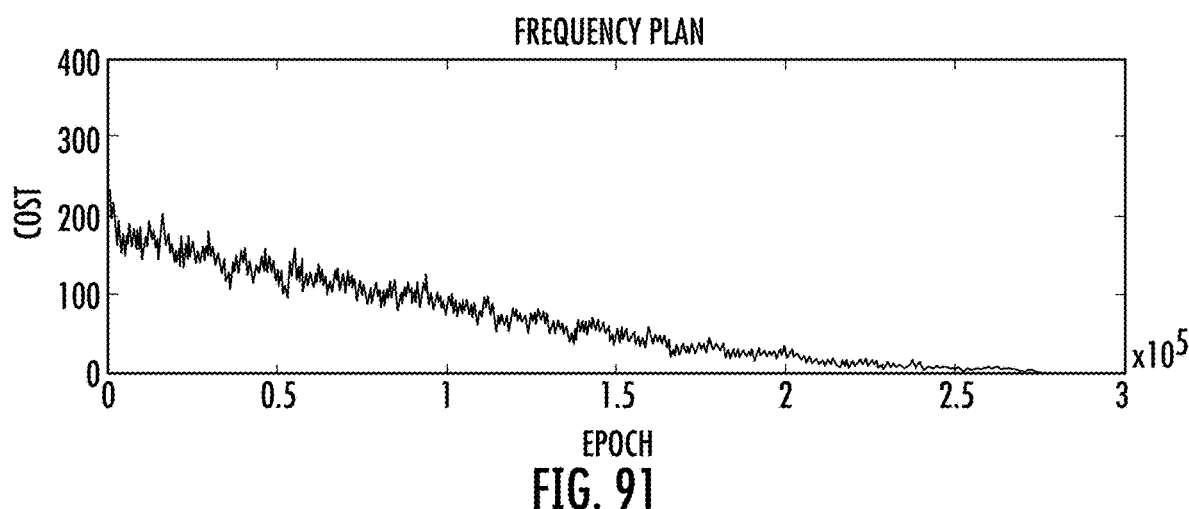
FIG. 91 is a graph showing the cost function versus the frequency plan.
Figure 92:
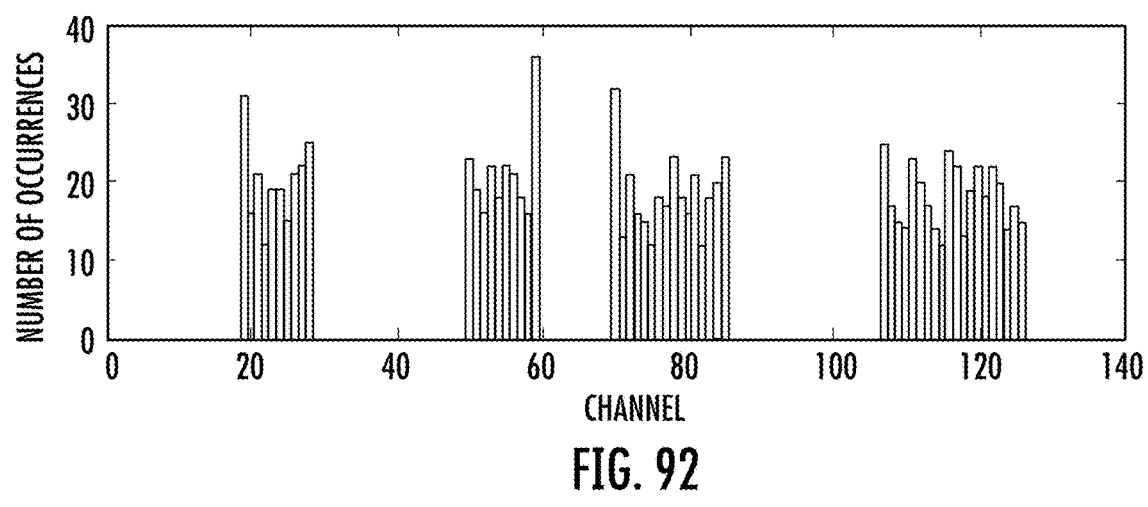
FIG. 92 shows the number of individual channels relative to the frequency plan.

An Automatic Frequency Planning (AFP) routine was used to devise a frequency plan for DME/TACAN sites using only channels from Table 16. The AFP routine re-plans DME/TACAN across the entire North America, e.g., Canada, US, and Mexico. The results of the AFP are illustrated in the proposed spectrum allocation of FIG. 90, and the graph and bar charts shown respectively in FIGS. 91 and 92. The decrease of the cost function (FIG. 91) and the frequency re-use of each individual channel (FIG. 92) are shown from Table 16. To replan all DME/TACAN sites within North America, each of the channels from Table 16 will used about twenty times. Given the size of the continent and the number of DME/TACAN sites, i.e., about 1070, this is not a very aggressive frequency re-use. The frequency planning is not overly constrained, and a solution may be found with relative ease. The gaps shown in the bar chart as a histogram of FIG. 92 are used for UAT, SSR (1090/1030 MHz) and in the enhanced LDACS system at 990-1010 MHz for air-to-ground and 1110-1130 MHz for ground-to-air. The minimum DME/TACAN co-channel separation is about 200 km.

Figure 93:
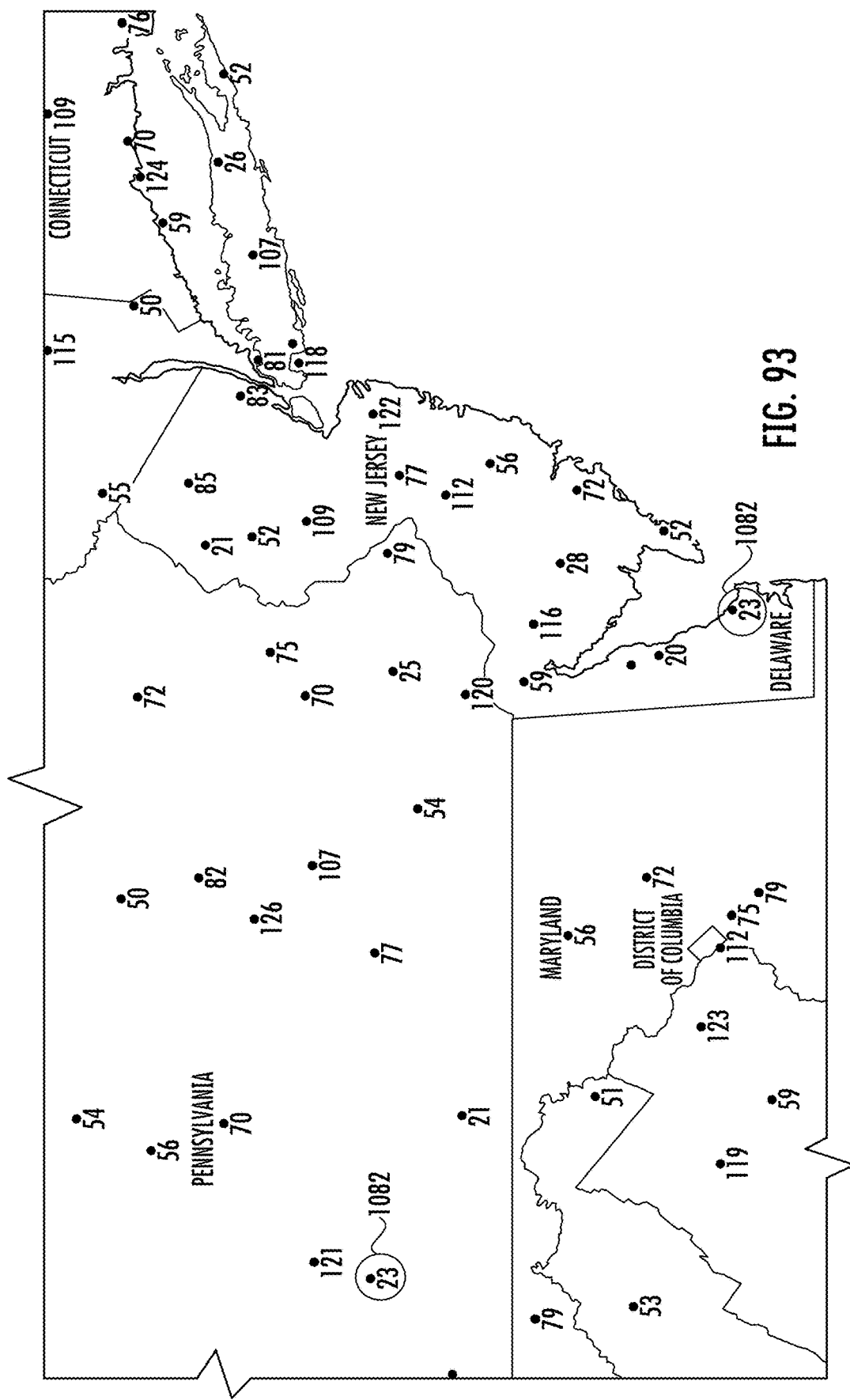
FIG. 93 is a map of the northeast section of the United States showing DME/TACAN sites.

FIG. 93 is a map of the northeast section of the United States, which is the area with the highest density of DME/TACAN sites. The re-use of frequencies is not very tight. Most of the frequencies are used only one time. However, there is some re-use. For example, channel 23 as shown in central Pennsylvania as indicated by the circled site numbered 1082 is re-used. However, the DME/TACAN sites using channel 23 are far from each other, where one of those sites is in southwest Pennsylvania and the other site is in south Delaware.

Having 20 MHz of available spectrum allows for two basic deployment options. In the first option, 20 MHz may be divided into individual 0.5 MHz channels, corresponding to 40 LDACS channels in the enhanced LDACS system. Using frequency re-use of N=7, as recommended by the SESAR2020 Standard, it is possible to have 5 or 6 LDACS channels per site. Through process of channel aggregation, it may be possible to achieve a throughput on the order of 12-15 MHz per site.

In the second deployment option, the enhanced LDACS system is deployed in a manner similar to LTE. In this option, each site uses the entire 20 MHz and the re-use scheme is N=1. Even though the enhanced LDACS standard has waveforms of larger bandwidths, the focus so far in the enhanced LDACS community has been on 500 kHz deployment. However, it is reasonable to expect that in this deployment option, the enhanced LDACS system may be as spectrally efficient as LTE or WiFi. Even in a conservative estimate, this could mean throughputs in excess of 50 Mbps per each LDACS site. In other deployment options, there may be hybrids of these options.

Alternative Positioning, Navigation and Timing within the Enhanced LDACS System

The enhanced LDACS system may use the LDACS standard defined MAC and PHY with modern cellular industry elements to provide Alternative Positioning, Navigation, and Timing (A-PNT) services as a component for the communications to an aircraft station. The FAA requires flight operations to be maintained in situations where GPS, or similar systems, become unusable.

Figure 94:
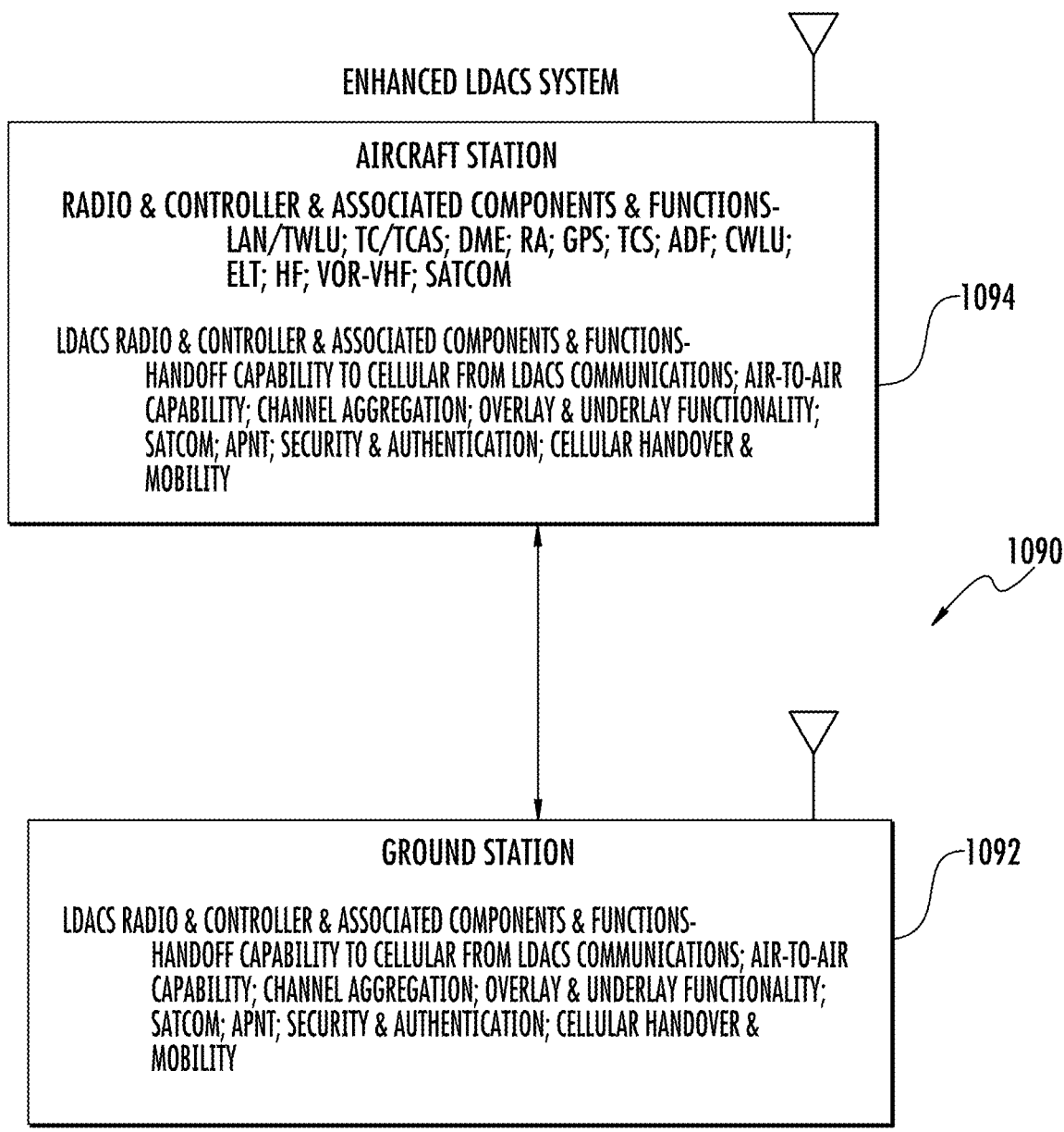
FIG. 94 is a block diagram showing the enhanced LDACS system and showing an aircraft station and different controllers and antennae and related components that may be used with the enhanced LDACS system.

Referring now to FIG. 94, there is illustrated the enhanced LDACS system generally at 1090. As noted before, the LDACS standards define two distinct system elements as the Ground Station (GS) and the Aircraft Station (AS) 1094. The ground station 1092 transmits the LDACS Forward Link (FL) signals and includes signaling to enable an aircraft station to detect, synchronize and decode the broadcast messaging to enable the aircraft station 1094 to establish a connection. The ground station 1092 serves as a gateway for any connected aircraft station 1094 to access services via a terrestrial network. The aircraft station 1094 includes the subscriber radio that is mounted on-board aircraft and includes the Forward Link (FL) receiver functionality and Reverse Link (RL) transmitter functionality, which detects, synchronizes to, and then establishes a connection with the local ground station 1092. The aircraft station 1094 provides access to the services available via a data connection with the ground station. Similar to cellular communication systems, an LDACS ground station 1092 continuously transmits and the LDACS aircraft station 1094 may perform pseudo-ranging on the ground station from these transmissions. If the aircraft station 1094 is able to receive transmissions from four or more ground stations 1092, then the aircraft station may determine its position in three-dimensional space, similar to GNSS (Global Navigation Satellite System), e.g. GPS or Galileo. The enhanced LDACS system includes capability to handoff to a commercial cellular provider or operate with LDACS underlay (U) and overlay (O) sites and communicate via satellite. The aircraft station 1094 is shown with different antenna systems and communication modules and components. Ground station 1092 components are illustrated.

As noted before, flight trials by DLR have demonstrated that an accuracy of approximately 15 meters is achievable in practice, which is better than the achievable accuracy of current DMEs (Distance Measuring Equipment). The required synchronization error can be achieved using affordable GNSS-disciplined, rubidium atomic clocks at the ground stations that have a small drift and can continue to function with sufficient accuracy for several hours in the case of a GNSS failure. To overcome an extended GNSS outage, other fallback methods for PNT (Positioning, Navigation and Timing) may be incorporated into the enhanced LDACS system along with a timing re-discipline mechanism that does not rely on GNSS. A technique for synchronization may rely on an atomic clock distribution network.

In order to supplement the PNT features of the enhanced LDACS system, the ground stations may be enhanced to transmit their physical location. The aircraft station may calculate its position within varying degrees of accuracy by calculating the time difference of arrival and angle of arrival for all ground stations within range. As the number of observed ground stations increases, the accuracy of the position measurement may increase as shown in FIGS. 95, 96, and 97 where three eNB's 1100, 1102, 1104 are illustrated. Case 1 (FIG. 95) with 1 eNB (E-UTRAN Node B), and case 2 (FIG. 96) with the more precise location of three eNB's 1100, 1102, 1104, and showing angle-of-arrival in case 3 (FIG. 97), showing the example of the Node B 1102 as a connection between nodes in a mobile phone network so that positioning takes advantage of LDACS stations, but may use commercial cellular systems.

A ground station positioning assist message may include range information to a set of neighboring LDACS ground station sites, and for each neighbor, may include acquisition information such as the channel, timing, offset and similar factors, and the distance from a serving ground station to a neighbor ground station site.

Alternatively, over time, a received signal strength heat map may be created from repeated ground station measurements. This environment is less likely to change over time compared to WiFi environments, or even cellular environments, and a precise map may be made for an aircraft pre-flight pattern to improve positioning measurements when fewer signals from fewer numbers of ground stations can be received.

Table 17 below shows the positional accuracy of different radio navigation systems.

TABLE 17

A Comparison of Various Radio Navigation System Accuracies

| System | 95% Accuracy (Lateral/Vertical) | Details |
| --- | --- | --- |
| LORAN-C Specification | 460 m/460 m | The specified absolute accuracy of the LORAN-C system. |
| Distance Measuring Equipment (DME) Specification | 185 m (Linear) | DME is a radionavigation aid that can calculate the linear distance from an aircraft to ground equipment. |
| GPS Specification | 100 m/150 m | The specified accuracy of the GPS system with the Selective Availability (SA) option turned on. SA was employed by the U.S. Government until May 1, 2000. |
| LORAN-C Measured Repeatability | 50 m/50 m | The U.S. Coast Guard reports "return to position" accuracies of 50 meters in time difference mode. |
| Differential GPS (DGPS) | 10 m/10 m | This is the Differential GPS (DGPS) worst-case accuracy. According to the 2001 Federal Radionavigation Systems (FRS) report published jointly by the U.S. DOT and Department of Defense (DoD), accuracy degrades with distance from the facility; it can be <1 m but will normally be <10 m. |
| Wide Area Augmentation System (WAAS) Specification | 7.6 m/7.6 m | The worst-case accuracy that the WAAS must provide to be used in precision approaches. |
| GPS Measured | 2.5 m/4.7 m | The actual measured accuracy of the system (excluding receiver errors), with SA turned off, based on the findings of the FAA's National Satellite Test Bed, or NSTB. |
| WAAS Measured | 0.9 m/1.3 m | The actual measured accuracy of the system (excluding receiver errors), based on the NSTB's findings. |

In order to achieve increased positional accuracy, it is possible to supplement the normal LDACS ground station with low cost, navigational beacon LDACS ground stations. Each navigational beacon LDACS ground station could broadcast supplemental navigation information on different frequencies or, in-order to prevent a significant frequency usage, transmit bursts of data allowing for multiple navigational LDACS ground stations to share a common frequency. These lower cost navigational beacon LDACS ground stations would not only aid in position accuracy, but would also help with positional integrity by increasing the number of LDACS ground stations for redundant ranging. Navigational beacon LDACS ground stations may lower cost by potentially eliminating the entire receive chain as the navigational beacon LDACS ground stations will not interact with aircraft stations, use lower transmit power, and use simpler antennas. Furthermore, operational expenses should be reduced by installing navigational beacon LDACS ground stations on buildings, water towers, and similar structures instead of using proper towers, which is a significant cost.

There is development of a suitable positioning algorithm. A positioning algorithm used by LDACS receivers on the aircraft may be developed. This algorithm may exploit the waveform structure of the LDACS signal, timing organization, broadcast messages, and many other characteristics of the ground transmission. The LDACS system is primarily intended for Air Traffic Control (ATC) communication, but support the needs of A-PNT the system should deploy a sufficient number of sites. Everywhere in the airspace of interest the aircraft station needs to see enough LDACS sites so that the position calculation is possible. As a result, the system may deploy more sites than what is required for communication needs. Not all of deployed sites have to be communication sites. Some of them may just be beacon sites that are used exclusively for A-PNT. Such sites require no backhaul and they may be miniaturized and manufactured at significantly lower cost than regular sites.

It is possible to use smaller localized signals as references for channel estimation and more precise ranging characteristics and this may be helpful versus the large booming towers in other location systems. Integrity may be provided by redundant ranging similar to Receiver Autonomous Integrity Monitoring (RAIM) and perform redundant ranging in situations where more than four ground stations are visible. The LDACS location may be compared against RF ranging measurements and the minimal number of LDACS ground station may be employed as an LTE monitor. The enhanced LDACS system may estimate the channel characteristics and RF propagation path. If a particular channel is experiencing issues, then one of the other signals may be used for ranging. This may be less effective, however, than the under canopy system as described.

Positional integrity is an important aspect of aviation positioning systems, and is the measure of the trust that can be placed in the correctness of the information supplied by a navigation system. Integrity includes the ability of the navigation system to provide timely warnings to users when the system should not be used for navigation. GPS integrity systems include Receiver Autonomous Integrity Monitoring (RAIM) and Wide Area Augmentation System (WAAS). The enhanced LDACS system positioning as described benefits from redundant ranging in situations where more than four ground stations are visible to determine if any of the ground stations are having channel issues which would lead to position error. The extra navigational beacon LDACS ground stations will improve navigation. It is possible to broadcast more detailed ground station information, including but not limited to, antenna characteristics such as angle and elevation, both above ground level (AGL) and mean sea level (MSL), allowing an RF ranging measurement that provides another technique for integrity.

LDACS ground stations may operate as an LDACS/LTE monitor and create a WAAS or RAIM like system using LDACS/LTE system and be applied to any form of communication, i.e., not limited to LDACS, to any type of aircraft such as UAS. RAIM systems for cellular positioning have been examined and this could be extended to LDACS. The LDACS ground station knows its precise location either through a highly accurate survey at time of install, or by listening to other systems such as LTE to determine its precise location. Initial position and timing could be done through GPS or potentially with a network synchronization via IEEE 1588 as a precision time protocol. The LDACS ground station compares its precise location to calculated positions from other LDACS ground stations and determines correction factors and integrity checks. These values could be broadcast from the ground station or transmitted back to a main data server, which sends correction values over an LDACS communications link to eliminate the need for using an extra channel at the airport.

There may be some resolution of the timing advance in the enhanced LDACS system. The resolution may need to be increased to improve the positioning resolution for the aircraft station. It is possible to use multiple radio access technology (RAT) receivers to improve resolution at lower altitudes and transition to a cellular receiver below a certain altitude. LTE resolution is able to meet e911 accuracy requirements. The receiver may be passive and may not need to have any active service requirements.

The ground station link information message may provide improved timing advance resolution to the aircraft station. The ground station may measure the round trip time used for calculating timing advance and the timing advance value may be reported to the aircraft station for limited resolution that is sufficient to maintain the length. The additional timing resolution may be provided to the aircraft station via a new message or extend the LDACS message. There may be additional messaging and parameters that are exchanged from the ground action to the aircraft station.

A-PNT Systems for Aeronautical Use and LDACS

As noted before, in aeronautical applications, navigation and positioning are predominantly based on L1 GPS signals. The aviation community accepts that there should be an A-PNT to L1 GPS. The A-PNT should be a terrestrial system.

Currently, the A-PNT services are based on mostly DME/DME and VOR/DME. There is a working group under SESAR that is investigating "Alternative Positioning, Navigation and Timing, A-PNT" (PJ14-03-04). The requirements for A-PNT are split into three main categories: (1) support for navigation; (2) support for ADS-B Out; and (3) provisioning of timing reference for on-board systems. The principal application in each category and relevant performance requirements are provided in Table 18.

TABLE 18

A-PNT Requirements

| Application category | Short term requirement | Long term requirement |
|---|---|---|
| Navigation | RNP 1 (P-RNAV) | RNP 0.3 |
| ADS-B | N/A | ADS-B RAD 3 nm separation |
| Time reference | 1 s (w.r.t UTC) | 1 s (w.r.t UTC) |

RNP = Required Navigation Performance
ADS-B RAD = ADS-B in RADar space

In the current stage, the scope of A-PNT is limited to continental en-route and Traffic Management Advisor (TMA) phases of the flight. A-PNT should support the performance level required for most demanding applications covering en-route and TMA phases of flight. Nevertheless, these requirements are lower than what is achievable through GNSS.

It is possible to use DME/DME, Multi-DME, eLORAN and LDACS. It is expected that a selected technology will integrate with aircraft inertial systems. Performance of L1-GPS is provided in Table 19 as taught by the Global Positioning System Standard Positioning Service Performance Standard, 5th Edition, April 2020. The performance of A-PNT needs to be at least close to L1-GPS.

TABLE 19

The GPS Standard Positioning Service (SPS) Error Limits

| Type of error | Global average 95% of time | Worst site 95% of time |
|---|---|---|
| Horizontal position error | 9 m (30 ft) | 17 m (56 ft) |
| Vertical position error | 15 m (49 ft) | 37 m (121 ft) |

DME has been studied for DME range accuracy. Modern DME equipment routinely exceeds initial technology specifications. A DME performance measurement campaign has been conducted and the results were reported in the article by Vitan et al., "Assessment of Current DME Performance and the Potential to Support a Future A-PNT Solution," (2015). During this trial more than 800,000 valid DME ranges were collected from over 100 ground stations installed in France and its neighboring countries. The analysis of the data concluded that the 95% bounds (2σ) for the error distribution of the aggregated dataset are lower than 0.1 nautical miles (NM) (~180 m). This is two times smaller than the most stringent standard requirement of 0.2 NM, at least for systems not used for approach procedures. DME/DME has some accuracy. The data set evaluated in Vitan et al. was used to access the accuracy of DME/DME positioning. It was observed that the actual DME/DME accuracy was better than the standard's performance baseline by a factor of two, as it can be anticipated on the basis of the actual range accuracy. These results led to the conclusion that current transponders could support Total System Error (TSE) values down to 0.5 nautical miles (NM), assuming a Flight Technical Error (FTE) allocation of 0.25 NM, for the typical subtended angle range used by Flight Management Systems (FMS's) of 30 to 150 degrees. Even lower TSE values may be obtained for tighter subtended angle limits.

Research has been conducted by Vitan et al., "Research on Alternative Positioning Navigation and Timing in Europe" (2018), and the DME/DME navigation meets RNP 1 requirements over en-route and TMA air spaces. Efforts are underway to codify DME/DME as A-PNT system. DME evolution includes so called "passive ranging." In passive ranging, DME sends pseudo random pulses from a ground station that are not responses to interrogation. If the aircraft receives signals from at least three DME ground stations it may use TDOA to compute its location. However, for passive ranging, ground stations need to be mutually synchronized. Passive ranging solves capacity issues associated with DME systems, i.e., it may serve unlimited number of aircraft. Most aircraft have dual multichannel DME receivers capable of tracking 6-10 different DME ground stations. The multi-DME utilizes this redundancy to process more than 2 DMEs. The approach is especially useful around large airports where one finds many DME ground stations. However, the methodology is still under development and evaluation.

Alternative Positioning, Navigation and Timing in the Enhanced LDACS System Based on LDACS and Long Range Navigation Research has been conducted with eLORAN, which stands for enhanced LOng-RAnge Navigation. The system introduces advancement in receiver design and transmission characteristics, which increase the accuracy and usefulness of traditional LORAN/LORAN-C. With reported accuracy as good as ±8 meters, the system is competitive with unenhanced GPS. eLORAN also includes additional pulses, which can transmit auxiliary data such as Differential GPS (DGPS) corrections. These enhancements make eLORAN an A-PNT when GPS is unavailable or degraded. eLORAN is a low-frequency radio navigation system that operates in the frequency band of 90 to 110 kHz. According to Vitan et al., eLORAN meets RNP 0.3 requirements for accuracy, availability and integrity. It may be used to support both en-route and non-precision approach and eLORAN is built upon LORAN-C. It adds additional data channel (LDC) to convey corrections for major error sources.

Figure 98:
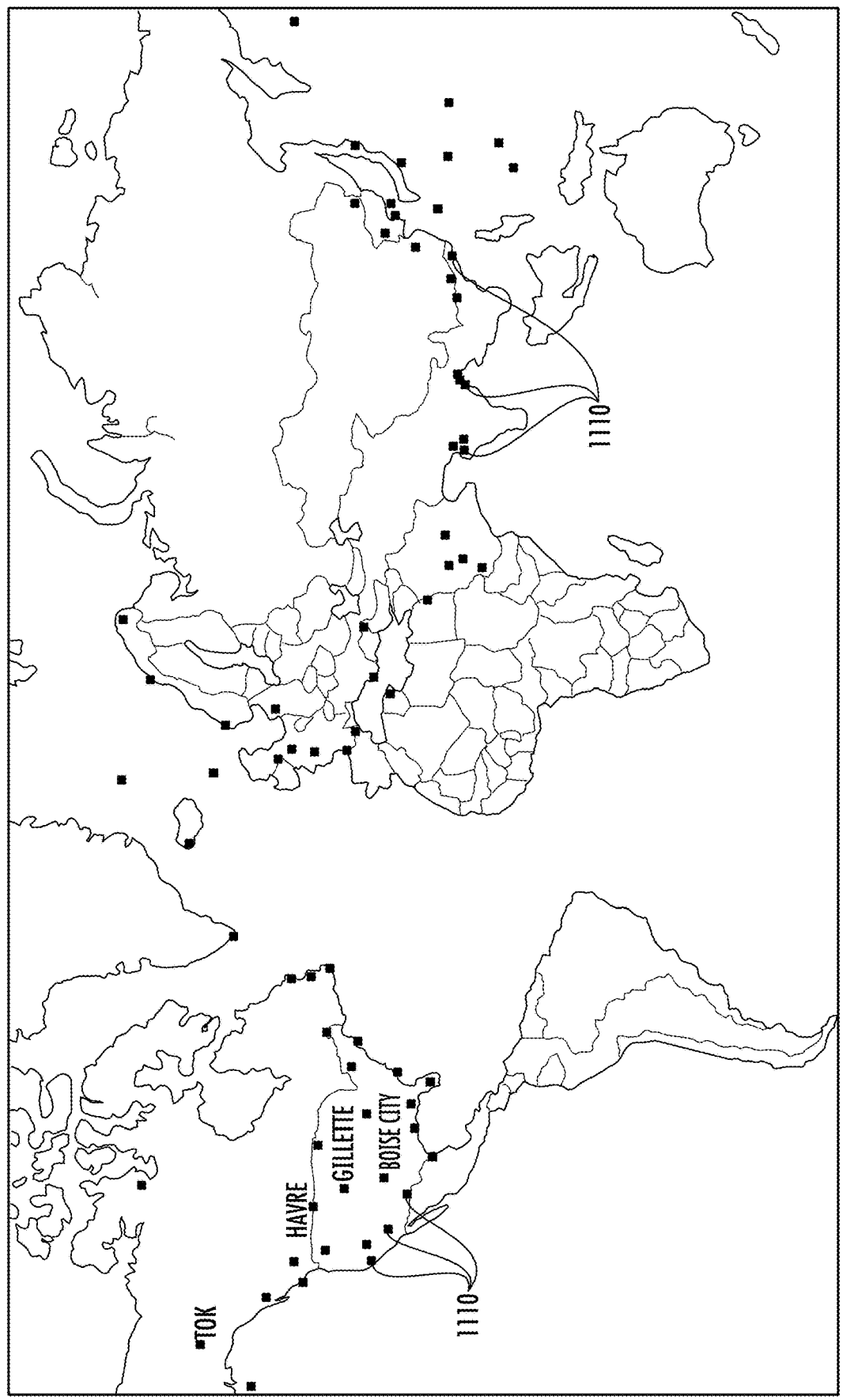
FIG. 98 is a world map showing different existing or proposed LORAN-C or eLORAN stations.

Further improvement of eLORAN may be achieved through ground-based augmentation and using ground stations for differential correction. eLORAN is difficult to jam. The transmit powers of eLORAN stations are in the range of 100-1000 kW (80-90 dBm). As a comparison, GPS satellites radiate approximately 100 W (50 dBm). An example location of LORAN stations is shown in FIG. 98, which are shown by the dots labeled at 1110. The coverage is not global. USA, Europe, Middle East (Saudi Arabia), and southeast Asia are covered. The systems in Norway and France may already be turned off. eLORAN may be used to recover UTC timing with accuracy of 50 ns. There are commercial receivers that integrate GNSS and eLORAN.

On two occasions, in 2008 and 2015, the US government announced its commitment to eLORAN as a backup to GPS. Also, the President's PNT Advisory Board has repeatedly recommended and endorsed eLORAN. In 2014, Congress prohibited further dismantling and disposal of Loran-C facilities until the government had decided and implemented a backup system for GPS. In late 2019, Hellen Systems and its integrator L3Harris Technologies, Inc. were awarded a contract to demonstrate functioning of eLORAN to the Department of Transportation (DOT). The demonstration of Hellen's next-generation solution may include a solid-state eLORAN transmitter from Continental Electronics Corp. integrated with advanced timing and frequency products from Microsemi Corporation, as a subsidiary of Microchip Technology, Inc.

UrsaNav supplies eLORAN and low-frequency technology for very wide-area, GPS-independent, PNT data and frequency services. UrsaNav was selected by the Volpe Center as part of the Department of Transportation to demonstrate wide-area UTC time synchronization and distribution utilizing the former LORAN site in Wildwood, N.J. The demonstration will be conducted at one of the Volpe Center sites at Joint Base Cape Cod in Massachusetts or the Langley Research Center in Langley, Va. Either site may be used in the demonstration as eLORAN signal transmissions from the Wildwood site can easily cover 700 miles or more. The demonstration should happen in 2020. Based on recent activities, that USA government plans to keep eLORAN as a fundamental backup A-PNT system for GPS. The chief sponsor of the efforts seems to be US Department of Transportation.

Figure 99:
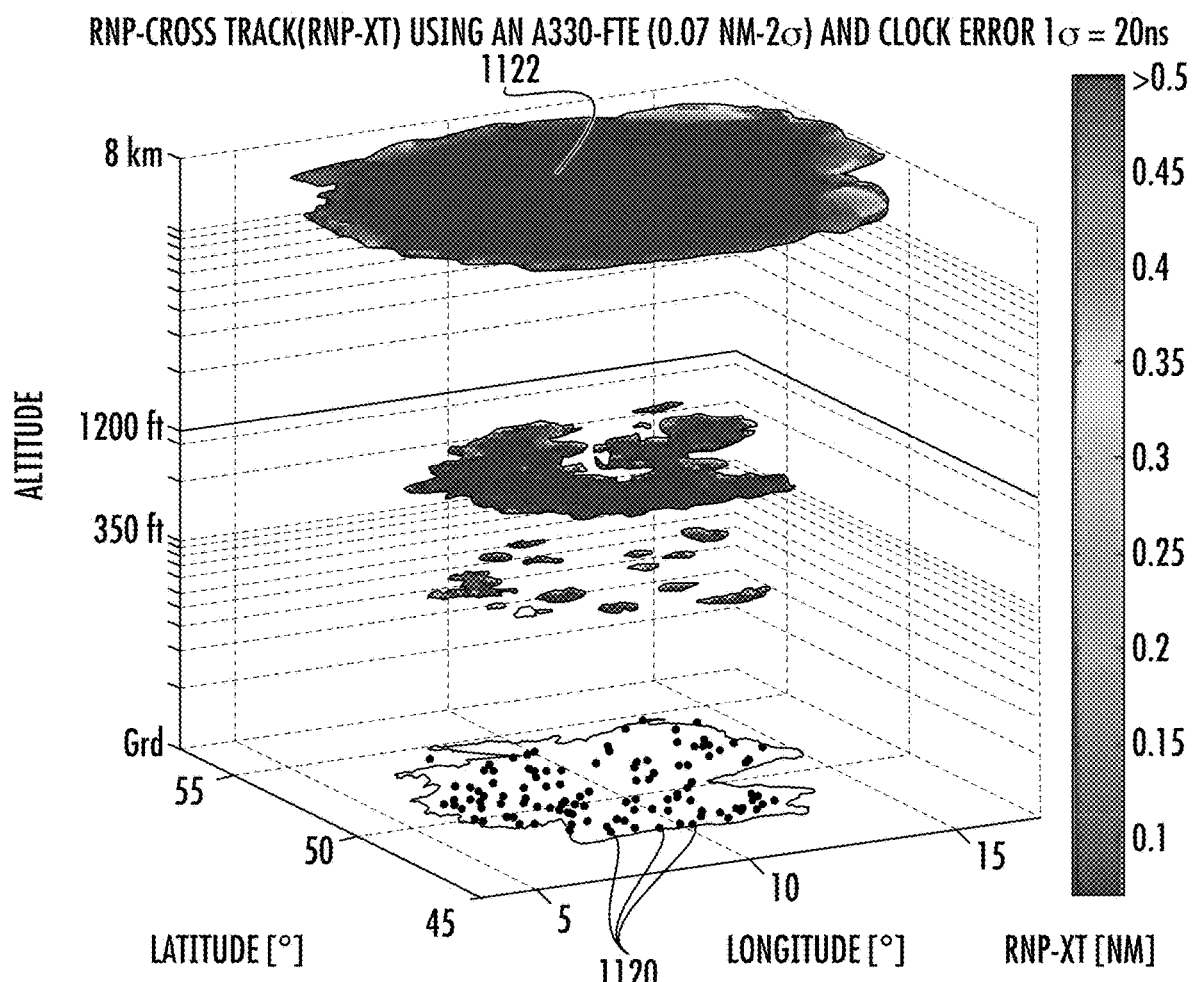
FIG. 99 is a 3-D chart showing the accuracy simulation of an LDACS based Alternate Positioning, Navigation and Timing (A-PNT) of the enhanced LDACS system.

The enhanced LDACS system is enhanced for positioning above what DLR (German Aerospace Center) has accomplished in 2013, where DLR conducted a flight trial using 4 LDACS stations located approximately 50 km apart. The tests were done in German airspace. The synchronization error between the ground stations was smaller than 20 ns. It was claimed in Vitan et al. that location calculations used the approach outlined in Nossek et al., "A Direct 2D Position Solution for an APN-T System (2015). No specific details of the actual algorithm were given, however. The simulation of LDACS' A-PNT accuracy is shown in FIG. 99 and taken from Vitan et al. The label 'Grd' at the left hand X,Y,Z axis intersection shows ground level. The numerical indicia on the right column are referenced to the cloud structure. The dots indicated at 1120 on the lower section of the graph represent location of LDACS cells. There are 159 stations covering the entire territory of Germany. LDACS stations are placed at locations of current DME ground stations, which may not be optimum from either interference management standpoint or from the standpoint of location accuracy.

The location accuracy may be assessed at three aircraft altitudes: 350 feet, 1,200 feet and 8 km. The synchronization error is assumed smaller than 20 ns. At low altitudes, accurate positions may be obtained only in limited number of locations. However, in places where the location could be obtained, the accuracy is good. It is 0.1 NM or better as shown at the shaded areas. As the altitude of the aircraft increases, the area over which good accuracy may be obtained becomes larger.

Referring again to the graph of FIG. 99, at the altitude of 8 km, the entire area of Germany is covered shown by the upper slow structure 1122 with the RNP-XT [NM] of about 0.1. The location accuracy better than 0.1 NM could be achieved over the entire country. According to Vitan et al., the performance at 8 km is better than what could be achieved with DME systems. The results shown in the graph of FIG. 99, on the other hand, assume that receiver evaluates all available LDACS signals. Therefore, presented results establish the upper limit on performance. In real world scenarios, however, the limited processing power of the receiver must be taken into account. This likely imposes the limit on the number of LDACS channels that could be used at the same time. There is a proposal to develop a hybrid system that uses LDACS and DME. The result was simulated and presented to ICAO in November 2015. Simulations indicate position accuracy better than 100 meters over most of the continental Europe. The simulation used existing 787 DME and 69 LDACS sites.

A comparison may be made between the proposed systems against A-PNT requirements. Table 20 provides comparison of the proposed A-PNT systems and their capabilities against stated requirements.

TABLE 20

Comparison of A-PNT Capabilities and Requirements

| Application category | Short term requirement | Long term requirement | DME based | eLORAN | LDACS |
|---|---|---|---|---|---|
| Navigation | RNP 1 (P-NAV) | RNP 0.3 | YES | YES | YES |
| ADS-B | N/A | ADS-B RAD 3 nm separation | NO | NO | YES |
| Time reference | 1 s (w.r.t UTC) | 1 s (w.r.t UTC) | YES (passive ranging) | YES | YES |

A-PNT systems require a solution for a non-GPS based timing reference. In the present form, DME systems are asynchronous. However, to deal with the requirement for increased capacity, a system may need to transition to passive ranging. In passive ranging, ground transmitter synchronization is required. This synchronization would have to be better than 30 ns. eLORAN is built to provide timing reference that is independent of GPS and within 100 ns of the UTC time. Measurement campaigns have demonstrated that current systems have time accuracy that is better than 50 ns as noted in Johnson et al., "An Evaluation of eLORAN as a Backup to GPS," (2007). There are multiple reports that state that, for the purposes of timing reference, eLORAN represents a viable alternative to GPS as noted in Johnson et al. The LDACS standard requires that ground stations be synchronized. At the current time, there are no solutions accepted for this synchronization. The LDACS tests performed by DLR, which are the only example of LDACS system deployment, used manual synchronization of ground stations using the Rb atomic clock as noted in Shutin et al., "LDACS1 Ranging Performance—An Analysis of Flight Measurement Results" (2013).

Out of the three proposed A-PNT approaches, the enhanced LDACS system meets all requirements because of its capability of supporting ADS-B. However, use of LDACS in navigation and timing reference requires the solution of two important technical challenges. The first challenge is timing reference and synchronization of LDACS ground stations. The second challenge is the position estimation algorithm. The enhanced LDACS system may support ATC communication services, but also, deploy a sufficient number of ground stations to enable positioning calculations.

Use of the enhanced LDACS system for A-PNT faces three technical challenges, listed as: (1) synchronization of LDACS ground stations; (2) development of a suitable positioning algorithm; and (3) a network or system deployment.

Figure 100:
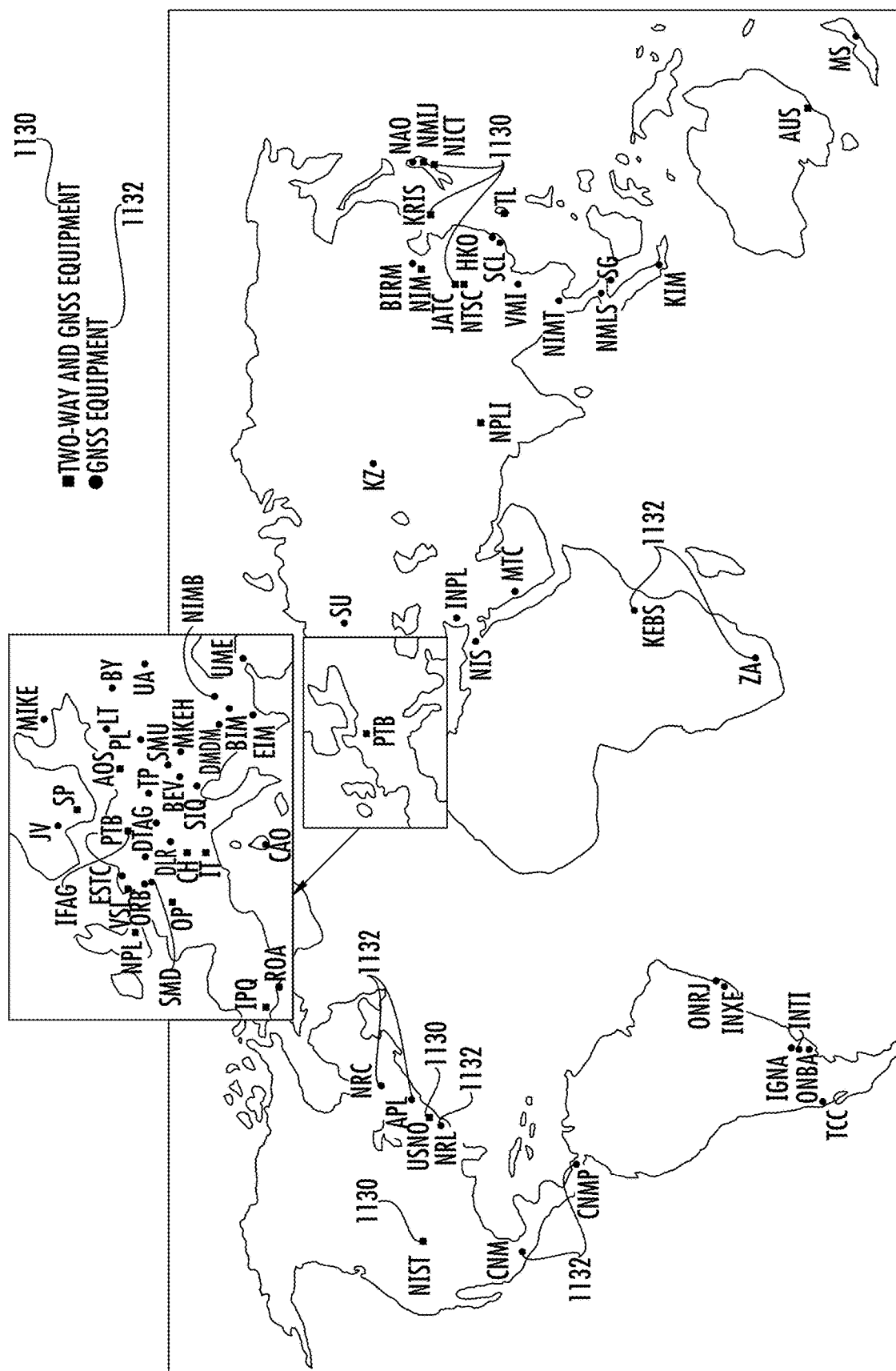
FIG. 100 is a world map showing the location of laboratories that synchronize with TAI (International Atomic Time).

It should be understood that there is synchronization of LDACS ground stations. LDACS ground station synchronization may be achieved in two ways: wireline or wireless. Wireline synchronization implies that LDACS obtains timing from one of the atomic clock distribution sites. The map of these sites may be obtained from Bureau International des Poids et Measures (BIMP) as shown in FIG. 100 where two-way and GNSS equipment are labeled 1130 and GNSS equipment are labeled 1132. There are several sites in the United States that provide the atomic clock based timing reference. The enhanced LDACS system may use these sites and some form of clock distribution technology, e.g., IEEE 1588, to achieve a system wide synchronization.

An alternative to the wireline synchronization is wireless synchronization. An example of a wireless timing reference for the enhanced LDACS system is shown generally at 1140 in FIG. 101. The system 1140 combines a GPS receiver 1142 and an eLORAN receiver 1144. Position data 1146 is taken in and the position calculation is made 1148 with additional data from ASF maps 1150 and input into the decision algorithm 1152. The output of the system as a resilient PNT output 1154 is used for synchronization of LDACS stations. If GPS is present, the synchronization is obtained from the GPS receiver 1142. This may be redundant as the aircraft receives the same GPS signal. However, the GPS signal at the ground station may be used for fine calibration of Additional Secondary Factors (ASF) maps 1150. In the case of the GPS outage, the decision algorithm 1152 switches to positioning based on eLORAN via the eLORAN receiver 1144.

The enhanced LDACS system, in an example, may be globally synchronized using eLORAN signals. By its design, eLORAN has ability to deliver timing that is within 100 ns of UTC, and it has even been demonstrated using measurement that the timing obtained from eLORAN may have better accuracy than 50 ns. Each LDACS ground station shown at 1160 in FIG. 101 may be equipped with the dual mode receiver. A LDACS ground station 1160 may receive signals from several eLORAN stations indicated at 1162. The LDACS ground station controller (GCS) 1164 knows its own location and by processing received eLORAN signals, the LDACS ground station 1160 may synchronize its internal clocks. Previous LDACS trials from DLR had required precise synchronization of LDACS stations at better than 20 ns. Such tight synchronization was necessary since actual LDACS waveforms were used for ranging. However, in this example of the enhanced LDACS system, the aircraft 1166 does not use the LDACS waveform for triangulation, and therefore, the synchronization does not have to be as tight as in the DLR trials.

A-PNT Solution Based on the Enhanced LDACS System and eLORAN

In these positioning systems, the ground station layout needs to achieve favorable Horizontal Dilution of Precision (HDOP) values over the area where the enhanced LDACS system provides alternative positioning, navigation and timing services. The enhanced LDACS system addresses the LDACS ground synchronization and the aircraft positioning algorithm by combining LDACS communication capabilities with the A-PNT support from eLORAN.

Referring again to FIG. 101, the hybrid GPS/eLORAN receiver formed by the combination 1142, 1144 that may be used in the enhanced LDACS system 1140 is illustrated. The hybrid GPS/eLORAN receiver 1142, 1144 uses GPS or other GNSS service when these services are available. However, when there is a GNSS outage, the decision algorithm module detects the outage and starts using the eLORAN system for position, navigation and timing (PNT).

Figure 101:
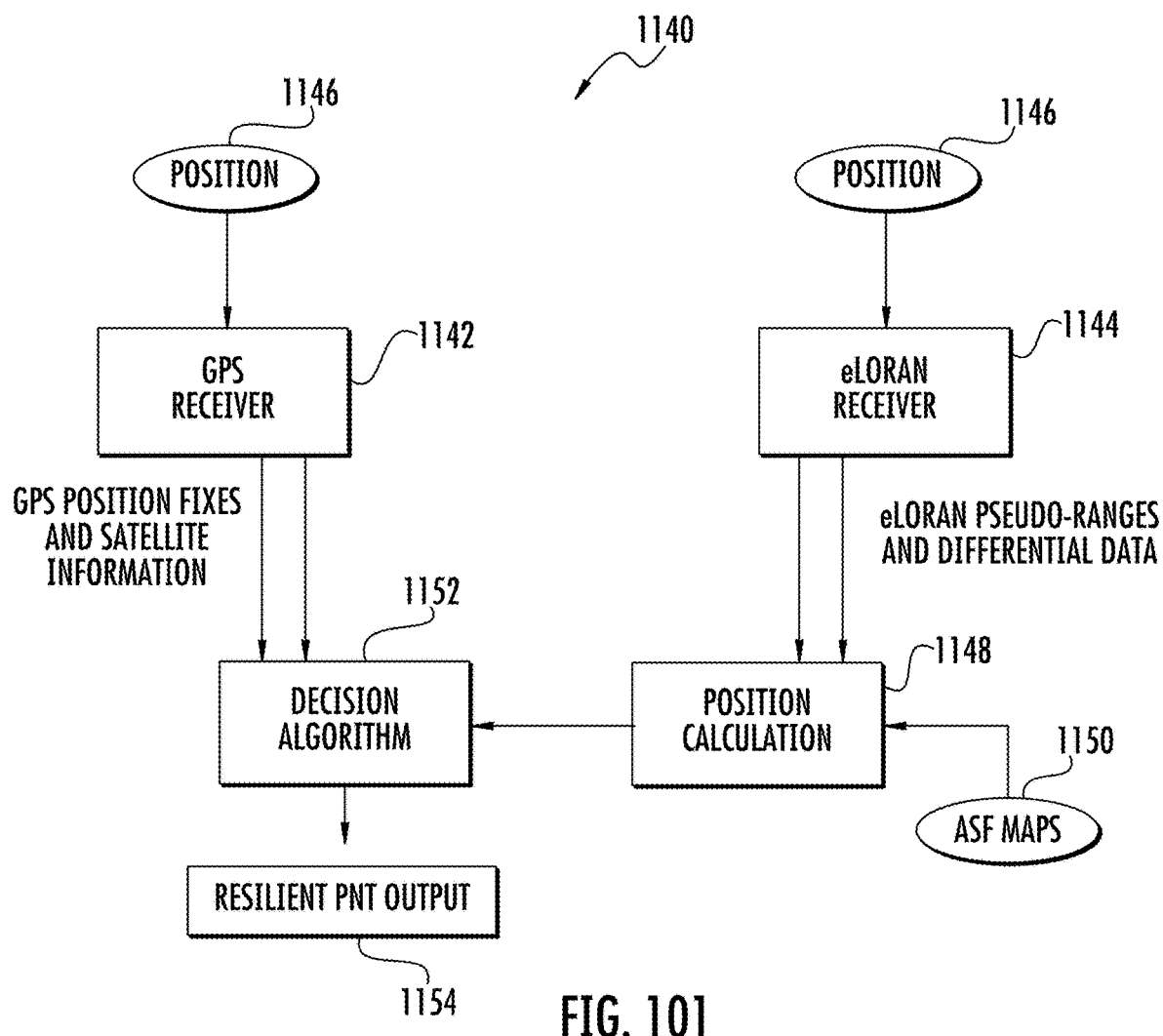
FIG. 101 is a block diagram of a dual mode receiver that may be used for both GPS and eLORAN.

At the "Resilient PNT output" 1114 shown in FIG. 101, the receiver 1142, 1144 provides PNT in the same format whether the PNT is obtained using GNSS or eLORAN. The most significant challenge for the enhanced LDACS system 1140 shown in FIG. 101 is the accuracy of eLORAN's portion of the receiver. The eLORAN positioning calculation is based on the propagation delays from fixed locations of eLORAN ground stations to the receiver. The eLORAN radio signals propagate in the vicinity of the ground and through Earth's atmosphere. As a result, its propagation speeds are not equal to the speed of light in vacuum. The differences are small but significant enough to make eLORAN less accurate than GNSS. The propagation speed of eLORAN signals depends on atmospheric conditions, which are subject to constant weather-based fluctuations.

To compensate for the changes in the atmosphere and the resulting changes in the radio signal, eLORAN systems use Additional Secondary Factors (ASF) maps, which are created for each eLORAN site. ASF maps are obtained through extensive calibrations of the site to compensate for variable propagation speed. When ASF maps are used, the eLORAN system meets RNP 0.3 navigation requirements corresponding to calculating position to within a circle with a radius of 0.3 nautical miles (NM). An accuracy better than 8 meters has even been observed.

An aircraft station may perform its position estimation using the dual mode receiver 1142, 1144 (FIG. 101). In the absence of GPS, the location estimation may be done using an eLORAN based Alternate Positioning, Navigation and Timing of the enhanced LDACS system. To achieve the required accuracy, the aircraft station 1166 will require the appropriate ASF maps, which may be delivered to the aircraft station via the enhanced LDACS system as shown in FIG. 102.

Figure 102:
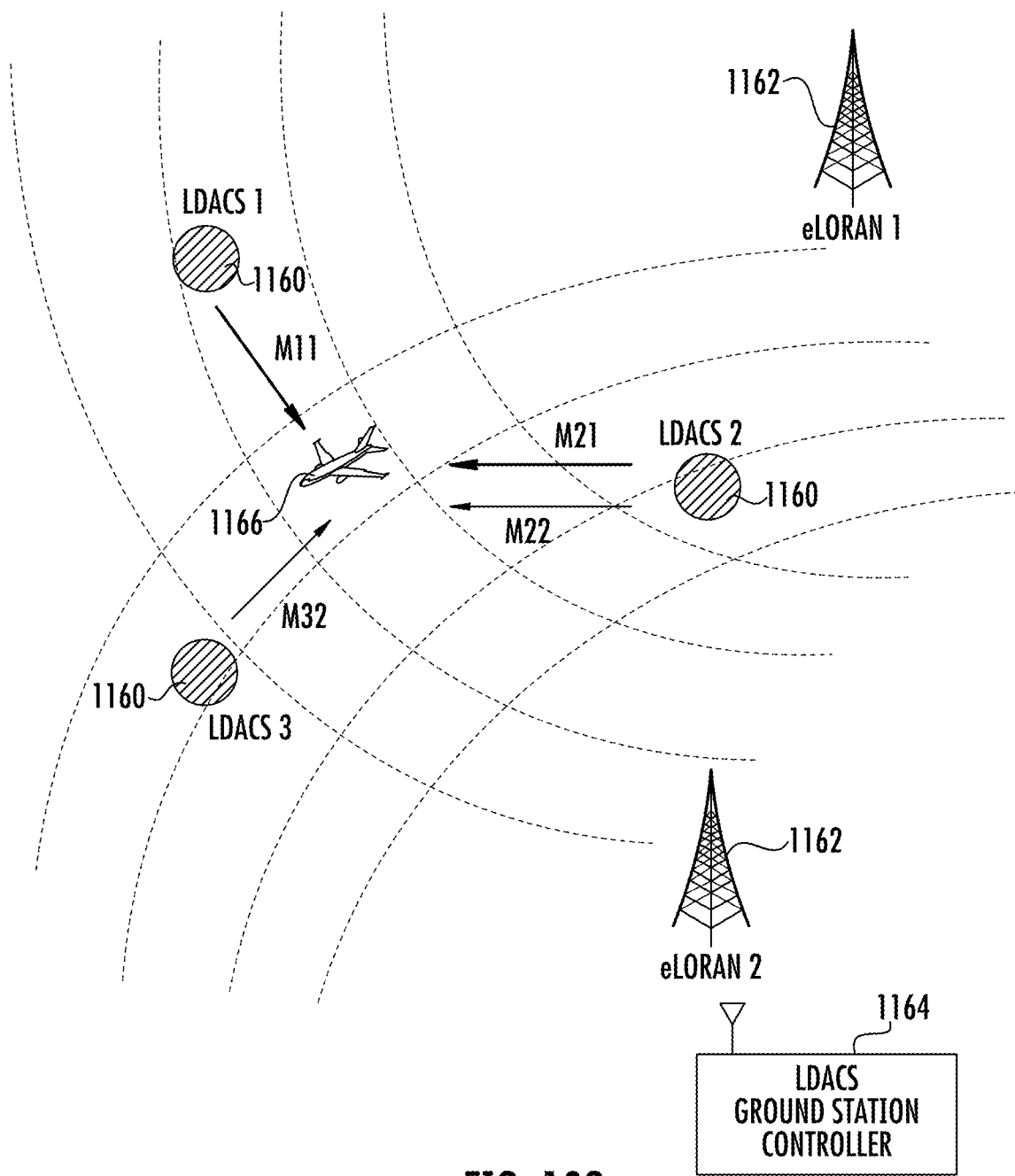
FIG. 102 is a schematic representation of the enhanced LDACS system using eLORAN to assist in Positioning, Navigation and Timing.

As shown in the example of FIG. 102, a flying aircraft station 1166 is within the coverage area of two eLORAN stations 1162 indicated as eLORAN 1 and eLORAN 2 and three LDACS sites 1160 indicated as LDACS1, LDACS2 and LDACS3. Using signals that it receives from eLORAN sites, the aircraft station 1166 may determine its location. The accuracy of this location determination, however, is dependent on the accuracy of the ASF maps that are available to the receiver at the aircraft station 1166. A set of accurate maps may be provided to the receiver via the broadcast channels of neighboring LDACS ground stations 1160. These stations 1166 are in the relative vicinity of the aircraft station and they are at a fixed location.

The distances between the LDACS ground stations 1160 and eLORAN sites 1162 are constant and known. Therefore, LDACS ground stations 1160 may determine ASF maps that are valid in their vicinity. Along its geographical location, each LDACS ground station 1160 may broadcast the ASF maps that are valid for its coverage area. The aircraft station 1166 may then combine these maps and use them to improve location accuracy. In the example shown in FIG. 102, the aircraft 1166 receives four different maps: 1) M11-ASF map for eLORAN 1 in the coverage area of LDACS1; 2) M21-ASF map for eLORAN 1 in the coverage area of LDACS2; 3) M22-ASF map for eLORAN 2 in the coverage area of LDACS2; and 4) M32-ASF map for eLORAN 2 in the coverage area of LDACS3. Knowing its approximate location relative to LDACS and eLORAN, the aircraft 1166 may use an ASF map to refine its location estimate. Because this estimate is based on almost real time calibrated ASF maps, the accuracy will be comparable with GNSS.

The enhanced LDACS system coupled with eLORAN is advantageous and uses the dual mode GNSS/eLORAN receiver shown in FIG. 101, which is used on both the LDACS ground station and on the aircraft station. In the presence of GNSS, this dual mode receiver uses satellite positioning, but in the absence of GNSS, the dual mode receiver uses eLORAN based positioning.

LDACS ground stations use the dual mode receiver to synchronize their transmission. The synchronization, however, comes from LDACS standard. The synchronization is not required for A-PNT because the LDACS waveform is not used for ranging. The LDACS ground stations use their knowledge of the locations for eLORAN stations and their own geo-coordinates to estimate up-to-date ASF for their coverage area. These maps are transmitted on the LDACS broadcast channel. The maps are received by the flying aircraft station, which receives multiple eLORAN signals, e.g., at least two, and multiple ASF maps, e.g., at least one per eLORAN site. eLORAN signals are used for location estimation and the maps are used to achieve higher location accuracy. The location estimate is communicated back to the Air Traffic Control via an ADS-B message carried over the enhanced LDACS system.

The enhanced LDACS system with eLORAN has several advantages. eLORAN is widely recognized as an A-PNT system and is a high power system that is difficult to jam. It is a high availability system and with the previous LORAN-C, is a proven and reliable positioning technology that has been used for navigation since 1957.

The enhanced LDACS system with eLORAN capability provides for synchronization of LDACS, avoids an LDACS specific ranging algorithm, and solves the communication bottleneck of eLORAN's data channel by employing the broadband LDACS communication capabilities. LDACS stations are used for real time calibration of eLORAN radio signal propagation and development of ASF maps and as a result, the maps become location specific and more accurate. This approach supports ADS-B and is independent of the LDACS network layout. As long as the aircraft receives 2 (or more) eLORAN signals and as long as it receives an ASF map for each eLORAN signal, an accurate positioning is possible. Even if the aircraft does not receive ASF maps, which may happen if there are no LDACS ground stations in view, historical ASF maps or the maps broadcast on the eLORAN data channel may be used.

Figure 103:
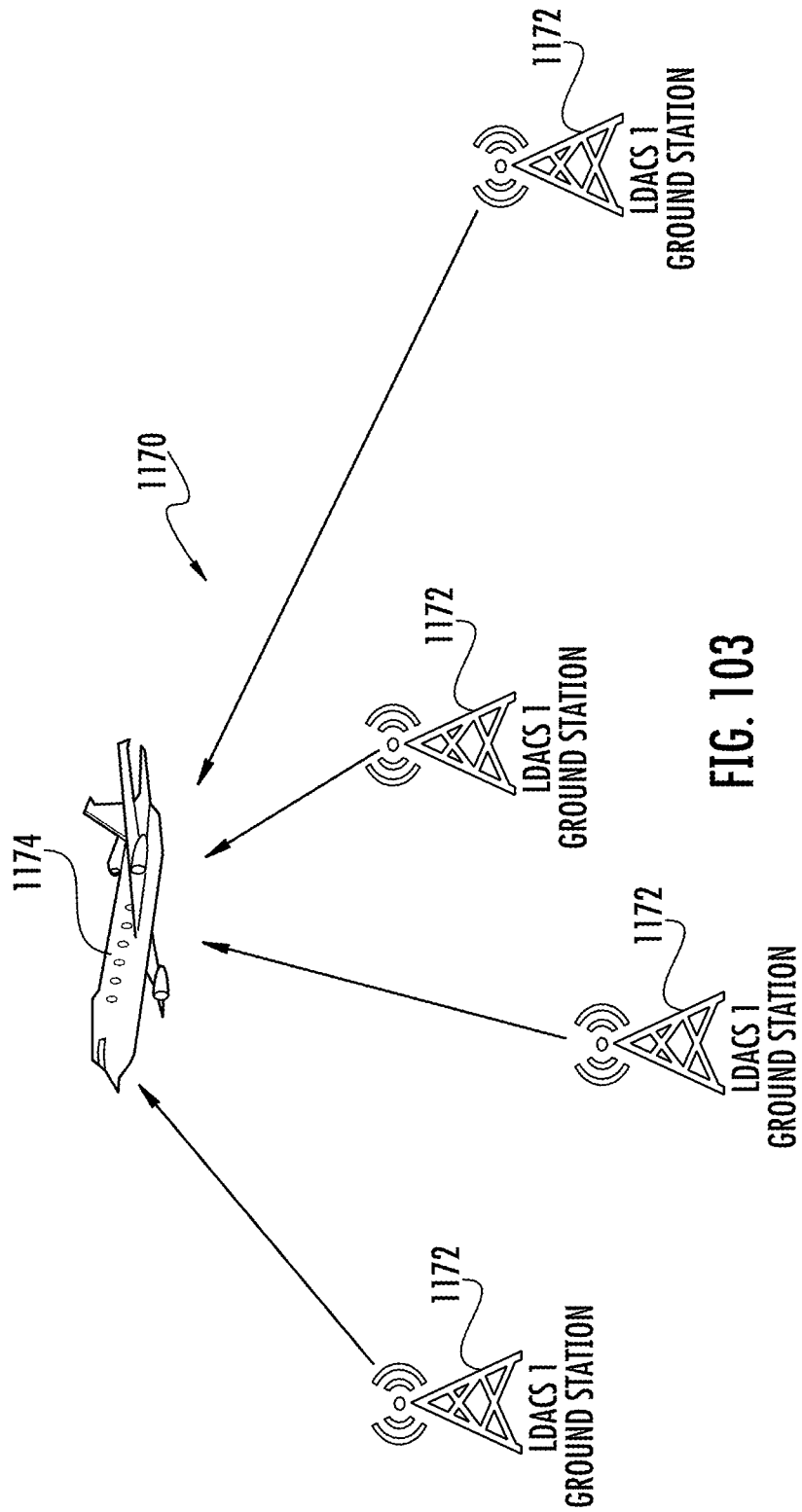
FIG. 103 is a schematic diagram showing four different LDACS ground stations used in positioning for the enhanced LDACS system.

Referring now to FIG. 103, there is illustrated an enhanced LDACS system generally at 1170 having an Alternate Positioning, Navigation and Timing (A-PNT) capability and showing four LDACS ground stations 1172 and aircraft 1174. A messaging overview includes a ground station site information message, such as an SIB (System Information Block) in addition to the base enhanced LDACS system 1170. This ground station site information includes the ground station transmit power (EiRP) and the ground station latitude and longitude for the antenna location. The site information message may include the antenna height in the ASL and GSL, and the antenna bore sight for the direction and tilt angle. The message may include antenna parameters, such as the gain profile and the horizontal/vertical 3 dB beamwidth and similar factors. Additional SIB messages may be broadcast by each LDACS ground station.

Figure 104:
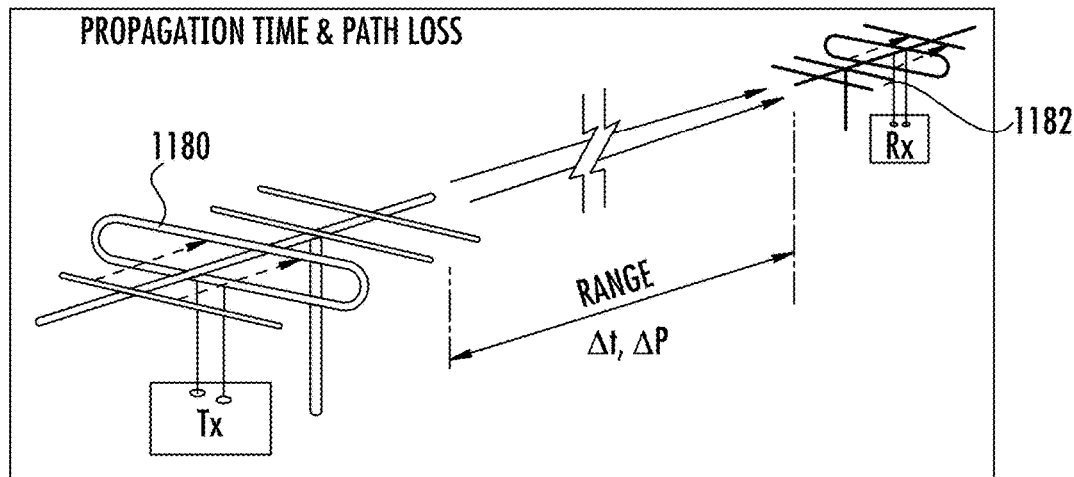
FIG. 104 is a schematic diagram showing propagation time and path loss from a transmit antenna to a receive antenna in the enhanced LDACS system.

The enhanced LDACS system may provide for multilateral RF path-loss calculation with confidence. For example, there may be a RF path-loss basis for location estimate. There is a direct relationship between path-loss and distance and time. Reference is made to FIG. 104 showing a propagation time and path-loss in the signal between a transmitter antenna 1180 and receiver antenna 1182. In air-to-ground applications, the RF path-loss is predictable in free space. The antenna pattern may be known such as the directional gain and the lobe shape. Because of insight into the transmitted signal characteristics and the antenna pattern in its orientation, the received signal characteristics may be used to derive a location area estimate. Multiple location area estimates may be based on signals for multiple transmitters and used such that a probable location can be derived. The location as derived may not be suitable for navigation, but may be used as verification for a primary position determination with an additive confidence factor and potentially suitable for a location determination in lieu of other positioning information.

The aircraft station acquires the signal from local serving ground station operating as a communications node. Based on the measured round trip time, the ground station provides timing advance (TA) plus the enhanced TA to the aircraft station. Using the TA/eTA, the aircraft station calculates the range to the serving ground station. There is an arc of possible locations to be determined from the ground station.

For each neighbor, it is possible to use supplied neighbor parameters, and the aircraft station synchronizes to a neighboring ground station and calculates a timing offset referenced to the serving ground station timing. A range to the neighboring ground station is derived from the measured timing offset. The measured time offset as a derived range, the TA/eTA derived range, and the supplied ground station-to-neighbor distance values are used to calculate an improved probability of location in three-dimensional space. This probability of location is calculated for each aircraft station, the serving ground station, and neighboring ground station triplet, which are used together to derive an improved accuracy and resolution position estimation for the aircraft station.

The triangulated location probability provides a level of integrity self-checking. Bounds may be applied to the calculated location and allow for detection of error conditions for that triplet. For example, the calculated location may indicate the altitude beyond a reasonable boundary, and the calculated location estimate may be geographically difficult. This may increase resistance to bogus ground station signals, including ionosphere bounce and similar factors.

The triangulated location probability provides a level of integrity self-checking where bounds may be applied to the calculated location surface and allow for detection of error conditions for that triplet. Examples may include the calculated location estimate and the indicated altitude beyond a reasonable boundary, and a calculated location estimate.

The path-loss may be calculated and may correspond to the transmitted signal strength minus the measured received signal strength, corresponding to the total and/or pilot signal power, e.g., the RSCP, SINR and other factors. The transmit power may be the total and/or pilot signal power and the transmitter characteristics may be advertised by the transmitter or known via an almanac database. The FSPL formula may be used to calculate the distance or an improved path-loss model for a specific ATG operation. The calculated distance value may include "error" due to antenna gain pattern. The calculated ranges may be used to multiple transmitters and may be used to derive a location of the receiver and this may result in an area of probability for the location of the receiver.

Figure 105:
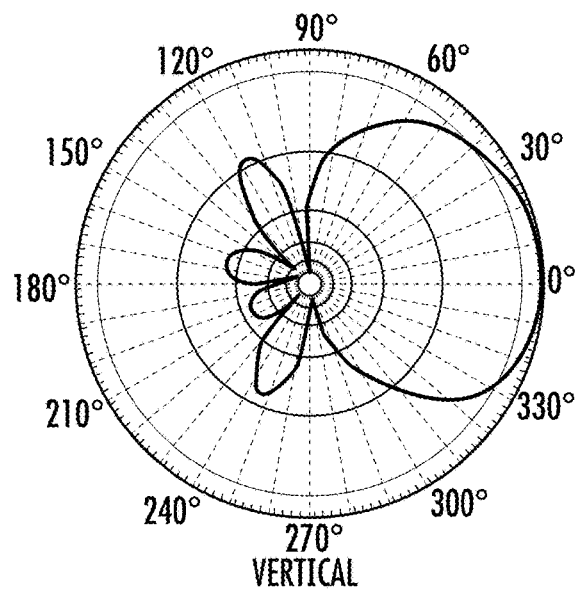
FIGS. 105 and 106 are graphs showing respective vertical and horizontal antenna pattern characteristics.
Figure 106:
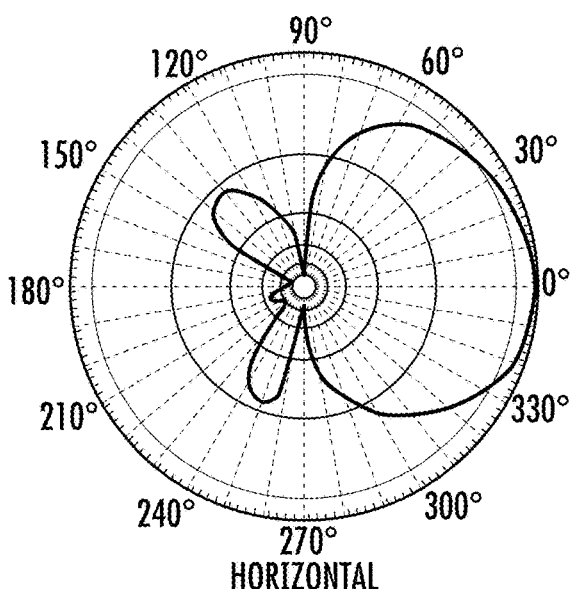
Figure 107:
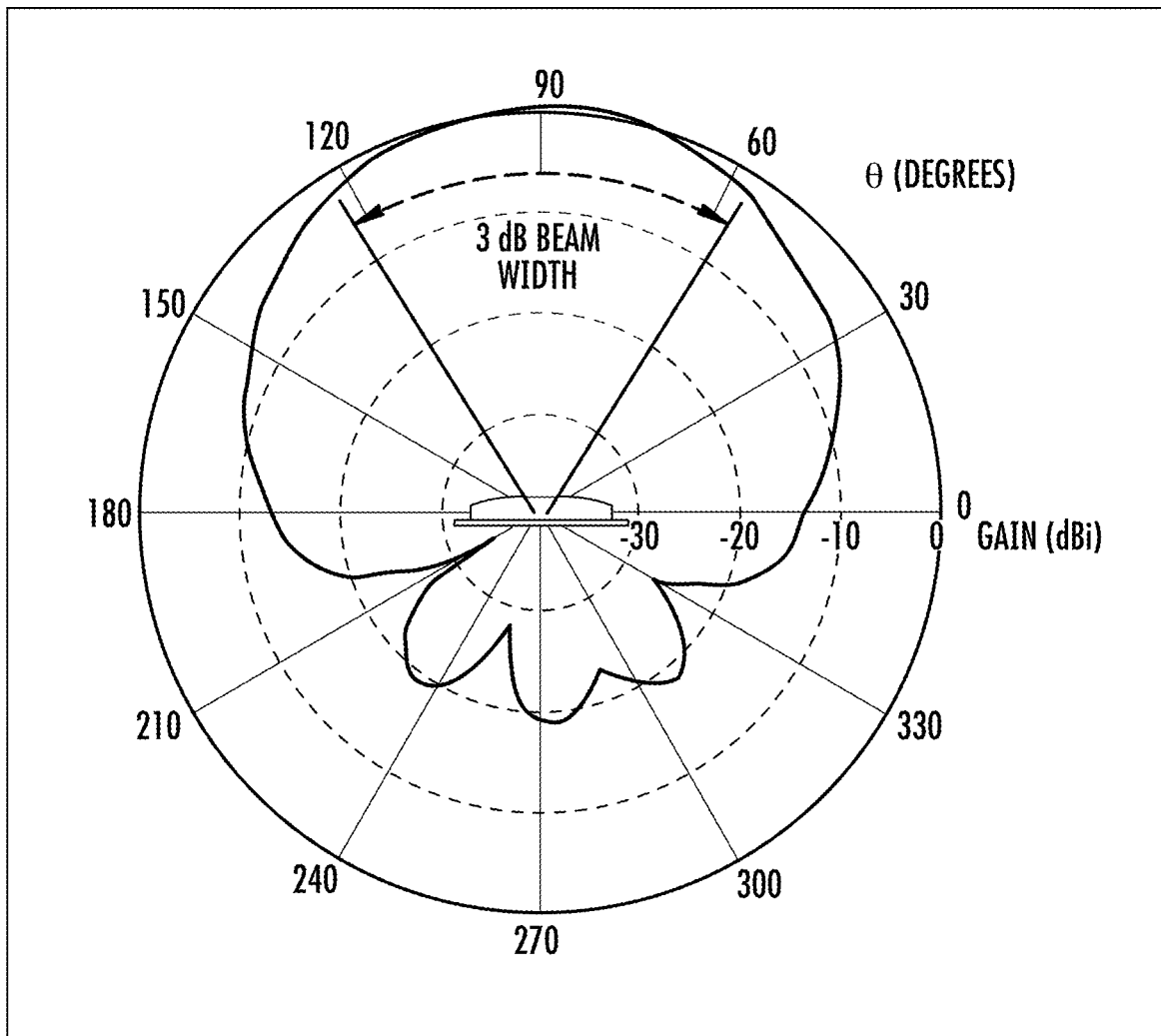
FIG. 107 is a graph showing a 120 degree sector antenna pattern.

Examples of the antenna pattern information are shown in FIGS. 105 and 106, which illustrate the vertical and horizontal antenna pattern. FIG. 107 shows a typical 120 degree sector antenna pattern with a 3 decibel beamwidth.

The transmitter antenna pattern characteristics and orientation may include the transmit antenna location, direction, tilt, gain, height, and the 3 decibel and 6 decibel beamwidth, e.g., both vertical and horizontal. This may be advertised by the transmitter or known via an almanac database. The receiver antenna gain should be known for optimal characteristics. If the relative location of the receiver to the transmitter is known, the antenna pattern characteristics may be used to improve the path-loss based range estimate and the angle of the receiver relative to the antenna gain load. This may be used effectively to verify or corroborate alternatively derived location solution for an integrity check and confidence factor impact.

It is also possible to use a low canopy LTE-assistance that includes a low cost LDACS Alternate Positioning, Navigation and Timing near airports to provide better coverage. For example, the local ground station may receive local LTE Alternate Positioning, Navigation and Timing signals and transmit to the aircraft station integrity and/or correction information for numerous LTE stations, which broadcast usable Alternate Positioning, Navigation and Timing information that is within range. It is possible to transmit local barometric information to enhance vertical positioning information and this may include initial position and timing that may be done through GPS or potentially with a network synchronization such as the IEEE 1588. The LTE Alternate Positioning, Navigation and Timing may be used for approaches with lower minimums such as equivalent to the SBAS GPS approaches. This may be used with any form of communication that is not limited to LDACS and to any type of aircraft such as UAS.

The ranging data, as part of the LDACS capability, is similar to the DME (Distance Measuring Equipment) and may be extracted from the LDACS communications links between the aircraft and LDACS ground stations. It is similar to the ILS (Instrument Landing System) with GBAS (Ground-Based Augmentation System). LDACS may provide enhanced data transfer capacity suitable to enhance DFMC GBAS2 by providing additional augmentation information. The enhance LDACS system may support cybersecurity measures for GBAS, such as authentication and information integrity. It is possible that the enhanced LDACS system may provide secured and increased throughput capacity that paves the way for future navigation applications, such as curved precision approaches and 4-D trajectory operations.

The enhanced LDACS system may incorporate a Subscriber Identity Module (SIM) card in which data may include information of whether or not a wireless communications system is usable. A network controller may control operation of the SIM card. The SIM card may operate in combination with the network controller to apply or store a policy for aircraft stations as client devices based on a subscription profile and apply a data capacity policy for each aircraft station based on subscription profile information. The SIM card may also provide a network security policy, including deep packet inspection and filtering for packets from external packet data networks.

As noted before, the enhanced LDACS system may connect to the cellular system and include the LTE functionality and it is possible to receive temporary identifiers to determine an authentication server and authenticate an aircraft station. An initial connection message may include the capabilities of the enhanced LDACS system and a service descriptor for initial connection for an aircraft station as part of the LDACS network connecting into a cellular network. This initial connection message may include a service descriptor to determine what network components and which aircraft station it should connect. It is possible to query different nodes to determine the best network components to which a cellular connection should be made. A cellular node may be queried to determine what services the aircraft station may access.

It is possible that the underlay and overlay networks may work in conjunction with the cellular core network. Either the overlay network or the underlay network may determine an authorization and authenticate a point of contact and perform authentication and authorization of different aircraft stations.

It is possible for the enhanced LDACS system and an aircraft station operating with the enhanced LDACS system to intercept DME requests and respond without using the DME over the air resources. It is possible for the enhanced LDACS system to identify messages intended for an initial navigational aid device such as a NORMARC distance measuring equipment and identify the context of the message, such as a message destination as part of an exclusion list of destinations that are not permitted to be forwarded. An automated message for a request to a secondary navigational aid device may be made with instructions to determine similar information as requested by the initial message. A response may be received from a secondary navigational aid device such as a beacon and data reformatted into the originally requested format and response made to the message.

The enhanced LDACS system may use the OFDM spectrally efficient modulation, but may incorporate filter bank multi-carrier (FBMC) and similar modulation techniques that operate with a multiple, narrow band, orthogonal, or non-orthogonal, closely spaced subcarrier signals with overlapping spectra transmitted to carry data in parallel. Multiple symbol mapping techniques may be used, including QPSK, QAM, 16-QAM, 64-QAM, and other mapping techniques. Separated 500 KHz channels may be used to transmit and receive with frequency division duplex (FDD) or a shared channel for transmit and receive using time division duplex (TDD). An aggregated base station radio equipment may be co-located at a common geographic location or located at geographically separated sites. A common LDACS controller may manage resources across a set of aggregated channels as a single logical element.

Bandwidth available for user services may be expanded using an expanded contiguous channel bandwidth in odd (3, 5, 7, etc.) multiples of the fundamental 500 KHz bandwidth channel. Bandwidth expansion may be allocated symmetrically above and below the center 500 KHz in 1 MHz increment as 500 KHz pairs. Remote nodes such as aircraft stations may be provided with two-way communications using an enhanced LDACS system link relay that includes an internet protocol (IP) data connection between a base station and the aircraft station. Peer-to-peer protocols may be used.

When a remote aircraft station requests a relay connection from another aircraft station, a proxy connection for the remote aircraft station may be requested and a logical internet protocol (IP) data connection made between the proxy connection and the peer-to-peer connection with a remote aircraft station. A packet routing function may be provided.

The SIM card may include data to determine whether or not a wireless communication is usable as noted before. A ground base station may execute mirror-updating and restoration of data stored in a SIM card in response to a request from an aircraft station. Thus data stored in an individual SIM card may be mirror-updated. Although a SIM card is discussed, other memory cards may be used. The SIM card or other memory card may include a non-volatile semiconductor memory for storing the data and the controller may control operation of the non-volatile semiconductor memory. The controller may include an ID control storage unit that is coupled to an external power supply terminal supplied with an external power supply voltage and read interface terminal used when an ID number is read from an outside. It may individually operate with the power supply voltage via the external power supply terminal to allow the ID number in the memory card to be read via the raid interface terminal. A power supply circuit may monitor the power supply voltage supplied to the controller and decouple a powerline for the power supply voltage when it is not supplied.

The enhanced LDACS network may include a base station or other controller that provides air traffic control voice and related data, weather data, guidance and navigation data, entertainment data, and similar data. The encryption keys of the memory card may vary over the duration of the session or vary with the exchange of traffic, such as based on a predefined algorithm. Any session or temporary security keys may be derived based on the encryption keys of the memory card by generating session or temporary security keys and key validation numbers using one or more algorithms at the aircraft station and part of the enhanced LDACS system. A seed value may be provided by the enhanced LDACS system from fixed or dynamic network parameters transmitted by the base station or aircraft stations of the enhanced LDACS system. The encryption information may include the encryption key and/or encryption certificate. A third-party certificate authority may be used with a public key infrastructure having two asymmetric keys as a public and private key where the keys expire after a validity. A symmetric session key may be optionally generated.

The enhanced LDACS system may also work with the ADS-B system. The enhanced LDACS system may receive signals from at least three transmitters that use different protocols, including but not limited to, GNSS, LTE, UMTS, and other protocols. Measurements may be made during periods as specified by the enhanced LDACS network on a single receiver chain or multiple receiver chains with geolocation measurements using different geolocation techniques, such as the observed time difference of arrival (OTDOA). Geolocation data and identifier information may be broadcast to other aircraft stations from ground stations or repeater or peer-to-peer aircraft stations at regular or irregular intervals as determined from the enhanced LDACS system network configuration. Different information elements as part of the geolocation data and identifier information may include an unencrypted temporary identifier, unencrypted location information with an accuracy of X labeled as "course," an unencrypted location information with an accuracy of Y labeled as "precise," and a value of integrity. A public encryption key and private encryption key may be distributed by a key server with asymmetric encryption key pairs updated via the network at a specified time.

There may be state machine updates with frequency scanning where the LDACS controller or aircraft stations may store frequencies with potential enhanced LDACS system signals along with associated signal strength measurements or metadata taken during measurement periods. There may be an ability to remove frequencies and associated metadata after unsuccessfully attempting to decode an enhanced LDACS communications signal on that frequency a number of times as specified by the enhanced LDACS system. There may be an accelerated link recovery by transitioning to a directed decode state, in which network signals may be decoded on specified frequencies, after determining that the forward link is unacceptably poor when the number of stored frequencies is greater than zero. A directed decode state may be transitioned after the expiration of the link timers when the number of stored frequencies is greater than zero.

An RSSI scan may be performed to find frequencies to scan and a next candidate carrier may be tuned and the LDACS ground station signal detected with frequency and metadata stored if there is success. If any LDACS ground stations have been located, a carrier frequency search list may be conducted.

Timers may be involved, including a paging timer. Synchronization signals may be used that include one or more periodic fixed subframe locations within a multi-frame as defined by the enhanced LDACS system. Potential subframe locations may include broadcast frames, common control frames, or data frames. A synchronization signal may be decoded in time windows within a multi-frame, including one or more periodic fixed subframe locations as defined by the enhanced LDACS system. The subframe locations of a synchronization signal may be reconfigured by the enhanced LDACS system at the start of each multi-frame.

A beacon may be used to create awareness of the enhanced LDACS system peer-to-peer capable radios where beacon transmit opportunities and periodicities are configurable by the enhanced LDACS system and beacon transceivers may use a listen before transmit procedure to reduce collisions. Relay support and location support may be included. It is possible that connected peers in a peer-to-peer network may create a peer tunnel to exchange information between those aircraft stations and other network entities that do not share a direct connection. Selected information elements may be broadcast to the peer connected enhanced LDACS system to maintain geolocation information, including associated metadata, such as heading and speed.

For clarity of explanation, a number of aspects of the system and method embodiments fully described above, are presented in a more simplified form in the following descriptive paragraphs and shown in the associated drawings. As will be appreciated by those skilled in the art, the various aspects described may be used independently or combined with one or more other aspects.

Throughout the description, it should be understood that LDACS ground stations may be located anywhere on the Earth's ground, which includes high altitude mountains, ground level sites, valleys and bodies of water such as rivers, lakes and the ocean. The LDACS ground stations may be portable and located on vehicles, including ships on water and in the middle of the ocean. The LDACS ground stations could be located on emergency vehicles for first responder use. In a working example, the LDACS ground stations could be portable ground stations that form the overlay network described above wherein corresponding ones of LDACS ground stations, whether mobile or fixed, have a lower transmission power. Mobile LDACS stations referred to as LDACS ground stations could be moved into a smaller geographical area on emergency or other portable vehicles and operate as smaller communication cells for the LDACS overlay network. A ship at sea can have an LDACS ground station that corresponds to a much larger geographical area, such as for an underlay network, while several ships at sea in an emergency rescue operation could operate as lower power LDACS stations for the overlay network.

Figure 108:
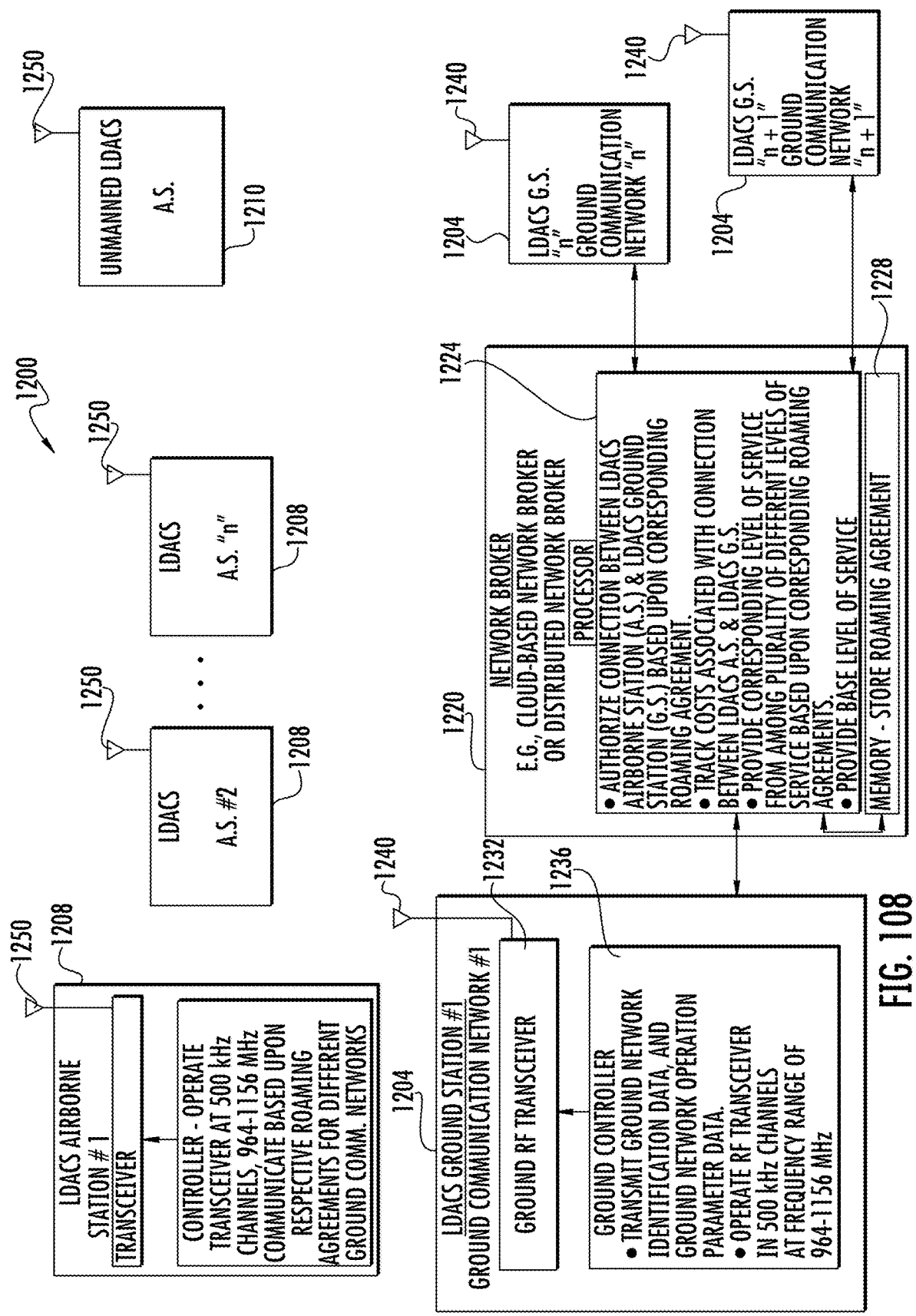
FIG. 108 is a block diagram of the enhanced LDACS system having roaming agreements and associated methods.

Referring now to FIG. 108, an enhanced L-band Digital Aeronautical Communications System (LDACS) is generally shown at 1200 and includes a plurality of LDACS ground stations 1204, assigned to respective different ground communication networks shown as ground communication network number 1 that is associated with LDACS ground station number 1. A number of ground stations 1204 are illustrated as LDACS ground station number 1 and LDACS ground station "n" and "n+1" communicating with respective ground communication networks 1 and "n" and "n+1." Of course, multiple ground stations may be assigned to a given ground communication network as will be appreciated by those skilled in the art. It will also be appreciated that where cellular telephone networks are used, these may also be part of different roaming agreements.

A plurality of LDACS airborne stations 1208 are configured to communicate with selected ones of the LDACS ground stations 1204 based upon respective roaming agreements for the different ground communication networks. In this example, a number of airborne stations 1208 are shown and numbered one, two, and "n" indicative that a large number of airborne stations could be present. The enhanced LDACS system 1200 includes a network broker 1220 having a processor 1224 and memory 1228 that stores roaming agreements. The processor 1224 is configured to authorize a connection between an LDACS airborne station 1208 and an LDACS ground station 1204 based upon a corresponding roaming agreement.

Each LDACS ground station 1204 includes a ground RF transceiver 1232 and ground controller 1236, and configured to transmit corresponding ground network identification data. Alternatively or additionally, each LDACS ground station 1204 may be configured to transmit corresponding ground network operation parameter data.

The network broker 1220 may be configured to track costs associated with the connection between the LDACS airborne station 1208 and the LDACS ground station 1204. The network broker 1220 is configured to provide a corresponding level of service, from among a plurality of different levels of service, based upon the corresponding roaming agreement. In some embodiment, the connection between the LDACS airborne station 1208 and LDACS ground station 1204 may be configured to provide a base level of service irrespective of the corresponding roaming agreement.

Each of the LDACS ground stations 1204 includes a ground antenna 1240 and its ground radio frequency (RF) transceiver 1232 coupled to the ground antenna, and its ground controller 1236 coupled to the ground RF transceiver. Further, each of the LDACS airborne stations 1208 includes an airborne antenna 1250, an airborne radio frequency (RF) transceiver 1254 coupled to the airborne antenna, and an airborne controller 1258 is coupled to the airborne RF transceiver.

The plurality of LDACS ground stations 1204 and LDACS airborne stations 1208 may be configured to operate within at least one 500 kHz channel in a frequency range of between 964-1156 MHz, for example. The network broker 1220 may be formed as a Cloud-based network broker and it may be formed as a distributed network broker, for example.

At least one of the LDACS airborne stations 1208 may be an unmanned LDACS airborne station illustrated generally at 1210. The network broker 1220 includes its processor 1224 and associated memory 1228 that is configured to authorize a connection between an LDACS airborne station 1208 and an LDACS ground station 1204 based upon a corresponding roaming agreement.

Figure 109:
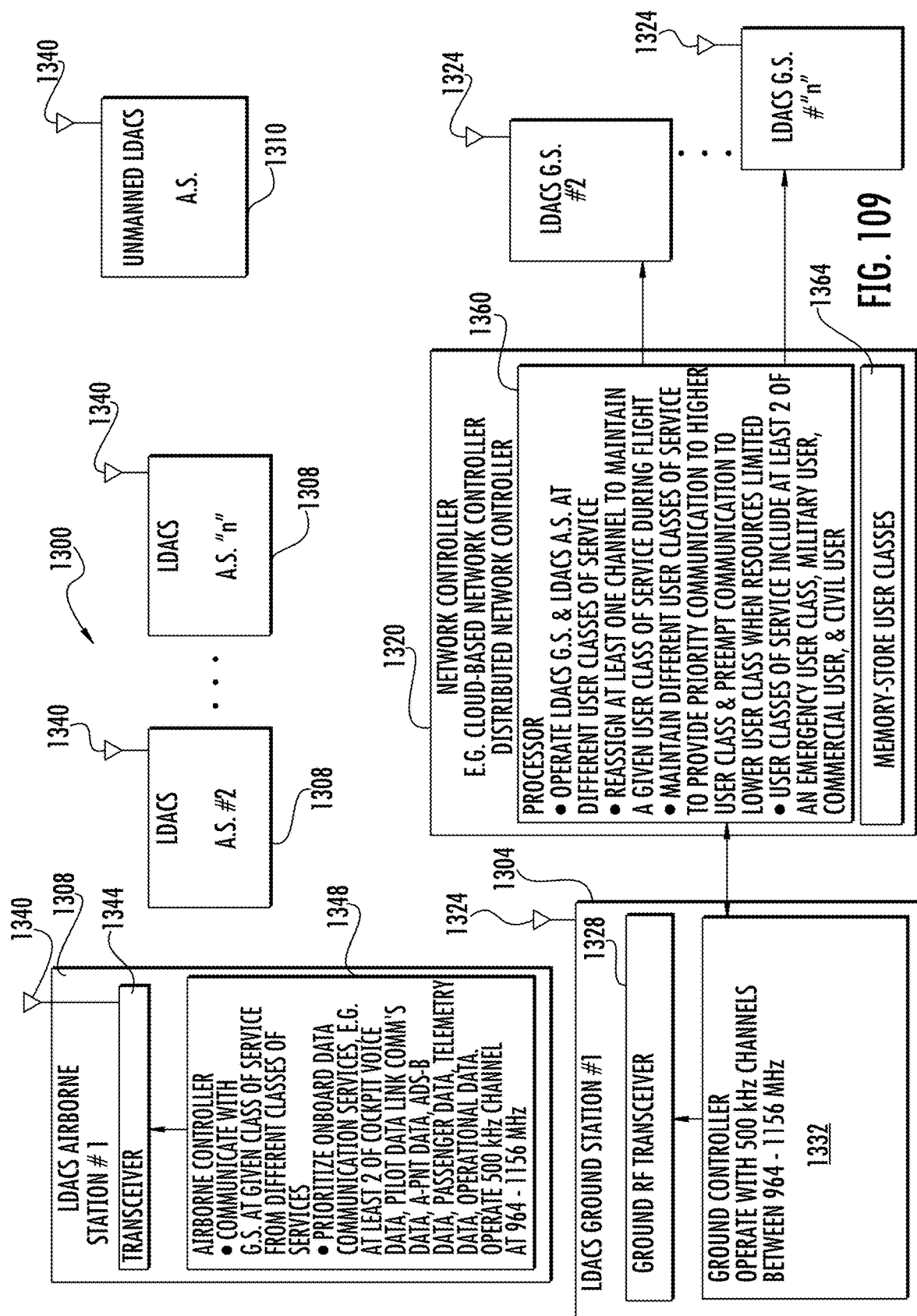
FIG. 109 is a block diagram of the enhanced LDACS system having different user classes and associated methods.

Referring now to FIG. 109, an enhanced L-band Digital Aeronautical Communications System (LDACS) is generally shown at 1300 and includes plurality of LDACS ground stations 1304 and a plurality of LDACS airborne stations 1308, each configured to communicate with the LDACS ground stations at a given class of service from among a plurality of different classes of service. As illustrated, a number of LDACS ground stations 1304 are shown and numbered one, two and "n" and may communicate with respective ground communication networks that are associated with respective LDACS ground stations. A number of LDACS airborne stations 1308 are shown and numbered one, two and "n" indicative that any number of airborne stations may be present. The enhanced LDACS system 1300 includes a network controller 1320 configured to operate the plurality of LDACS ground stations 1304 and LDACS airborne stations 1308 at the plurality the different user classes of service. One of skill in the art will also appreciate that a given airborne station and/or ground station may communicate on multiple classes of service either simultaneously or sequentially.

The network controller 1320 is configured to reassign at least one channel to maintain a given user class of service during flight. The network controller 1320 is also configured to maintain different user classes of service to provide priority communication to a higher user class, and to preempt communication to a lower user class when resources are limited. For example, the plurality of different user classes of service may include at least two of an emergency user class of service, a military user class of service, a commercial user class of service, and a civil user class of service. Other exemplary classes of service include air traffic control, air traffic control audio, and aircraft operations. In some embodiments, each LDACS airborne station 1308 prioritizes onboard data communications services. The onboard data communications services includes at least two of cockpit voice data, pilot data link communications data, A-PNT data, ADS-B data, passenger data, telemetry data, and operational data.

Each of the plurality of LDACS ground stations 1304 includes a ground antenna 1324, a ground radio frequency (RF) transceiver 1328 coupled to the ground antenna, and a ground controller 1332 coupled to the ground RF transceiver. Each of the plurality of LDACS airborne stations 1308 includes an airborne antenna 1340, an airborne radio frequency (RF) transceiver 1344 coupled to the airborne antenna, and an airborne controller 1348 coupled to the airborne RF transceiver 1344.

The plurality of LDACS ground stations 1304 and LDACS airborne stations 1308 are configured to operate within at least one 500 kHz channel in a frequency range of between 964-1156 MHz. In some embodiments, the network controller 1320 is formed as a Cloud-based network controller and in another embodiment, the network controller is formed a distributed network controller. In addition, at least one of the LDACS airborne stations 1308 includes an unmanned LDACS airborne station indicated generally at 1310. The network controller includes a processor 1360 and an associated memory 1364, which stores the different classes of services.

Figure 110:
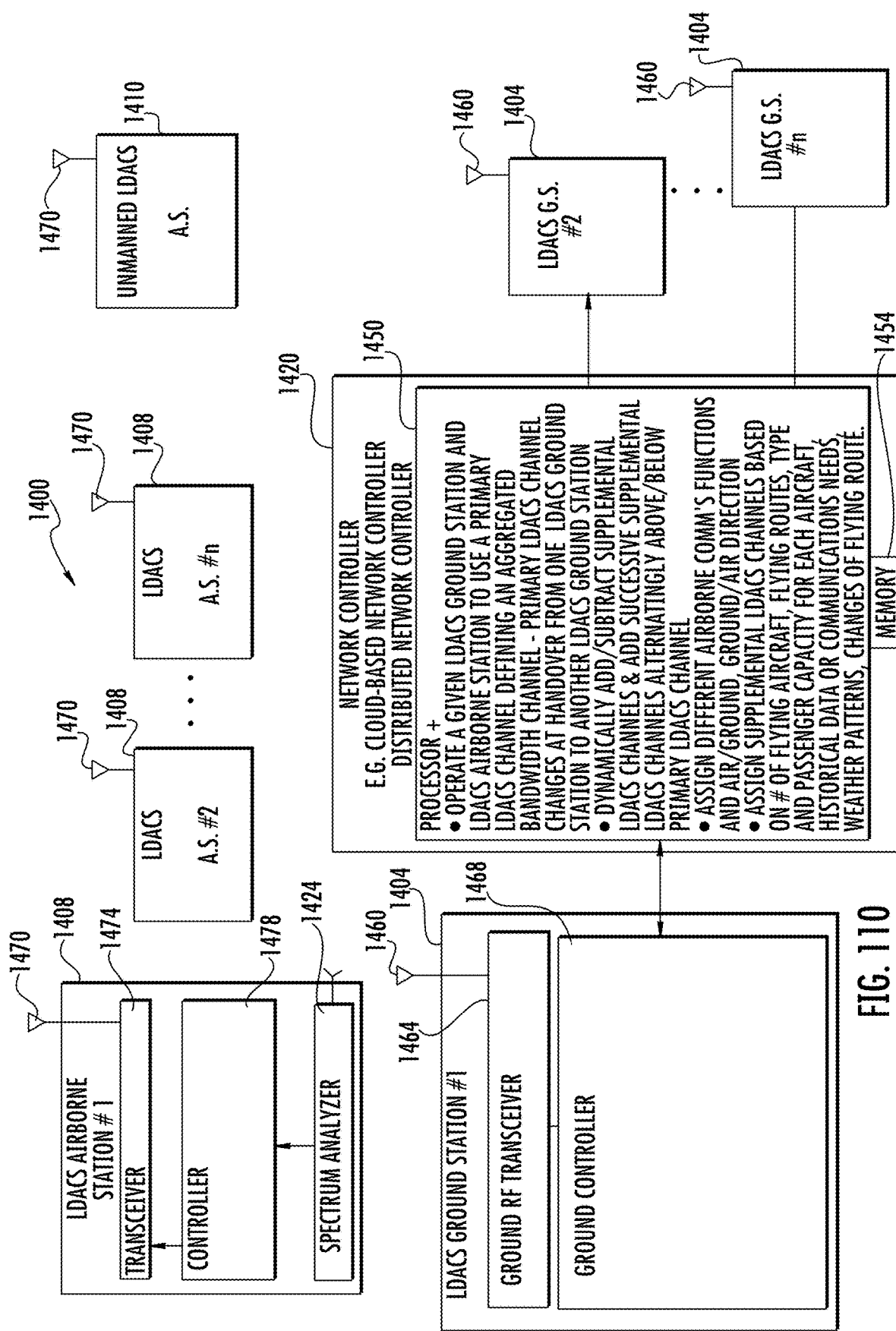
FIG. 110 is a block diagram of the enhanced LDACS system having channel aggregation and associated methods.

Referring now to FIG. 110, an enhanced L-band Digital Aeronautical Communications System (LDACS) is generally shown at 1400 and includes a plurality of LDACS ground stations 1404, and a plurality of LDACS airborne stations 1408 each configured to communicate with the LDACS ground stations.

The enhanced LDACS system 1400 includes a network controller 1420 configured to operate a given LDACS ground station 1404 and LDACS airborne station 1408 to use a primary LDACS channel and at least one supplemental LDACS channel defining an aggregated bandwidth channel, with the primary LDACS channel changing at handover from one LDACS ground station to another LDACS ground station. LDACS ground stations 1404 are numbered 1, 2 . . . n corresponding to the plurality that can be contained in the LDACS 1400, and LDACS airborne stations 1408 are numbered 1, 2, . . . n indicative that any number can be employed.

The network controller 1420 is configured to dynamically add or subtract supplemental LDACS channels. The network controller 1420 is also configured to add successive supplemental LDACS channels alternatingly above and below the primary LDACS channel. One of skill in the art will appreciate that the added (or subtracted) supplemental channels need not be contiguous with the primary channel or other supplemental channels.

Each LDACS airborne station 1408 may include a spectrum analyzer 1424 or similar device that is configured to collect spectral data and transmit the spectral data to a respective LDACS ground station 1404. The network controller 1420 may assign the at least one supplemental channel based upon the spectral data.

The network controller 1420 is configured to assign different airborne communications functions to different supplemental LDACS channels. The network controller 1420 is also configured to assign the at least one supplemental LDACS channel for a ground-to-air direction and/or for an air-to-ground direction.

In one embodiment, the network controller 1420 may be formed as a Cloud-based network controller, and, in another embodiment, the network controller may be formed as a distributed network controller. The network controller 1420 may assign the at least one supplemental LDACS channel based on at least one of a number of flying aircraft, flying routes of each aircraft, type and passenger capacity for each aircraft, historical data on communication needs for each aircraft, weather patterns, and changes of flying routes due to changes in weather patterns.

At least one of the LDACS airborne stations 1408 may include an unmanned LDACS airborne station indicated generally at 1410. The network controller includes a processor 1450 and associated memory 1454 that stores data related to aircraft, communication needs for each aircraft, weather patterns and other related data. Each of the plurality of LDACS ground stations 1404 includes a ground antenna 1460, a ground radio frequency (RF) transceiver 1464 coupled to the ground antenna, and a ground controller 1468 coupled to the ground RF transceiver. Each of the plurality of LDACS airborne stations 1408 includes an airborne antenna 1470, an airborne RF transceiver 1474 coupled to the airborne antenna, and an airborne controller 1478 coupled to the airborne RF transceiver. One of the LDACS airborne stations 1408 may be an unmanned LDACS airborne station indicated generally at 1410.

Figure 111:
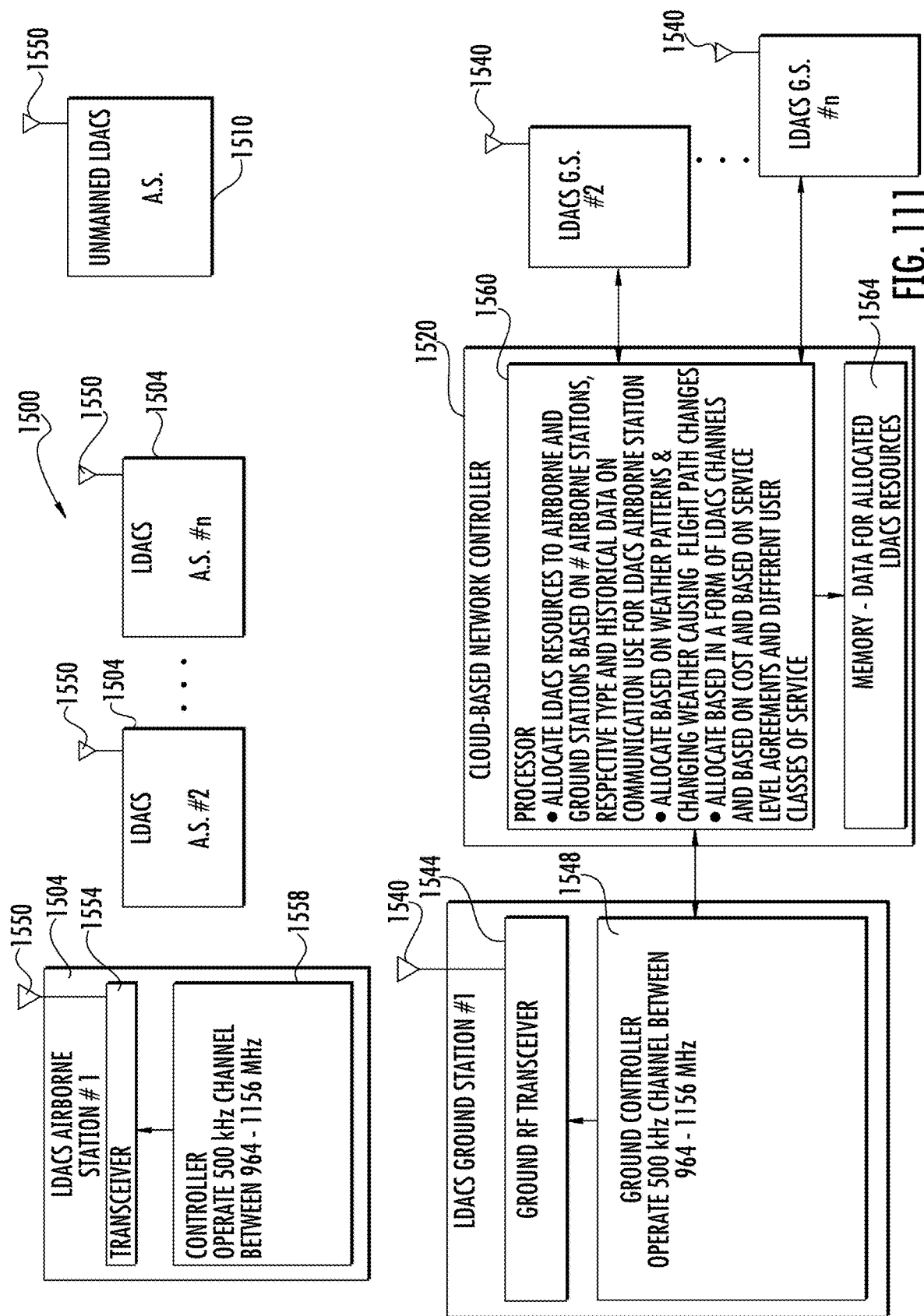
FIG. 111 is a block diagram of the enhanced LDACS system having cloud-based management and associated methods.

Referring now to FIG. 111, an enhanced L-band Digital Aeronautical Communications System (LDACS) is generally shown at 1500 and includes a plurality of LDACS ground stations 1504, and a plurality of LDACS airborne stations 1508 configured to communicate with the LDACS ground stations. As illustrated, a number of LDACS ground stations 1504 are illustrated and numbered one, two and "n" and communicate with respective ground communication networks that may be associated with respective LDACS ground stations. A number of LDACS airborne stations 1508 are shown and numbered one, two and "n," indicative that any number of airborne stations may be present.

The enhanced LDACS 1500 includes a Cloud-based network controller 1520 configured to allocate LDACS resources to the plurality of LDACS ground stations 1504 and the plurality of LDACS airborne stations 1508 based upon a number of LDACS airborne stations, respective flight paths of each LDACS airborne station, a respective type of each LDACS airborne station, and historical data on communication use for each LDACS airborne station. The Cloud-based network controller 1520 is configured to allocate LDACS resources based on weather patterns, changing weather causing flight path changes, in a form of LDACS channels, and based on cost, for example. The Cloud-based network controller 1520 may allocate LDACS resources based upon different Service Level Agreements (SLAs) and based upon different user classes of service.

Each of the plurality of LDACS ground stations 1504 includes a ground antenna 1540, a ground radio frequency (RF) transceiver 1544 coupled to the ground antenna, and a ground controller 1548 coupled to the ground RF transceiver. Similarly, each of the plurality of LDACS airborne stations 1508 includes an airborne antenna 1550, an airborne radio frequency (RF) transceiver 1554 coupled to the airborne antenna, and an airborne controller 1558 coupled to the airborne RF transceiver.

The plurality of LDACS ground stations 1504 and LDACS airborne stations 1508 operate within at least one 500 kHz channel in a frequency range of between 964-1156 MHz. In addition, at least one of the LDACS airborne stations 1508 includes an unmanned LDACS airborne station indicated generally at 1510. The Cloud-based network controller 1520 includes a processor 1560 and associated memory 1564 that stores data related to the allocated LDACS resources.

Figure 112:
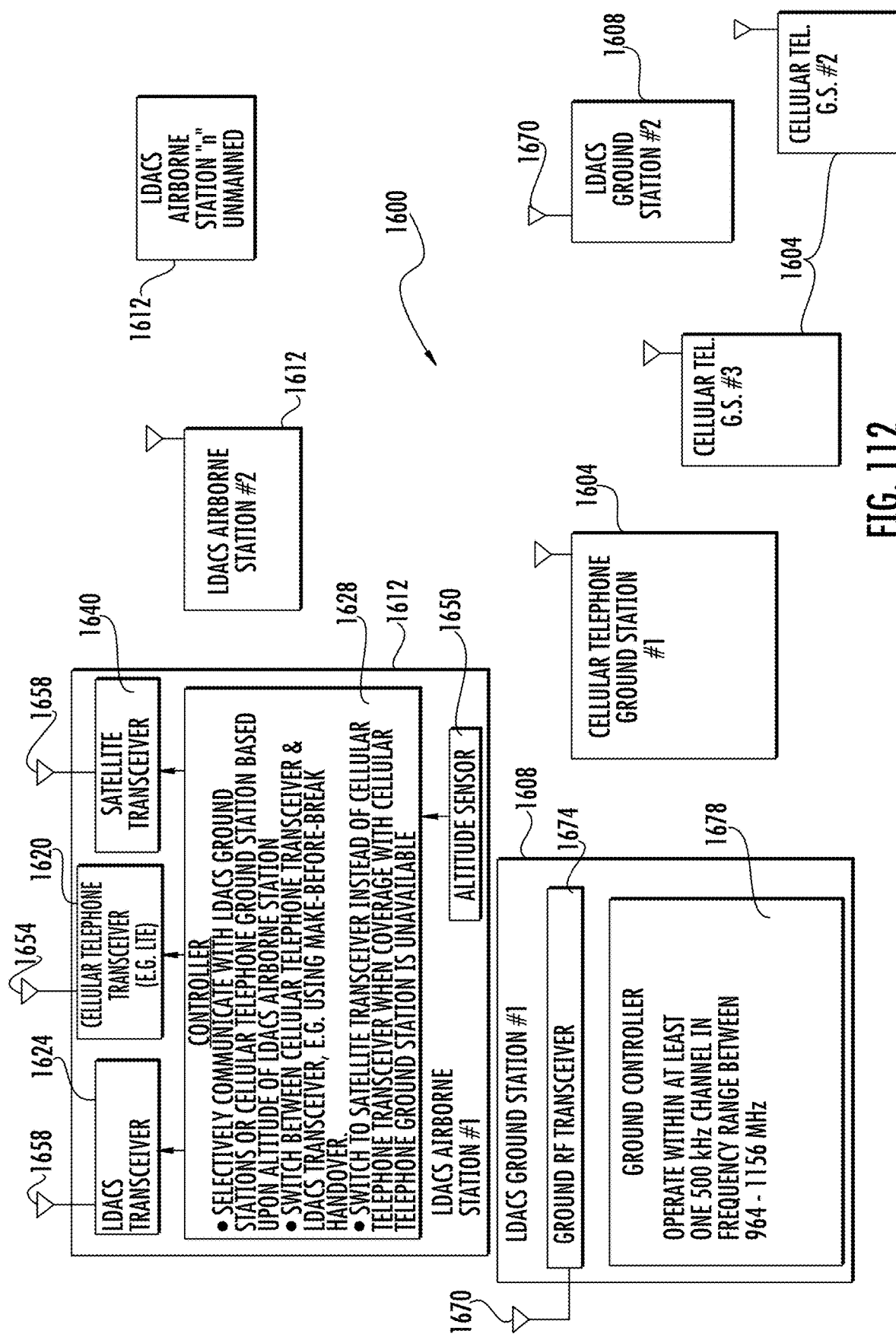
FIG. 112 is a block diagram of the enhanced LDACS system combined with cellular telephone ground stations and associated methods.

Referring now to FIG. 112, an enhanced L-band Digital Aeronautical Communications System (LDACS) is generally shown at 1600 and includes a plurality of cellular telephone ground stations 1604, and a plurality of LDACS ground stations 1608. The enhanced LDACS 1600 includes a plurality of LDACS airborne stations 1612, each configured to selectively communicate with either a corresponding LDACS ground station 1604 or a corresponding cellular telephone ground station 1608 based upon an altitude of the LDACS airborne station. The altitude may be determined by any of a number of different approaches. For example, the altitude can be determined by an airborne sensor, prior survey data, received signal strength, a position determining sensor referenced to a service area volume database, etc. Of course, other parameters may also be considered along with altitude to determine switching between networks.

As illustrated, a number of LDACS ground stations 1608 are illustrated and numbered one, two and three and communicate with respective ground communication networks that may be associated with respective LDACS ground stations or with cellular networks the plurality of cellular ground stations numbered in this example as ground stations one, two and three. A number of LDACS airborne stations 1612 are shown and numbered one, two and "n" indicative that any number of airborne stations may be present. One of skill in the art will also appreciate that the roaming aspects discussed herein are also applicable to these embodiments.

Each LDACS airborne station 1612 includes a cellular telephone transceiver 1620, an LDACS transceiver 1624, and a controller 1628 to switch between the cellular telephone transceiver and the LDACS transceiver. The controller 1628 may be configured to switch using a make-before-break handover. The cellular telephone transceiver 1620 may be formed as an LTE transceiver in an example.

Each LDACS airborne station 1612 includes a satellite transceiver 1640. The controller 1628 is configured to switch to the satellite transceiver 1640 instead of the cellular telephone transceiver 1620 when coverage with the corresponding cellular telephone ground station 1604 is unavailable.

The LDACS airborne station 1612 includes an altitude sensor 1650 coupled to the controller 1628. The LDACS airborne station 1612 includes a first antenna 1654 coupled to the cellular telephone transceiver 1620, a second antenna 1658 coupled to the LDACS transceiver 1624, and a third antenna 1658 or other receiving device coupled to the satellite transceiver 1640.

Each of the plurality of LDACS ground stations 1608 includes a ground antenna 1670, a ground radio frequency (RF) transceiver 1674 coupled to the ground antenna, and a ground controller 1678 coupled to the ground RF transceiver. The plurality of LDACS ground stations 1608 and LDACS airborne stations 1612 are configured to operate within at least one 500 kHz channel in a frequency range of between 964-1156 MHz. At least one of the plurality of LDACS airborne stations 1612 includes an unmanned airborne station indicated generally at 1682.

Figure 113:
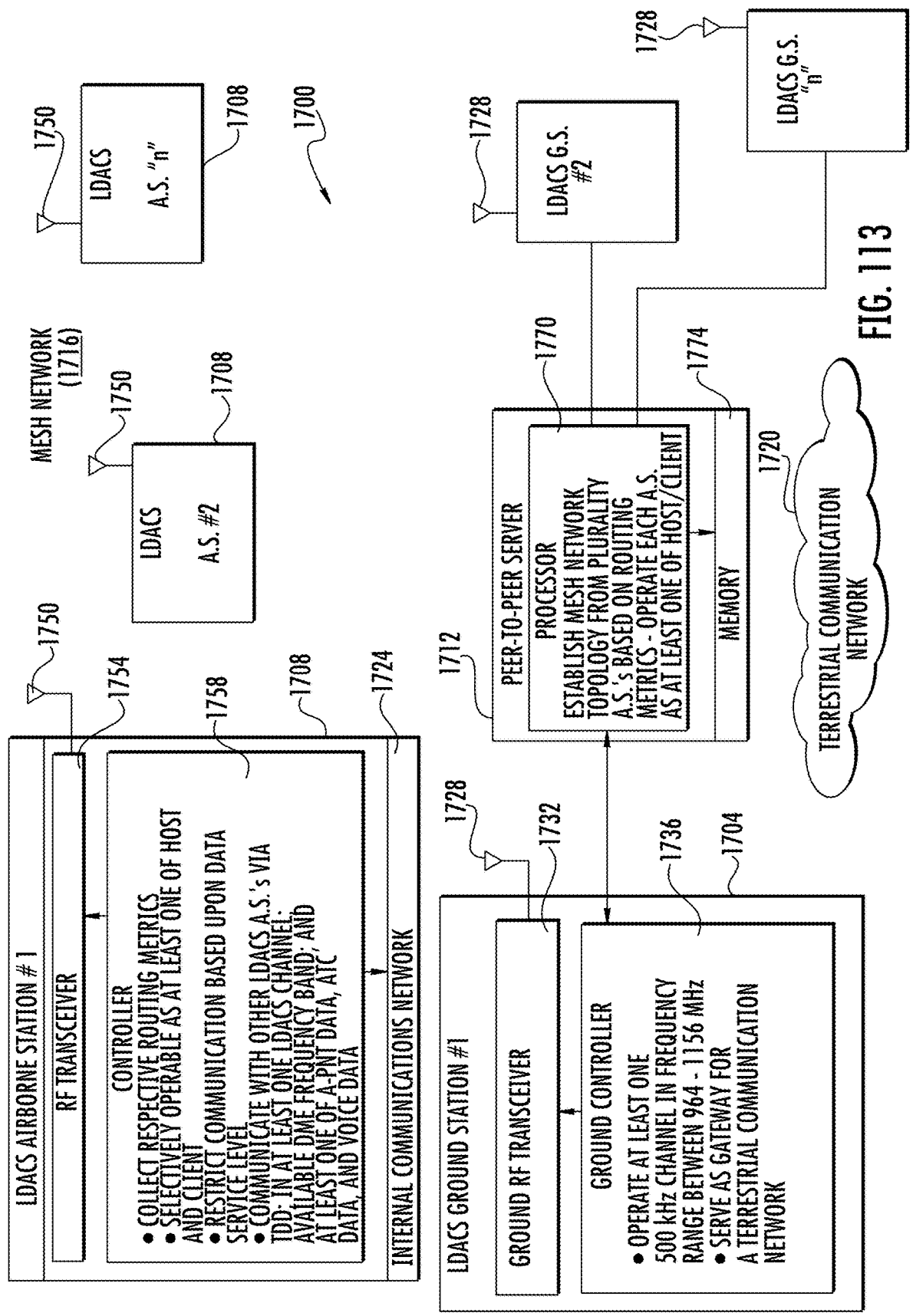
FIG. 113 is a block diagram of the enhanced LDACS system having mesh network topology and associated methods.

Referring now to FIG. 113, an enhanced L-band Digital Aeronautical Communications System (LDACS) is generally shown at 1700 and includes a plurality of LDACS ground stations 1704, and a plurality of LDACS airborne stations 1708 configured to communicate with the plurality of LDACS ground stations. Each LDACS airborne station 1708 may be configured to collect respective routing metrics, and each LDACS airborne station may be selectively operable as at least one of a host and client. As will be appreciated by those skilled in the art, routing metrics may be based on relative positions of the airborne stations 1708 and ground stations 1704, available channels, etc. The enhanced LDACS 1700 includes a peer-to-peer server 1712 that establishes a mesh network topology shown generally at 1716 from the plurality of LDACS airborne stations 1708 based upon the routing metrics, and selectively operate each LDACS airborne station as at least one of the host and client. The peer-to-peer server 1712 may be provided by a mesh controller on one or more the airborne stations in some embodiments. As illustrated, a number of LDACS ground stations 1704 are illustrated and numbered one, two and "n." A number of airborne stations 1708 are illustrated and numbered one, two and "n" indicative that any number of airborne stations may be present.

The plurality of LDACS airborne stations 1708 may restrict communication based upon data service level. At least one LDACS ground station 1704 may serve as a gateway for a terrestrial communication network illustrated generally at 1720. Each LDACS airborne station 1708 may include internal communications network 1724 such as an airborne WiFi network coupled to the mesh network topology 1716.

The plurality of LDACS airborne stations 1708 may be configured to communicate with one another via time division duplex and in at least one LDACS channel. The LDCAS airborne stations 1708 may also communicate in an available Distance Measuring Equipment (DME) frequency band. The plurality of LDACS airborne stations 1708 may be configured to communicate at least one of A-PNT data, ATC data, and voice data. In some embodiments, one or more links to a satellite communications network may also be used in the LDACS mesh network as will be understood by those skilled in the art.

Each LDACS ground station 1704 includes a ground antenna 1728, a ground radio frequency (RF) transceiver 1732 coupled to the ground antenna, and a ground controller 1736 coupled to the ground RF transceiver. Similarly, each LDACS airborne station 1708 includes an airborne antenna 1750, an airborne radio frequency (RF) transceiver 1754 coupled to the airborne antenna, and an airborne controller 1758 coupled to the airborne RF transceiver. The plurality of LDACS ground stations 1704 and LDACS airborne stations 1708 are configured to operate within at least one 500 kHz channel in a frequency range of between 964-1156 MHz. The peer-to-peer server 1712 includes a processor 1770 and an associated memory 1774.

Figure 114:
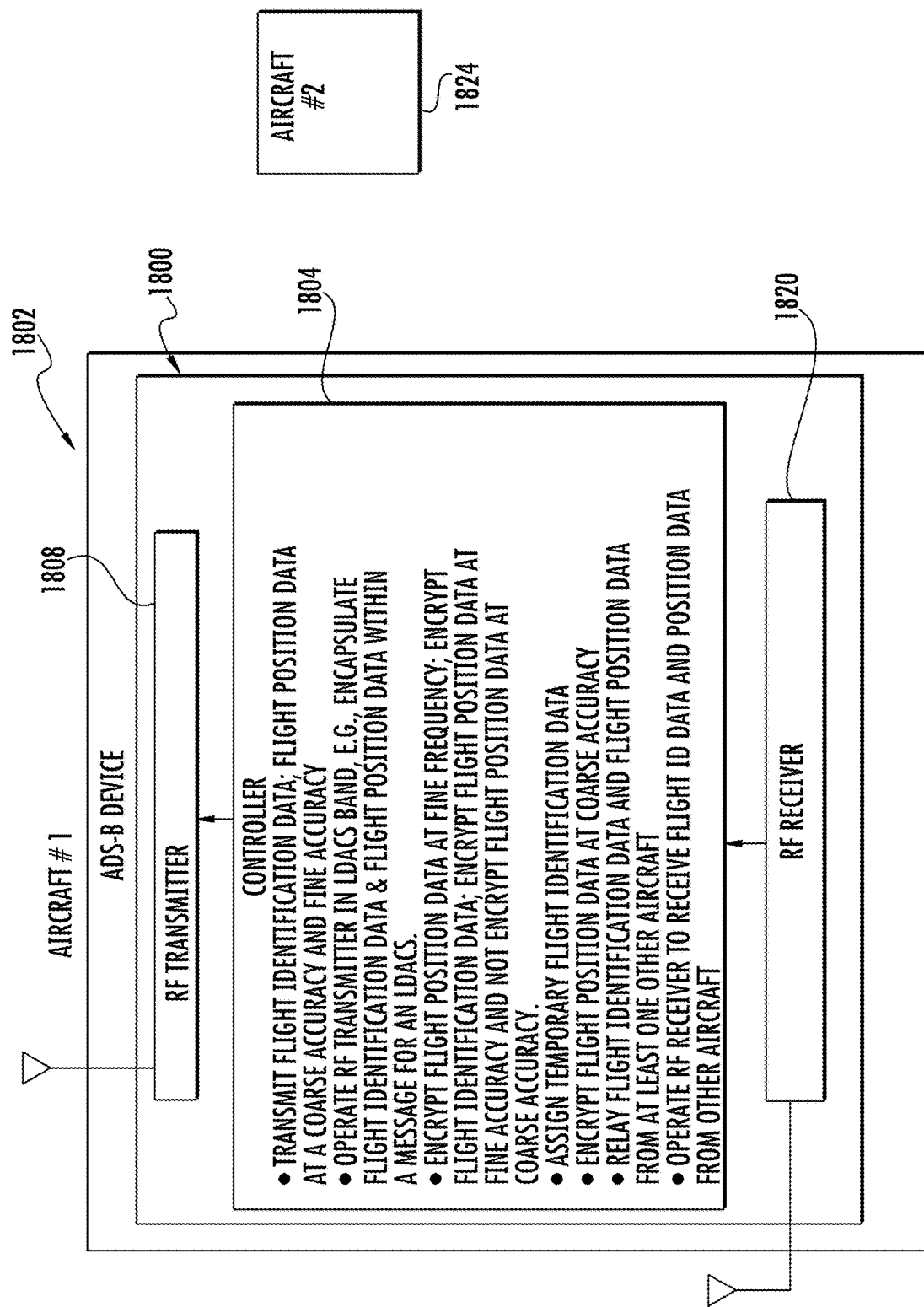
FIG. 114 is a block diagram of an automatic dependent surveillance-broadcast (ADS-B) device having coarse and fine accuracy flight position data and associated methods.

Referring now to FIG. 114, an Automatic Dependent Surveillance-Broadcast (ADS-B) device is illustrated generally at 1800 that is positioned in an aircraft shown at 1802. The ADS-B device 1800 includes a controller 1804 and a radio frequency (RF) transmitter 1808 coupled thereto and configured to transmit flight identification data, and transmit flight position data at a coarse accuracy and a fine accuracy. The RF transmitter 1808 operates in this example at a frequency within the L-band Digital Aeronautical Communications System (LDACS) frequency band. The controller 1804 is configured to encapsulate the flight identification data and flight position data within a message for an LDACS. The ADS-B device 1800 may include an internal position determining device, or may be coupled to another device for position data.

The controller 1804 may encrypt the flight position data at the fine accuracy and encrypt the flight identification data. The controller 1804 may encrypt the flight position data at the fine accuracy and not encrypt the flight position data at the coarse accuracy. In some embodiments, the coarse position data may be generated in the controller 1804 by adding a position offset to the true position data, and the position offset may be generated by an algorithm that varies the offset over time, for example. The controller 1804 may assign temporary flight identification data, for example, and not encrypt the flight position data at the coarse accuracy.

The ADS-B device 1800 includes an RF receiver 1820 to receive flight identification data and flight position data from at least one other aircraft illustrated generally at 1824. In these embodiments, the controller 1804 may relay the flight identification data and flight position data from the at least one other aircraft 1824.

Figure 115:
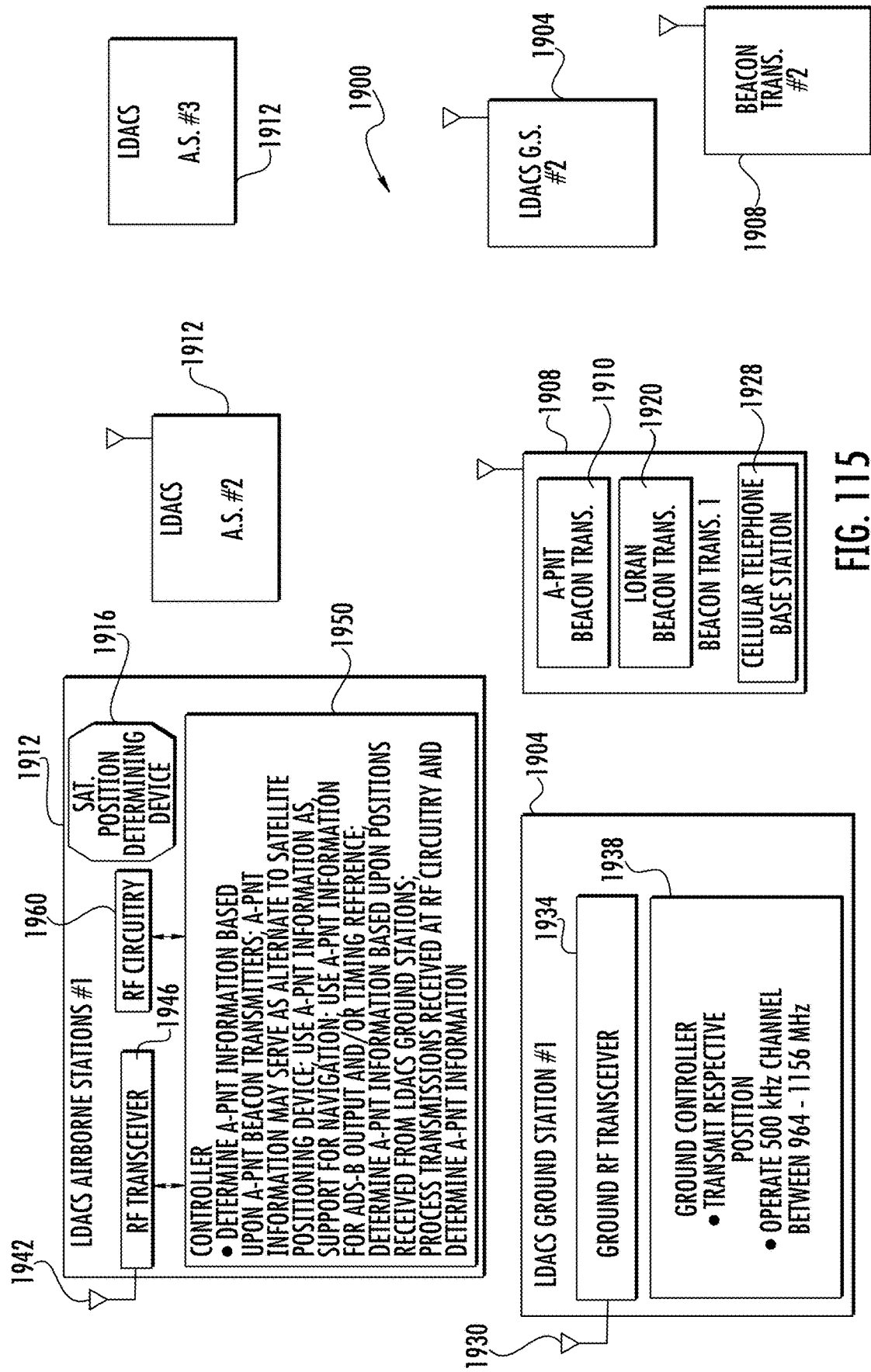
FIG. 115 is a block diagram of the enhanced LDACS system that determines A-PNT information and associated methods.

Referring now to FIG. 115, an enhanced L-band Digital Aeronautical Communications System (LDACS) is illustrated generally at 1900 and includes a plurality of LDACS ground stations 1904, a plurality of Alternate Positioning, Navigation and Timing (A-PNT) beacon transmitters positioned on the ground, and indicated generally at 1908, and a plurality of LDACS airborne stations indicated generally at 1912. The LDACS airborne stations 1912 communicate with the LDACS ground stations 1904, and determine A-PNT information based upon the plurality of A-PNT beacon transmitters 1908.

Each LDACS airborne station includes a satellite position determining device 1916 such as a GPS device. However, the A-PNT information may serve as an alternate to the satellite position determining device 1916.

Each A-PNT beacon transmitter 1908 may be used exclusively for A-PNT, for example, as shown by the A-PNT beacon transmitter block function at 1910, and each LDACS airborne station 1912 may use the A-PNT information as support for navigation. The A-PNT information may also be used for an Automatic Dependent Surveillance-Broadcast (ADS-B) output, and/or as a timing reference. In an example, each A-PNT beacon transmitter 1908 includes a LORAN beacon transmitter 1920, for example. In another example, each A-PNT beacon transmitter 1924 in an example may be a cellular telephone base station 1928. The cellular base station 1928 may be an LTE base station so that the LTE pilot signals serve as the beacon signals as will be understood by those skilled in the art.

Each LDACS ground station 1904 may transmit a respective position and each LDACS airborne station 1912 further determine A-PNT information based upon the positions received from the plurality of LDACS ground stations. Each of the LDACS ground stations 1904 includes a ground antenna 1930, a ground radio frequency (RF) transceiver 1934 coupled to the ground antenna, and a ground controller 1938 coupled to the ground RF transceiver. Similarly, each of the LDACS airborne stations 1912 includes an airborne antenna 1942, an airborne radio frequency (RF) transceiver 1946 coupled to the airborne antenna, and an airborne controller 1950 coupled to the airborne RF transceiver.

The LDACS ground stations 1904 and LDACS airborne stations 1912 are configured to operate within at least one 500 kHz channel in a frequency range of between about 964-1156 MHz. In addition, at least one of the LDACS airborne stations 1912 includes an unmanned LDACS airborne station indicated generally at 1914.

An LDACS airborne station 1912 for the enhanced LDACS 1900 includes radio frequency (RF) circuitry 1960 configured to communicate with the plurality of LDACS ground stations 1904 and receive transmissions from the plurality of A-PNT beacon transmitters 1908. The controller 1950 is coupled to the RF circuitry 1960 and configured to communicate with the LDACS ground stations 1904, and determine A-PNT information based upon the transmissions from the plurality of A-PNT beacon transmitters 1908.

Figure 116:
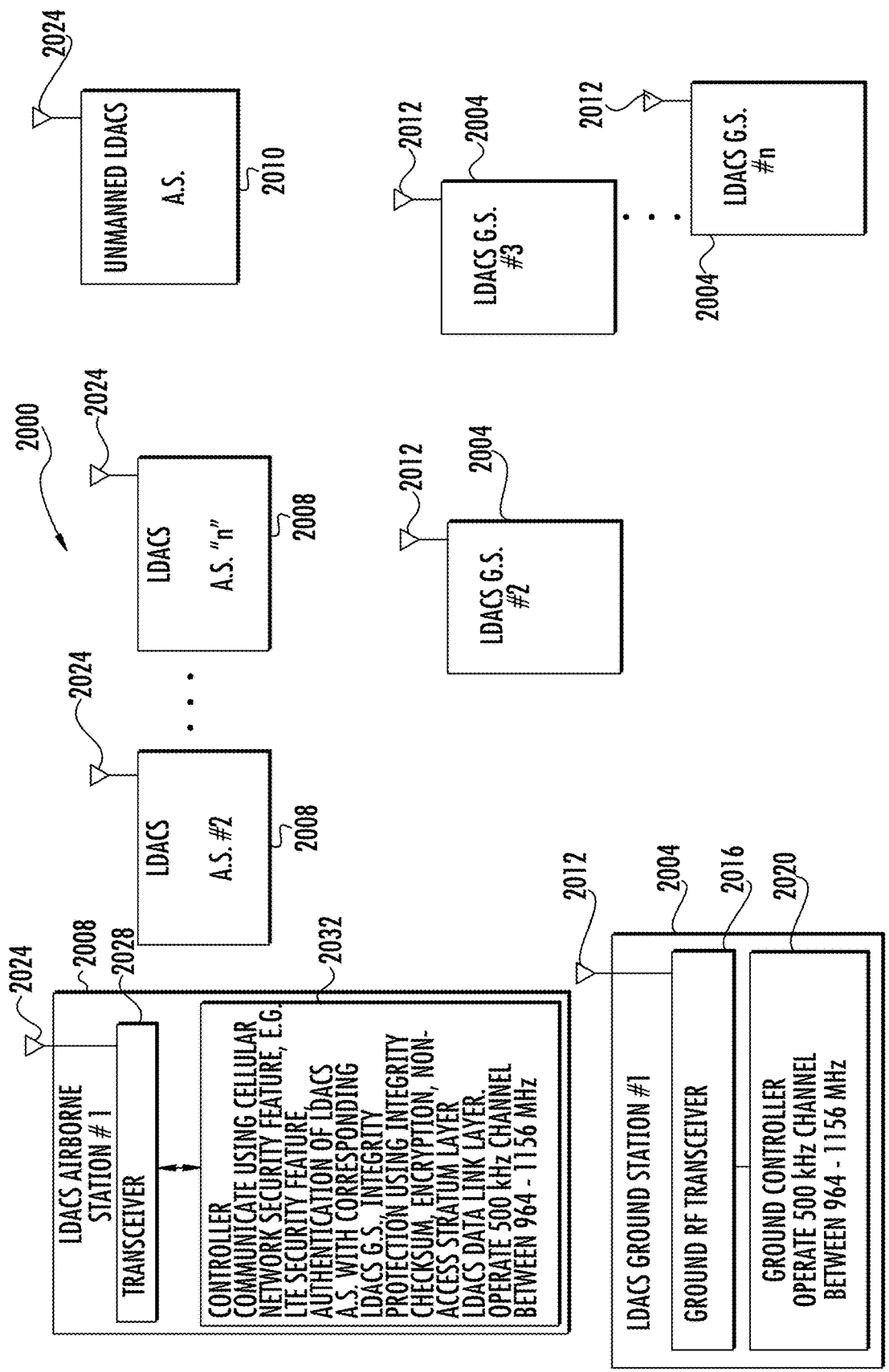
FIG. 116 is a block diagram of the enhanced LDACS system having security features and associated methods.

Referring now to FIG. 116, an enhanced L-band Digital Aeronautical Communications System (LDACS) is illustrated generally at 2000 and includes a plurality of LDACS ground stations 2004, and a plurality of LDACS airborne stations 2008. Each LDACS airborne station 2008 communicates with the plurality of LDACS ground stations 2004 using at least one cellular network security feature. In an example, the at least one cellular network security feature is a Long-Term Evolution (LTE) security feature. The cellular network security features may be one or more of the following: a) authentication of an LDACS airborne station 2008 with a corresponding LDACS ground station 2004; b) integrity protection using an integrity checksum; c) encryption of LDACS data; d) using a non-access stratum layer; and e) using an LDACS Data Link Layer.

Each of the plurality of LDACS ground stations 2004 includes a ground antenna 2012, a ground radio frequency (RF) transceiver 2016 coupled to the ground antenna, and a ground controller 2020 coupled to the ground RF transceiver. A number of ground stations 2004 are illustrated as ground stations 1, 2, 3 and "n" corresponding to the different number of ground communication cells or networks. Similarly, each of the LDACS airborne stations 2008 includes an airborne antenna 2024, an airborne radio frequency (RF) transceiver 2028 coupled to the airborne antenna, and an airborne controller 2032 coupled to the airborne RF transceiver. A number of airborne stations 2008 are shown and numbered 1, 2 and "n" indicative that any number of airborne stations may be used.

The LDACS ground stations 2004 and LDACS airborne stations 2008 operate within at least one 500 kHz channel in a frequency range of between 964-1156 MHz. In addition, at least one of the LDACS airborne stations 2008 includes an unmanned LDACS airborne station indicated generally at 2010.

Figure 117:
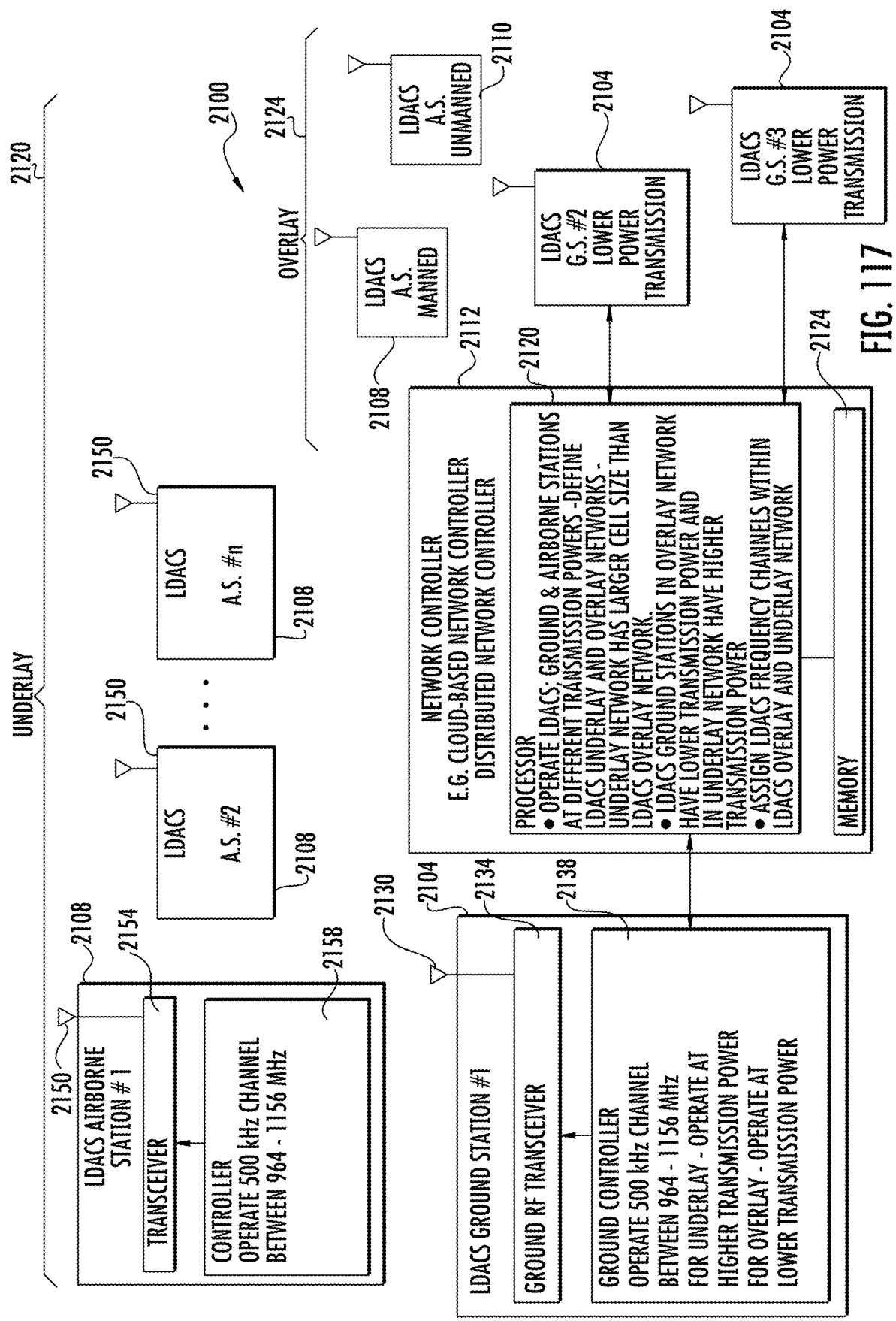
FIG. 117 block diagram of the enhanced LDACS system having LDACS underlay and overlay networks and associated methods.

Referring now to FIG. 117, an enhanced L-band Digital Aeronautical Communications System (LDACS) is illustrated generally at 2100 and includes a plurality of LDACS ground stations 2104, and a plurality of LDACS airborne stations 2108 configured to communicate with the LDACS ground stations. The enhanced LDACS 2100 includes a network controller 2112 that operates the plurality of LDACS ground stations 2104 and LDACS airborne stations 2108 at different transmission powers to define an LDACS underlay network illustrated generally at 2120 and an LDACS overlay network illustrated generally at 2124. In this example, the LDACS underlay network 2120 has a larger cell size than the LDACS overlay network 2124.

For example, the LDACS underlay network 2120 includes corresponding ones of the LDACS ground stations 2104 having a higher transmission power, and the LDACS overlay network 2124 includes corresponding other ones of the LDACS ground stations having a lower transmission power. The network controller 2112 assigns LDACS frequency channels within the LDACS overlay network 2124 and the LDACS underlay network 2120.

Each of the LDACS ground stations 2104 includes a ground antenna 2130, a ground radio frequency (RF) transceiver 2134 coupled to the ground antenna, and a ground controller 2138 coupled to the ground RF transceiver. The LDACS ground stations 2104 are numbered 1, 2 and 3 with the first ground station operating at the higher transmission power for the underlay network 2120 and ground stations 2 and 3 operating at lower transmission power for the overlay network 2124. Each of the LDACS airborne stations 2108 includes an airborne antenna 2150, an airborne radio frequency (RF) transceiver 2154 coupled to the airborne antenna, and an airborne controller 2158 coupled to the airborne RF transceiver. In the underlay network 2120, LDACS airborne stations numbers 1, 2-"n" are illustrated and may be operating at higher altitudes over a large geographic area, while the overlay network 2124 includes a manned airborne station 2108 and an unmanned airborne station 2110 operating at lower altitudes and in communication with the lower power LDACS ground stations 2 and 3 as illustrated. Of course, the different transmission powers may be provided by one or more of different transmitter output powers, different antenna gain patterns, and different heights and pointing direction of the antennas, for example.

The plurality of LDACS ground stations 2104 and LDACS airborne stations 2108 are configured to operate within at least one 500 kHz channel in a frequency range of between 964-1156 MHz. The network controller 2112 includes a processor 2120 and associated memory 2124, in an example, is the network a Cloud-based network controller, and in another example, the network controller is a distributed network controller. In addition, at least one of the plurality of LDACS airborne stations includes an unmanned LDACS airborne station 2110, which in this example is operating with the LDACS overlay network 2124 since the unmanned airborne station may be a drone for delivering packages or similar function and operate closer to the ground.

This application is related to copending patent applications entitled, "ENHANCED LDACS SYSTEM HAVING ROAMING AGREEMENTS AND ASSOCIATED METHODS," "ENHANCED LDACS SYSTEM HAVING DIFFERENT USER CLASSES AND ASSOCIATED METHODS," "ENHANCED LDACS SYSTEM HAVING CHANNEL AGGREGATION AND ASSOCIATED METHODS," "ENHANCED LDACS SYSTEM HAVING CLOUD-BASED MANAGEMENT AND ASSOCIATED METHODS," "ENHANCED LDACS SYSTEM COMBINED WITH CELLULAR TELEPHONE GROUND STATIONS AND ASSOCIATED METHODS," "AUTOMATIC DEPENDENT SURVEILLANCE-BROADCAST (ADS-B) DEVICE HAVING COARSE AND FINE ACCURACY FLIGHT POSITION DATA AND ASSOCIATED METHODS," "ENHANCED LDACS SYSTEM THAT DETERMINES A-PNT INFORMATION AND ASSOCIATED METHODS," "ENHANCED LDACS SYSTEM HAVING LTE SECURITY FEATURES AND ASSOCIATED METHODS," "ENHANCED LDACS SYSTEM HAVING LDACS UNDERLAY AND OVERLAY NETWORKS AND ASSOCIATED METHODS," which are filed on the same date and by the same assignee and inventors, the disclosures which are hereby incorporated by reference.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:
1. An enhanced L-band Digital Aeronautical Communications System (LDACS) comprising:
 a plurality of LDACS ground stations;
 a plurality of LDACS airborne stations configured to communicate with the plurality of LDACS ground stations, each LDACS airborne station configured to collect respective routing metrics, and each LDACS airborne station selectively operable as at least one of a host and client; and a peer-to-peer server configured to
establish a mesh network topology from the plurality of LDACS airborne stations based upon the routing metrics, and
selectively operate each LDACS airborne station as at least one of the host and client.

2. The enhanced LDACS of claim 1, wherein the plurality of LDACS airborne stations are configured to restrict communication based upon data service level.

3. The enhanced LDACS of claim 1, wherein at least one LDACS ground station is configured to serve as a gateway for a terrestrial communication network.

4. The enhanced LDACS of claim 1, wherein each LDACS airborne station comprises an internal communications network coupled to the mesh network topology.

5. The enhanced LDACS of claim 1, wherein the plurality of LDACS airborne stations are configured to communicate with one another via time division duplex.

6. The enhanced LDACS of claim 1, wherein the plurality of LDACS airborne stations are configured to communicate with one another in at least one LDACS channel.

7. The enhanced LDACS of claim 1, wherein the plurality of LDACS airborne stations are configured to communicate with one another in an available Distance Measuring Equipment (DME) frequency band.

8. The enhanced LDACS of claim 1, wherein the plurality of LDACS airborne stations are configured to communicate at least one of A-PNT data, ATC data, and voice data.

9. The enhanced LDACS of claim 1 wherein each of the plurality of LDACS ground stations comprises:
a ground antenna;
a ground radio frequency (RF) transceiver coupled to the ground antenna; and
a ground controller coupled to the ground RF transceiver.

10. The enhanced LDACS of claim 1 wherein each of the plurality of LDACS airborne stations comprises:
an airborne antenna;
an airborne radio frequency (RF) transceiver coupled to the airborne antenna; and
an airborne controller coupled to the airborne RF transceiver.

11. The enhanced LDACS of claim 1, wherein the plurality of LDACS ground stations and LDACS airborne stations are configured to operate within at least one 500 kHz channel in a frequency range of between 964-1156 MHz.

12. The enhanced LDACS of claim 1, wherein at least one of the plurality of LDACS airborne stations comprises an unmanned airborne station.

13. A peer-to-peer server for an enhanced L-band Digital Aeronautical Communications System (LDACS) comprising a plurality of LDACS ground stations, and a plurality of LDACS airborne stations configured to communicate with the plurality of LDACS ground stations, each LDACS airborne station configured to collect respective routing metrics, and each LDACS airborne station selectively operable as at least one of a host and client, the peer-to-peer server comprising:
a processor and an associated memory configured to
establish a mesh network topology from the plurality of LDACS airborne stations based upon the routing metrics, and
selectively operate each LDACS airborne station as at least one of the host and client.

14. The peer-to-peer server of claim 13, wherein the processor and associated memory are configured to operate the plurality of LDACS airborne stations to restrict communication based upon data service level.

15. The peer-to-peer server of claim 13, wherein at least one LDACS ground station is configured to serve as a gateway for a terrestrial communication network.

16. The peer-to-peer server of claim 13, wherein each LDACS airborne station comprises an internal communications network coupled to the mesh network topology.

17. The peer-to-peer server of claim 13, wherein the processor and associated memory are configured to operate the plurality of LDACS airborne stations to communicate with one another via time division duplex.

18. The peer-to-peer server of claim 13, wherein the processor and associated memory are configured to operate the plurality of LDACS airborne stations to communicate with one another in at least one LDACS channel.

19. The peer-to-peer server of claim 13, wherein the processor and associated memory are configured to operate the plurality of LDACS airborne stations to communicate with one another in an available Distance Measuring Equipment (DME) frequency band.

20. The peer-to-peer server of claim 13, wherein the processor and associated memory are configured to operate the plurality of LDACS airborne stations to communicate at least one of A-PNT data, ATC data, and voice data.

21. A method of operating an enhanced L-band Digital Aeronautical Communications System (LDACS) comprising a plurality of LDACS ground stations, and a plurality of LDACS airborne stations configured to communicate with the plurality of LDACS ground stations, each LDACS airborne station configured to collect respective routing metrics, and each LDACS airborne station selectively operable as at least one of a host and client, the method comprising:
operating a peer-to-peer server to
establish a mesh network topology from the plurality of LDACS airborne stations based upon the routing metrics, and
selectively operate each LDACS airborne station as at least one of the host and client.

22. The method of claim 21, comprising restricting communication based upon data service level.

23. The method of claim 21, comprising configuring at least one LDACS ground station to serve as a gateway for a terrestrial communication network.

24. The method of claim 21, wherein each LDACS airborne station comprises an internal communications network coupled to the mesh network topology.

25. The method of claim 21, comprising operating the plurality of LDACS airborne stations to communicate with one another via time division duplex.

26. The method of claim 21, comprising operating the plurality of LDACS airborne stations to communicate with one another in at least one LDACS channel.

27. The method of claim 21, comprising operating the plurality of LDACS airborne stations to communicate with one another in an available Distance Measuring Equipment (DME) frequency band.

28. The method of claim 21, comprising operating the plurality of LDACS airborne stations to communicate at least one of A-PNT data, ATC data, and voice data.

* * * * *